(12) United States Patent
Ishiguro

(10) Patent No.: US 9,316,843 B2
(45) Date of Patent: Apr. 19, 2016

(54) STEREOSCOPIC IMAGE RECOGNITION APPARATUS

(75) Inventor: Makoto Ishiguro, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 171 days.

(21) Appl. No.: 13/277,584

(22) Filed: Oct. 20, 2011

(65) Prior Publication Data
US 2012/0099033 A1 Apr. 26, 2012

(30) Foreign Application Priority Data

Oct. 22, 2010 (JP) ................................ 2010-238033
Jun. 30, 2011 (JP) ................................ 2011-146865

(51) Int. Cl.
G02B 27/22 (2006.01)
G02F 1/13363 (2006.01)
(Continued)

(52) U.S. Cl.
CPC ........ *G02B 27/2264* (2013.01); *H04N 13/0438* (2013.01); *G02F 1/133634* (2013.01); *G02F 2001/133331* (2013.01); *G02F 2001/133638* (2013.01); *G02F 2413/08* (2013.01); *G02F 2413/11* (2013.01)

(58) Field of Classification Search
CPC ........... G02B 27/2264; H04N 13/0438; G02F 2001/133638; G02F 1/133634; G02F 1/133331
USPC ...................................................... 349/13, 15
See application file for complete search history.

(56) References Cited

U.S. PATENT DOCUMENTS 6,400,433 B1* 6/2002 Arakawa ............. G02B 5/3016
349/117
2002/0044350 A1* 4/2002 Sato et al. ..................... 359/465
(Continued)

FOREIGN PATENT DOCUMENTS

CN 101253429 A 8/2008
CN 101387784 A 3/2009
(Continued)

OTHER PUBLICATIONS

Japanese Office Action issued by JPO on Sep. 24, 2014 in connection with the corresponding Japanese Patent Application No. JP2011-146865.
(Continued)

Primary Examiner — Dennis Y Kim
(74) Attorney, Agent, or Firm — Jean C. Edwards, Esq; Edwards Neils PLLC

(57) ABSTRACT

A stereoscopic image recognition apparatus is provided and includes a liquid crystal display I and a time division image display shutter II. The liquid crystal display I includes a λ/4 plate A in a protection region for a the display side polarizing plate, the protection region being a region on the display side of a polarizer of the one of the polarizing plate. An angle formed by an absorption axis of the display side polarizing plate and a slow axis of the λ/4 plate A is 35 to 55° or 125 to 145°, and the protection region satisfies |Rth (550)|≤160 nm. The time division image display shutter II includes a polarizing plate C between the second liquid crystal cell and the viewer and includes a λ/4 plate B between the polarizing plate C and the liquid crystal display I. When the absorption axis of the display side polarizing plate and the absorption axis of the polarizing plate C are disposed so as to be perpendicular or parallel to each other, the slow axes of the λ/4 plate A and the λ/4 plate B are perpendicular or parallel to each other.

7 Claims, 4 Drawing Sheets

(51) Int. Cl.
*H04N 13/04* (2006.01)
*G02F 1/1333* (2006.01)

(56) References Cited

U.S. PATENT DOCUMENTS

| | | | |
|---|---|---|---|
| 2002/0180673 A1 | 12/2002 | Tsuda et al. | |
| 2003/0214625 A1* | 11/2003 | Arakawa et al. | 349/194 |
| 2005/0151906 A1 | 7/2005 | Yoshimi et al. | |
| 2006/0181662 A1* | 8/2006 | Kameyama et al. | 349/117 |
| 2007/0024780 A1* | 2/2007 | Kim et al. | 349/117 |
| 2007/0048459 A1* | 3/2007 | Takebe et al. | 428/1.31 |
| 2009/0066886 A1* | 3/2009 | Shimizu et al. | 349/96 |
| 2009/0273742 A1* | 11/2009 | Kuo et al. | 349/75 |
| 2010/0053488 A1* | 3/2010 | Kim et al. | 349/48 |
| 2010/0149472 A1 | 6/2010 | Hoshi | |
| 2011/0292308 A1* | 12/2011 | Lin et al. | 349/13 |
| 2012/0120356 A1* | 5/2012 | Washizu et al. | 349/117 |
| 2012/0206665 A1* | 8/2012 | Sakai et al. | 349/13 |

FOREIGN PATENT DOCUMENTS

| | | |
|---|---|---|
| JP | 53-051917 A | 5/1978 |
| JP | 10-232365 | 9/1998 |
| JP | 2001-312253 | 11/2001 |
| JP | 2002-082307 A | 3/2002 |
| JP | 2004-226945 A | 8/2004 |
| JP | 2009-069282 A | 4/2009 |
| JP | 2010-164956 | 7/2010 |
| WO | WO 2007/026524 A1 | 3/2007 |
| WO | WO 2010071079 A1 * | 6/2010 |
| WO | WO 2011058784 A1 * | 5/2011 |

OTHER PUBLICATIONS

Office Action issued by the Chinese State Intellectual Property Office (SIPO) on Nov. 2, 2014, in connection with Chinese Patent Application No. 201110347839.9.

Office Action issued by the Taiwan Patent Office on Sep. 3, 2015, in connection with Taiwanese Patent Application No. 100138083.

* cited by examiner

STEREOSCOPIC IMAGE RECOGNITION APPARATUS

This application is based on and claims priority under 35 U.S.C. §119 from Japanese Patent Application Nos. 2010-238033 and 2011-146865, filed Oct. 22, 2010 and Jun. 30, 2011, respectively, the entire disclosures of which are herein incorporated by reference.

BACKGROUND OF THE INVENTION

1. Field of the Invention

The present invention relates to a stereoscopic image recognition apparatus capable of improving luminance and enabling an image having a slight color variation to be recognized without crosstalk when a liquid crystal display which projects images displayed in a stereoscopic manner by a time division scheme is viewed in front and obliquely.

2. Background Art

As a stereoscopic image recognition apparatus which has a liquid crystal display mainly including a liquid crystal cell, and a pair of polarizing plates interposing the liquid crystal cell therebetween, and a time division image display shutter which includes a polarizing plate in a form of glasses or the like and a liquid crystal cell, there is known a stereoscopic image recognition apparatus disclosed in JP-A-53-51917 and JP-A-2002-82307 and the corresponding US 2002/0044350. In addition, the time division image display shutter is called liquid crystal (hereinafter, abbreviated to LC in some cases) shutter glasses when it is in a form of glasses. Such a stereoscopic image recognition apparatus is viewed in a state where, typically, the liquid crystal display stands vertically with respect to the ground, and the time division image display shutter is disposed in parallel to the ground (the eye of a viewer is parallel to the ground).

As a configuration of the stereoscopic image recognition apparatus, there is a configuration in which a $\lambda/4$ plate is disposed on a viewing side of a display side polarizing plate of the liquid crystal display, and a liquid crystal sealing body such as a liquid crystal cell and a $\lambda/4$ plate are disposed outside (opposite side to the viewer side) a polarizing plate disposed at the viewer side of the time division image display shutter. (Hereinafter, a configuration of the time division image display shutter having two polarizing plates is referred to as two-polarizing plate type time division image display shutter, and a configuration having one polarizing plate is referred to as a one-polarizing plate time division image display shutter.)

However, in the stereoscopic image recognition apparatus described above, at least one polarizing plate is used in the time division image display shutter, and thus it is known that luminance of a display screen is theoretically reduced. In order to obtain 3D display having high display definition, it is important to suppress reduction in luminance of a display screen as much as possible.

Since a stereoscopic image recognition apparatus in the related art does not use a $\lambda/4$ plate, there is a problem in that if the face is tilted in a case where the liquid crystal display is viewed in front, a display screen is darkened, but, in a stereoscopic image recognition apparatus using two $\lambda/4$ plates, it is possible to prevent the display screen from being darkened even if the face is tilted when the liquid crystal display is viewed in front.

In addition, in a case of the one-polarizing plate time division image display shutter, a flickering phenomenon unique to the stereoscopic image recognition apparatus can be suppressed; however, there is a problem in that a distinction between a right eye image and a left eye image, which is a mechanism for recognizing a stereoscopic image, is not completely recognized, and a so-called crosstalk phenomenon occurs in which the images are seen to overlap each other by a viewer when the liquid crystal display is viewed obliquely.

In relation to the latter crosstalk problem, as a solving means, a technique is disclosed in JP-A-2004-226945 and the corresponding US 2005/0151906 in which a member used as a $\lambda/4$ plate is formed on a transparent support by aligning discotic liquid crystal.

If the negative (−) plate A disclosed in JP-A-2004-226945 is applied to the stereoscopic image recognition apparatus disclosed in JP-A-2002-82307, it is proved that the crosstalk phenomenon is greatly reduced.

SUMMARY OF THE INVENTION

The present inventor attempted to improve luminance of a display screen by using two $\lambda/4$ plates in the stereoscopic image recognition apparatus, and in a case where the liquid crystal device is viewed obliquely in the above-described viewing form which is the most important, and it was found that luminance was not improved but rather is reduced (the screen is darkened) as compared with a stereoscopic image recognition apparatus which does not use the $\lambda/4$ plate. It can be said that none of the problems caused by using two $\lambda/4$ plates is known in the related art as far as the present inventor knows, in the stereoscopic image recognition apparatus.

In addition, in the stereoscopic image recognition apparatus using two $\lambda/4$ plates, a color variation in a display screen is great, and stereoscopic display (3D display) definition is considerably low even if a luminance variation is reduced when the face is tilted (the time division image display shutter is rotated), as compared with a form which does not use the $\lambda/4$ plate.

The crosstalk problem in the one-polarizing plate type time division image display shutter varies depending on an azimuth angle of a viewer. Even if a stereoscopic image recognition apparatus is formed by combining the techniques disclosed in JP-A-2002-82307 and JP-A-2004-226945, the azimuth-dependent problem of the crosstalk cannot be solved.

That is to say, an object of the present invention is not only to solve reduction in luminance in a tilted direction caused by employing two $\lambda/4$ plates, and but also to reduce a color variation in a display screen and improve crosstalk. Specifically, an object of the present invention is to provide a stereoscopic image recognition apparatus (a 3D display apparatus) capable of improving a color variation and crosstalk along with viewing angle luminance.

In addition, another object of the present invention is to provide an optical film which can be manufactured with high yield, and has physical performance sufficient to be used at a foremost surface of a display device. Further, still another object of the present invention is to provide a stereoscopic image recognition apparatus (a 3D display apparatus) with a small viewing angle dependency, and good durability.

As a result of various studies in order to solve the above-described problems, the present inventor has made the present invention based on findings that if a total of Rth of a display side polarizing plate protection region of a liquid crystal display (indicating the whole layers disposed on a viewing side of the display side polarizer among layers disposed on the display side polarizing plate of the liquid crystal display) is in a range, a color variation and crosstalk can be notably improved in addition to viewing angle luminance of a stereoscopic image recognition apparatus employing two λ/4 plates.

In other words, the above-described problems can be solved the following means.

[1] A stereoscopic image recognition apparatus comprising:
a liquid crystal display I that comprises a first liquid crystal cell and a pair of polarizing plates interposing the first liquid crystal cell therebetween, one of the polarizing plates being a diplay side polarizing plate on a display side of the first liquid crystal cell; and
a time division image display shutter II that comprises a second liquid crystal cell and that is disposed between a display surface of the liquid crystal display I and a viewer,
wherein the liquid crystal display I includes a λ/4 plate A in a protection region for the display side polarizing plate (i.e., the display side polarizing plate protection region), the protection region being a region on the display side of a polarizer of the one of the polarizing plate, wherein an angle formed by an absorption axis of the display side polarizing plate and a slow axis of the λ/4 plate A is 35 to 55° or 125 to 145°, and the protection region satisfies the following Expression (I),
wherein the time division image display shutter II includes a polarizing plate C between the second liquid crystal cell and the viewer and includes a λ/4 plate B between the polarizing plate C and the liquid crystal display I, and
wherein when the absorption axis of the display side polarizing plate and the absorption axis of the polarizing plate C are disposed so as to be perpendicular or parallel to each other, the slow axes of the λ/4 plate A and the λ/4 plate B are perpendicular or parallel to each other:

$|Rth(550)| \leq 160$ nm  (I)

wherein Rth (λ) is a retardation (nm) in a thickness direction at a wavelength λ nm

[2] The stereoscopic image recognition apparatus according to [1], wherein at least one of the λ/4 plate A and the λ/4 plate B includes a transparent support, an alignment film, and an optically anisotropic layer containing a liquid crystalline compound.

[3] The stereoscopic image recognition apparatus according to [2], wherein the liquid crystalline compound is a discotic liquid crystalline compound, and the discotic liquid crystalline compound is substantially vertically aligned in the optically anisotropic layer.

[4] The stereoscopic image recognition apparatus according to any one of [1] to [3], wherein the protection region satisfies the following Expression (II):

$|Rth(550)| \leq 120$ nm  (II)

[5] The stereoscopic image recognition apparatus according to any one of [1] to [4], wherein the protection region satisfies the following Expressions (IV) and (V):

$1.00 \leq Re(450)/Re(550) \leq 1.18$  (IV)

$0.92 \leq Re(630)/Re(550) \leq 1.00$  (V)

where Re (λ) is an in-plane retardation (nm) at a wavelength λ nm

[6] The stereoscopic image recognition apparatus according to any one of [1] to [5], wherein the λ/4 plate B satisfies the following Expressions (XII) and (XIII):

$Re(450)/Re(550) \leq 0.89$  (XII)

$Re(630)/Re(550) \geq 1.04$  (XIII)

where Re (λ) is in-plane retardation (nm) at a wavelength λ mm

[7] The stereoscopic image recognition apparatus according to any one of [1] to [6], wherein the protection region has an anti-reflection layer on an outmost surface thereof.

[8] The stereoscopic image recognition apparatus according to any one of [1] to [7], wherein the protection region has an absorptivity of 0.06 or more at 380 mm

[9] The stereoscopic image recognition apparatus according to any one of [1] to [8], wherein the time division image display shutter II includes at least the λ/4 plate B, the second liquid crystal cell, and the polarizing plate C in this order from a side facing the liquid crystal display I.

[10] The stereoscopic image recognition apparatus according to any one of [1] to [9], wherein the time division image display shutter II includes at least the λ/4 plate B, a polarizing plate, the second liquid crystal cell, and the polarizing plate C in this order from a side facing the liquid crystal display I.

DETAILED DESCRIPTION OF THE INVENTION

Figure 1:
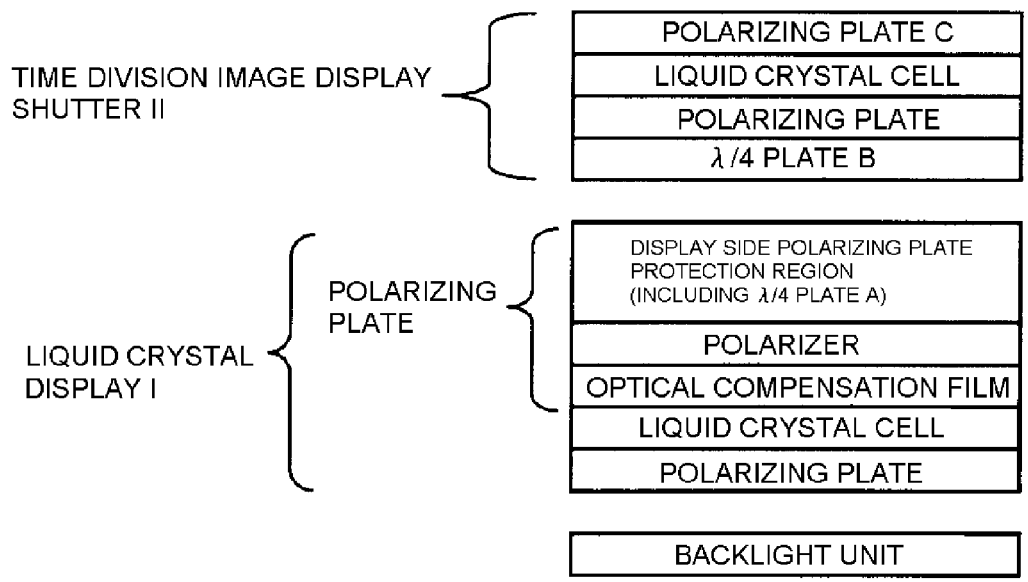
FIG. 1 is a schematic cross-sectional view illustrating an example of the stereoscopic image recognition apparatus including a two-polarizing plate type time division image display shutter according to an embodiment of the present invention.

According to embodiments of the present invention, it is possible to provide a display (a 3D display) apparatus capable of improving a color variation and crosstalk along with viewing angle luminance.

Hereinafter, embodiments of the present invention will be described in detail.

In addition, in the present embodiment, "parallel" or "perpendicular" indicates a range of an accurate angle within ±5°. An error in this accurate angle is preferably less than 4°, and more preferably 3°. However, in a relationship between a slow axis of a λ/4 plate A and a slow axis of a λ/4 plate B, "parallel" indicates a range where an angle formed by the two λ/4 plates is in a range of ±10° or less, and preferably in a range of ±5° or less, and more preferably in a range of ±3° or less. In a relationship between the slow axis of the λ/4 plate A and the slow axis of the λ/4 plate B, "perpendicular" indicates a range where an angle formed by the two λ/4 plates is in a range of 80° to 100° or less, and preferably in a range of 85° to 95° or less, and more preferably in a range of 87° to 93° or less.

In addition, in relation to an angle, "+" indicates a clockwise direction, and "−" indicates a counterclockwise direction.

Further, a "slow axis" indicates a direction where a refractive index is maximized, and a measurement wavelength of a refractive index is a value in a visible ray range (λ=550 nm) unless particularly described.

In addition, in the description of the present embodiment, a "polarizing plate" is used in a meaning including both of an elongated polarizing plate and a polarizing plate which is cut out as a size installed in a display device. In addition, "cut-out" described here includes "punching", "clipping", and the like. In the description of the present embodiment, a "polarizing plate" and a "polarizer" are discriminated from each other, but, the "polarizing plate" indicates a layer product where the polarizer has a transparent protective layer, which protects the polarizer, on at least one surface. The transparent protective layer indicates a film which is disposed between a liquid crystal cell and a polarizer and can support itself. (The magnitude of retardation does not matter.) In addition, a "polarizer" and a "polarizer" have the same meaning.

A "λ/4 plate" and a "λ/4 film" also have the same meaning.

In addition, in the description of the present embodiment, a "molecular symmetry axis" indicates a corresponding symmetry axis in a case where molecules have a rotational symmetry axis, but, strictly, there is no need for molecules to have rotational symmetry. Generally, in a discotic liquid crystalline compound, the molecular symmetry axis corresponds with an axis which passes through a center of the discotic plane and is perpendicular to the discotic plane, and, in a rod-shaped liquid crystalline compound, the molecular symmetry axis corresponds with a long axis of a molecule.

In addition, in the present specification, Re (λ) and Rth (λ) respectively indicate in-plane retardation and retardation in the thickness direction at a wavelength λ. Re (λ) is measured by making light of a wavelength λ nm incident in the film normal direction in KOBRA 21ADH or WR (manufactured by Oji Scientific Instruments). A measurement wavelength λ nm may be selected by exchanging wavelength selection filters manually, or by converting measurement values using a program or the like. If a measured film is expressed by a one-axis or two-axis index ellipsoid, Rth (λ) is calculated by the following method. In addition, the measurement method is partially used for measurement of an average tilt angle on an alignment film side and an average tilt angle on an opposite side of discotic liquid crystalline molecules in an optically anisotropic layer described later.

Re (λ) of the overall six points is measured by making light of a wavelength λ nm incident from respective tilted directions with ten-degree steps up to 50° from the normal direction with respect to the film normal direction using an in-plane slow axis (determined by KOBRA 21ADH or WR) as a tilted axis (rotation axis) (if there is no slow axis, an arbitrary axis in a film plane is used as a rotation axis), and Rth (λ) is calculated by KOBRA 21ADH or WR based on the measured retardation values, assumed values of an average refractive index, and input film thickness values. In the above description, in a case of a film having a direction where a retardation value is zero at a certain tilted angle from the normal direction using the in-plane slow axis as a rotation axis, the sign of a retardation value at a tilted angle larger than the tilted angle is changed to negative (−), and then Rth (λ) is calculated by KOBRA 21ADH or WR. In addition, retardation values are measured from an arbitrary two tilted directions using a slow axis as a tilted axis (rotation axis) (if there is no slow axis, an arbitrary axis in a film plane is used as a rotation axis), and Rth may be calculated for the following Equations (A) and (B) based on the measured values, assumed values of an average refractive index, and input film thickness values.

Equation A $$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad (A)$$

Here, Re (θ) indicates a retardation value at a direction tilted by an angle θ from the normal direction.

In addition, in Equation (A) and the following Equation (B), nx indicates a refractive index in a slow axis direction in a plane, ny indicates a refractive index in a direction perpendicular to nx in the plane, and nz indicates a refractive index in a direction perpendicular to nx and ny. Further, d indicates a film thickness.

$$Rth = ((nx+ny)/2-nz) \times d \quad \text{Equation (B)}$$

If a measured film is not expressed by a one-axis or two-axis index ellipsoid, that is, there is no so-called optic axis, Rth (λ) is calculated by the following method. Re (λ) of the overall eleven points is measured by making light of a wavelength λ nm from respective tilted directions with 10° steps from −50° to +50° from the normal direction with respect to the film normal direction using an in-plane slow axis (determined by KOBRA 21ADH or WR) as a tilted axis (rotation axis), and Rth (λ) is calculated by KOBRA 21ADH or WR based on the measured retardation values, assumed values of an average refractive index, and input film thickness values. In the above measurement, an assumed value of an average refractive index may use values described in Polymer Handbook (JOHN WILEY & SONS, INC), or catalogs for various optical films. If a value of an average refractive index does not exist, it may be measured using an Abbe refractometer. Values of the average refractive index of main optical films are exemplified below: cellulose acylate (1.48), cycloolefin polymer (1.52), polycarbonate (1.59), polymethylmethacrylate (1.49), and polystyrene (1.59). If these assumed values of the average refractive index and the film thickness are input, KOBRA 21ADH or WR calculates nx, ny and nz.

From calculated nx, ny, and nz, Nz=(nx−nz)/(nx−ny)=Rth/Re+0.5 is further calculated.

<Measurement of Tilit Angle>

In an optically anisotropic layer where the discotic liquid crystalline compound or the rod-shaped liquid crystalline compound is aligned, it is difficult to directly and accurately measure a tilt angle (the tilt angle is set to an angle formed by a physical target axis of the discotic liquid crystalline compound or the rod-shaped liquid crystalline compound and an interface of the optically anisotropic layer) θ1 of one surface of the optically anisotropic layer and a tilt angle θ2 of the other surface thereof. Therefore, in the present specification, θ1 and θ2 are calculated by the following method. This method does not exactly express an actual alignment state in the present invention but is effective as a means indicating a relative relationship of partial optical characteristics of the optical film.

In this method, in order to facilitate the calculation, the following two matters are assumed, and are used as tilt angles at the two interfaces of the optically anisotropic layer.

1. The optically anisotropic layer is assumed as a multi-layer body which is constituted by layers including the discotic liquid crystalline compound or the rod-shaped liquid crystalline compound. In addition, the minimal unit layer constituting the body (a tilt angle of the discotic liquid crystalline compound or the rod-shaped liquid crystalline compound is assumed as being equal in the layers) is assumed as one axis optically.

2. A tilt angle of each layer is assumed to be monotonously varied as a linear function in the thickness direction of the optically anisotropic layer.

A detailed calculation method is as follows.

(1) In a plane where a tilt angle of each layer is monotonously varied as a linear function in the thickness direction of the optically anisotropic layer, an incidence angle of measurement light to the optically anisotropic layer is varied, and thereby a retardation value is measured at three or more measurement angles. For simplification of measurement and calculation, it is preferable to set the normal direction of the optically anisotropic layer to 0° and measure a retardation value at three measurement angles of −40°, 0°, and +40°. The measurement may be performed using KOBRA-21ADH and KOBRA-WR (manufactured by Oji Scientific Instruments), transmissive ellipsometer AEP-100 (manufactured by Shimadzu Corporation), M150 and M520 (manufactured by JASCO Corporation), and ABR10A (manufactured by Uniopt Corporation).

(2) In the above-described model, for each layer, a refractive index of ordinary rays is denoted by no, a refractive index of extraordinary rays is denoted by ne (ne is the same value in all the layers, and no is the same in all the layers), and the overall thickness of the multi-layer body is denoted by d. Further, on the premise that a tilt angle in each layer corresponds with an optic axis direction of one axis of the layer, fitting is performed using a tilt angle θ1 of one surface of the optically anisotropic layer and a tilt angle θ2 of the other surface as variables such that calculation of angle dependency of a retardation value of the optically anisotropic layer matches a measured value, thereby calculating θ1 and θ2.

Here, as no and ne, known values such as values disclosed in documents or values disclosed in catalogs may be used. If values are unknown, they may be measured using an Abbe refractometer. The thickness of the optically anisotropic layer can be measured using an optical interference coating thickness meter, a cross-sectional picture of a scan type electron microscope, or the like.

Hereinafter, a stereoscopic image recognition apparatus according to an embodiment of the present invention, an optical film, a polarizing plate, and an image display device constituting the same, various materials used to manufacture them, and a manufacturing method thereof will be described in detail.

<Stereoscopic Image Recognition Apparatus>

A stereoscopic image recognition apparatus according to an embodiment of the present invention includes a liquid crystal display I which has a liquid crystal cell (a first liquid crystal cell), and a pair of polarizing plates interposing the liquid crystal cell therebetween, and a time division image display shutter II which is disposed between a display surface of the liquid crystal display I and a viewer and which has a liquid crystal cell (a second liquid crystal cell). If a region disposed on the display side of a polarizer of the display side polarizing plate is a display side polarizing plate protection region, the liquid crystal display I has a λ/4 plate A in the display side polarizing plate protection region, and an angle formed by the absorption axis of the display side polarizing plate of the liquid crystal display I and the slow axis of the λ/4 plate A is 35 to 55° or 125 to 145°. Further, the display side polarizing plate protection region satisfies Expression (I).

$$|Rth(500)| \leq 160 \text{ nm} \qquad \text{(I)}$$

Here, Rth (λ) denotes retardation (nm) in the thickness direction at a wavelength λ nm.

The time division image display shutter II has at least one polarizing plate C between the liquid crystal cell and a viewer, and has a λ/4 plate B between the polarizing plate C and the liquid crystal display I.

Here, when the absorption axis of the display side polarizing plate of the liquid crystal display I and the absorption axis of the polarizing plate C of the time division image display shutter II are disposed to be perpendicular or parallel to each other, the slow axes of the λ/4 plate A and the λ/4 plate B are perpendicular or parallel to each other.

Figure 2:
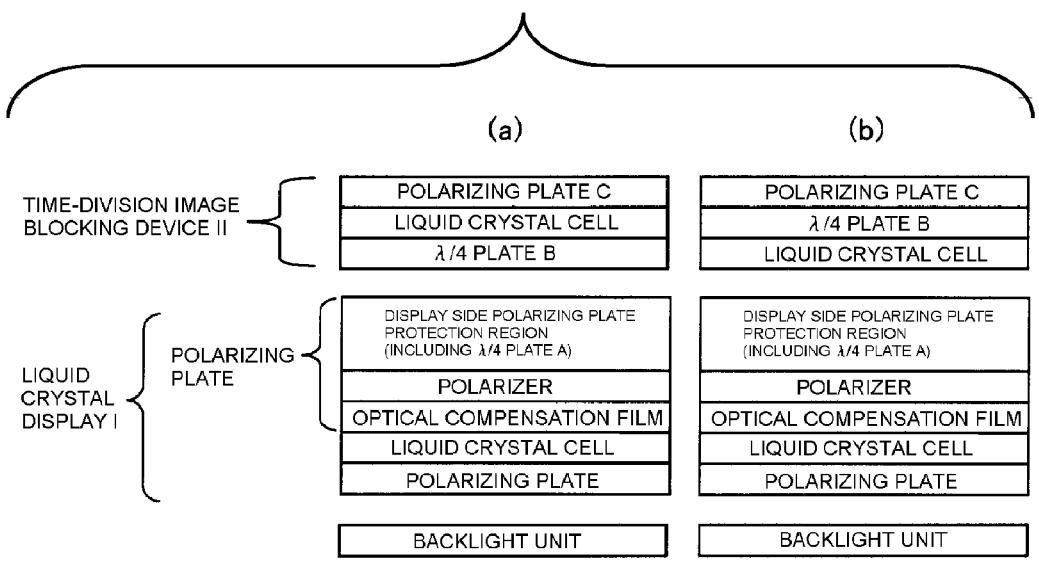
FIG. 2 is a schematic cross-sectional view illustrating examples of the stereoscopic image recognition apparatus including a one-polarizing plate type time division image display shutter according to an embodiment of the present invention.

Representative aspects of the stereoscopic image recognition apparatus of the present invention are shown in FIGS. 1 and 2.

In the aspects shown in FIGS. 1 and 2, an optical compensation film is provided at a region opposite to the display side polarizing plate protection region with respect to the polarizer of the display side polarizing plate. In addition, the liquid crystal display I includes a backlight unit, and image display can be performed via the liquid crystal display I using light from the unit. The display side polarizing plate protection region indicates a region of the liquid crystal display I on the display side when seen from the polarizer of the display side polarizing plate, and the display side polarizing plate protection region includes the λ/4 plate A. The λ/4 plate A may be constituted by a support and an optically anisotropic layer and have a λ/4 function, or may be constituted only by a support which has desired optical anisotropy and thus a λ/4 function (hereinafter, also referred to as an optically anisotropic support).

The display side polarizing plate protection region may include various surface films in addition to the λ/4 plate A.

As the surface film, there is a hard coat film where a hard coat layer is formed on a support, an anti-reflection film where an anti-reflection layer (a low refractive index layer, a medium refractive index layer, a high refractive index layer, and the like) is formed on a support, or the like. The surface film may be a film having a hard coat function and an anti-reflection function by forming both of the hard coat layer and the anti-reflection layer on the support. The support of the surface film may also be used as the λ/4 plate A.

The time division image display shutter II according to an embodiment of the present invention includes at least one polarizing plate C between the liquid crystal cell and a viewer, and includes a λ/4 plate B between the polarizing plate C and the liquid crystal display I. The polarizing plate C is installed on the viewer side when seen from the liquid crystal cell.

As shown in FIG. 1, the time division image display shutter may include an aspect (two-polarizing plate type) in which another polarizing plate and the λ/4 plate B are provided on an opposite side to the polarizing plate C of the liquid crystal cell, and, as shown in FIG. 2, an aspect (one-polarizing plate type) in which the λ/4 plate B is provided on an opposite side to the polarizing plate C of the liquid crystal cell without a polarizing plate. In the one-polarizing plate type time division image display shutter, the polarizing plate C, the liquid crystal cell, and the λ/4 plate B may be stacked in this order (part (a) of FIG. 2), or the polarizing plate C, the λ/4 plate B, and the liquid crystal cell may be stacked in this order (part (b) of FIG. 2).

Here, in the aspect shown in FIG. 1, the λ/4 plate B is a generic name of layers positioned on the liquid crystal display I side when seen from the polarizer of the polarizing plate disposed opposite to the polarizing plate C with the liquid crystal cell interposed therebetween, and, is a generic name of layers positioned on the liquid crystal display I when seen from the liquid crystal cell in the aspect shown in part (a) of FIG. 2. In the aspect shown in part (b) of FIG. 2, the λ/4 plate B is a generic name of layers positioned between the polarizer of the polarizing plate C and the liquid crystal cell, and the transparent protective layer of the polarizing plate C disposed on the liquid crystal cell side is also included in the λ/4 plate B.

The λ/4 plate B of the time division image display shutter II may be constituted by a support and an optically anisotropic layer, and or may be constituted only by a support which has desired optical anisotropy and thus a λ/4 function (hereinafter, also referred to as an optically anisotropic support), in the same manner as the λ/4 plate A. In addition, in the aspects shown in FIGS. 1 and 2, the above-described various surface films may be provided on the outmost surface of the λ/4 plate B.

Figure 3:
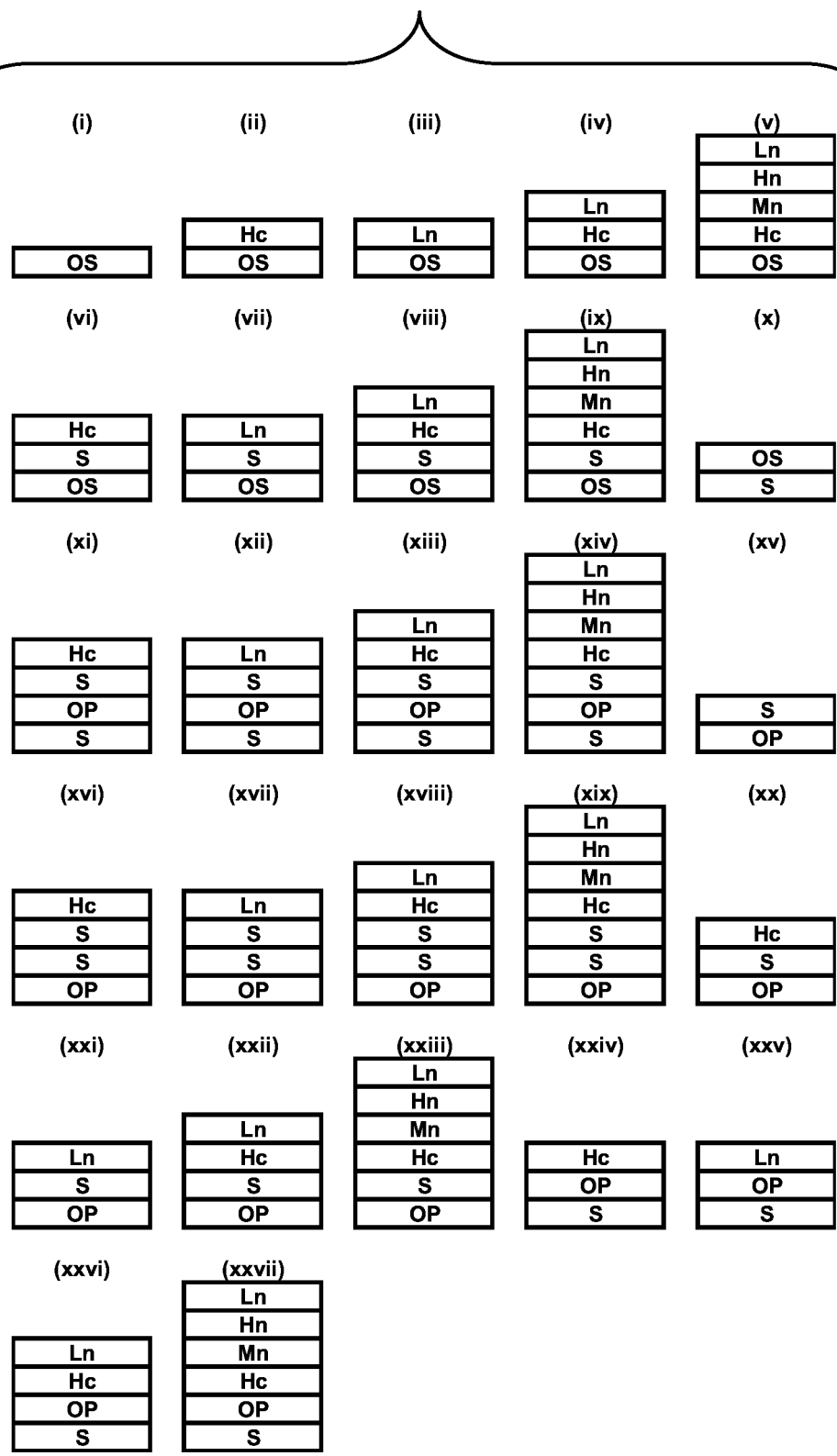
FIG. 3 is a schematic cross-sectional view illustrating examples of a λ/4 plate B of a display side polarizing plate protection region and a time division image display shutter according to an embodiment of the present invention.

As shown in FIG. 3, configuration examples of the display side polarizing plate protection region and the λ/4 plate B of the time division image display shutter may include the followings. In FIG. 3, "OS", "S", "Hc", "Ln", "Mn", "Hn", "OP" mean an optically anisotropic layer, a support, a hard coat layer, a low refractive index layer, a medium refractive index layer, a high refractive index layer, an optically anisotropic layer, respectively.

Optically anisotropic support (part (i) of FIG. 3)

Optically anisotropic support/hard coat layer (part (ii) of FIG. 3)

Optically anisotropic support/low refractive index layer (part (iii) of FIG. 3)

Optically anisotropic support/hard coat layer/low refractive index layer (part (iv) of FIG. 3)

Optically anisotropic support/hard coat layer/medium refractive index layer/high refractive index layer/low refractive index layer (part (v) of FIG. 3)

Optically anisotropic support/support/hard coat layer (part (vi) of FIG. 3)

Optically anisotropic support/support/low refractive index layer (part (vii) of FIG. 3)

Optically anisotropic support/support/hard coat layer/low refractive index layer (part (viii) of FIG. 3)

Optically anisotropic support/support/hard coat layer/medium refractive index layer/high refractive index layer/low refractive index layer (part (ix) of FIG. 3)

Support/optically anisotropic support (part (x) of FIG. 3)

Support/optically anisotropic support/support/hard coat layer (part (xi) of FIG. 3)

Support/optically anisotropic support/support/low refractive index layer (part (xii) of FIG. 3)

Support/optically anisotropic support/support/hard coat layer/low refractive index layer (part (xiii) of FIG. 3)

Support/optically anisotropic support/support/hard coat layer/medium refractive index layer/high refractive index layer/low refractive index layer (part (xiv) of FIG. 3)

Optically anisotropic layer/support (part (xv) of FIG. 3)

Optically anisotropic layer/support/support/hard coat layer (part (xvi) of FIG. 3)

Optically anisotropic layer/support/support/low refractive index layer (part (xvii) of FIG. 3)

Optically anisotropic layer/support/support/hard coat layer/low refractive index layer (part (xviii) of FIG. 3)

Optically anisotropic layer/support/support/hard coat layer/medium refractive index layer/high refractive index layer/low refractive index layer (part (xix) of FIG. 3)

Optically anisotropic layer/support/hard coat layer (part (xx) of FIG. 3)

Optically anisotropic layer/support/low refractive index layer (part (xxi) of FIG. 3)

Optically anisotropic layer/support/hard coat layer/low refractive index layer (part (xxii) of FIG. 3)

Optically anisotropic layer/support/hard coat layer/medium refractive index layer/high refractive index layer/low refractive index layer (part (xxiii) of FIG. 3)

Support/optically anisotropic layer/hard coat layer (part (xxiv) of FIG. 3)

Support/optically anisotropic layer/low refractive index layer (part (xxv) of FIG. 3)

Support/optically anisotropic layer/hard coat layer/low refractive index layer (part (xxvi) of FIG. 3)

Support/optically anisotropic layer/hard coat layer/medium refractive index layer/high refractive index layer/low refractive index layer (part (xxvii) of FIG. 3)

<λ/4 Plate>

A λ/4 plate which can be used in the present invention will be described including the λ/4 plate A and the λ/4 plate B.

A λ/4 plate used in the present invention may be constituted by an optically anisotropic support itself which has a desired λ/4 function, or may have an optically anisotropic layer on a support formed of a polymer film. That is to say, in the latter case, a desired λ/4 function is given by laminating other layers on the support. A material forming the optically anisotropic layer is not particularly limited. The optically anisotropic layer is formed of a composition containing a liquid crystalline compound, and may be a layer having optical anisotropy expressed by alignment of molecules of the liquid crystalline compound, may be a layer having optical anisotropy expressed by aligning large molecules in a stretched polymer film, or may have both the two layers. That is to say, the optically anisotropic layer may be constituted by one or two or more two-axis films, or may be constituted by combining two or more one-axis films such as a combination of a C plate and an A plate. Of course, it may be constituted by a combination of one or more two-axis films and one or more one-axis films.

In-plane retardation Re (550) of the optically anisotropic support used in the present invention is 100 to 175 nm. It is more preferably 100 to 165 nm, and even more preferably 115 to 155 nm. Retardation Rth (550) in the thickness direction is preferably −400 to 260 nm, and more preferably −200 to 160 nm, and even more preferably −90 to 90 nm. In the above range, it is possible to obtain an optically anisotropic support which has small wavelength dependency or incidence angle dependency of light and functions as a λ/4 plate. In addition, ideally, a wavelength is dispersed such that Re is λ/4 at any of 450 nm, 550 nm, and 630 nm That is to say, an ideal λ/4 plate satisfies Re (450)=112.5 nm, Re (550)=137.5 nm, and Re (630)=157.5 nm Ideally, Rth is preferably 0 nm at any wavelength. That is to say, an ideal λ/4 plate Rth (450)=0 nm, Rth (550)=0 nm, and Rth (630)=0 nm.

In an aspect where a λ/4 plate used in the present invention includes the optically anisotropic layer or the like on the support, the overall Re and Rth of the combined the support and the optically anisotropic layer preferably satisfy the above range.

A preferable range of in-plane retardation Re (550) of the entire display side polarizing plate protection region of the liquid crystal display I is the same as the above range. Retardation Rth (550) in the thickness direction of the entire display side polarizing plate protection region is (I) preferably |Rth (550)|≤160 nm, (II) more preferably |Rth (550)|≤120 nm, and (III) even more preferably |Rth (550)|≤80 nm If Rth (550) of the entire display side polarizing plate protection region satisfies the above Expression (I), it is possible to increase viewing angle luminance as compared with a stereoscopic image recognition apparatus which does not include a λ/4 plate, and if satisfies the above Expression (II), it is possible to increase viewing angle crosstalk in an aspect of the present invention shown in FIG. 2 (the stereoscopic image recognition apparatus including the one-polarizing plate type time division image display shutter). In addition, if the above Expression (III) is satisfied, it is possible to improve display performance to a degree that left and right asymmetry in a case where the liquid crystal display is viewed diagonally right (for example, an azimuth angle direction is 45 degrees, and a polar angle direction is 60 degree) and is viewed diagonally left (for example, an azimuth angle direction is 135 degrees, and a polar angle direction is 60 degrees) is not viewed.

Wavelength dispersion in Re of the entire display side polarizing plate protection region is preferably 0.82≤Re (630)/Re (550)≤1.11 at 0.80≤Re (450)/Re (550)≤1.21, and, at (IV) 1.00≤Re (450)/Re (550)≤1.18, (V) more preferably 0.92≤Re (630)/Re (550)≤1.00. In this range, there is provided a stereoscopic image recognition apparatus in which viewing angle luminance and viewing angle crosstalk mainly depend on Rth of the entire display side polarizing plate protection region, and does not depend on wavelength dispersion of Re of the entire display side polarizing plate protection region.

An angle formed by the absorption axis of the display side polarizing plate of the liquid crystal display I and the slow axis of the λ/4 plate A is preferably 30 to 60° or 120 to 150°,
more preferably 35 to 55° or 125 to 145°, and
even more preferably 40 to 50° or 130 to 140°.

A preferable range of the in-plane retardation Re (550) of the λ/4 plate B mounted on the time division image display shutter II is also the same as the above range, and, is more preferable 120 nm to 150 nm. If Re (550) is in this range, a difference in display performance is not viewed to a great extent. Retardation Rth (550) in the thickness direction of the λ/4 plate B mounted on the time division image display shutter II is (VI) preferably |Rth (550)|≤100 nm, and
(VII) more preferably |Rth (550)|≤40 nm If Rth (550) of the λ/4 plate B mounted on the time division image display shutter II satisfies the above Expression (VI), screen luminance unevenness of the liquid crystal display can be reduced to an unnoticeable degree, and if it satisfies the above Expression (VII), screen luminance unevenness of the liquid crystal display can be reduced to a degree that it is not viewed at all. In the aspect where various surface films are provided on the outmost surface of the λ/4 plate B, it is preferable to satisfy the above-described Rth range including the surface films.

The wavelength dispersion in the in-plane retardation Re of the λ/4 plate B mounted on the time division image display shutter II preferably shows so-called backward dispersibility where the longer a wavelength is, the larger the dispersion is, in the visible ray range, or so-called flat dispersibility where dispersion is constant regardless of a wavelength. In other words, the wavelength dispersion preferably satisfies Re (450)≤Re (550)≤Re (630). This is because, although stereoscopic display can be obtained by viewing the liquid crystal display I from various angles including the time division image display shutter II since the time division image display shutter II is separated from the liquid crystal display I, if Re of the λ/4 plate B has the backward wavelength dispersibility or the flat dispersibility, a color variation of a display screen of the liquid crystal display I can be reduced when the time division image display shutter II is rotated. In order to obtain stereoscopic display having a small color variation even in a case where the time division image display shutter II is rotated, the wavelength dispersion of the λ/4 plate B is (VIII) preferably Re (450)/Re (550)≤1, and (IX) 1≤Re (630)/Re (550), (X) more preferably Re (450)/Re (550)≤0.94, and (XI) 1.02≤Re (630)/Re (550), and (XII) even more preferably Re (450)/Re (550)≤0.89, and (XIII) 1.04≤Re (630)/Re (550).

In addition, if the wavelength dispersion of the λ/4 plate B satisfies the above Expressions (X) and (XI), a color variation can be reduced to a degree to be almost unnoticeable, and if it satisfies the above Expressions (XII) and (XIII), color shading can be improved to a degree that a color variation is not viewed at all.

In the stereoscopic image recognition apparatus according to the embodiment of the present invention, an aspect is also a preferable aspect in which a λ/4 plate with Re backward dispersibility is used as the λ/4 plate B of the time division image display shutter II, and a λ/4 plate having low Rth is used as the λ/4 plate A of the display side polarizing plate protection region of the liquid crystal display I.

In the related art, in a stereoscopic image recognition apparatus using two λ/4 plates (λ/4 films), two λ/4 plates having the same kind and characteristic are used from the viewpoint of luminance and color visibility in front. This is because, in viewing stereoscopic images in a recommended form in front, two λ/4 plates are disposed to be perpendicular to each other, thus Re wavelength dispersibility is canceled out, and, as a result, it is possible to obtain stereoscopic images where front luminance is high and there is no color variation.

However, as described above, an ideal λ/4 plate has Re (550)=137.5 nm, Rth (550)=0 nm, and Nz=Rth/Re+0.5=0.5. That is to say, ideal wavelength dispersion of Re is backward dispersion, and ideal wavelength dispersion of Rth is flat dispersion. By using the ideal λ/4 plate in the liquid crystal display I and the time division image display shutter II, there is provided a stereoscopic image recognition apparatus having a favorable viewing angle characteristics as well as a front characteristic. However, there are many cases where such a λ/4 film is difficult to manufacture. This is because if a λ/4 plate is manufactured using an optically anisotropic support of which Re shows backward dispersibility in order to approach the ideal plate, the Nz factor scarcely reaches 0.5, and, typically, Nz becomes 1 or more (that is, Rth is increased). On the other hand, for example, if a λ/4 plate is manufactured using a layer product of a transparent support and an optically anisotropic layer made of a composition containing a liquid crystalline compound, the Nz factor can realize 0.5, but there are cases where the Re wavelength dispersibility becomes forward dispersion and thereby a color variation of a display screen is increased.

From the results of intensive study, the present inventor found that the λ/4 plate A included in the display side polarizing plate protection region of the liquid crystal display I and the λ/4 plate B of the time division image display shutter II have different required characteristics. Specifically, the λ/4 plate A included in the display side polarizing plate protection region of the liquid crystal display I preferably has low Rth, and the λ/4 plate B of the time division image display shutter II preferably Re backward dispersibility. If the λ/4 plate included in the display side polarizing plate protection region of the liquid crystal display I has low Rth, it is possible to improve viewing angle luminance and viewing angle crosstalk performance. If Re of the λ/4 plate B of the time division image display shutter II has backward dispersibility, a color variation can reduced to a degree that it is not viewed when the time division image display shutter II is rotated regardless of the wavelength dispersibility of the λ/4 plate A included in the display side polarizing plate protection region of the liquid crystal display I.

In addition, even in a case where the λ/4 plate B of the time division image display shutter II and the λ/4 plate A of the display side polarizing plate protection region of the liquid crystal display I are different, the front luminance is not substantially varied in a range where Re (550) is 115 to 155 nm That is to say, by using a λ/4 plate of Re backward dispersibility in the time division image display shutter II, along with improvement in viewing angle luminance and viewing angle crosstalk performance, obtained by using the λ/4 plate A having low Rth in the display side polarizing plate protection region of the liquid crystal display I, it is possible to remove a demerit of the color variation due to Re wavelength dispersibility (flat dispersion and forward dispersion). In this case, even if an ideal λ/4 plate is not used, it is possible to obtain the same stereoscopic images as a case of using the ideal λ/4 plate.

In an aspect where the Re wavelength dispersion of the λ/4 plate A and the λ/4 plate B is forward dispersion or flat dispersion, Re (550) of one or both of the λ/4 plate A and the λ/4 plate B is preferably lower than 137.5 nm, and, specifically, if 130 nm or less, a color variation can be reduced to a degree that it is not viewed when the time division image display shutter II is rotated. On the other hand, if Re (550) is too high or too low, luminance in 3D display is reduced, and crosstalk is increased. In order to reduce a color variation to a degree where it is not viewed when the time division image display shutter II is rotated without reduction in luminance and increase (deterioration) in crosstalk in 3D display, Re (550) is more preferably 115 nm to 130 nm Particularly, in an aspect where the λ/4 plate A included in the display side polarizing plate protection region of the liquid crystal display I which is viewed from various direction shows Re forward dispersibility, Re (550) of the λ/4 plate A is preferably 115 nm to 130 nm.

A material for the optically anisotropic support used in the present invention is not particularly limited. Various polymer films, for example, polyester-based polymers such as a cellulose acylate, a polycarbonate-based polymer, polyethylene terephthalate, polyethylene naphthalate, and the like; acrylic polymers such as polymethylmethacrylate and the like; styrenic polymers such as polystyrene, an acrylonitrile/styrene copolymer (AS resin), and the like; etc. can be used. Furthermore, one or two or more kinds selected from a polyolefin such as polyethylene, polypropylene, and the like, a polyolefinic polymer such as an ethylene-propylene copolymer, a vinyl chloride-based polymer, an amide-based polymer such as nylon, an aromatic polyamide, and the like, an imide-based polymer, a sulfone-based polymer, a polyethersulfone-based polymer, a polyether ether ketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, an epoxy polymer, a polymer mixture thereof, and the like, can be used as a main component to produce a polymer film, which can be used to produce an optical film with a combination satisfying the above characteristics.

In the case where the λ/4 plate is a layer product of a polymer film (transparent support) and an optically anisotropic layer, the optically anisotropic layer includes at least one layer formed of a composition containing a liquid crystalline compound, preferably a polymer film, or more preferably both of them. That is, a layer product of a polymer film (transparent support) and an optically anisotropic layer formed of a composition containing a liquid crystalline compound is preferred. A polymer having low optical anisotropy may be used, or a polymer film having the optical anisotropy expressed by a stretch treatment or the like may be used. The support may have a light transmittance of 80% or more.

[Optically Anisotropic Layer Containing Liquid Crystalline Compound]

The kind of liquid crystalline compound used to form an optically anisotropic layer that may be contained in the λ/4 plate is not particularly limited. For example, an optically anisotropic layer, which can be obtained by forming a low molecular liquid crystalline compound in a nematic alignment in a liquid crystal state, and forming an optically anisotropic layer which can be obtained by performing fixation by optical crosslinking or thermal crosslinking, or forming a high molecular liquid crystalline compound in a nematic alignment in a liquid crystal state, and then cooling to fix the alignment, can be used. Further in the present invention, even if a liquid crystalline compound may be used in an optically anisotropic layer, the optically anisotropic layer is a layer fixed and formed by the polymerization or the like of the liquid crystalline compound, thus does not need to show crystallinity once the layer is formed. The polymerizable liquid crystalline compound may be a multifunctional polymerizable liquid crystalline compound, and may also be a monofunctional polymerizable liquid crystalline compound. In addition, the liquid crystalline compound may be a discotic liquid crystalline compound, and may also be a rod-shaped liquid crystalline compound.

In the optically anisotropic layer, the molecule of the liquid crystalline compound is preferably fixed in any one alignment state selected from a vertical alignment, a horizontal alignment, a hybrid alignment, and an inclined alignment. In order to produce a retardation plate with symmetrical viewing angle-dependency, the disc plane of the discotic liquid crystalline compound is substantially vertical to the film plane (optically anisotropic layer plane), or preferably the longitudinal direction of the rod-shaped liquid crystalline compound is substantially horizontal to the film plane (optically anisotropic layer plane). A discotic liquid crystalline compound being substantially vertical is defined by an angle between the film plane (optically anisotropic layer plane), and the disc plane of the discotic liquid crystalline compound being in the range of 70° to 90°. The angle is preferably 80° to 90°, and more preferably 85° to 90°. A rod-shaped liquid crystalline compound being substantially horizontal is defined by an angle between the film plane (optically anisotropic layer plane) and the director of the rod-shaped liquid crystalline compound being in the range of 0° to 20°. The angle is preferably 0° to 10°, and more preferably 0° to 5°.

In the case where the molecule of the liquid crystalline compound is in the hybrid alignment so as to produce an optical compensation film with symmetrical viewing angle-dependency, the average inclination angle of the liquid crystalline compound is preferably 5° to 85°, more preferably 10° to 80°, and even more preferably 15° to 75°.

In the case where the λ/4 plate includes an optically anisotropic layer containing a liquid crystalline compound, the optically anisotropic layer may be formed of a single layer or may be a layer product of two or more optically anisotropic layers.

The optically anisotropic layer can be formed by coating a rod-shaped liquid crystalline compound, a discotic liquid crystalline compound, or the like, and if necessary, a composition containing the following polymerization initiator, air interface alignment material and other additives onto a support. It is preferable to form an alignment film on a support, and then to coat the liquid crystalline composition onto the surface of the alignment.

[Discotic Liquid Crystalline Compound]

In the present invention, it is preferable to use a discotic liquid crystalline compound so as to form an optically anisotropic layer contained in the optical film. The discotic liquid crystalline compound is described in various publications (C. Destrade, et al., Mol. Crysr. Liq. Cryst., Vol. 71, p. 111 (1981); Chemical Society of Japan, Quarterly Journal of General Chemistry, No. 22, Chemistry of Liquid Crystals, Chap. 5, Chap. 10, Sec. 2 (1994); B. Kohne, et al. Angew. Chem. Soc. Chem. Comm., p. 1794 (1985); and J. Zhang, et al., J. Am. Chem. Soc., Vol. 116, p. 2655 (1994)). Polymerization of a discotic liquid crystalline compound is described in JP-A-8-27284.

A discotic liquid crystalline compound preferably contains a polymerizable group for allowing fixation by polymerization. For example, a structure having a polymerizable group as a substituent bonded onto the discotic core of the discotic liquid crystalline compound can be considered, but when a polymerizable group is directly bonded to the discotic core, it is difficult to maintain the alignment state during the polymerization reaction. Therefore, a structure having a linking group between the discotic core and the polymerizable group is preferred. That is, a discotic liquid crystalline compound having a polymerizable group is preferably a compound represented by the following formula.

D(-L-P)$_n$ wherein D is a discotic core, L is a divalent linking group, P is a polymerizable group and n is an integer of 1 to 12. Preferable specific examples of the discotic core (D), a divalent group (L) and a polymerizable group (P) in the formula are disclosed in (D1) to (D15), (L1) to (L25), and (P1) to (P18) of JP-A-2001-4837, respectively, and the disclosed contents in the publication can be preferably used. Further, the transition temperature of discotic nematic liquid crystal phase-solid phase of the liquid crystalline compound is preferably 30 to 300° C., and more preferably 30 to 170° C.

The discotic liquid crystalline compound represented by the following formulae (I) or (DI) has low wavelength dispersibility of the in-plane retardation and can express high in-plane retardation, and can accomplish vertical alignment having excellent uniformity with a high average inclination angle even without the use of a specific alignment film or additive. Therefore, it is preferably used to form an optically anisotropic layer. A coating liquid further containing the liquid crystalline compound has a tendency to provide a low viscosity and has good coatability, which is thus preferred.

(1)-1 Discotic Liquid Crystalline Compound Represented by Formula (I)

Formula (I):

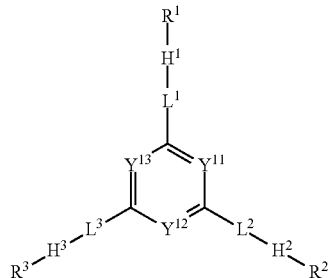

In the formula, each of $Y^{11}$, $Y^{12}$, and $Y^{13}$ independently represents methine which may be substituted or a nitrogen atom.

In the case where each of $Y^{11}$, $Y^{12}$, and $Y^{13}$ is a methine group, the hydrogen atom of the methine group may be substituted with a substituent. Preferred examples of the substituent which may be introduced to the methine group include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Among these substituents, an alkyl group, an alkoxy group, an alkoxycarbonyl group, an acyloxy group, a halogen atom and a cyano group are more preferred; an alkyl group having 1 to 12 carbon atoms, an alkoxy group having 1 to 12 carbon atoms, an alkoxycarbonyl group having 2 to 12 carbon atoms, an acyloxy group having 2 to 12 carbon atoms, a halogen atom, and a cyano group are even more preferred.

$Y^{11}$, $Y^{12}$, and $Y^{13}$ are preferably all methine, and more preferably unsubstituted methine, in terms of easy synthesis of the compound and cost.

Each of $L^1$, $L^2$, and $L^3$ independently represents a single bond or a bivalent linking group.

In the case where $L^1$, $L^2$, and $L^3$ are bivalent linking groups, the linking group is preferably selected from —O—, —S—, —C(=O)—, —NR$^7$—, —CH=CH—, —C≡C—, a bivalent cyclic group, and a combination thereof. $R^7$ is an alkyl group having 1 to 7 carbon atoms, or a hydrogen atom, preferably an alkyl group having 1 to 4 carbon atoms, or a hydrogen atom, even more preferably a methyl group, an ethyl group, or a hydrogen atom, and most preferably a hydrogen atom.

The bivalent cyclic group for $L^1$, $L^2$, and $L^3$ is a divalent linking having at least one kind of cyclic structure (which may be hereinafter sometimes referred to as a cyclic group). The cyclic group is preferably a 5-, 6-, or 7-membered group, more preferably a 5- or 6-membered group, and even more preferably a 6-membered group. The ring in the cyclic group may be a condensed ring. However, a monocyclic ring is preferred to a condensed ring. The ring in the cyclic ring may be any of an aromatic ring, an aliphatic ring, and a heteroring. Preferred examples of the aromatic ring are a benzene ring and a naphthalene ring. Preferred examples of the aliphatic ring include a cyclohexane ring. Preferred examples of the heteroring include a pyridine ring and a pyrimidine ring. The cyclic group is more preferably an aromatic ring or a heteroring. Further, the divalent cyclic group in the present invention is more preferably a divalent linking group including only a cyclic structure (provided that it includes a substituent) (which shall apply hereinafter).

Among the bivalent cyclic groups represented by $L^1$, $L^2$, and $L^3$, the benzene ring-containing cyclic group is preferably a 1,4-phenylene group. The naphthalene ring-containing cyclic group is preferably a naphthalene-1,5-diyl group or a naphthalene-2,6-diyl group. The cyclohexane ring-containing cyclic group is preferably a 1,4-cyclohexylene-diyl group. The pyridine ring-containing cyclic group is preferably a pyridine-2,5-diyl group. The pyrimidine ring-containing cyclic group is preferably a pyrimidine-2,5-diyl group.

The bivalent cyclic group represented by $L^1$, $L^2$, and $L^3$ may have a substituent. Examples of the substituent are a halogen atom (preferably a fluorine atom or a chlorine atom), a cyano group, a nitro group, an alkyl group having 1 to 16 carbon atoms, an alkenyl group having 2 to 16 carbon atoms, an alkynyl group having 2 to 16 carbon atoms, a halogen atom-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl group-substituted carbamoyl group having 2 to 16 carbon atoms, and an acylamino group having 2 to 16 carbon atoms.

$L^1$, $L^2$, and $L^3$ are preferably a single bond, *—O—CO—, *—CO—O—, *—CH=CH—, *—C≡C—, *-bivalent cyclic group-, *—O—CO-bivalent cyclic group-, *—CO—O-bivalent cyclic group-, *—CH=CH-bivalent cyclic group-, *—C≡C-bivalent cyclic group-, *-bivalent cyclic group-O—CO—, *-bivalent cyclic group-CO—O—, *-bivalent cyclic group-CH=CH—, or *-bivalent cyclic group-C≡C—. Particularly preferably, they are a single bond, *—CH=CH—, *—C≡C—, *—CH=CH-bivalent cyclic group-, or *—C≡C-bivalent cyclic group-, and most preferably a single bond. Herein, * indicates the position at which the group bonds to the 6-membered ring in the formula (I) that contains $Y^{11}$, $Y^{12}$, and $Y^{13}$.

In the formula (I), each of $H^1$, $H^2$, and $H^3$ independently represents a group of the following formula (I-A) or (I-B).

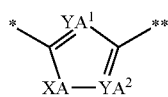

Formula (I-A)

In the formula (I-A), each of $YA^1$ and $YA^2$ independently represents a methine group or a nitrogen atom;

XA represents an oxygen atom, a sulfur atom, methylene, or imino;

* represents the position at which the formula (I) bonds to any of $L^1$ to $L^3$; and

** represents the position at which the formula (I) bonds to any of $R^1$ to $R^3$.

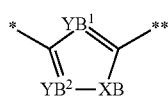

Formula (I-B)

In the formula (I-B), each of $YB^1$ and $YB^2$ independently represents a methine group or a nitrogen atom;

XB represents an oxygen atom, a sulfur atom, methylene, or imino;

* represents the position at which the formula (I) bonds to any of $L^1$ to $L^3$; and

** represents the position at which the formula (I) bonds to any of $R^1$ to $R^3$.

In the formula (I), each of $R^1$, $R^2$, and $R^3$ independently represents the following formula (I-R).

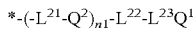

Formula (I-R)

In the formula (I-R), * represents the position at which the formula bonds to $H^1$, $H^2$, or $H^3$ in the formula (I).

$L^{21}$ represents a single bond or a bivalent linking group. In the case where $L^{21}$ is a bivalent linking group, it is preferably a bivalent linking group selected from a group consisting of —O—, —S—, —C(=O)—, —NR$^7$—, —CH=CH—, and —C≡C—, and a combination thereof.

$R^7$ is an alkyl group having 1 to 7 carbon atoms, or a hydrogen atom, preferably an alkyl group having 1 to 4 carbon atoms, or a hydrogen atom, more preferably a methyl group, an ethyl group, or a hydrogen atom, and most preferably a hydrogen atom.

$L^{21}$ is preferably at least one of a single bond, *—O—CO—, *—CO—O—, *—CH=CH—, and *—C≡C— (wherein *** represents the * side in the formula (DI-R)), and more preferably a single bond.

$Q^2$ represents a bivalent group (cyclic group) having at least one cyclic structure. The cyclic structure is preferably a 5-membered ring, a 6-membered ring, or a 7-membered ring, more preferably a 5-membered ring or a 6-membered ring, and even more preferably a 6-membered ring. The cyclic structure may be a condensed ring. However, a monocyclic ring is preferred to a condensed ring. Further, the ring in the cyclic ring may be any one of an aromatic ring, an aliphatic ring, and a heteroring. Preferred examples of the aromatic ring include a benzene ring, a naphthalene ring, an anthracene ring, and a phenanthrene ring. Preferred examples of the aliphatic ring include a cyclohexane ring. Preferred examples of the heteroring include a pyridine ring and a pyrimidine ring.

Among the $Q^2$'s above, the benzene ring-containing group is preferably a 1,4-phenylene group. The naphthalene ring-containing group is preferably a naphthalene-1,4-diyl group, a naphthalene-1,5-diyl group, a naphthalene-1,6-diyl group, a naphthalene-2,5-diyl group, a naphthalene-2,6-diyl group, and a naphthalene-2,7-diyl group. The cyclohexane ring-containing group is preferably a 1,4-cyclohexylene group. The pyridine ring-containing group is preferably a pyridine-2,5-diyl group. The pyrimidine ring-containing group is preferably a pyrimidine-2,5-diyl group. Among these, $Q^2$ is particularly preferably a 1,4-phenylene group, a naphthalene-2,6-diyl group, or a 1,4-cyclohexylene group.

$Q^2$ may have a substituent. Examples of the substituent are a halogen atom (a fluorine atom, a chlorine atom, a bromine atom, or an iodine atom), a cyano group, a nitro group, an alkyl group having 1 to 16 carbon atoms, an alkenyl group having 2 to 16 carbon atoms, an alkynyl group having 2 to 16 carbon atoms, a halogen atom-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl group-substituted carbamoyl group having 2 to 16 carbon atoms, and an acylamino group having 2 to 16 carbon atoms. Preferred examples of the substituent include a halogen atom, a cyano group, an alkyl group having 1 to 6 carbon atoms, and a halogen atom-substituted alkyl group having 1 to 6 carbon atoms; and more preferred examples include a halogen atom, an alkyl group having 1 to 4 carbon atoms, and a halogen atom-substituted alkyl group having 1 to 4 carbon atoms; even more preferred examples include a halogen atom, an alkyl group having 1 to 3 carbon atoms, and a trifluoromethyl group.

n1 represents an integer of from 0 to 4. n1 is preferably an integer of from 1 to 3, and more preferably 1 or 2.

$L^{22}$ represents —O—, —O—CO—, —CO—O—, —O—CO—O—, —S—, —NH—, —SO$_2$—, —CH$_2$—, —CH=CH—, or —C≡C—, wherein ** represents the position bonding to the $Q^2$ side).

$L^{22}$ preferably represents —O—, —O—CO—, —CO—O—, —O—CO—O—, —CH$_2$—, —CH=CH—, or —C≡C—, and more preferably —O—, —O—CO—, —O—CO—O—, or **—CH$_2$—. When $L^{22}$ is a group containing a hydrogen atom, the hydrogen atom may be substituted with a substituent. Preferred examples of the substituent include a halogen atom, a cyano group, a nitro group, an alkyl group having 1 to 6 carbon atoms, a halogen atom-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl group-substituted carbamoyl group having 2 to 6 carbon atoms, and an acylamino group having 2 to 6 carbon atoms, and more preferred examples include a halogen atom and an alkyl group having 1 to 6 carbon atoms.

$L^{23}$ represents a bivalent linking group selected from a group consisting of —O—, —S—, —C(=O)—, —SO$_2$—, —NH—, —CH$_2$—, —CH=CH—, and —C≡C—, and a combination thereof. Herein, the hydrogen atom in —NH—, —CH$_2$—, or —CH=CH— may be substituted with a substituent. Preferred examples of the substituent include a halogen atom, a cyano group, a nitro group, an alkyl group having 1 to 6 carbon atoms, a halogen atom-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl group-substituted carbamoyl group having 2 to 6 carbon atoms, and an acylamino group having 2 to 6 carbon atoms, and more preferred examples include a halogen atom and an alkyl group having 1 to 6 carbon atoms. By such substitution with a substituent, the solubility of the solvent used in the production of a liquid crystalline composition from the liquid crystalline compound of the present invention can be improved.

$L^{23}$ is preferably selected from a group consisting of —O—, —C(=O)—, —CH$_2$—, —CH=CH—, and —C≡C—, and a combination thereof. $L^{23}$ preferably has 1 to 20 carbon atoms, and more preferably 2 to 14 carbon atoms. Further, $L^{23}$ even more preferably has 1 to 16 (—CH$_2$—)'s, and even more preferably 2 to 12 (—CH$_2$—)'s.

$Q^1$ represents a polymerizable group or a hydrogen atom. In the case where the liquid crystalline compound of the present invention is used in an optical film or the like, of which the retardation is required not to change by heat, such as an optical compensatory film, $Q^1$ is preferably a polymerizable group. The polymerization reaction is preferably an addition polymerization (including ring-opening polymerization) or polycondensation reaction. In other words, the polymerizable group is preferably a functional group that enables the addition polymerization or polycondensation reaction. Examples of the polymerizable group are shown below.

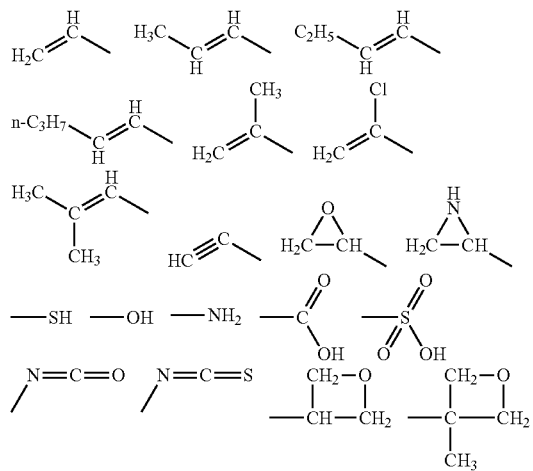

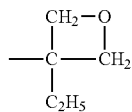

Furthermore, the polymerizable group is particularly preferably a functional group that enables an addition-polymerization reaction. Such a polymerizable group is preferably a polymerizable ethylenically unsaturated group or a ring-opening polymerizable group.

Examples of the polymerizable ethylenically unsaturated group include the groups of the following formulae (M-1) to (M-6).

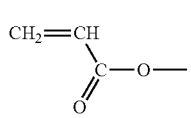
(M-1)

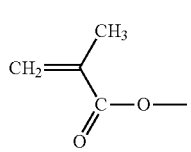
(M-2)

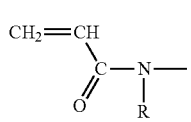
(M-3)

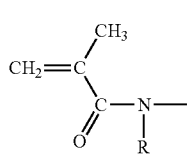
(M-4)

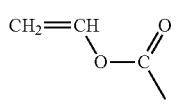
(M-5)

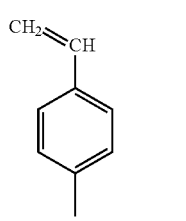
(M-6)

In the formulae (M-3) and (M-4), R represents a hydrogen atom or an alkyl group, and preferably a hydrogen atom or a methyl group.

Among the formulae (M-1) to (M-6), the formulae (M-1) and (M-2) are preferred, and the formula (M-1) is more preferred.

The ring-opening polymerizable group is preferably a cyclic ether group, and more preferably an epoxy group or an oxetanyl group.

Among the compounds of the formula (I), a compound of the following formula (I') is more preferred.

Formula (I')

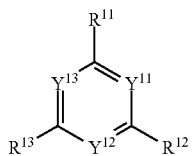

In the formula (I'), each of $Y^{11}$, $Y^{12}$, and $Y^{13}$ independently represents a methine group or a nitrogen atom, and preferably methine, and the methine is more preferably unsubstituted.

Each of $R^{11}$, $R^{12}$, and $R^{13}$ independently represents a group of the following formula (I'-A), the following formula (I'-B), or the following formula (I'-C). In the case of decreasing the intrinsic birefringent wavelength dispersibility, a group of the formula (I'-A) or the formula (I'-C) is preferred, and a group of the formula (I'-A) is more preferred. $R^{11}$, $R^{12}$, and $R^{13}$ preferably satisfy $R^{11}=R^{12}=R^{13}$.

Formula (I'-A)

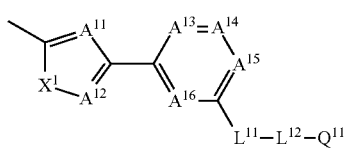

In the formula (I'-A), each of $A^{11}$, $A^{12}$, $A^{13}$, $A^{14}$, $A^{15}$, and $A^{16}$ independently represents methine or a nitrogen atom.

It is preferable that at least one of $A^{11}$ and $A^{12}$ be a nitrogen atom, and it is more preferable that both of them be nitrogen atoms.

It is preferable that at least three of $A^{13}$, $A^{14}$, $A^{15}$, and $A^{16}$ be methine, and it is more preferable that they be all methine, and the methine is preferably unsubstituted methine In the case where $A^{11}$, $A^{12}$, $A^{13}$, $A^{14}$, $A^{15}$, or $A^{16}$ is methine, examples of the substituent include a halogen atom (a fluorine atom, a chlorine atom, a bromine atom, or an iodine atom), a cyano group, a nitro group, an alkyl group having 1 to 16 carbon atoms, an alkenyl group having 2 to 16 carbon atoms, an alkynyl group having 2 to 16 carbon atoms, a halogen atom-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl group-substituted carbamoyl group having 2 to 16 carbon atoms, and an acylamino group having 2 to 16 carbon atoms.

Among these, a halogen atom, a cyano group, an alkyl group having 1 to 6 carbon atoms, and a halogen atom-substituted alkyl group having 1 to 6 carbon atoms are preferred; a halogen atom, an alkyl group having 1 to 4 carbon atoms, and an alkyl group-substituted carbamoyl group having 1 to 4 carbon atoms are more preferred; and a halogen atom, an alkyl group having 1 to 3 carbon atoms, and a trifluoromethyl group are even more preferred.

$X^1$ represents an oxygen atom, a sulfur atom, methylene, or imino, and preferably an oxygen atom.

Formula (I'-B)

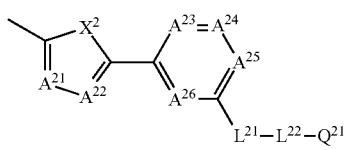

In the formula (I'-B), each of $A^{21}$, $A^{22}$, $A^{23}$, $A^{24}$, $A^{25}$, and $A^{26}$ independently represents methine or a nitrogen atom.

It is preferable that at least one of $A^{21}$ and $A^{22}$ is a nitrogen atom; and it is more preferable that they be both nitrogen atoms.

It is preferable that at least three of $A^{23}$, $A^{24}$, $A^{25}$, and $A^{26}$ be methine, and it is more preferable that they be all methane.

In the case where $A^{21}$, $A^{22}$, $A^{23}$, $A^{24}$, $A^{25}$, or $A^{26}$ is methine, examples of the substituent include a halogen atom (a fluorine atom, a chlorine atom, a bromine atom, or an iodine atom), a cyano group, a nitro group, an alkyl group having 1 to 16 carbon atoms, an alkenyl group having 2 to 16 carbon atoms, an alkynyl group having 2 to 16 carbon atoms, a halogen atom-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl group-substituted carbamoyl group having 2 to 16 carbon atoms and an acylamino group having 2 to 16 carbon atoms.

Among these, a halogen atom, a cyano group, an alkyl group having 1 to 6 carbon atoms, and a halogen atom-substituted alkyl group having 1 to 6 carbon atoms are preferred; a halogen atom, an alkyl group having 1 to 4 carbon atoms, and an alkyl group-substituted carbamoyl group having 1 to 4 carbon atoms are more preferred; and a halogen atom, an alkyl group having 1 to 3 carbon atoms, and a trifluoromethyl group are even more preferred.

$X^2$ represents an oxygen atom, a sulfur atom, methylene, or imino, and preferably an oxygen atom.

Formula (I'-C)

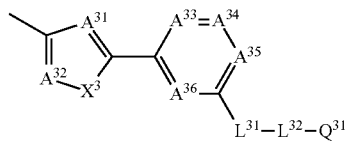

In the formula (I'-C), each of $A^{31}$, $A^{32}$, $A^{33}$, $A^{34}$, $A^{35}$, and $A^{36}$ independently represents methine or a nitrogen atom.

It is preferable that at least one of $A^{31}$ and $A^{32}$ is a nitrogen atom; and it is more preferable that they be both nitrogen atoms.

It is preferable that at least three of $A^{33}$, $A^{34}$, $A^{35}$, and $A^{36}$ be methine, and it is more preferable that they be all methane.

In the case where $A^{31}$, $A^{32}$, $A^{33}$, $A^{34}$, $A^{35}$, or $A^{36}$ is methine, methane may have a substituent. Examples of the substituent include a halogen atom (a fluorine atom, a chlorine atom, a bromine atom, or an iodine atom), a cyano group, a nitro group, an alkyl group having 1 to 16 carbon atoms, an alkenyl group having 2 to 16 carbon atoms, an alkynyl group having 2 to 16 carbon atoms, a halogen atom-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl group-substituted carbamoyl group having 2 to 16 carbon atoms, and an acylamino group having 2 to 16 carbon atoms.

Among these, a halogen atom, a cyano group, an alkyl group having 1 to 6 carbon atoms, and a halogen atom-substituted alkyl group having 1 to 6 carbon atoms are preferred; a halogen atom, an alkyl group having 1 to 4 carbon atoms, and an alkyl group-substituted carbamoyl group having 1 to 4 carbon atoms are more preferred; and a halogen atom, an alkyl group having 1 to 3 carbon atoms, and a trifluoromethyl group are even more preferred.

$X^3$ represents an oxygen atom, a sulfur atom, methylene, or imino, and preferably an oxygen atom.

Each of $L^{11}$ in the formula (I'-A), $L^{21}$ in the formula (I'-B), and $L^{31}$ in the formula (I'-C) independently represents —O—, —C(=O)—, —O—CO—, —CO—O—, —O—CO—O—, —S—, —NH—, —SO$_2$—, —CH$_2$—, —CH=CH—, or —C≡C—, preferably —O—, —C(=O)—, —O—CO—, —CO—O—, —O—CO—O—, —CH$_2$—, —CH=CH—, or —C≡C—, and more preferably —O—, —O—CO—, —CO—O—, —O—CO—O—, or —C≡C—. In particular, $L^{11}$ in the formula (I'-A), from which low intrinsic birefringent wavelength dispersibility can be expected is particularly preferably —O—, —CO—O—, or —C≡C—, and among these, —CO—O— is preferred since it enables a discotic nematic phase to be developed at a higher temperature. When the above-described group is a group containing a hydrogen atom, the hydrogen atom may be substituted with a substituent. Preferred examples of the substituent include a halogen atom, a cyano group, a nitro group, an alkyl group having 1 to 6 carbon atoms, a halogen atom-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl group-substituted carbamoyl group having 2 to 6 carbon atoms, and an acylamino group having 2 to 6 carbon atoms, and a halogen atom and an alkyl group having 1 to 6 carbon atoms are more preferred.

Each of $L^{12}$ in the formula (I'-A), $L^{22}$ in the formula (I'-B), and $L^{32}$ in the formula (I'-C) independently represents a divalent linking group selected from a group consisting of —O—, —S—, —C(=O)—, —SO$_2$—, —NH—, —CH$_2$—, —CH=CH—, and —C≡C—, and a combination thereof. Herein, the hydrogen atom in —NH—, —CH$_2$—, or —CH=CH— may be substituted with a substituent. Preferred examples of the substituent include a halogen atom, a cyano group, a nitro group, a hydroxyl group, a carboxyl group, an alkyl group having 1 to 6 carbon atoms, a halogen atom-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl group-substituted carbamoyl group having 2 to 6 carbon atoms, and an acylamino group having 2 to 6 carbon atoms, and a halogen atom, a hydroxyl group, and an alkyl group having 1 to 6 carbon atoms are more preferred, and a halogen atom, a methyl group, and an ethyl group are particularly preferred.

Each of $L^{12}$, $L^{22}$, and $L^{32}$ is independently selected from a group consisting of —O—, —C(=O)—, —CH$_2$—, —CH=CH—, and —C≡C—, and a combination thereof.

Each of $L^{12}$, $L^{22}$, and $L^{32}$ independently has 1 to 20 carbon atoms, and more preferably 2 to 14 carbon atoms. It preferably has 2 to 14 carbon atoms, more preferably 1 to 16-CH$_2$— groups, and even more preferably 2 to 12-CH$_2$— groups.

The number of carbon atoms constituting $L^{12}$, $L^{22}$, or $L^{32}$ affects the phase transition temperature of the liquid crystal and the solubility of the compound in a solvent. Generally, a larger number of carbon atoms tends to lower the transition temperature from a discotic nematic phase (N$_D$ phase) to an isotropic liquid. Further, the solubility in the solvent generally tends to be increased with a larger number of carbon atoms.

Each of $Q^{11}$ in the formula (I'-A), $Q^{21}$ in the formula (I'-B), and $Q^{31}$ in the formula (I'-C) independently represents a polymerizable group or a hydrogen atom. Further, $Q^{11}$, $Q^{21}$, and $Q^{31}$ are preferably polymerizable groups. The polymerization reaction is preferably an addition polymerization (including ring-opening polymerization) or polycondensation reaction. In other words, the polymerizable group is preferably a functional group that enables the addition polymerization or polycondensation reaction. Examples of the polymerizable group are as described above, and the preferred examples thereof are also as described above.

Hereinbelow, specific examples of the compound represented by the formula (I) include the compounds described in [0038] to [0069] of JP-A-2009-97002, but the present invention is not limited to the following compounds.

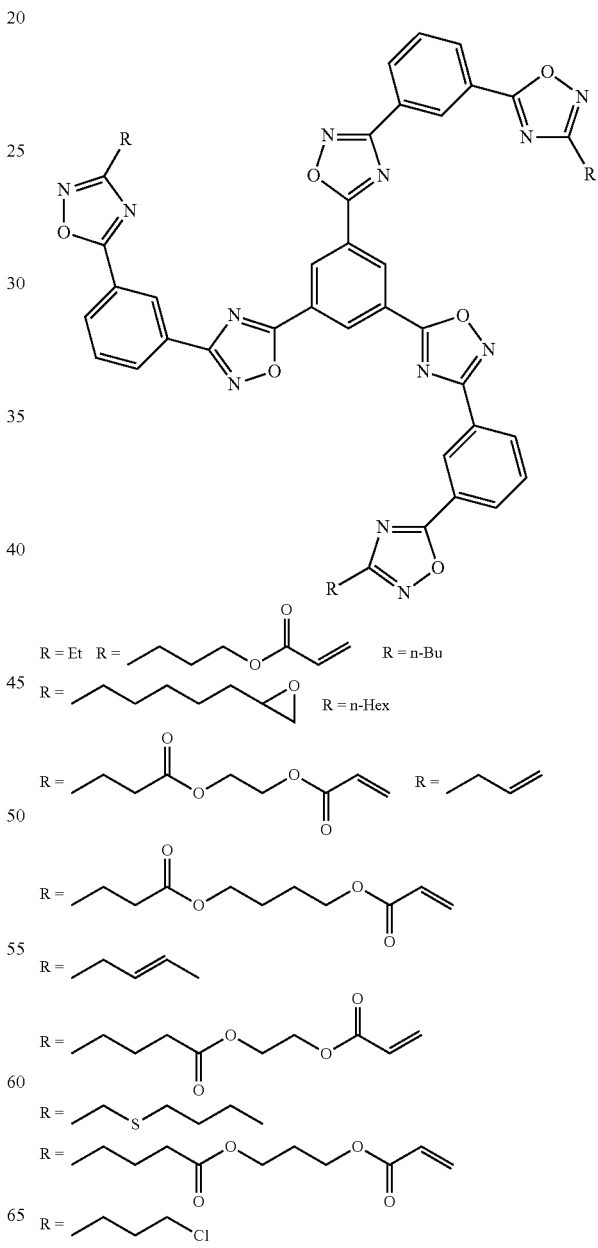

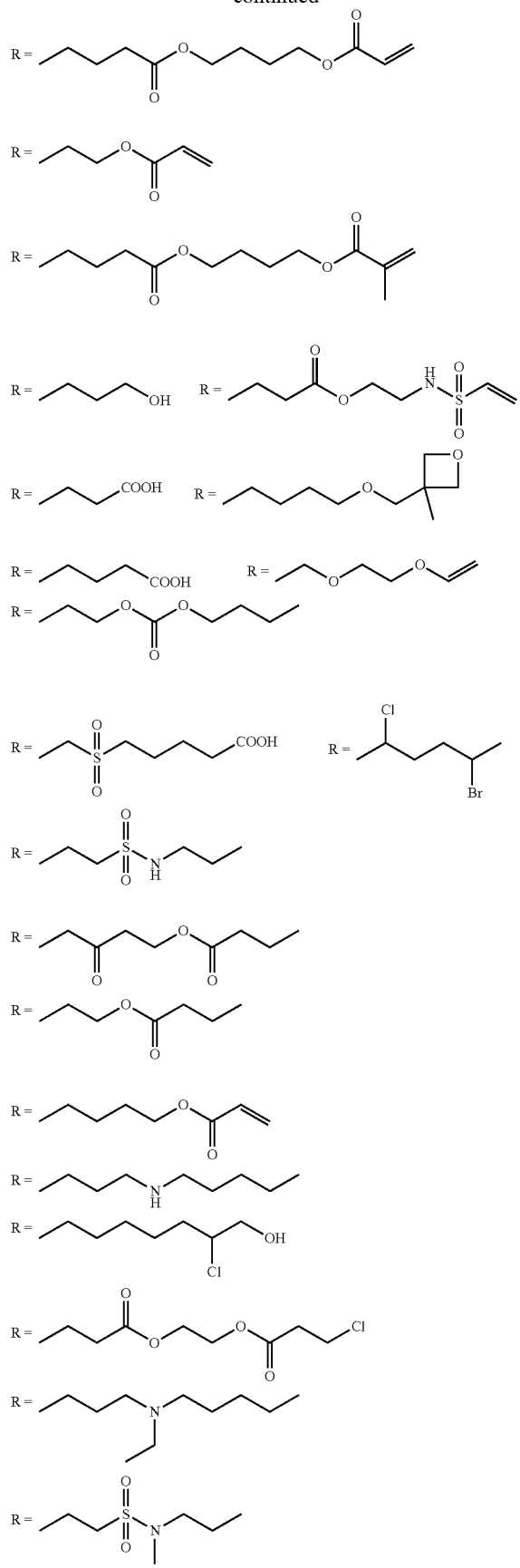
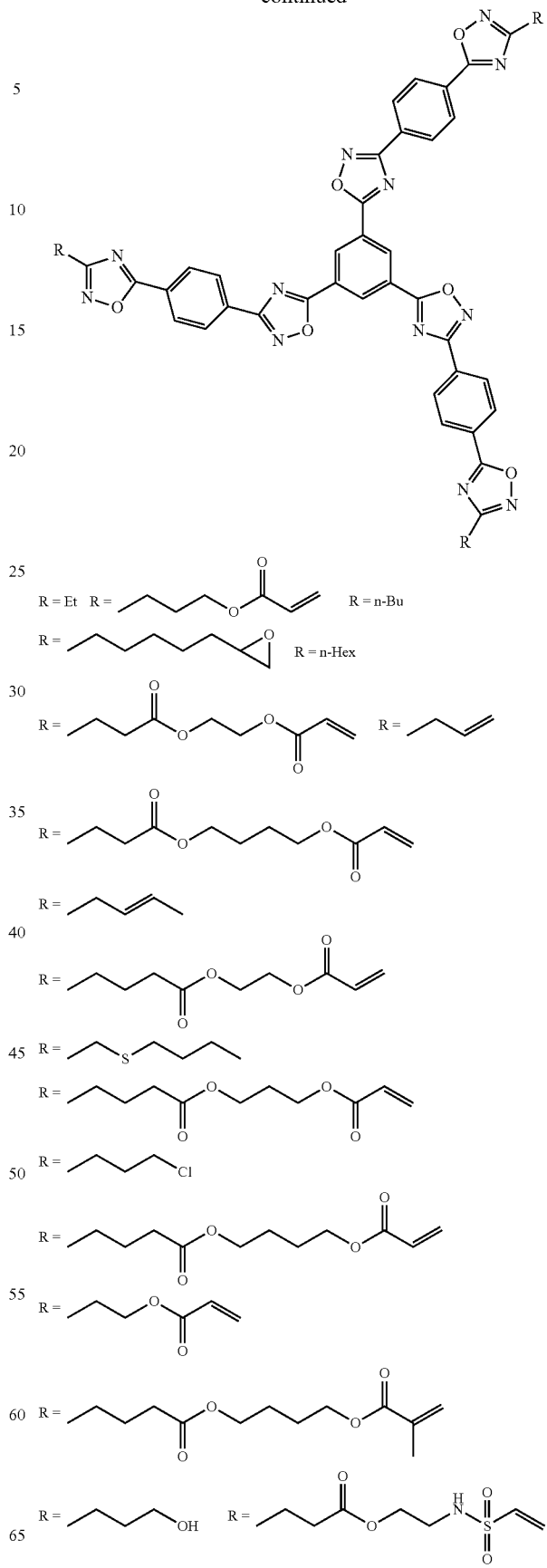

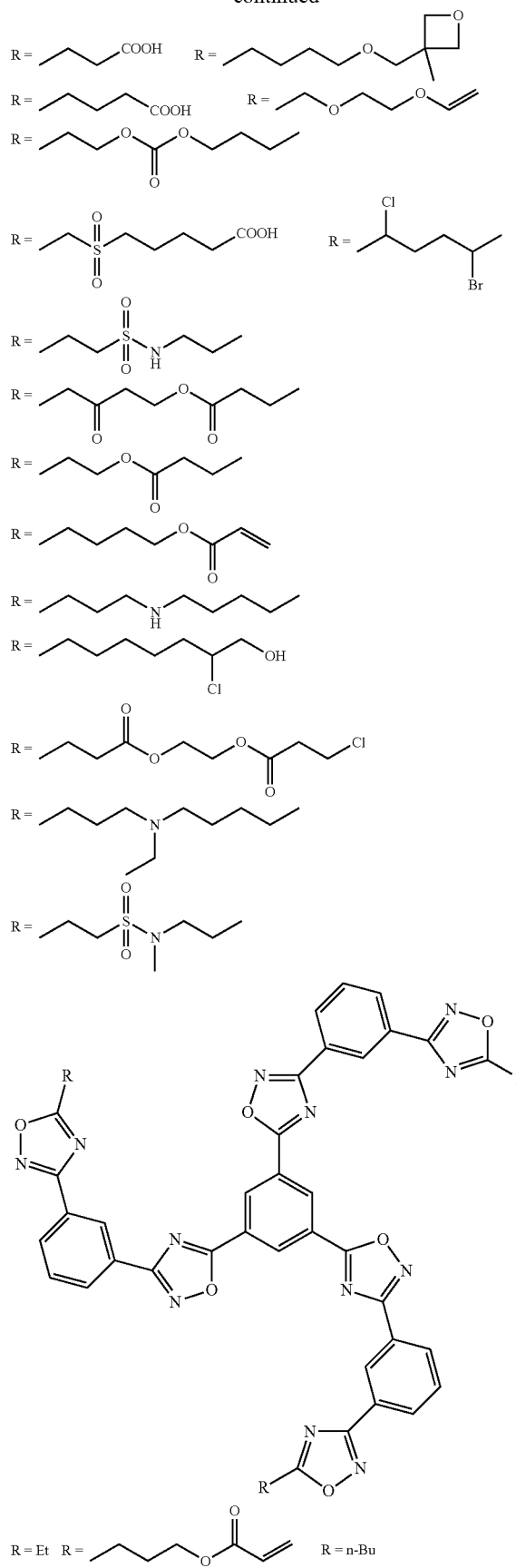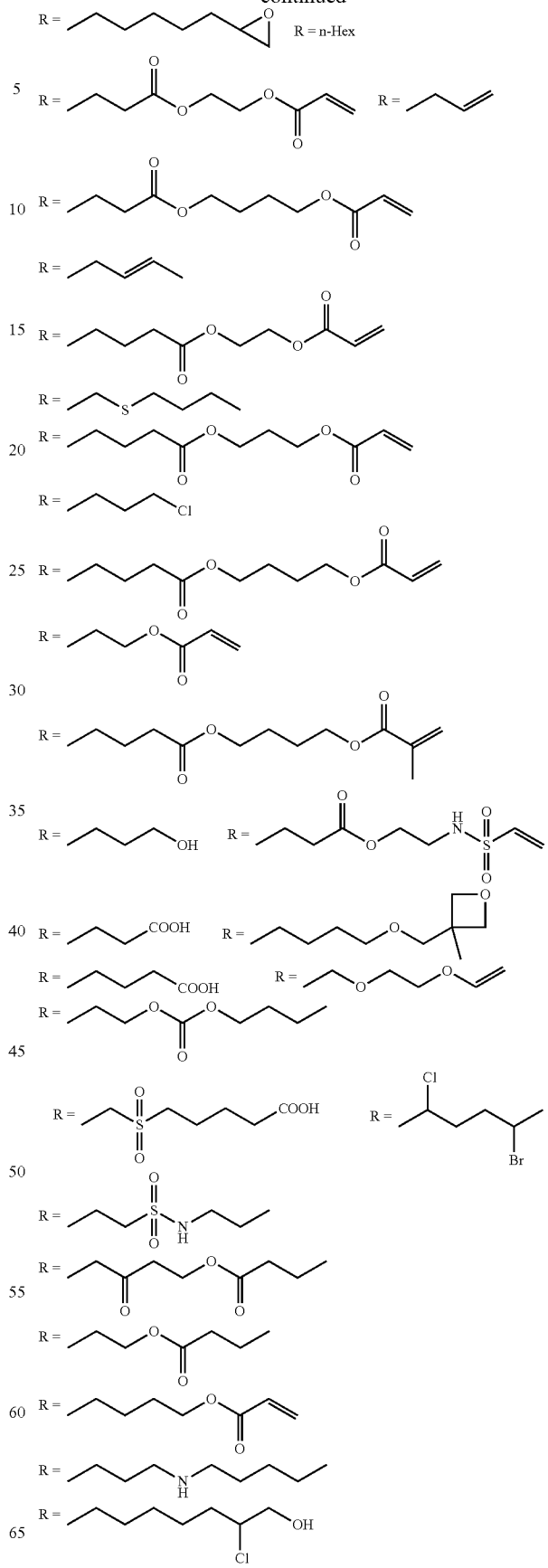

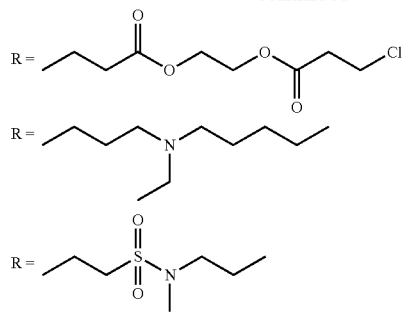
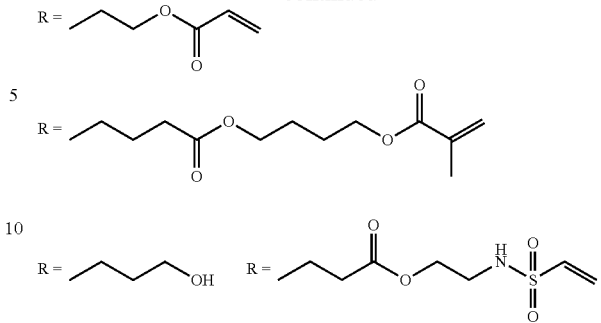
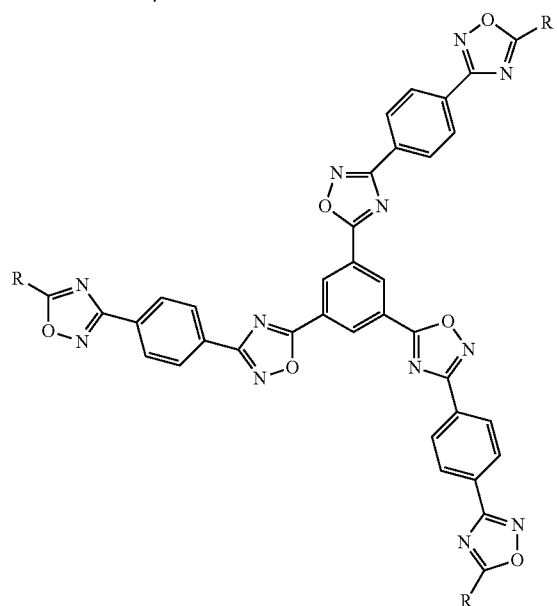
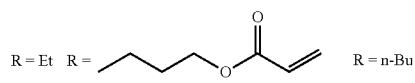
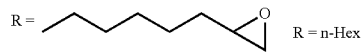
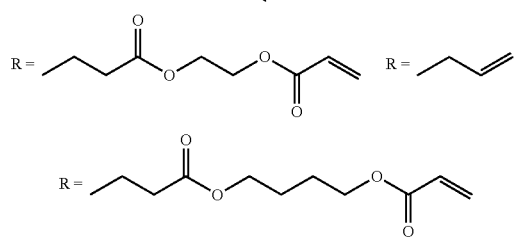
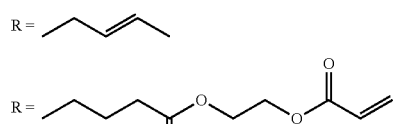
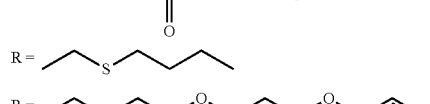
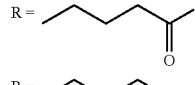
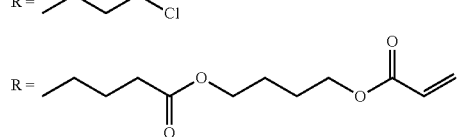

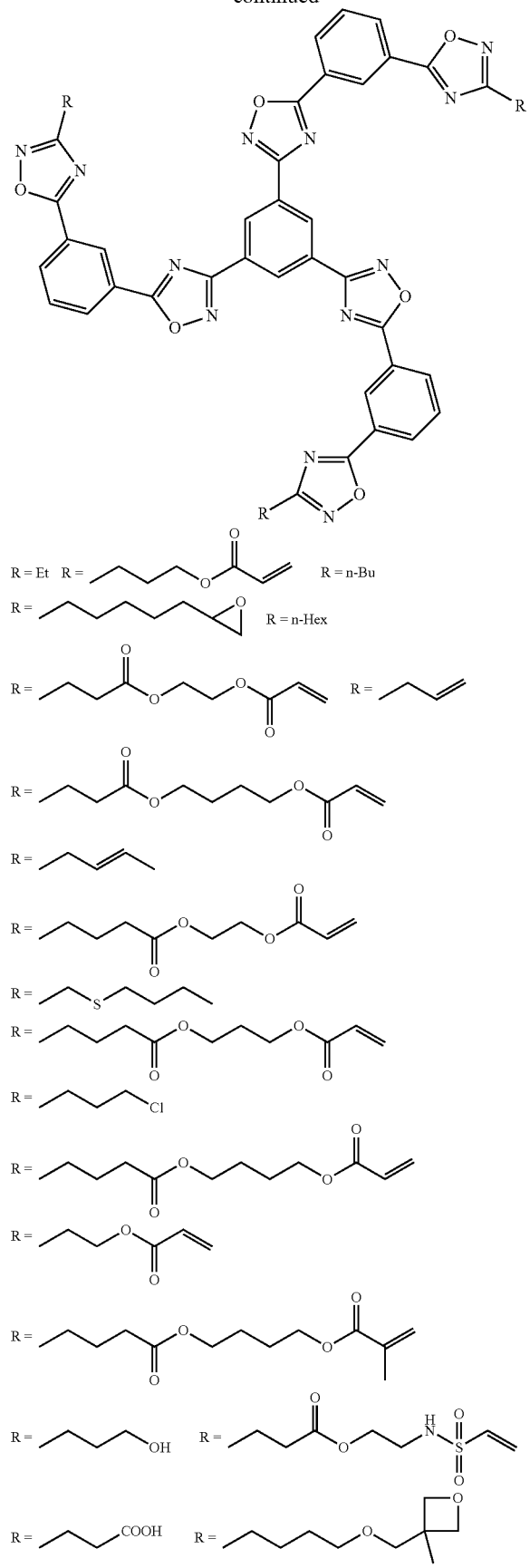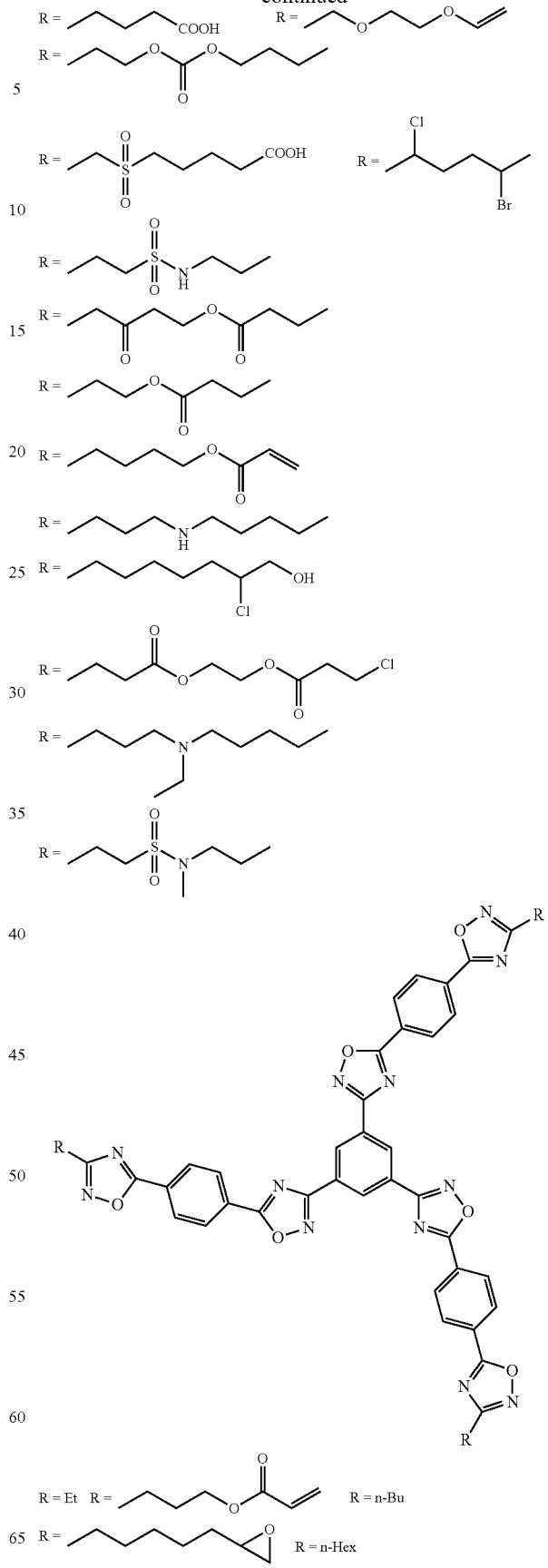

33
-continued
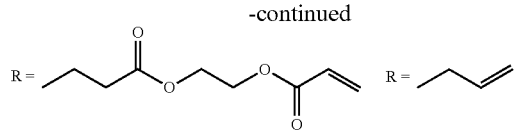
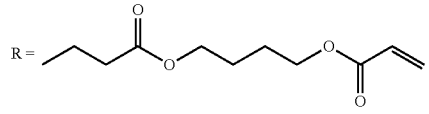
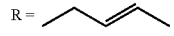
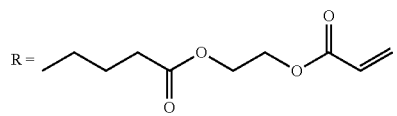
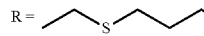
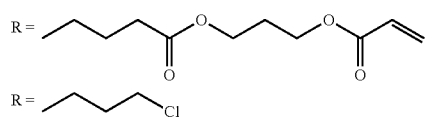
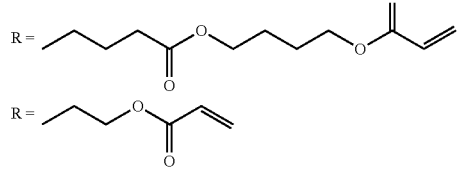
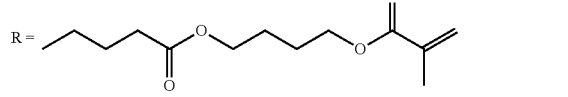
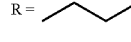
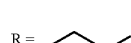
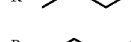
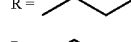
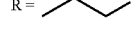
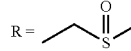
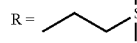
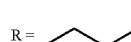
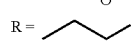
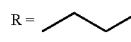
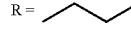
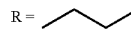
34
-continued

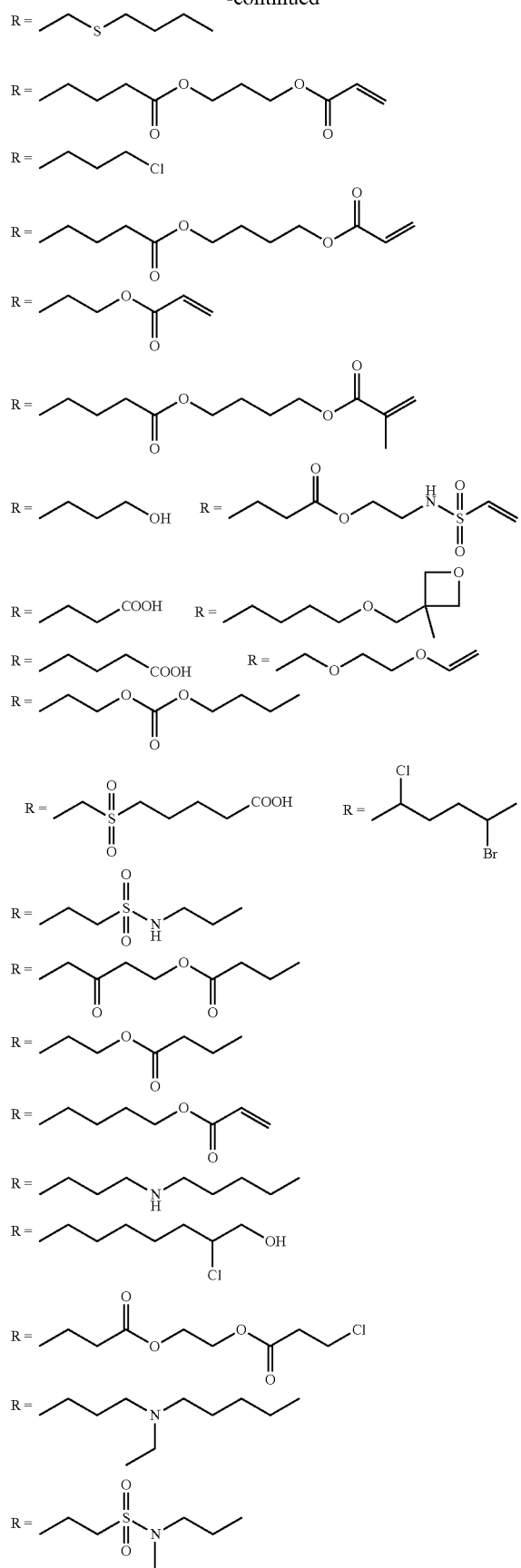
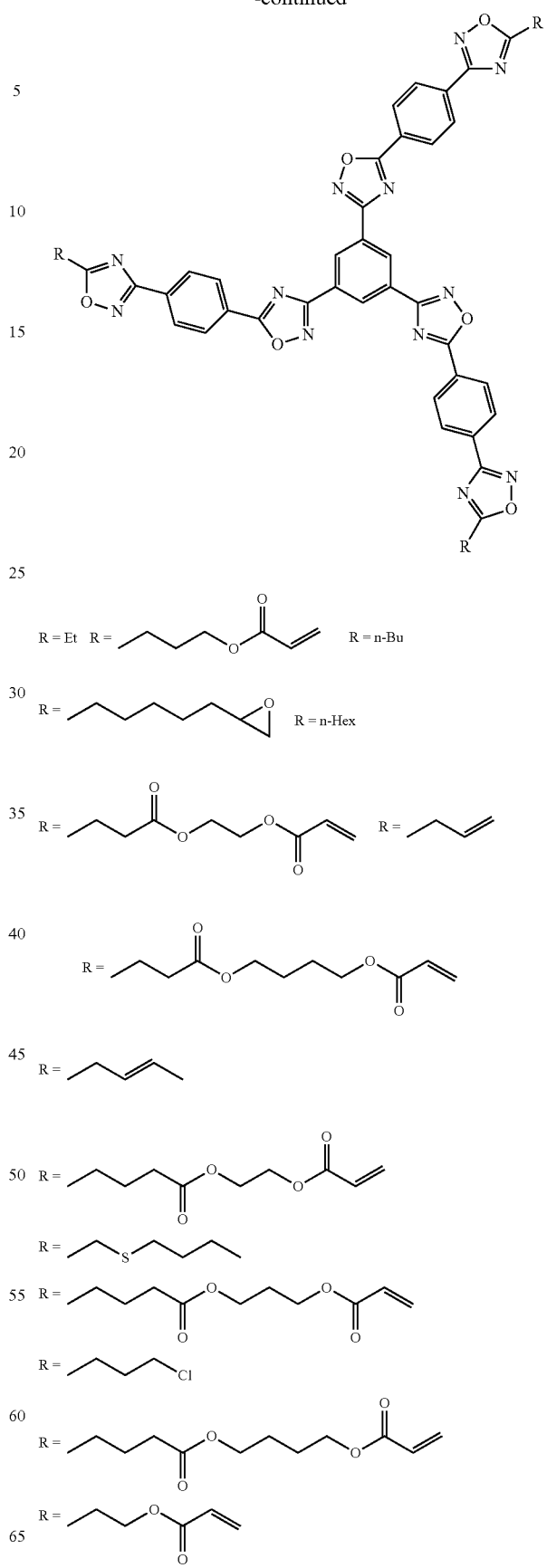

37
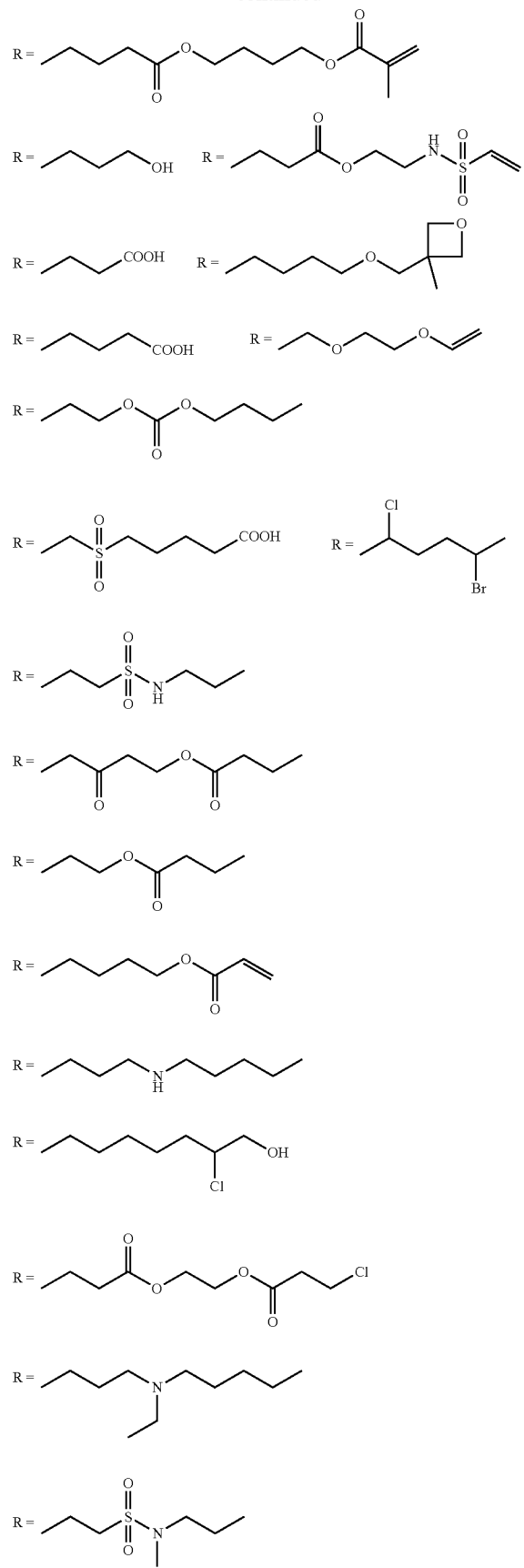
38
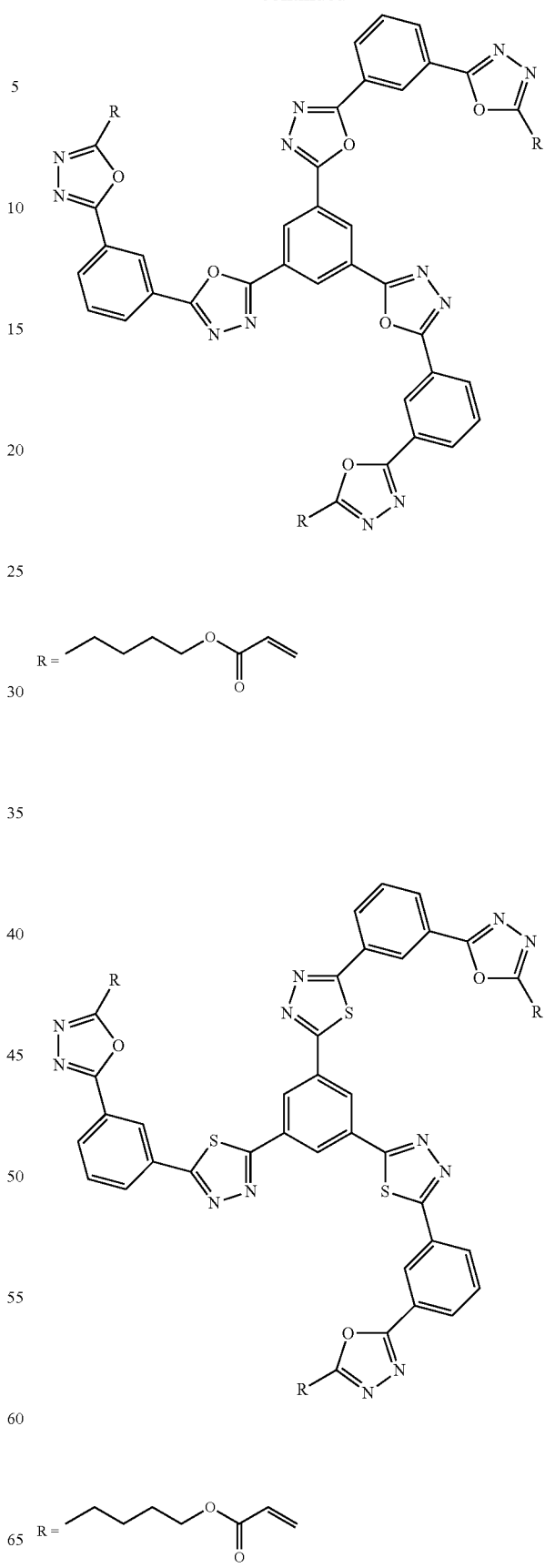

39
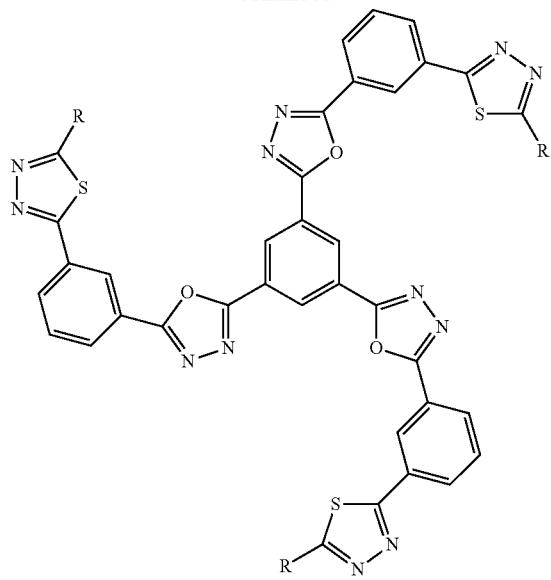
40
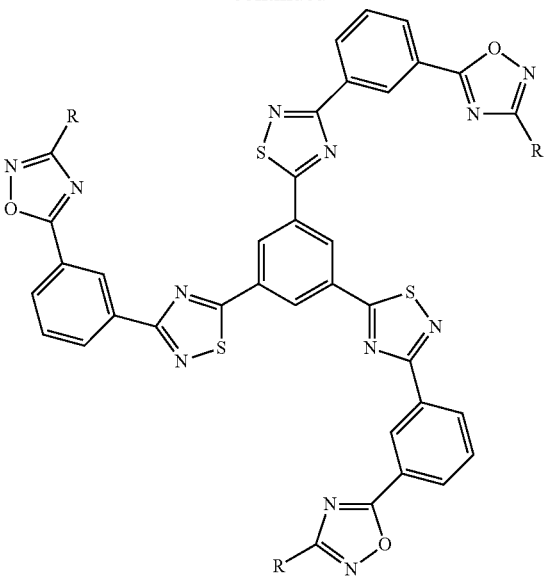
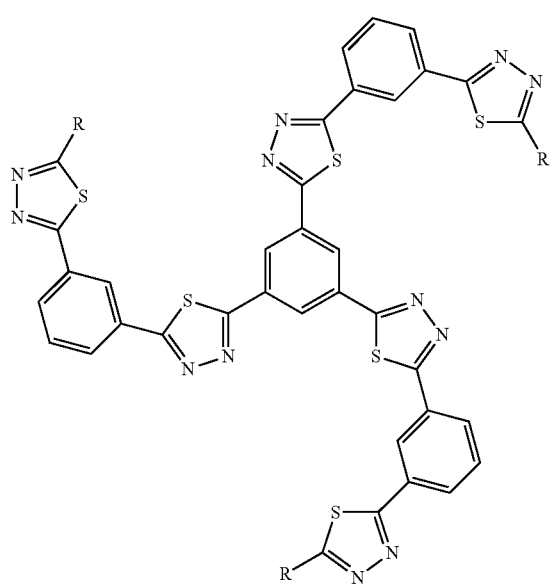
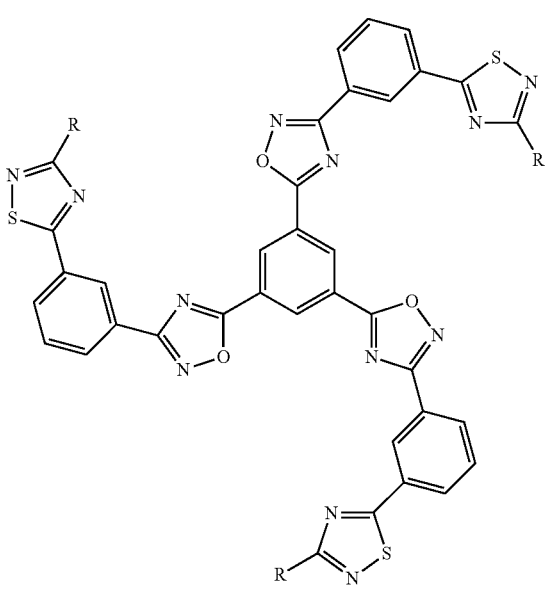

41
-continued
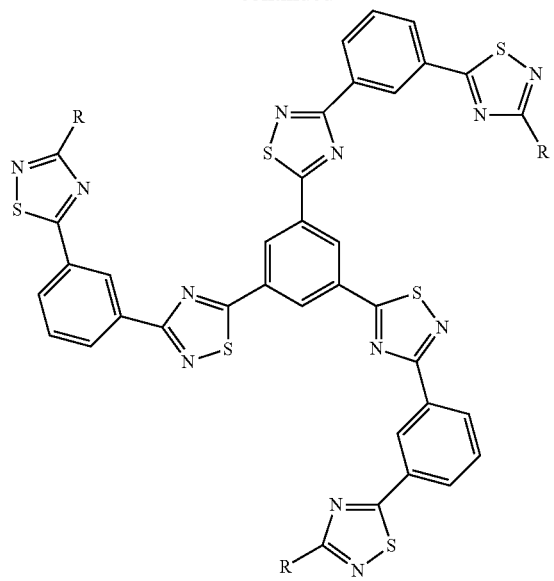
42
-continued
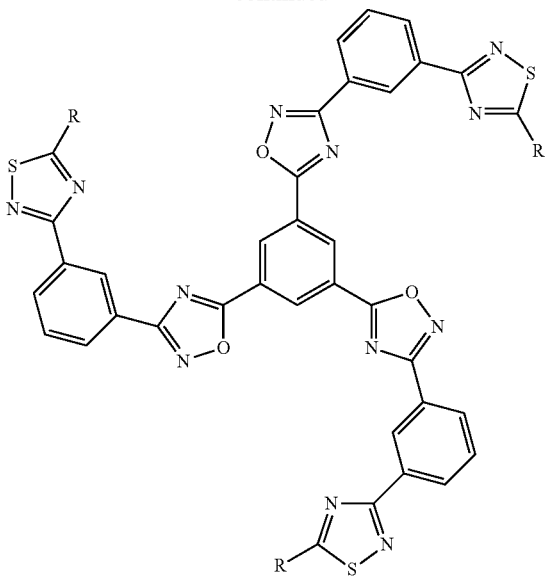
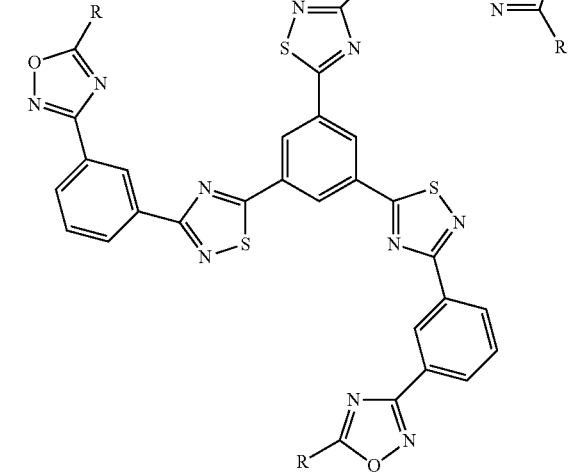
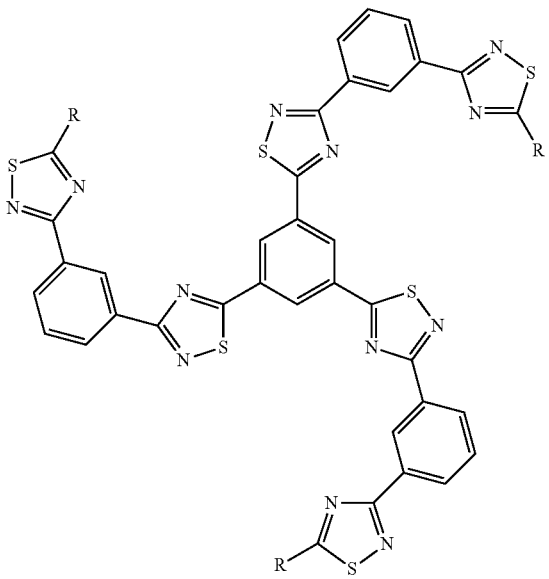

43
-continued
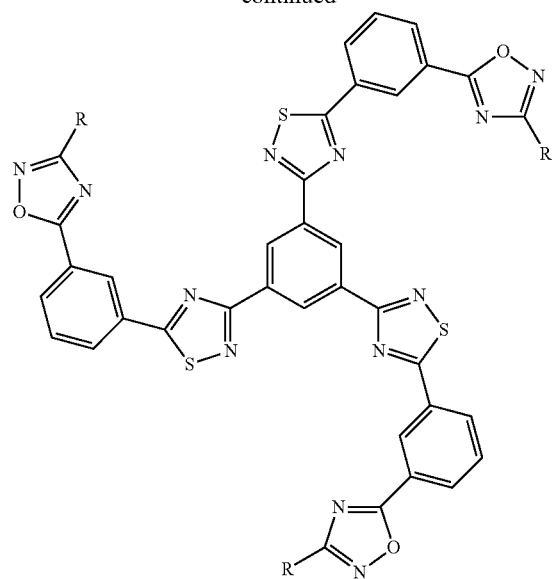
R = 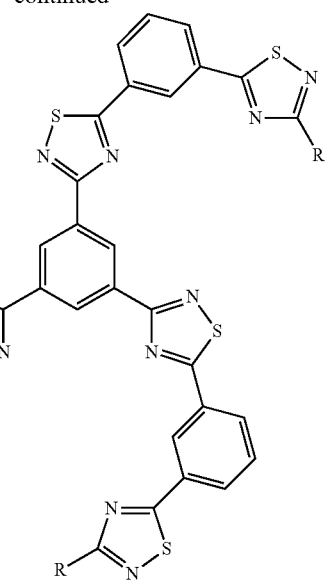
44
-continued
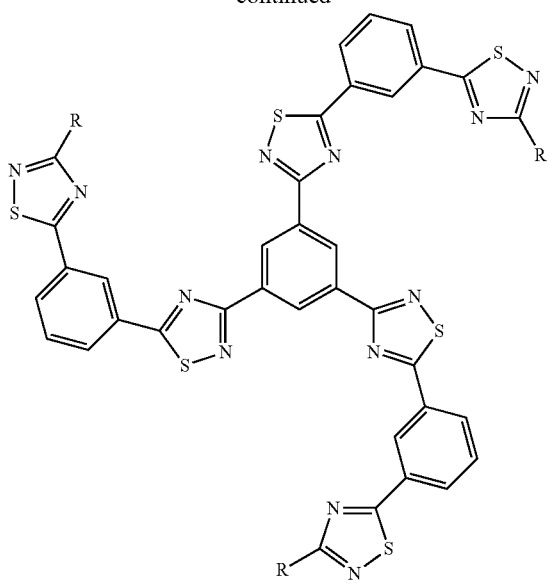
R = 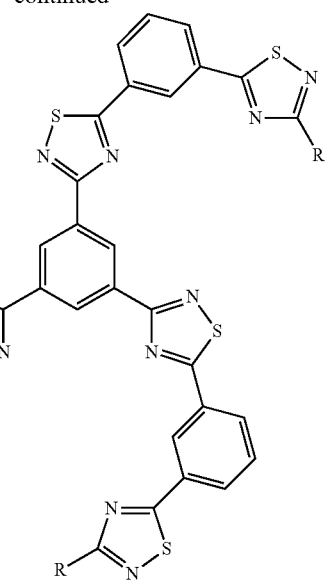
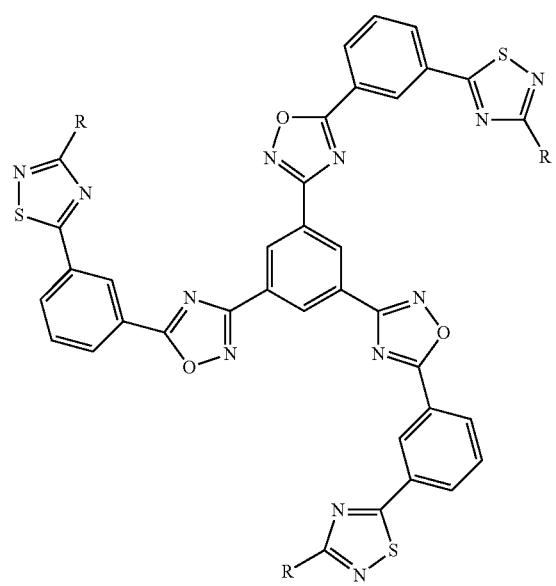
R = 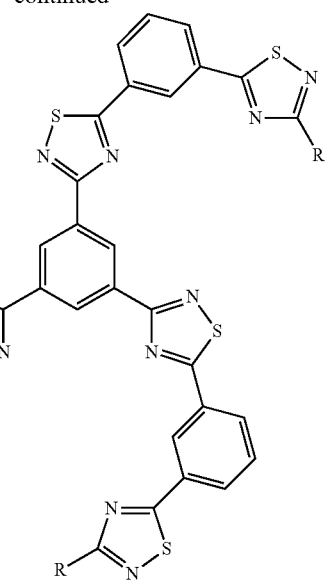
R = 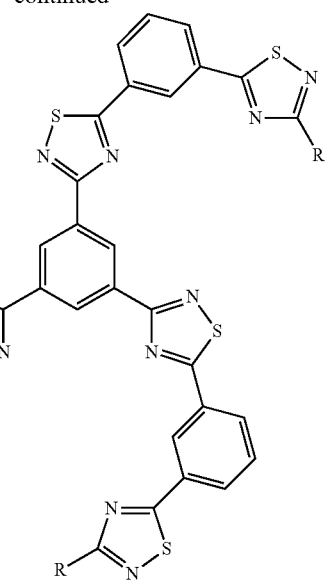

45
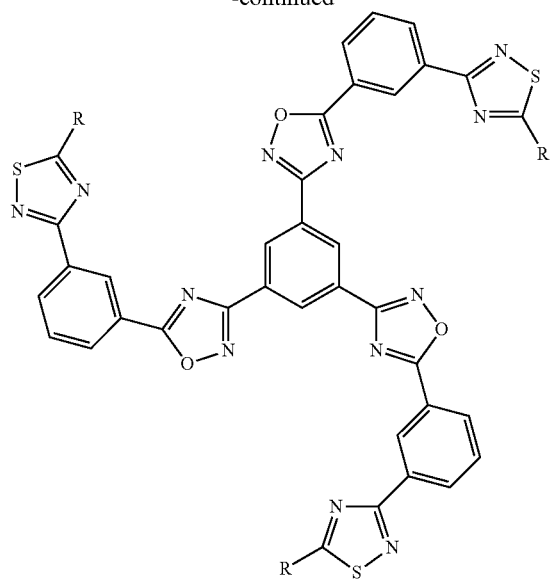
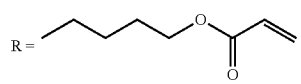
46
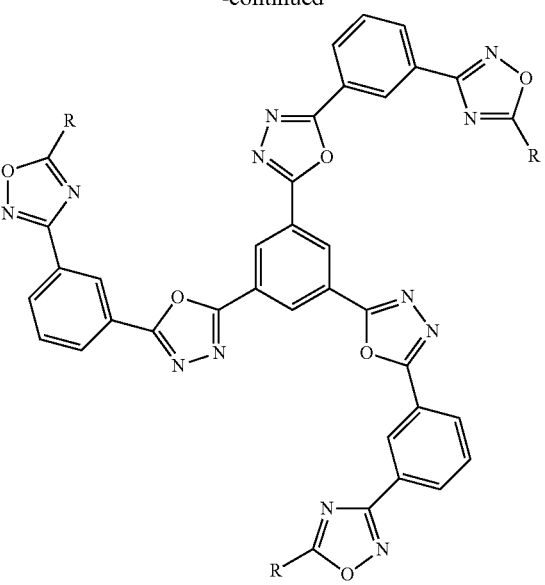
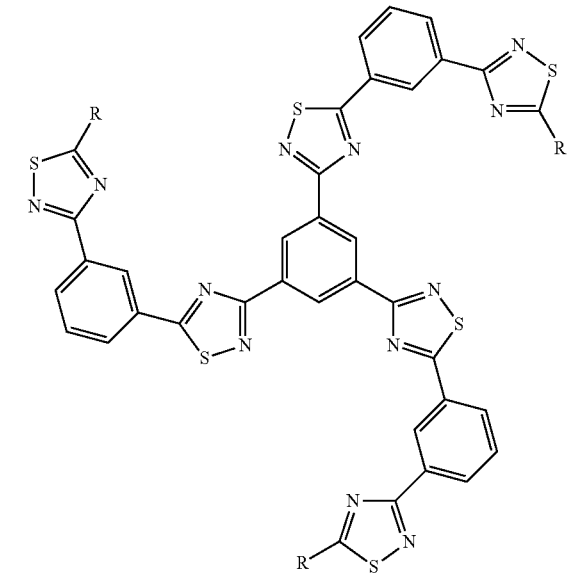
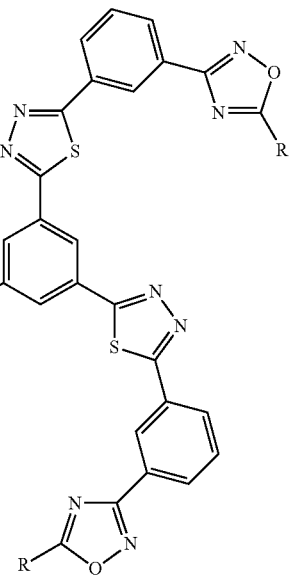
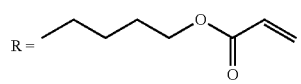
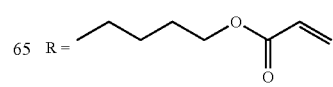

47
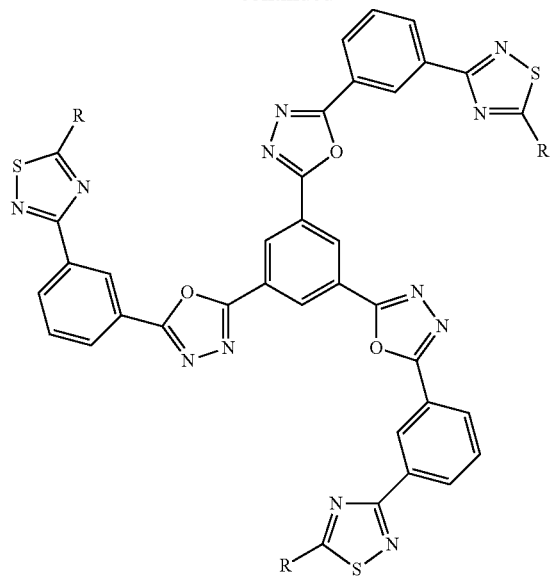
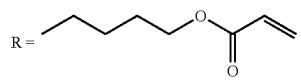
48
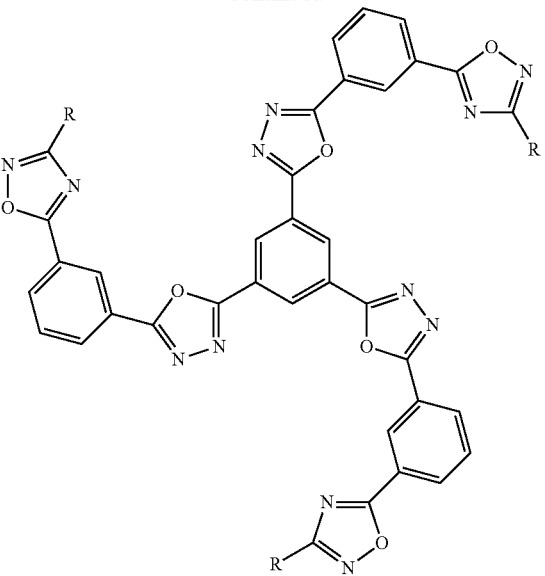
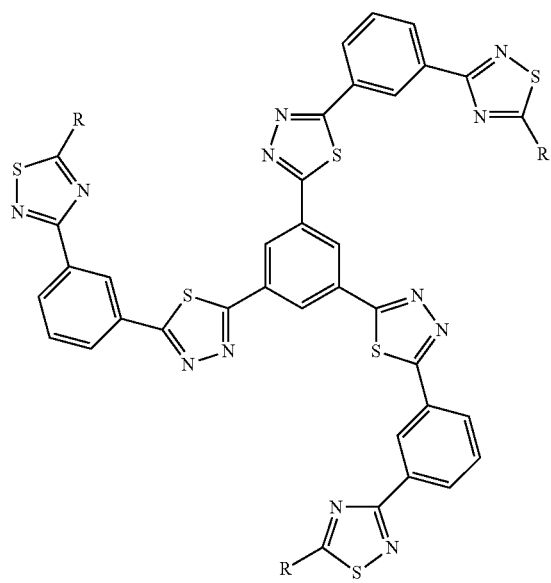
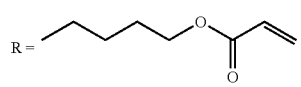
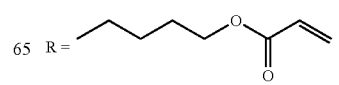

49
-continued
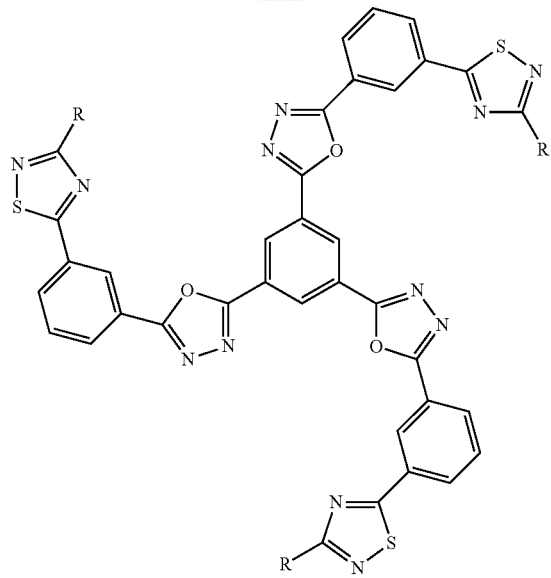
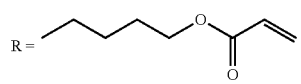
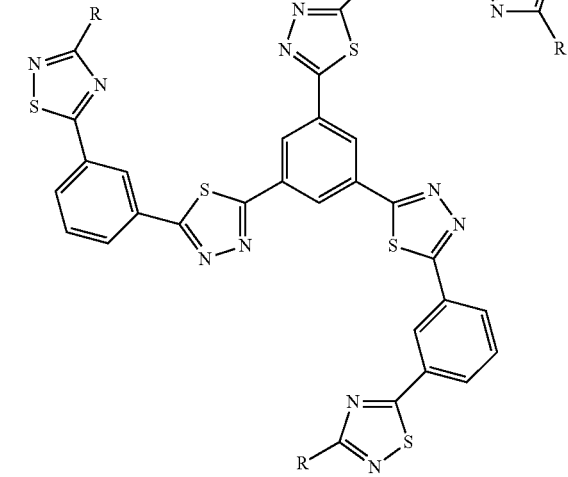
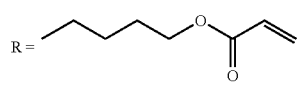
50
-continued
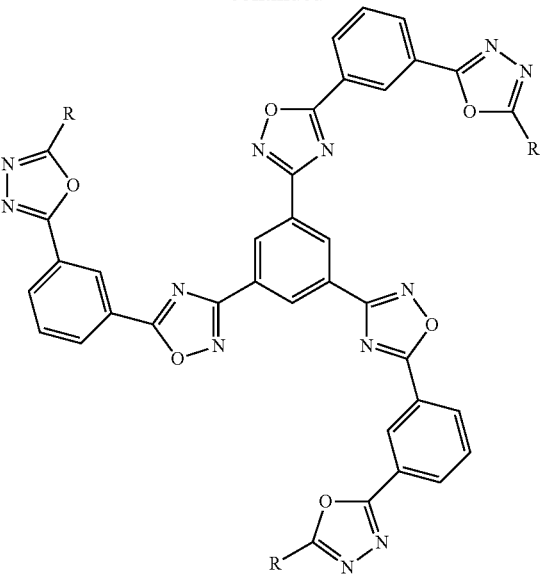
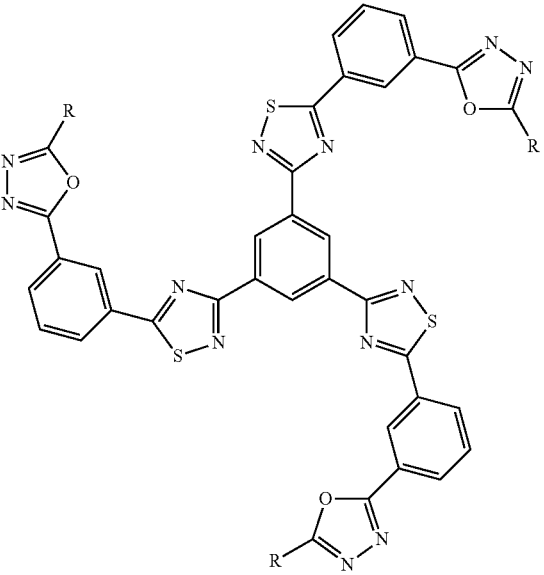
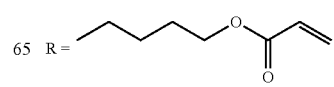

51
-continued
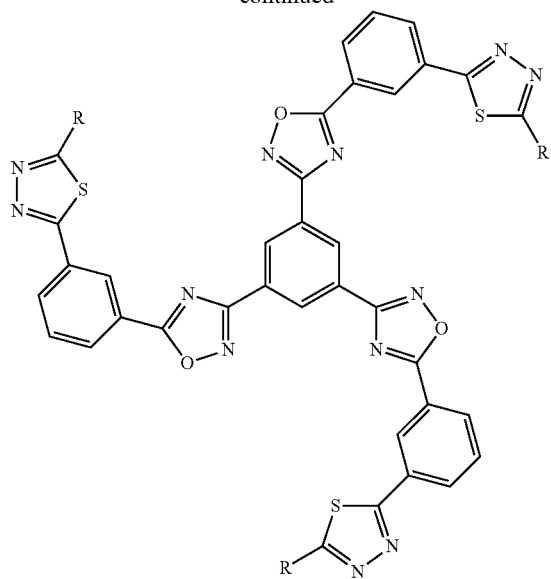
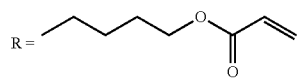
52
-continued
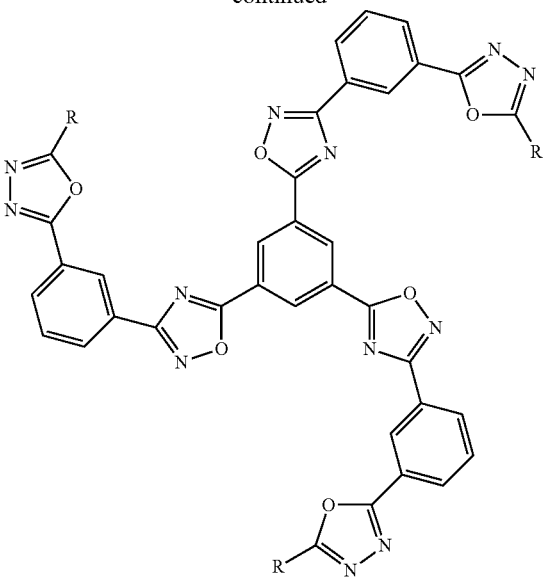
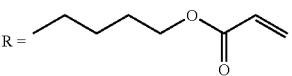
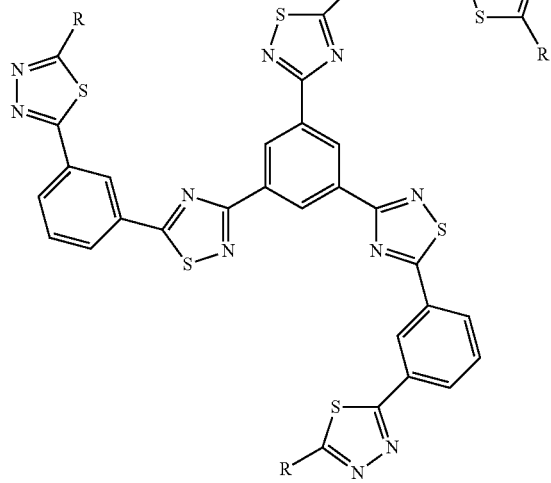
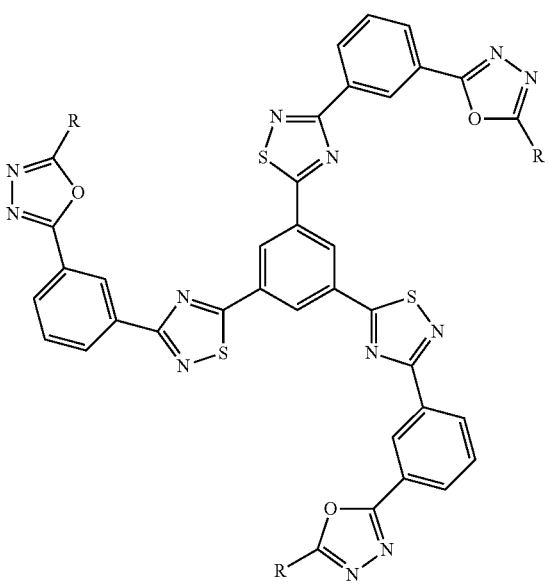
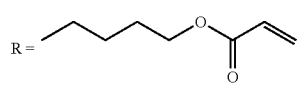
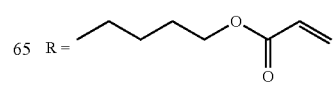

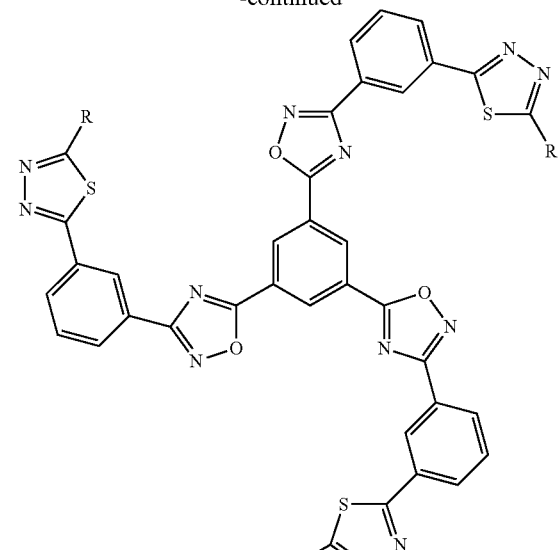

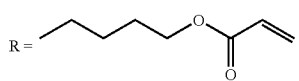

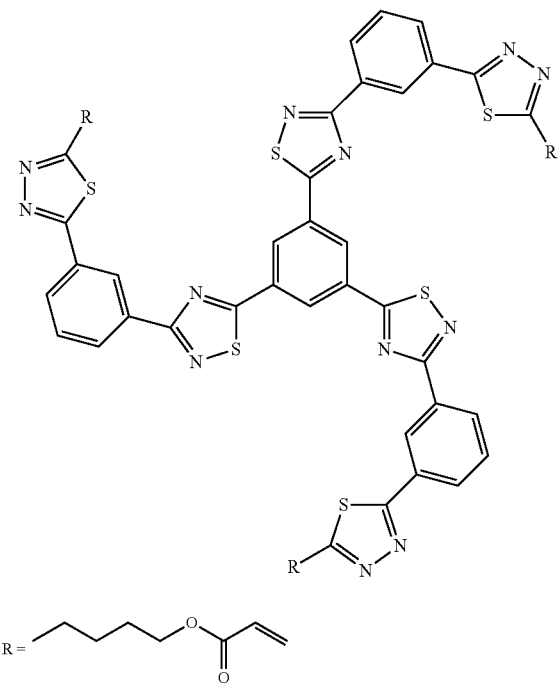

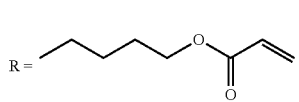

For the triphenylene compound, examples of the discotic liquid crystalline compound having low wavelength dispersion include the compounds described in Paragraph Nos. [0062] to [0067] of JP-A-2007-108732, and the like, but the present invention is not limited thereto.

[Rod-Shaped Liquid Crystalline Compound]

In the present invention, it is preferable to use a rod-shaped liquid crystalline compound to form an optically anisotropic layer included in the λ/4 plate. As the rod-shaped liquid crystalline compound, azomethines, azoxys, cyano biphenyls, cyano phenyl esters, benzoic acid esters, cyclohexanecarboxylic acid phenyl esters, cyano phenylcyclohexanes, cyano-substituted phenylpyrimidines, alkoxy-substituted phenylpyrimidines, phenyldioxanes, tolanes, and alkenyl cyclohexylbenzonitriles are preferably used. Not only these low-molecular liquid crystalline compounds, but also high-molecular liquid crystalline compounds can be used. It is more preferable to fix the alignment by polymerization of a rod-shaped liquid crystalline compound. A liquid crystalline compound having a partial structure which may conduct polymerization or crosslinking reaction with active light or electron rays, heat, or the like can be preferably used. The number of such partial structures is preferably 1 to 6, and more preferably 1 to 3. As the polymerizable rod-shaped liquid crystalline compound, a compound disclosed in Makromol. Chem., Vol. 190, p. 2255 (1989), Advanced Materials, Vol. 5, p. 107 (1993), U.S. Pat. Nos. 4,683,327, 5,622,648, and 5770107, WO95/22586, WO95/24455, WO97/00600, WO98/23580, WO98/52905, JP-A-1-272551, JP-A-6-16616, JP-A-7-110469, JP-A-11-80081, JP-A-2001-328973, and the like can be used.

[Vertical Alignment Promoting Agent]

In order to uniformly align the liquid crystalline compound vertically when the optically anisotropic layer is formed, it is necessary to control alignment of the liquid crystalline compound vertically in an alignment film interface side and an air interface side. For this purpose, a composition which contains, together with the liquid crystalline compound, a compound having an action of vertically aligning the liquid crystalline compound in the alignment film by means of an exclusion volume effect, an electrostatic effect, or a surface energy effect is preferably used to form the optically anisotropic layer. Further, with respect to regulating the alignment of an air interface side, a composition which contains, together with a compound having an action of vertically aligning the liquid crystalline compound by means of an exclusion volume effect, an electrostatic effect, or a surface energy effect at the time of aligning the liquid crystalline compound is preferably used to form an optically anisotropic layer. For the compound (alignment film interface side vertical alignment material) that promotes vertical aligning of the molecules of the liquid crystalline compound at the interface side of these alignment films, a pyridinium derivative can be preferably used. As for a compound (air interface side vertical alignment material) that promotes the vertical aligning of the molecules of the liquid crystalline compound at the interface side of these alignment films, a compound, which promotes maldistribution of the compounds, containing at least one or more hydrophilic groups selected from a fluoro aliphatic group, a carboxyl group (—COOH), a sulfo group (—SO$_3$H), phosphonoxy {—OP(=O)(OH)$_2$}, and a salt thereof is preferably used. In addition, by combining these compounds, for example, when the liquid crystalline compound is produced as a coating liquid, the coatability of the coating liquid is improved, and thus generation of unevenness and a fish-eye effect are inhibited. Hereinbelow, the vertical alignment material will be described in detail.

[Alignment Film Interface Side Vertical Alignment Material]

For the alignment film interface side vertical aligning material that can be used in the present invention, a pyridinium derivative (pyridinium salt) represented by the following formula (II) is preferably used. By adding at least one kind of the pyridinium derivative to the liquid crystalline composition, it is possible to align the molecules of a discotic liquid crystalline compound in the substantially vertical direction near an alignment film.

Formula (II)

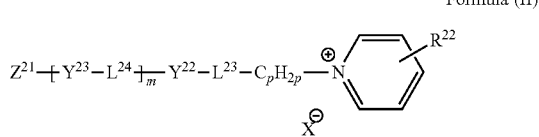

Each of $L^{23}$ and $L^{24}$ represents a divalent linking group. $L^{23}$ is preferably a single bond, —O—, —O—CO—, —CO—O—, —C≡C—, —CH═CH—, —CH═N—, —N═CH—, —N═N—, —C-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO—, or —O—CO-AL-CO—O—, and AL is an alkylene group having 1 to 10 carbon atoms. $L^{23}$ is preferably a single bond, —O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO—, or —O—CO-AL-CO—O—, more preferably a single bond or —O—, and most preferably —O—.

$L^{24}$ is preferably a single bond, —O—, —O—CO—, —CO—O—, —C≡C—, —CH═CH—, —CH═N—, —N═CH—, or —N═N—, and more preferably —O—CO— or —CO—O—. When m is 2 or more, it is more preferable that plural $L^{24}$'s be alternately —O—CO— and —CO—O—.

$R^{22}$ is a hydrogen atom, an unsubstituted amino group or a substituted amino group having 1 to 25 carbon atoms.

In the case where $R^{22}$ is a di-alkyl-substituted amino group, two alkyl groups may be bonded to each other to form a nitrogen-containing heteroring. At this time, the formed nitrogen-containing heteroring is preferably a 5- or 6-membered ring. $R^{22}$ is more preferably a hydrogen atom, an unsubstituted amino group, or a di-alkyl-substituted amino group having 2 to 12 carbon atoms, and even more preferably a hydrogen atom, an unsubstituted amino group, or a di-alkyl-substituted amino group having 2 to 8 carbon atoms. When $R^{22}$ is an unsubstituted amino group or a substituted amino group, the pyridinium ring is preferably substituted at its 4-position.

X is an anion.

X is preferably a monovalent anion. Examples of the anion include a halogen anion (for example, a fluorine ion, a chlorine ion, bromine ion, an iodine ion, and the like), a sulfonate ion (for example, a methanesulfonate ion, a trifluoromethanesulfonate ion, a methylsulfate ion, a p-toluenesulfonate ion, a p-chlorobenzenesulfonate ion, a 1,3-benzenedisulfonate ion, a 1,5-naphthalenedisulfonate ion, a 2,6-naphthalenedisulfonate ion, and the like), a sulfate ion, a carbonate ion, a nitrate ion, a thiocyanate ion, a perchlorate ion, a tetrafluoroborate ion, a picrate ion, an acetate ion, a formate ion, a trifluoroacetate ion, a phosphate ion (for example, a hexafluorophosphate ion), a hydroxyl ion, and the like. X is preferably a halogen anion, a sulfonate ion, or a hydroxyl ion.

Each of $Y^{22}$ and $Y^{23}$ is independently a divalent linking group including a 5- or 6-membered ring as a partial structure.

The 5- or 6-membered ring may have a substituent. Preferably, at least one of $Y^{22}$ and $Y^{23}$ is a divalent linking group including a 5- or 6-membered ring as a partial structure, which has a substituent. Preferably, each of $Y^{22}$ and $Y^{23}$ is independently a divalent linking group including a 6-membered ring as a partial structure. Examples of the 6-membered ring include an aliphatic ring, an aromatic ring (a benzene ring) and a heteroring. Examples of the 6-membered aliphatic ring include a cyclohexane ring, a cyclohexene ring, and a cyclohexadiene ring. Examples of the 6-membered heteroring include a pyran ring, a dioxane ring, a dithiane ring, a thiine ring, a pyridine ring, a piperidine ring, an oxazine ring, a morpholine ring, a thiazine ring, a pyridazine ring, a pyrimidine ring, a pyrazine ring, a piperazine ring, and a triazine ring. The 6-membered ring may be condensed with other 6- or 5-membered rings.

Examples of the substituent include a halogen atom, a cyano group, an alkyl group having 1 to 12 carbon atoms, and an alkoxy group having 1 to 12 carbon atoms. The alkyl group and the alkoxy group may be substituted with an acyl group having 2 to 12 carbon atoms or an acyloxy group having 2 to 12 carbon atoms. The substituent is preferably an alkyl group having 1 to 12 (more preferably 1 to 6, and even more preferably 1 to 3) carbon atoms. Two or more substituents may be included, and for example, in the case where $Y^{22}$ and $Y^{23}$ are phenylene groups, they may be substituted with 1 to 4 alkyl groups having 1 to 12 (more preferably 1 to 6, and even more preferably 1 to 3) alkyl groups.

Furthermore, m is 1 or 2, and preferably 2. When m is 2, plural $Y^{23}$'s and $L^{24}$'s may be the same as or different from each other.

$Z^{21}$ is a monovalent group selected from a group consisting of a halogen-substituted phenyl group, a nitro-substituted phenyl group, a cyano-substituted phenyl group, a phenyl group substituted with an alkyl group having 1 to 25 carbon atoms, a phenyl group substituted with an alkoxy group having 1 to 25 carbon atoms, an alkyl group having 1 to 25 carbon atoms, an alkynyl group having 2 to 25 carbon atoms, an alkoxy group having 1 to 25 carbon atoms, an alkoxycarbonyl group having 1 to 25 carbon atoms, an aryloxycarbonyl group having 7 to 26 carbon atoms, and an arylcarbonyl group having 7 to 26 carbon atoms.

In the case where m is 2, $Z^{21}$ is preferably cyano, an alkyl group having 1 to 25 carbon atoms, or an alkoxy group having 1 to 25 carbon atoms, and more preferably an alkoxy group having 4 to 20 carbon atoms.

In the case where m is 1, $Z^{21}$ is preferably an alkyl group having 7 to 25 carbon atoms, an alkoxy group having 7 to 25 carbon atoms, an alkyl group substituted with an acyl group having 7 to 25 carbon atoms, an alkoxy group substituted with an acyl group having 7 to 25 carbon atoms, an alkyl group substituted with an acyloxy group having 7 to 12 carbon atoms, or an alkoxy group substituted with an acyloxy group having 7 to 25 carbon atoms, The acyl group is represented by —CO—R, the acyloxy group is represented by —O—CO—R, and R is represented by an aliphatic group (an alkyl group, a substituted alkyl group, an alkenyl group, a substituted alkenyl group, an alkynyl group, or a substituted alkynyl group), or an aromatic group (an aryl group or a substituted aryl group). R is preferably an aliphatic group, and more preferably an alkyl group or an alkenyl group.

p is an integer of 1 to 10, and particularly preferably 1 or 2. $C_pH_{2p}$ means a chained alkylene group, which may have a branched structure. $C_pH_{2p}$ is preferably a linear alkylene group (—$(CH_2)_p$—).

Among the compounds represented by the formula (II) above, a compound represented by the following (II') is preferred.

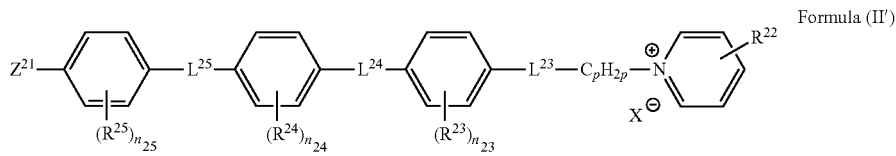

Formula (II')

In the formula (II'), the same symbols as in the formula (II) have the same definition and their preferable ranges are also the same. $L^{25}$ has the same definition as $L^{24}$, and its preferable range is also the same. It is preferable that $L^{24}$ and $L^{25}$ be —O—CO— or —CO—O—, and it is also preferable that $L^{24}$ be —O—CO— and $L^{25}$ be —CO—O—.

Each of $R^{23}$, $R^{24}$, and $R^{25}$ is an alkyl group having 1 to 12 (more preferably 1 to 6, and even more preferably 1 to 3) carbon atoms. $n_{23}$ represents 0 to 4, $n_{24}$ represents 1 to 4, and $n_{25}$ represents 0 to 4. It is preferable that $n_{23}$ and $n_{25}$ be 0, and $n_{24}$ be 1 to 4 (more preferably 1 to 3).

Specific examples of the compound represented by the formula (II) include the compounds described in [0058] to [0061] of JP-A-2006-113500.

Besides, specific examples of the compound represented by the formula (II) include the following compounds, provided that in the following formula, an ion ($X^-$) is omitted.

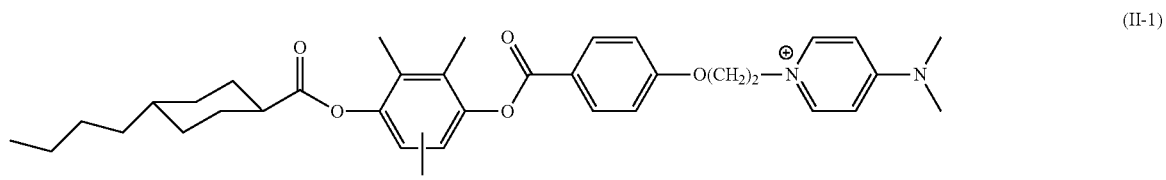
(II-1)

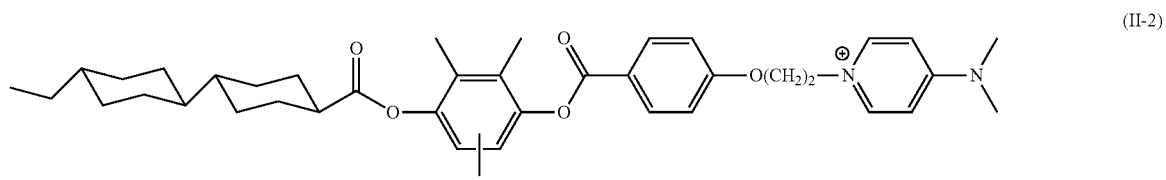
(II-2)

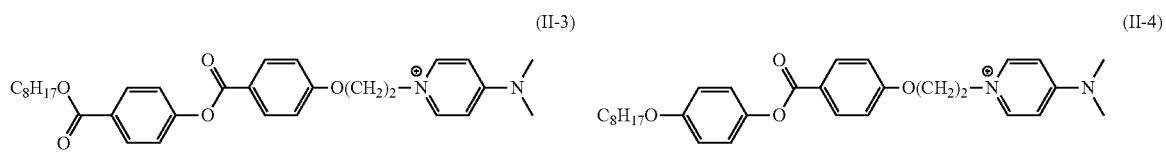
(II-3)                                    (II-4)

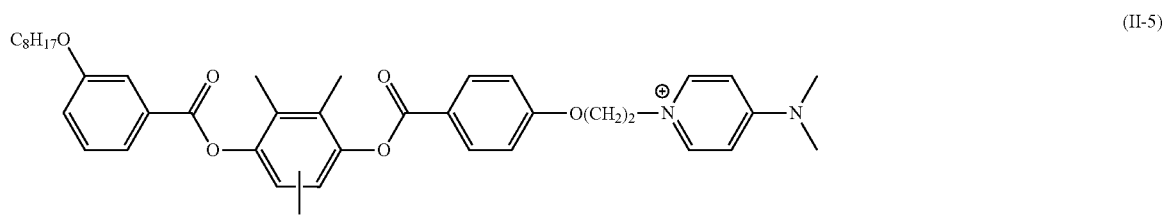
(II-5)

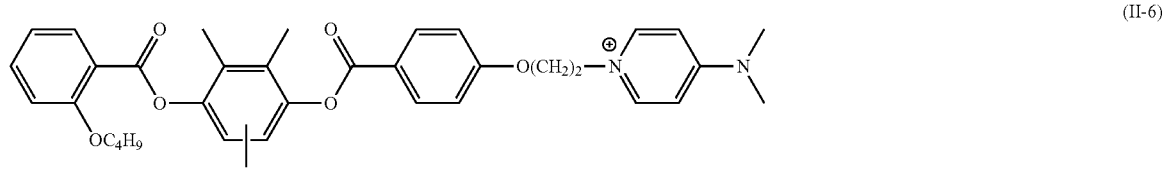
(II-6)

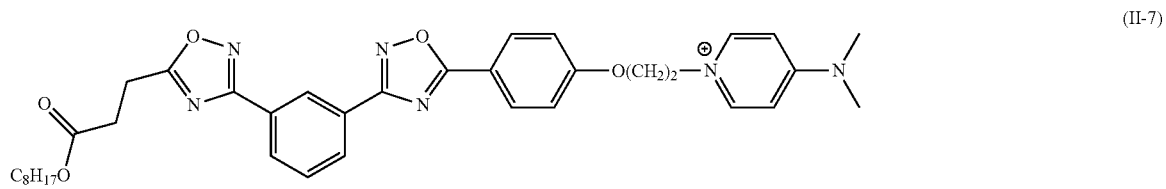
(II-7)

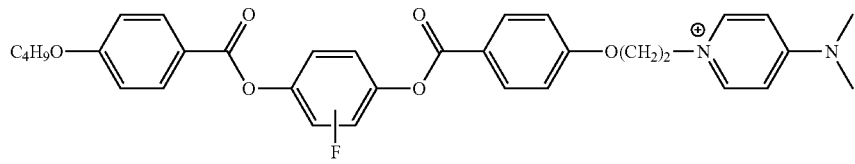
(II-8)
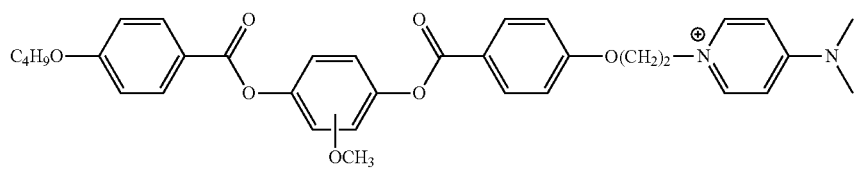
(II-9)
Specific examples of the compound represented by the formula (II') are shown below, provided that in the following formula, an ion (X$^-$) is omitted.
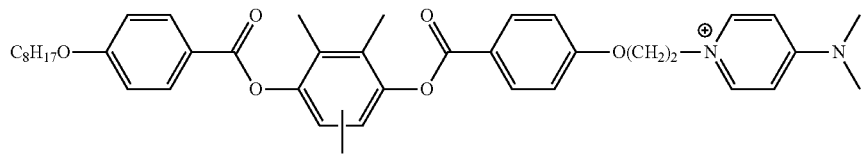
(II-10)
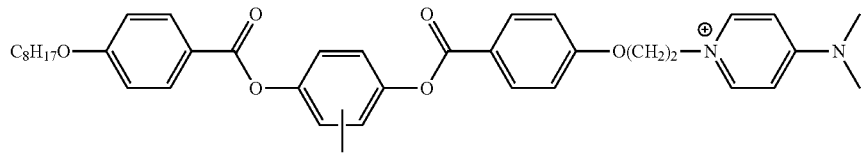
(II-11)
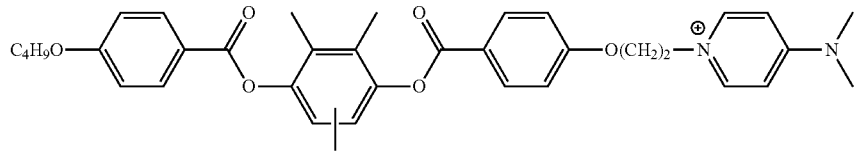
(II-12)
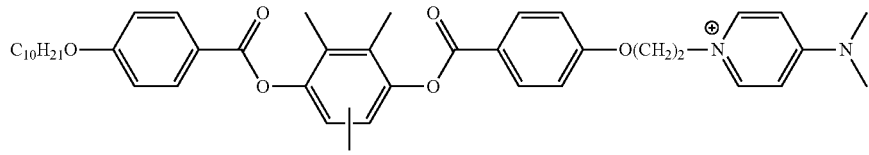
(II-13)
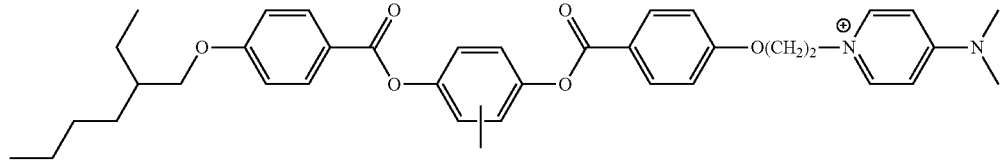
(II-14)
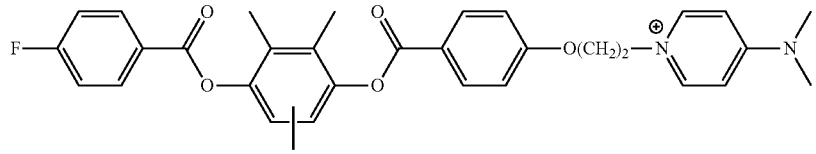
(II-15)

-continued
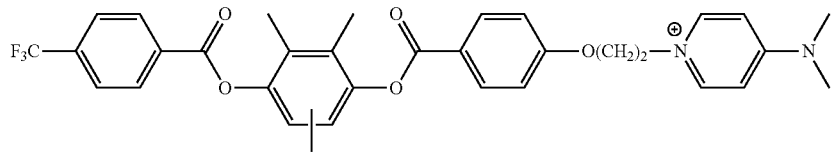 (II-16)
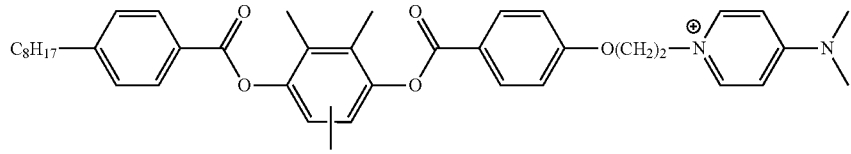 (II-17)
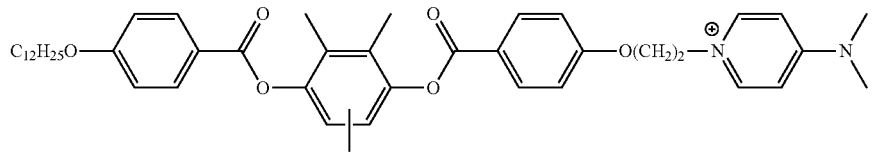 (II-18)
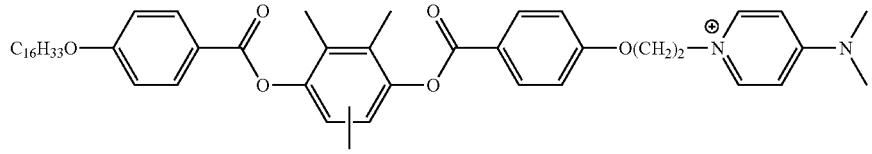 (II-19)
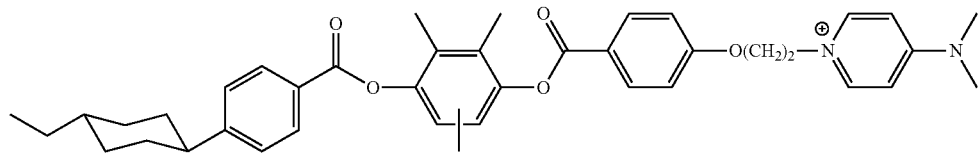 (II-20)
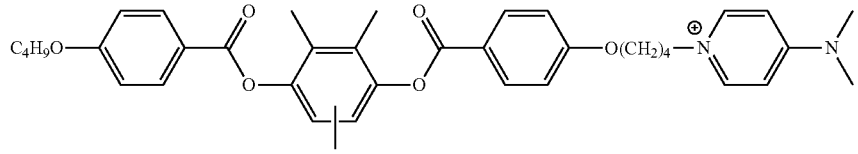 (II-21)
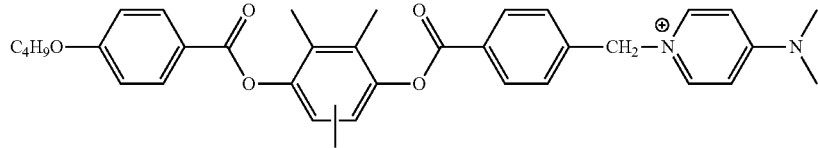 (II-22)
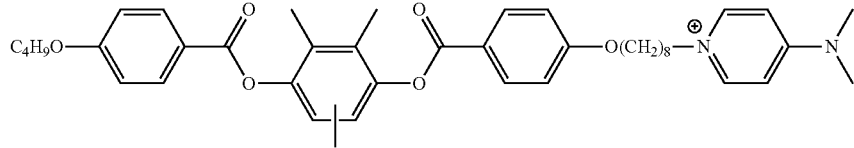 (II-23)
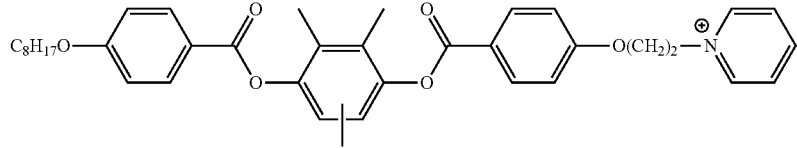 (II-24)

-continued

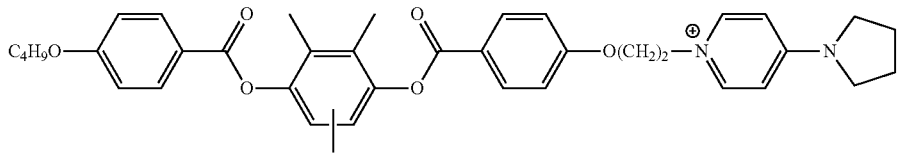
(II-25)

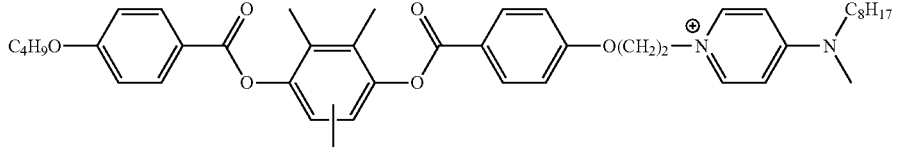
(II-26)

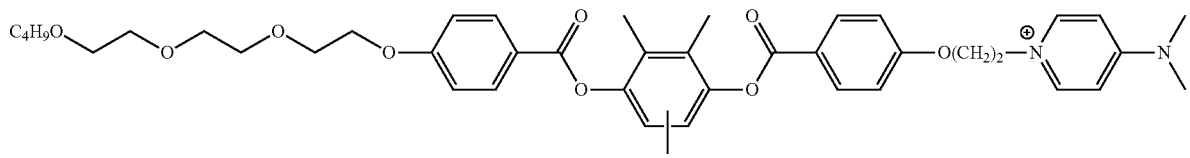
(II-27)

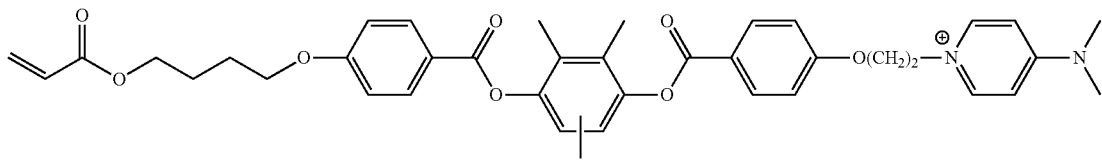
(II-28)

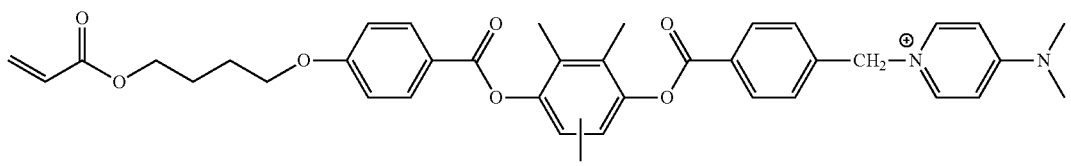
(II-29)

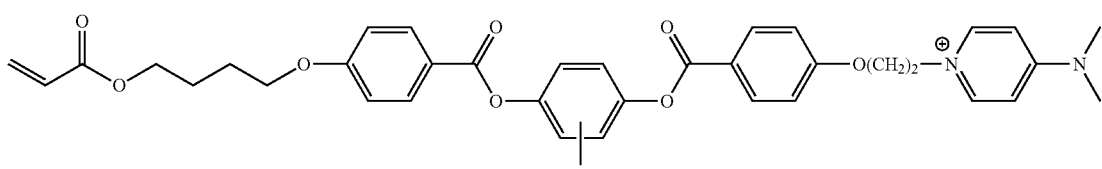
(II-30)

The pyridinium derivative of the formula (II) can be usually obtained by subjecting a pyridine ring to alkylation (Menschutkin reaction).

A preferable range of the content of the pyridinium derivatives in the composition for forming an optically anisotropic layer varies depending on its use, but it is preferably 0.005 to 8% by mass, and more preferably 0.01 to 5% by mass in the composition (liquid crystalline composition without a solvent in the case of producing it as a coating liquid).

[Air Interface Side Vertical Alignment Material]

As the air interface side vertical alignment material in the present invention, a fluorine-based polymer (II) or a fluorine-containing compound represented by the formula (III) is preferably used.

The fluorine-based polymer is a copolymer including a repeating unit derived from a fluoro-aliphatic group-containing monomer and a repeating unit represented by the following formula (II).

(II)

In the formula, each of $R^1$, $R^2$, and $R^3$ independently represents a hydrogen atom or a substituent; and L represents a divalent linking group selected from the following group of linking groups or a divalent linking group formed of a combination of two or more kinds selected from the following group of linking groups.

(Group of Linking Groups)

a single bond, —O—, —CO—, —NR$^4$— (wherein R$^4$ represents a hydrogen atom, an alkyl group, an aryl group, or an aralkyl group), —S—, —SO$_2$—, —P(=O)(OR$^5$)— (wherein R$^5$ represents an alkyl group, an aryl group, or an aralkyl group), an alkylene group, and an arylene group;

Q represents a carboxylic group (—COOH) or a salt thereof, a sulfo group (—SO$_3$H) or a salt thereof, or phosphonoxy {—OP(=O)(OH)$_2$} or a salt thereof.

Fluorine-Containing Compound Represented by Formula (III) Below.

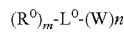  Formula (III)

In the formula, R$^0$ represents an alkyl group, an alkyl group having a CF$_3$ group at the end, or an alkyl group having a CF$_2$H group at the end, and m represents an integer of 1 or more. Plural R$^0$'s may be the same as or different from each other, but at least one thereof represents an alkyl group having a CF$_3$ group or a CF$_2$H group at the end. L$^0$ represents a (m+n)-valent linking group, W represents a carboxylic group (—COOH) or a salt thereof, a sulfo group (—SO$_3$H) or a salt thereof, or phosphonoxy {—OP(=O)(OH)$_2$} or a salt thereof, and n represents an integer of 1 or more.

First, the fluorine-based polymer will be described.

The fluorine-based polymer that can be used in the present invention is characterized in that it contains a fluoro-aliphatic group and at least one or more hydrophilic groups selected from a group consisting of a carboxyl group (—COOH), a sulfo group (—SO$_3$H), a phosphonoxy group {—OP(=O)(OH)$_2$}, and salts thereof. Examples of the polymers, as described in "Revision of The Chemistry of Polymer Synthesis" (Otsu, T., published by Kagaku Dojin, p. 1-4, 1968) include polyolefins, polyesters, polyamides, polyimides, polyurethanes, polycarbonates, polysulfones, polycarbonates, polyethers, polyacetals, polyketones, polyphenylene oxides, polyphenylene sulfides, polyarylates, PTFEs, polyvinylidene fluorides, cellulose derivatives, and the like. The fluorine-based polymers are preferably polyolefins.

The fluorine-based polymer is a polymer having a fluoro-aliphatic group in its side chain. The fluorine-based polymer preferably has 1 to 12 carbon atoms, and more preferably 6 to 10 carbon atoms. The aliphatic group may be chained or cyclic. When the aliphatic group is chained, it may be a linear chain or a branched chain. Among them, a linear chain fluoro-aliphatic group having 6 to 10 carbon atoms is preferred. The degree of substitution by a fluorine atom is not particularly limited, but 50% or more of the hydrogen atoms in the aliphatic group are preferably substituted by a fluorine atom, and a substitution degree of 60% or more is further preferred. The fluoro-aliphatic group is contained in the side chain bonded with the main chain of a polymer introduced by an ester bond, an amide bond, an imide bond, a urethane bond, a urea bond, an ether bond, a thioether bond, an aromatic ring, or the like. One of the fluoro-aliphatic groups is derived from a fluoro-aliphatic compound prepared by the telomerization method (which is also referred to as a telomer method) or the oligomerization method (which is also referred to as an oligomer method). The preparation method of the fluoro-aliphatic compound is described, for example, in p. 117-118 of "Synthesis and Function of Fluorine Compounds" (Nobuo Ishikawa, published by CMC, 1987), or Hudlicky, M. & Pavlath, A. E., "Chemistry of Organic Fluorine Compounds II" (Monograph 187, Ed by Milos Hudlicky and Attila E. Pavlath, American Chemical Society, 1995), p. 747-752. The telomerization method is a process in which an alkyl halide having a large chain transfer constant such as an iodide and the like is used as a telogen to conduct radical polymerization of a fluorine-containing vinyl compound such as tetrafluoroethylene and the like to synthesize a telomer (exemplified in Scheme-1).

Scheme 1

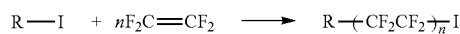

The obtained iodine-terminated telomer is usually subjected to appropriate terminal chemical modification, such as those shown by Scheme 2, and thus converted to fluoro-aliphatic compounds. These compounds are further converted, if necessary, into desired monomer structures, which are then used in preparation of a fluorinated aliphatic polymer.

Scheme 2

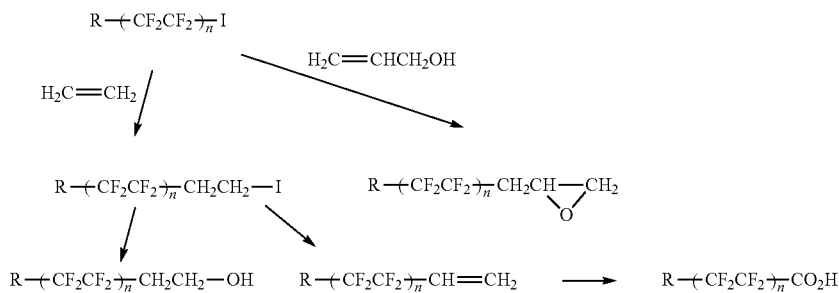

Specific examples of the monomer that can be used in preparation of the fluorine-based polymer useable in the present invention include the compounds described in Paragraph Nos. [0075] to [0081] of JP-A-2006-113500, and the like, but the present invention is not limited to these specific examples in any way.

One embodiment of the fluorine-based polymer that can be used in the present invention is a copolymer including a repeating unit derived from a fluoro-aliphatic group-containing monomer and a repeating unit having a hydrophilic group represented by the following formula (II).

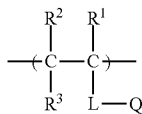

(II)

In the formula (II), each of $R^1$, $R^2$, and $R^3$ independently represents a hydrogen atom or a substituent.

Q represents a carboxyl group (—COOH) or a salt thereof, a sulfo group (—SO$_3$H) or a salt thereof, or a phosphonoxy group {—OP(=O)(OH)$_2$} or a salt thereof. L represents an arbitrary group selected from the following group of linking groups or a divalent linking group formed by combination of two or more kinds thereof.

(Group of Linking Groups)

a single bond, —O—, —CO—, —NR$^b$— (wherein $R^b$ represents a hydrogen atom, an alkyl group, an aryl group, or an aralkyl group), —S—, —SO$_2$—, —P(=O)(OR$^c$)— (wherein $R^c$ represents an alkyl group, an aryl group, or an aralkyl group), an alkylene group, and an arylene group.

In the formula (II), each of $R^1$, $R^2$, and $R^3$ independently represents a hydrogen atom or a substituent selected from the following group of substituents.

(Group of Substituents)

an alkyl group (an alkyl group having preferably 1 to 20 carbon atoms, more preferably 1 to 12 carbon atoms, and even more preferably 1 to 8 carbon atoms, such as a methyl group, an ethyl group, an isopropyl group, a tert-butyl group, an n-octyl group, an n-decyl group, an n-hexadecyl group, a cyclopropyl group, a cyclopentyl group, a cyclohexyl group, and the like); an alkenyl group (an alkenyl group having preferably 2 to 20 carbon atoms, more preferably 2 to 12 carbon atoms, and even more preferably 2 to 8 carbon atoms, such as a vinyl group, an aryl group, a 2-butenyl group, a 3-pentenyl group, and the like); an alkynyl group (an alkynyl group having preferably 2 to 20 carbon atoms, more preferably 2 to 12 carbon atoms, and even more preferably 2 to 8 carbon atoms, such as a propargyl group, a 3-pentynyl group, and the like); an aryl group (an aryl group having preferably 6 to 30 carbon atoms, more preferably 6 to 20 carbon atoms, and even more preferably 6 to 12 carbon atoms, such as a phenyl group, a p-methylphenyl group, a naphthyl group, and the like); an aralkyl group (an aralkyl group having 7 to 30 carbon atoms, more preferably 7 to 20 carbon atoms, and even more preferably 7 to 12 carbon atoms, such as a benzyl group, a phenethyl group, a 3-phenylpropyl group, and the like); a substituted or unsubstituted amino group (an amino group having preferably 0 to 20 carbon atoms, more preferably 0 to 10 carbon atoms, and even more preferably 0 to 6 carbon atoms, such as an unsubstituted amino group, a methylamino group, a dimethylamino group, a diethylamino group, an anilino group, and the like);

an alkoxy group (an alkoxy group having preferably 1 to 20 carbon atoms, more preferably 1 to 16 carbon atoms, and even more preferably 1 to 10 carbon atoms, such as a methoxy group, an ethoxy group, a butoxy group, and the like); an alkoxycarbonyl group (an alkoxycarbonyl group having preferably 2 to 20 carbon atoms, more preferably 2 to 16 carbon atoms, and even more preferably 2 to 10 carbon atoms, such as a methoxycarbonyl group, an ethoxycarbonyl group, and the like); an acyloxy group (an acyloxy group having preferably 2 to 20 carbon atoms, more preferably 2 to 16 carbon atoms, and even more preferably 2 to 10 carbon atoms, such as an acetoxy group, a benzoyloxy group, and the like); an acylamino group (an acylamino group having preferably 2 to 20 carbon atoms, more preferably 2 to 16 carbon atoms, and even more preferably 2 to 10 carbon atoms, such as an acetylamino group, a benzoylamino group, and the like); an alkoxycarbonylamino group (an alkoxycarbonylamino group having preferably 2 to 20 carbon atoms, more preferably 2 to 16 carbon atoms, and even more preferably 2 to 12 carbon atoms, such as methoxycarbonylamino group, and the like); an aryloxycarbonylamino group (an aryloxycarbonylamino group having preferably 7 to 20 carbon atoms, more preferably 7 to 16 carbon atoms, and even more preferably 7 to 12 carbon atoms, such as phenyloxycarbonylamino group, and the like); a sulfonylamino group (a sulfonylamino group having preferably 1 to 20 carbon atoms, more preferably 1 to 16 carbon atoms, and even more preferably 1 to 12 carbon atoms, such as a methanesulfonylamino group, a benzenesulfonylamino group, and the like); a sulfamoyl group (a sulfamoyl group having preferably 0 to 20 carbon atoms, more preferably 0 to 16 carbon atoms, and even more preferably 0 to 12 carbon atoms, such as a sulfamoyl group, a methylsulfamoyl group, a dimethylsulfamoyl group, a phenylsulfamoyl group, and the like); a carbamoyl group (a carbamoyl group having preferably 1 to 20 carbon atoms, more preferably 1 to 16 carbon atoms, and even more preferably 1 to 12 carbon atoms, such as an unsubstituted carbamoyl group, a methylcarbamoyl group, a diethylcarbamoyl group, a phenylcarbamoyl group, and the like);

an alkylthio group (an alkylthio group having preferably 1 to 20 carbon atoms, more preferably 1 to 16 carbon atoms, and even more preferably 1 to 12 carbon atoms, such as a methylthio group, an ethylthio group, and the like); an arylthio group (an arylthio group having preferably 6 to 20 carbon atoms, more preferably 6 to 16 carbon atoms, and even more preferably 6 to 12 carbon atoms, such as a phenylthio group, and the like); a sulfonyl group (a sulfonyl group having preferably 1 to 20 carbon atoms, more preferably 1 to 16 carbon atoms, and even more preferably 1 to 12 carbon atoms, such as a mesyl group, a tosyl group, and the like); a sulfinyl group (a sulfinyl group having preferably 1 to 20 carbon atoms, more preferably 1 to 16 carbon atoms, and even more preferably 1 to 12 carbon atoms, such as a methanesulfinyl group, a benzenesulfinyl group, and the like); a ureido group (a ureido group having preferably 1 to 20 carbon atoms, more preferably 1 to 16 carbon atoms, and even more preferably 1 to 12 carbon atoms, such as an unsubstituted ureido group, a methylureido group, a phenylureido group, and the like); a phosphoric amido group (a phosphoric amido group having preferably 1 to 20 carbon atoms, more preferably 1 to 16 carbon atoms, and even more preferably 1 to 12 carbon atoms, such as a diethylphosphoric amido group, a phenylphosphoric amido group, and the like); a hydroxyl group; a mercapto group; a halogen atom (for example, a fluorine atom, a chlorine atom, a bromine atom and an iodine atom); a cyano group; a sulfo group; a carboxyl group; a nitro group; a hydroxamic acid group; a sulfino group; a hydrazino group; an imino group; a heterocyclic group (a heterocyclic group having preferably 1 to 30 carbon atoms, and more preferably 1 to 12 carbon atoms, such as heterocyclic group containing heteroatoms such as a nitrogen atom, an oxygen atom, a sulfur atom, for example, an imidazolyl group, a pyridyl group, a quinolyl group, a furyl group, a piperidine group, a morpholino group, a benzoxazolyl group, a benzimidazolyl group, a benzthiazolyl group, and the like); a silyl group (a silyl group having preferably 3 to 40 carbon atoms, more preferably 3 to 30 carbon atoms, and even more preferably 3 to 24 carbon atoms, such as a trimethylsilyl group, a triphenylsilyl group, and the like). These substituents may be further substituted with these substituents. In addition, in the case where two or more substituents exist, they may be the same as or different from each other. Further, they may be bonded to each other to form a ring, if possible.

Preferably, each of $R^1$, $R^2$, and $R^3$ independently represents a hydrogen atom, an alkyl group, a halogen group (for example, a fluorine atom, a chlorine atom, a bromine atom, an iodine atom, and the like), or a group represented by -L-Q as described later, more preferably a hydrogen atom, an alkyl group having 1 to 6 carbon atoms, a chlorine atom, or a group represented by -L-Q, particularly preferably a hydrogen atom or an alkyl group having 1 to 4 carbon atoms, and most preferably a hydrogen atom or an alkyl group having 1 to 2 carbon atoms. Specific examples of the alkyl group include a methyl group, an ethyl group, an n-propyl group, an n-butyl group, a sec-butyl group, and the like. The alkyl group may have a suitable substituent. Examples of the substituent include a halogen atom, an aryl group, a heterocyclic group, an alkoxyl group, an aryloxy group, an alkylthio group, an arylthio group, an acyl group, a hydroxyl group, an acyloxy group, an amino group, an alkoxycarbonyl group, an acylamino group, an oxycarbonyl group, a carbamoyl group, a sulfonyl group, a sulfamoyl group, a sulfonamido group, a sulforyl group, a carboxyl group, and the like. Further, for the number of carbon atoms in the alkyl group, carbon atoms in the substituents are not considered. Hereinafter, this also applied to the number of carbon atoms in other groups.

L is a divalent linking group selected from the group of linking groups, or a divalent linking group formed by combination of two or more kinds thereof to form a divalent linking group. Among the group of the linking groups, $R^b$ of —$NR^b$— is a hydrogen atom, an alkyl group, an aryl group or an aralkyl group, and preferably a hydrogen atom or an alkyl group. Further, $R^c$ of —PO(O$R^c$)— is an alkyl group, an aryl group or an aralkyl group, and preferably an alkyl group. When $R^b$ and $R^c$ are an alkyl group, an aryl group or an aralkyl group, the number of carbon atoms is the same as described for the 'group of substituents'. Examples of L preferably include a single bond, —O—, —CO—, —$NR^b$—, —S—, —$SO_2$—, an alkylene group or an arylene group, and particularly preferably include —CO—, —O—, —$NR^b$—, an alkylene group or an arylene group. When L is an alkylene group, it is an alkylene group having preferably 1 to 10 carbon atoms, more preferably 1 to 8 carbon atoms, and even more preferably 1 to 6 carbon atoms. Specific examples of the particularly preferable alkylene group include a methylene group, an ethylene group, a trimethylene group, a tetrabutylene group, a hexamethylene group and the like. When L is an arylene group, the number of carbon atoms in an arylene group is preferably 6 to 24, more preferably 6 to 18, and even more preferably 6 to 12. Specific examples of the particularly preferable arylene group include a phenylene group, a naphthalene group and the like. When L includes a divalent linking group obtained by combination of an alkylene group and an arylene group, the number of the aralkylene groups is preferably 7 to 34, more preferably 7 to 26, and even more preferably 7 to 16. Specific examples of the particularly preferable aralkylene group include a phenylenemethylene group, a phenyleneethylene group, a methylenephenylene group and the like. The group mentioned as L may have a suitable substituent. Examples of such the substituent are the same substituents as mentioned as the substituent in $R^1$ to $R^3$.

Hereinbelow, the specific structures of L include the structures described in Paragraph Nos. [0090] to [0091] of JP-A-2006-113500, but the present invention is not limited to these specific examples in any way.

In the formula (II), Q represents a carboxyl group and a salt thereof (for example, a lithium salt, a sodium salt, a potassium salt, an ammonium salt (for example, ammonium, tetramethylammonium, trimethyl-2-hydroxyethylammonium, tetrabutylammonium, trimethylbenzylammonium, dimethylphenylammonium, and the like), a pyridinium salt, and the like), a sulfo group and a salt thereof (examples of the cation forming salt are the same as the salts disclosed for the carboxyl group), a phosphonoxy group and a salt thereof (examples of the cation forming salt are the same salts as described for the carboxyl group). Q is more preferably a carboxyl group, a sulfo group, or a phospho group, and particularly preferably a carboxyl group or a sulfo group.

The fluorine-based polymer may contain one kind of the repeating unit represented by the formula (II), and may also contain two or more kinds thereof. Moreover, the fluorine-based polymer may contain one or two or more kinds of other repeating units in addition to each repeating unit. The other repeating unit is not particularly limited, but preferred examples thereof typically include a repeating unit derived from a radically polymerizable monomer example. Hereinafter, specific examples of the monomer to be used to derive other repeating units will be mentioned. The fluorine-based polymer may contain a repeating unit derived from one or two or more kinds of monomers selected from the following group of monomers.

Group of Monomers
(1) Alkenes
ethylene, propylene, 1-butene, isobutene, 1-hexene, 1-dodecene, 1-octadecene, 1-eicosene, hexafluoropropene, vinylidene fluoride, chlorotrifluoroethylene, 3,3,3-trifluoropropylene, tetrafluoroethylene, vinyl chloride, vinylidene chloride, and the like;
(2) Dienes
1,3-butadiene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-chloro-1,3-butadiene, 1,1,2-trichloro-1,3-butadiene and 2-cyano-1,3-butadiene, 1,4-divinyl cyclohexane, and the like;
(3) Derivatives of α,β-Unsaturated Carboxylic Acid
(3a) Alkyl Acrylates
methyl acrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxypolyethylene glycol acrylate (number of added moles of polyoxyethylene: n=2 to 100), 3-methoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate, and the like;
(3b) Alkyl Methacrylates
methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetrahydrofurfuryl methacrylate, cresyl methacrylate, naphthyl methacrylate, 2-methoxyethyl methacrylate, 3-methoxybutyl methacrylate, ω-methoxypolyethylene glycol methacrylate (number of added moles of polyoxyethylene: n=2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimethoxysilylpropyl methacrylate, allyl methacrylate, 2-isocyanatoethyl methacrylate, and the like;

(3c) Diesters of Unsaturated Polyvalent Carboxylic Acid dimethyl malate, dibutyl malate, dimethyl itaconate, dibutyl itaconate, dibutyl crotonate, dihexyl crotonate, diethyl fumarate, dimethyl fumarate, and the like; and (3d) Amides of α,β-Unsaturated Carboxylic Acid N,N-dimethylacrylic amide, N,N-diethylacrylic amide, N-n-propylacrylic amide, N-tert-butylacrylic amide, N-tert-octyl methacrylamide, N-cyclohexylacrylic amide, N-phenylacrylic amide, N-(2-acetoacetoxyethyl)acrylic amide, N-benzylacrylic amide, N-acryloylmorpholine, diacetone acrylic amide, N-methylmaleimide, and the like.

(4) Unsaturated Nitriles acrylonitrile, methacrylonitrile, and the like;

(5) Styrenes and Derivatives Thereof:

styrene, vinyltoluene, ethylstyrene, p-tert-butylstyrene, methyl p-vinylbenzoate, α-methylstyrene, p-chloromethyl styrene, vinylnaphthalene, p-methoxystyrene, p-hydroxymethylstyrene, p-acetoxystyrene, and the like;

(6) Vinyl Esters vinyl acetate, vinyl propionate, vinyl butyrate, vinyl isobutyrate, vinyl benzoate, vinyl salicylate, vinyl chloroacetate, vinyl methoxyacetate, vinyl phenylacetate, and the like;

(7) Vinyl Ethers:

methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether, and the like; and (8) Other Polymerizable Monomers:

N-vinylpyrrolidone, methyl vinyl ketone, phenyl vinyl ketone, methoxyethyl vinyl ketone, 2-vinyloxazoline, 2-isopropenyloxazoline, and the like.

Within the fluorine-based polymers, the content of the fluoro-aliphatic group-containing monomer is preferably 5% by mass or more, more preferably 10% by mass or more, and even more preferably 30% by mass or more of the total content of the component monomer in the polymer. For the fluorine-based polymer, the content of the repeating unit represented by the formula (II) is preferably 0.5% by mass or more of the total content of the component monomer in the polymer, more preferably 1 to 20% by mass or more, and even more preferably 1 to 10% by mass or more. The percent by mass may be easily changed as the value of the preferable range is changed according to the molecular mass of the monomer being used, thus by presenting the molar number of the functional group per unit mass of a polymer, an accurate content of the repeating unit represented by the formula (II) can be determined. In the case of using such notation, a preferable content of a hydrophilic group contained in the fluorine-based polymer (Q in the formula (II)) is 0.1 mmol/g to 10 mmol/g, and a more preferable content is 0.2 mmol/g to 8 mmol/g.

The mass average molecular mass of the fluorine-based polymer that is used in the present invention is preferably 1,000,000 or less, more preferably 500,000 or less, and even more preferably 100,000 or less. The mass average molecular mass can be measured in terms of a polystyrene (PS) value by gel permeation chromatography (GPC).

A method for polymerization of the fluorine-based polymer is not particularly limited, but for example, a polymerization method selected from cationic polymerization, radical polymerization using a vinyl group, anionic polymerization, and the like can be adopted. Among them, the radical polymerization is particularly preferred from the viewpoint of common use. For the polymerization initiator, a conventional compound such as a radical thermopolymerization initiator, a radical photopolymerization initiator, and the like can be used, but particularly preferably a radical thermopolymerization initiator is used. Herein, the radical thermopolymerization initiator is a compound which generates radicals by heating to a temperature of decomposition temperature or more. Examples of the radical thermopolymerization initiator include dioxy peroxides (acetyl peroxides, benzoyl peroxides, and the like), ketone peroxides (methyl ethyl ketone peroxides, cyclohexanone peroxides, and the like), hydroperoxides (hydrogen peroxide, tert-butylhydroperoxide, cumene hydroperoxide, and the like), dialkyl peroxides (di-tert-butyl peroxide, dicumyl peroxide, dilauroyl peroxide, and the like), peroxy esters (tert-butyl peroxyacetate, tert-butyl peroxypivarate, and the like), azo compounds (azo-bis-isobutyronitrile, azo-bis-isovaleronitrile, and the like), and persulfates (ammonium persulfate, sodium persulfate, potassium persulfate, and the like). These radical thermopolymerization initiators can be used singly or in combination of two or more kinds thereof.

The radical polymerization is not particularly limited, but emulsion polymerization, suspension polymerization, mass polymerization, solution polymerization, and the like can be selected and adopted. The solution polymerization which is a typical radical polymerization will be described in detail. The fundamentals of other polymerization methods are the same, and they are described, for example, in "Experimental Methods for Polymer Synthesis, (Tokyo KAGAKU-DOJIN, 1981), and the like.

An organic solvent is used to carry out the solution polymerization. The organic solvent can be arbitrarily selected as long as it does not impair the object and effect of the present invention. The organic solvent is generally an organic compound having a boiling point within a range of 50 to 200° C. under atmospheric pressure, and an organic compound which may dissolve each constitutional component is preferred. Preferred examples of the organic solvent include alcohols such as isopropanol, butanol, and the like; ethers such as dibutyl ether, ethylene glycol dimethyl ether, tetrahydrofuran, dioxane, and the like; ketones such as acetone, methyl ethyl ketone, methyl isobutyl ketone, cyclohexanone, and the like; esters such as ethyl acetate, butyl acetate, amyl acetate, γ-butyrolactone, and the like; and aromatic hydrocarbons such as benzene, toluene, xylene, and the like. Further, the organic solvent can be used singly or in combination of two or more. In addition, from the viewpoint of dissolvability of a monomer or a produced polymer, a water-mixed organic solvent, in which water is used in combination with the organic solvent, may be also employed.

In addition, the conditions for solution polymerization are not particularly limited, but it is preferable, for example, that the temperature is within the range of 50 to 200° C. and the duration time for heating is 10 minutes to 30 hours. Further, in order not to deactivate the generated radicals, it is preferable to conduct inert gas purge surely during the solution polymerization, but also prior to the solution polymerization initiation. For the inert gas, a typical nitrogen gas can be preferably used.

In order to obtain the fluorine-based polymer within a preferable molecular mass range, a radical polymerization method using a chain transfer agent is particularly effective. For the chain transfer agent, mercaptans (for example, octylmercaptan, decylmercaptan, dodecylmercaptan, tert-dodecylmercaptan, octadecylmercaptan, thiophenol, p-nonylthiophenol, and the like), polyalkyl halides (for example, carbon tetrachloride, chloroform, 1,1,1-trichloroethane, 1,1,1-tribromooctane, and the like), low-active monomers (α-methylstyrene, a α-methylstyrene dimer, and the like) can be used, and preferably mercaptan having 4 to 16 carbon atoms is preferably used. The used amount of the chain transfer agent is influenced by an activity of the chain transfer agent, a combination of the monomers, polymerization conditions, or the like, and is required to be under precise control. However, with respect to the total molar number of the monomers used, the used amount of the chain transfer agent is preferably about 0.01% by mole to 50% by mole, more preferably 0.05% by mole to 30% by mole, and particularly preferably 0.08% by mole to 25% by mole. The chain transfer agent may exist well together with the subjective monomers to be controlled in terms of the degree of polymerization during the polymerization process, and its additive process is not particularly critical. The chain transfer agent may be added by dissolving in monomers or added separately from the monomer.

Furthermore, the fluorine-based polymer of the present invention preferably contains a polymerizable group as a substituent for fixing the alignment state of the discotic liquid crystalline compound.

Specific examples of the fluorine-based polymer which is preferably used in the present invention include the compounds described in Paragraph Nos. [0110] to [0114] of JP-A-2006-113500, but the present invention is not limited to these specific examples in any way.

The fluorine-based polymer used in the present invention, can be prepared by a conventional and practical method. For example, first, to an organic solvent containing a given fluorine-containing monomer, a monomer having a group capable of hydrogen bonding and the like, a typical radical polymerization initiator is added, and the mixture is polymerized to produce the fluorine-based polymer. Further, in cases, other additional polymerizable unsaturated compounds are further added, and the same process is carried out to produce the fluorine-based polymer. With respect to the polymerizability of each monomer, a dropwise polymerization method that carries out polymerization while adding monomers and an initiator dropwise into a reactor, or the like is effective for obtaining a polymer with a uniform composition.

A preferable range of the content of the fluorine-based polymer in the composition varies depending on the use, but in the case of being used for formation of an optically anisotropic layer, it is preferably 0.005 to 8% by mass, more preferably 0.01 to 5% by mass, and even more preferably 0.05 to 3% by mass in the composition (the liquid crystalline composition without a solvent in the case of preparing it as a coating liquid). When the amount of the fluorine-based polymer added is less than 0.005% by mass, its efficacy is insufficient, while when the amount added is more than 8% by mass, drying of the coating film is not carried out sufficiently, and the properties as an optic film are influenced negatively (for example, uniformity of retardation, and the like).

Next, the fluorine-containing compound represented by the formula (III) will be described.

In the formula (III), $R^\circ$ functions as a hydrophobic group of a fluorine-containing compound. An alkyl group represented by $R^\circ$ may be a substituted or unsubstituted alkyl group, and may be a linear or branched chain. The alkyl group represented by $R^\circ$ is preferably an alkyl group having 1 to 20 carbon atoms, more preferably an alkyl group having 4 to 16 carbon atoms, and particularly preferably an alkyl group having 6 to 16 carbon atoms. For the substituent, any one of the substituents exemplified as the following group D of substituents can be used. An alkyl group having a $CF_3$ group at the end represented by $R^\circ$ is an alkyl group having preferably 1 to 20 carbon atoms, more preferably 4 to 16 carbon atoms, and particularly preferably 4 to 8 carbon atoms. The alkyl group having a $CF_3$ group at the end is an alkyl group having the hydrogen atoms contained in the alkyl group which may be partially substituted or all substituted with fluorine atoms. 50% or more of hydrogen atoms within the alkyl group being substituted with fluorine atoms is preferred, a substitution degree of 60% or more is more preferred, and a substitution degree of 70% or more is particularly preferred. The remaining hydrogen atoms may be further substituted with substituents exemplified as the following group D of substituents. An alkyl group having a $CF_2H$ group at the end represented by $R^\circ$ is an alkyl group having preferably 1 to 20 carbon atoms, more preferably 4 to 16 carbon atoms, and particularly preferably 4 to 8 carbon atoms. The alkyl group having a $CF_2H$ group at the end is an alkyl group having the hydrogen atoms contained in the alkyl group which may be partially substituted or all substituted with fluorine atoms. 50% or more of hydrogen atoms within the alkyl group being substituted with fluorine atoms is preferred, a substitution degree of 60% or more is more preferred, and a substitution degree of 70% or more is particularly preferred. The remaining hydrogen atoms may be further substituted with substituents exemplified as the following group D of substituents. Examples of the alkyl group having a $CF_3$ group at the end or the alkyl group having a $CF_2H$ group at the end represented by $R^\circ$ are shown below.

R1: $n\text{-}C_8F_{17}-$
R2: $n\text{-}C_6F_{13}-$
R3: $n\text{-}C_4F_9-$
R4: $n\text{-}C_8F_{17}-(CH_2)_2-$
R5: $n\text{-}C_6F_{13}-(CH_2)_2-$
R6: $n\text{-}C_4F_9-(CH_2)_2-$
R7: $H-(CF_2)_8-$
R8: $H-(CF_2)_6-$
R9: $H-(CF_2)_4-$
R10: $H-(CF_2)_8-(CH_2)-$
R11: $H-(CF_2)_6-(CH_2)-$
R12: $H-(CF_2)_4-(CH_2)-$ In the formula (III), a (m+n)-valent linking group represented by $L^\circ$ is preferably a linking group formed by combination of groups selected from a group consisting of an alkylene group, an alkenylene group, an aromatic group, a heterocyclic group, —CO—, —NR— (wherein R is an alkyl group having 1 to 5 carbon atoms or a hydrogen atom), —O—, —S—, —SO—, and —SO$_2$—.

In the formula (III), W represents a carboxyl group (—COOH) or a salt thereof, a sulfo group (—SO$_3$H) or a salt thereof, or phosphonoxy {—OP(=O)(OH)$_2$} or a salt thereof. The preferable range of W is the same as of Q in the formula (II).

Among the fluorine-containing compounds represented by the formula (III), a compound represented by the following formula (III)-a or (III)-b is preferred.

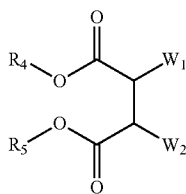

Formula (III)-a

In the formula (III)-a, each of $R_4$ and $R_5$ represents an alkyl group, an alkyl group having a $CF_3$ group at the end, or an alkyl group having a $CF_2H$ group at the end, but $R_4$ and $R_5$ cannot be an alkyl group at the same time. Each of $W_1$ and $W_2$ represents a hydrogen atom, a carboxyl group (—COOH) or a salt thereof, a sulfo group (—$SO_3H$) or a salt thereof, a phosphonoxy group {—OP(=O)(OH)$_2$} or a salt thereof, or an alkyl group, an alkoxy group, or an alkylamino group having a carboxyl group, a sulfo group, or a phosphonoxy group as a substituent, but $W_1$ and $W_2$ are not hydrogen atoms at the same time.

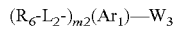

$(R_6\text{-}L_2\text{-})_{m2}(Ar_1)\text{—}W_3$   Formula (III)-b

In the formula (III)-b, $R_6$ represents an alkyl group, an alkyl group having a $CF_3$ group at the end, or an alkyl group having a $CF_2H$ group at the end, m2 represents an integer of 1 or more. Plural $R_6$'s may be the same as or different from each other, but at least one $R_6$ represents an alkyl group having a $CF_3$ group or a $CF_2H$ group at the end. $L_2$ represents a divalent linking group selected from a group consisting of an alkylene group, an aromatic group, —CO—, —NR— (wherein R represents an alkyl group having 1 to 5 carbon atoms or a hydrogen atom), —O—, —S—, —SO—, —$SO_2$—, or a combination thereof, and plural $L_2$ may be the same as or different from each other. $Ar_1$ represents an aromatic hydrocarbon ring or an aromatic heteroring, and $W_3$ represents a carboxyl group (—COOH) or a salt thereof, a sulfo group (—$SO_3H$) or a salt thereof, a phosphonoxy group {—OP(=O)(OH)$_2$} or a salt thereof, or an alkyl group, an alkoxy group or an alkylamino group having a carboxyl group, a sulfo group, or a phosphonoxy group as a substituent.

First, the formula (III)-a will be described.

$R_4$ and $R_5$ have the same definition as for R° in the formula (III), and their preferable ranges are also the same. A carboxyl group (—COOH) or a salt thereof, a sulfo group (—$SO_3H$) or a salt thereof, a phosphonoxy group {—OP(=O)(OH)$_2$} or a salt thereof represented by $W_1$ and $W_2$ have the same definition as W in the formula (III), and their preferable ranges are also the same. An alkyl group having a carboxyl group, a sulfo group or a phosphonoxy group as a substituent represented by $W_1$ and $W_2$ may be a linear or branched chain, and the alkyl group having 1 to 20 carbon atoms is preferred, the alkyl group having 1 to 8 carbon atoms is more preferred, and the alkyl group having 1 to 3 carbon atoms is particularly preferred. The alkyl group having a carboxyl group, a sulfo group or a phosphonoxy group as a substituent may have at least one of a carboxyl group, a sulfo group or a phosphonoxy group, and the carboxyl group, the sulfo group and the phosphonoxy group have the same definition as the carboxyl group, the sulfo group and the phosphonoxy group represented by W in the formula (III), and their preferable ranges are also the same. The alkyl group having a carboxyl group, a sulfo group or a phosphonoxy group as a substituent may be substituted with other substituents in addition thereto, and for the substituent, any one of substituents exemplified as the following group D of substituents can be suitably used. An alkoxy group having a carboxyl group, a sulfo group or a phosphonoxy group as a substituent represented by $W_1$ and $W_2$ may be a linear or branched chain, and the alkoxy group having 1 to 20 carbon atoms is preferred, the alkoxy group having 1 to 8 carbon atoms is more preferred, and the alkoxy group having 1 to 4 carbon atoms is particularly preferred. The alkoxy group having a carboxyl group, a sulfo group or a phosphonoxy group as a substituent may have at least one of a carboxyl group, a sulfo group or a phosphonoxy group, and the carboxyl group, the sulfo group and the phosphonoxy group have the same definition as the carboxyl group, the sulfo group and the phosphonoxy group represented by W in the formula (III), and their preferable ranges are also the same. The alkoxy group having a carboxyl group, a sulfo group or a phosphonoxy group as a substituent may be substituted with other substituents in addition thereto, and for the substituent, any one of substituents exemplified as the following group D of substituents can be suitably used. An alkylamino group having a carboxyl group, a sulfo group or a phosphonoxy group as a substituent represented by $W_1$ and $W_2$ may be a linear or branched chain, and the alkylamino group having 1 to 20 carbon atoms is preferred, the alkylamino group having 1 to 8 carbon atoms is more preferred, and the alkylamino group having 1 to 4 carbon atoms is particularly preferred. The alkylamino group having a carboxyl group, a sulfo group or a phosphonoxy group as a substituent may have at least one of a carboxyl group, a sulfo group or a phosphonoxy group, and the carboxyl group, the sulfo group and the phosphonoxy group have the same definition as the carboxyl group, the sulfo group and the phosphonoxy group represented by W in the formula (III), and their preferable ranges are also the same. The alkylamino group having a carboxyl group, a sulfo group or a phosphonoxy group as a substituent may be substituted with other substituents in addition thereto, and for the substituent, any one of substituents exemplified as the following group D of substituents can be suitably used.

$W_1$ and $W_2$ are particularly preferably a hydrogen atom or —$(CH_2)_nSO_3M$ (wherein n represents 0 or 1), respectively. M represents a cation, but in the case where the charge within the molecule becomes 0, M may not exist. Examples of the cation represented by M, a protonium ion, an alkali metal ion (a lithium ion, a sodium ion, a potassium ion, and the like), an alkaline-earth metal ion (a barium ion, a calcium ion, and the like), an ammonium ion and the like, can be preferably used. Among these, a protonium ion, a lithium ion, a sodium ion, a potassium ion and an ammonium ion are particularly preferred.

Next, the formula (III)-b will be described.

$R_6$ has the same definition as R° in the formula (III), and their preferable ranges are also the same. $L_2$ preferably represents a linking group having total of 0 to 40 carbon atoms selected from a group consisting of an alkylene group having 1 to 12 carbon atoms, an aromatic group having 6 to 12 carbon atoms, —CO—, —NR—, —O—, —S—, —SO—, —$SO_2$—, or a combination thereof, and particularly preferably a linking group having total of 0 to 20 carbon atoms selected from a group consisting of an alkylene group having 1 to 8 carbon atoms, a phenyl group, —CO—, —NR—, —O—, —S—, —$SO_2$—, or a combination thereof. An $Ar_1$ preferably represents an aromatic hydrocarbon ring having 6 to 12 carbon atoms, and particularly preferably a benzene ring or a naphthalene ring. A carboxyl group (—COOH) or a salt thereof, a sulfo group (—$SO_3H$) or a salt thereof, a phosphonoxy group {—OP(=O)(OH)$_2$} or a salt thereof, or an alkyl group, an alkoxy group or an alkylamino group having a carboxyl group, a sulfo group or a phosphonoxy group as a substituent, represented by $W_3$, has the same definition as a carboxyl group (—COOH) or a salt thereof, a sulfo group (—SO$_3$H) or a salt thereof, phosphonoxy {—OP(=O)(OH)$_2$} or a salt thereof, or an alkyl group, an alkoxy group or an alkylamino group having a carboxyl group, a sulfo group or a phosphonoxy group as a substituent, represented by W$_1$ and W$_2$ in the formula (III)-a, and their preferable ranges are also the same.

W$_3$ preferably represents a carboxyl group (—COOH) or a salt thereof, a sulfo group (—SO$_3$H) or a salt thereof, or an alkylamino group having a carboxyl group (—COOH) or a salt thereof, or a sulfo group (—SO$_3$H) or a salt thereof as a substituent, and particularly preferably SO$_3$M or CO$_2$M. M is a cation, but in the case where the charge within the molecule becomes 0, M may not exist. As the cation represented by M, a protonium ion, an alkali metal ion (a lithium ion, a sodium ion, a potassium ion, and the like), an alkaline-earth metal ion (a barium ion, a calcium ion, and the like), an ammonium ion and the like, can be preferably used. Among these, a protonium ion, a lithium ion, a sodium ion, a potassium ion, and an ammonium ion are particularly preferred.

In the specification, examples of the group D of substituents include an alkyl group (an alkyl group having preferably 1 to 20 carbon atoms, more preferably 1 to 12 carbon atoms, and particularly preferably 1 to 8 carbon atoms, such as a methyl group, an ethyl group, an isopropyl group, a tert-butyl group, an n-octyl group, an n-decyl group, an n-hexadecyl group, a cyclopropyl group, a cyclopentyl group, a cyclohexyl group, and the like); an alkenyl group (an alkenyl group having preferably 2 to 20 carbon atoms, more preferably 2 to 12 carbon atoms, and particularly preferably 2 to 8 carbon atoms, such as a vinyl group, an aryl group, a 2-butenyl group, a 3-pentenyl group, and the like); an alkynyl group (an alkynyl group having preferably 2 to 20 carbon atoms, more preferably 2 to 12 carbon atoms, and particularly preferably 2 to 8 carbon atoms, such as a propargyl group, a 3-pentynyl group, and the like); an aryl group (an aryl group having preferably 6 to 30 carbon atoms, more preferably 6 to 20 carbon atoms, and particularly preferably 6 to 12 carbon atoms, such as a phenyl group, a p-methylphenyl group, a naphthyl group, and the like); a substituted or unsubstituted amino group (an amino group having preferably 0 to 20 carbon atoms, more preferably 0 to 10 carbon atoms, and particularly preferably 0 to 6 carbon atoms, such as an unsubstituted amino group, a methylamino group, a dimethylamino group, a diethylamino group, a dibenzylamino group, and the like);

an alkoxy group (an alkoxy group having preferably 1 to 20 carbon atoms, more preferably 1 to 12 carbon atoms, and particularly preferably 1 to 8 carbon atoms, such as a methoxy group, an ethoxy group, a butoxy group, and the like); an aryloxy group (an aryloxy group having preferably 6 to 20 carbon atoms, more preferably 6 to 16 carbon atoms, and particularly preferably 6 to 12 carbon atoms, such as a phenyloxy group, a 2-naphthyloxy group, and the like); an acyl group (an acyl group having 1 to 20 carbon atoms, more preferably 1 to 16 carbon atoms, and particularly preferably 1 to 12 carbon atoms, such as an acetyl group, a benzoyl group, a formyl group, a pivaloyl group, and the like); an alkoxycarbonyl group (an alkoxycarbonyl group having preferably 2 to 20 carbon atoms, more preferably 2 to 16 carbon atoms, and particularly preferably 2 to 12 carbon atoms, such as a methoxycarbonyl group, an ethoxycarbonyl group, and the like); an aryloxycarbonyl group (an aryloxycarbonyl group having preferably 7 to 20 carbon atoms, more preferably 7 to 16 carbon atoms, and particularly preferably 7 to 10 carbon atoms, such as phenyloxycarbonyl group, and the like); an acyloxy group (an acyloxy group having preferably 2 to 20 carbon atoms, more preferably 2 to 16 carbon atoms, and particularly preferably 2 to 10 carbon atoms, such as an acetoxy group, a benzoyloxy group, and the like);

an acylamino group (an acylamino group having preferably 2 to 20 carbon atoms, more preferably 2 to 16 carbon atoms, and particularly preferably 2 to 10 carbon atoms, such as an acetylamino group, a benzoylamino group, and the like); an alkoxycarbonylamino group (an alkoxycarbonylamino group having preferably 2 to 20 carbon atoms, more preferably 2 to 16 carbon atoms, and particularly preferably 2 to 12 carbon atoms, such as methoxycarbonylamino group, and the like); an aryloxycarbonylamino group (an aryloxycarbonylamino group having preferably 7 to 20 carbon atoms, more preferably 7 to 16 carbon atoms, and particularly preferably 7 to 12 carbon atoms, such as phenyloxycarbonylamino group, and the like); a sulfonylamino group (a sulfonylamino group having preferably 1 to 20 carbon atoms, more preferably 1 to 16 carbon atoms, and particularly preferably 1 to 12 carbon atoms, such as a methanesulfonylamino group, a benzenesulfonylamino group, and the like); a sulfamoyl group (a sulfamoyl group having preferably 0 to 20 carbon atoms, more preferably 0 to 16 carbon atoms, and particularly preferably 0 to 12 carbon atoms, such as a sulfamoyl group, a methylsulfamoyl group, a dimethylsulfamoyl group, a phenylsulfamoyl group, and the like); a carbamoyl group (a carbamoyl group having preferably 1 to 20 carbon atoms, more preferably 1 to 16 carbon atoms, and particularly preferably 1 to 12 carbon atoms, such as an unsubstituted carbamoyl group, a methylcarbamoyl group, a diethylcarbamoyl group, a phenylcarbamoyl group, and the like);

an alkylthio group (an alkylthio group having preferably 1 to 20 carbon atoms, more preferably 1 to 16 carbon atoms, and particularly preferably 1 to 12 carbon atoms, such as a methylthio group, an ethylthio group, and the like); an arylthio group (an arylthio group having preferably 6 to 20 carbon atoms, more preferably 6 to 16 carbon atoms, and particularly preferably 6 to 12 carbon atoms, such as a phenylthio group, and the like); a sulfonyl group (a sulfonyl group having preferably 1 to 20 carbon atoms, more preferably 1 to 16 carbon atoms, and particularly preferably 1 to 12 carbon atoms, such as a mesyl group, a tosyl group, and the like); a sulfinyl group (a sulfinyl group having preferably 1 to 20 carbon atoms, more preferably 1 to 16 carbon atoms, and particularly preferably 1 to 12 carbon atoms, such as a methanesulfinyl group, a benzenesulfinyl group, and the like); a ureido group (a ureido group having preferably 1 to 20 carbon atoms, more preferably 1 to 16 carbon atoms, and particularly preferably 1 to 12 carbon atoms, such as an unsubstituted ureido group, a methylureido group, a phenylureido group, and the like); a phosphoric amido group (a phosphoric amido group having preferably 1 to 20 carbon atoms, more preferably 1 to 16 carbon atoms, and particularly preferably 1 to 12 carbon atoms, such as a diethylphosphoric amido group, a phenylphosphoric amido group, and the like); a hydroxyl group; a mercapto group; a halogen atom (for example, a fluorine atom, a chlorine atom, a bromine atom and an iodine atom); a cyano group; a sulfo group; a carboxyl group; a nitro group; a hydroxamic acid group; a sulfino group; a hydrazino group; an imino group; a heterocyclic group (a heterocyclic group having preferably 1 to 30 carbon atoms, and more preferably 1 to 12 carbon atoms, such as heterocyclic group containing heteroatoms such as a nitrogen atom, an oxygen atom, a sulfur atom, for example, an imidazolyl group, a pyridyl group, a quinolyl group, a furyl group, a piperidine group, a morpholino group, a benzoxazolyl group, a benzimidazolyl group, a benzthiazolyl group, and the like); a silyl group (a silyl group having preferably 3 to 40 carbon atoms, more preferably 3 to 30 carbon atoms, and particularly preferably 3 to 24 carbon atoms, such as a trimethylsilyl group, a triphenylsilyl group, and the like). These substituents may be further substituted with these substituents. In addition, when two or more substituents exist, they may be the same as or different from each other. Further, they may be bonded to each other to form a ring, if possible.

Furthermore, for the fluorine-containing compound of the present invention, it is preferable to contain a polymerizable group as a substituent for fixing the alignment state of the discotic liquid crystalline compound.

Specific examples of the fluorine-containing compound represented by the formula (III) that can be used in the present invention include the compounds described in Paragraph Nos. [0136] to [0140] of JP-A-2006-113500, and the like, but the present invention is not limited to these specific examples in any way.

A preferable range of the content of the fluorine-containing compound in the composition varies depending on its use, but in the case of being used for forming an optically anisotropic layer, it is preferably 0.005 to 8% by mass, more preferably 0.01 to 5% by mass, and even more preferably 0.05 to 3% by mass in the composition (liquid crystalline composition without a solvent in the case of producing it as a coating liquid).

[Polymerizable Initiator]

The vertically aligned liquid crystalline compound is fixed while maintaining the alignment state. Fixation is preferably carried out by a polymerizing reaction of a polymerizable group (P) which is introduced to the liquid crystalline compound. Examples of the polymerization reaction include a thermopolymerization reaction using a thermopolymerization initiator and a photopolymerization reaction using a photopolymerization initiator. A photopolymerization reaction is preferred. Examples of the photopolymerization initiator include α-carbonyl compounds (described in each of U.S. Pat. Nos. 2,367,661 and 2,367,670), acyloin ethers (described in U.S. Pat. No. 2,448,828), α-hydrocarbon substituted aromatic acyloin compounds (described in U.S. Pat. No. 2,722,512), polynuclear quinone compounds (described in each of U.S. Pat. Nos. 3,046,127 and 2,951,758), a combination of triarylimidazole dimer and p-aminophenyl ketone (described in U.S. Pat. No. 3,549,367), acridine and phenazine compounds (described in each of JP-A-60-105667 and U.S. Pat. No. 4,239,850), and oxadiazole compounds (described in U.S. Pat. No. 4,212,970).

The amount of the photopolymerization initiator to be used is preferably 0.01 to 20% by mass, and more preferably 0.5 to 5% by mass of the solid content in a coating liquid. For the light irradiation for polymerization of a discotic liquid crystalline compound, ultraviolet rays are preferably used. The irradiation energy is preferably 20 mJ/cm$^2$ to 50 mJ/cm$^2$, and more preferably 100 mJ/cm$^2$ to 800 mJ/cm$^2$. In order to promote the polymerization reaction, light irradiation may be carried out under a heating condition. The thickness of the retardation layer is preferably 0.1 to 10 μm, more preferably 0.5 to 5 μm, and most preferably 1 to 5 μm.

[Other Additives in Optically Anisotropic Layer]

In addition to the liquid crystalline compound, a plasticizer, a surfactant, polymerizable monomers, or the like can be used in combination to improve the uniformity of a coating film, the film strength, alignment characteristics of a liquid crystalline compound, and the like. With these materials, one having compatibility with a liquid crystalline compound and one not hindering the alignment is preferred.

For the polymerizable monomer, a radical polymerizable or cationic polymerizable compound may be mentioned. Preferably, a multifunctional radical polymerizable monomer which is copolymerizable with the liquid crystalline compound having a polymerizable group is preferred. Examples thereof include one described in the Paragraph Nos. [0018] to [0020] of JP-A-2002-296423. The content of the compound with respect to the discotic liquid crystalline compound is preferably 1 to 50% by mass, and more preferably 5 to 30% by mass.

For the surfactant, a conventional compound may be mentioned, but particularly a fluorine-containing compound is preferred. Specific examples thereof include the compounds as described in the Paragraph Nos. [0028] to [0056] of JP-A-2001-330725 and a compound as described in the Paragraph Nos. [0069] to [0126] of JP-A-2003-295212.

A polymer that is used with a liquid crystalline compound is preferably one which can increase the viscosity of a coating liquid. For the polymer, a cellulose ester may be mentioned. Preferred examples of the cellulose ester include one as described in the Paragraph No. [0178] of JP-A-2000-155216. To prevent hindering of the alignment of a liquid crystalline compound, the content of the polymer with respect to the liquid crystalline compound is preferably in the range of 0.1 to 10% by mass, and more preferably in the range of 0.1 to 8% by mass.

The transition temperature of the discotic nematic liquid crystal phase-solid phase of the liquid crystalline compound is preferably 70 to 300° C., and more preferably 70 to 170° C.

[Coating Solvent]

As a solvent that is used to produce a coating liquid, an organic solvent is preferably used. Examples of the organic solvent include amides (for example, N,N-dimethylformamide), sulfoxides (for example, dimethylsulfoxide), heterocyclic compounds (for example, pyridine), hydrocarbons (for example, benzene and hexane), alkyl halides (for example, chloroform and dichloromethane), esters (for example, methyl acetate and butyl acetate), ketones (for example, acetone and methyl ethyl ketone), ethers (for example, tetrahydrofuran and 1,2-dimethoxyethane). Alkyl halides and ketones are preferred. Two or more organic solvents may be used in combination.

[Coating Method]

Coating of a coating liquid can be carried out by a known method (for example, an extrusion coating method, a direct gravure coating method, a reverse gravure coating method, and a dye coating method). Among these, when forming the optically anisotropic layer, a wire bar coating method is preferably used to carry out the coating, and the rotation speed of the wire bar preferably satisfies the following formula.

$$0.6 < (W \times (R+2r) \times \pi)/V < 1.4$$

[W: Rotation speed (rpm) of wire bar, R: Core diameter (m) of the bar, r: Diameter (m) of the bar, V: Conveying speed (m/min) of support]

(W×(R+2r)×π)/V is preferably in the range of 0.7 to 1.3, and more preferably in the range of 0.8 to 1.2.

When forming the optically anisotropic layer, a die coating method is preferably used, and a coating method using a slide coater or a slot die coater is particularly preferred.

[Alignment Film]

In the present invention, it is preferable that the liquid crystalline compound is coated on the surface of an alignment film, thereby aligning the molecules of the liquid crystalline compound. The alignment film is preferably used for carrying out a preferred embodiment of the present invention due to having a function of regulating the alignment direction of the discotic liquid crystalline compound. However, since the alignment film completes its role once the alignment state is fixed after aligning the liquid crystalline compound, it is not an essential matter as a constitutional element of the present invention. That is, it is possible to produce a polarizing plate by transferring only the optically anisotropic layer of the alignment film where the alignment is fixed onto a polarizer.

An alignment film can be formed by means of, for example, the rubbing treatment of an organic compound (preferably a polymer), the oblique evaporation of an inorganic compound, formation of a layer having microgrooves, or accumulation of organic compounds (for example, (ω-tricosanic acid, diocta-decylmethylammonium chloride, and methyl stearate) by a Langmuir-Blodgett method (LB film). Further, an alignment film that exhibits an alignment function by a given electric field, a given magnetic field or light irradiation, is also known. An alignment film formed by the rubbing treatment of a polymer is preferred.

Examples of the polymer include methacrylate copolymers disclosed in the Paragraph No. [0022] of JP-A-8-338913, styrene copolymers, polyolefins, polyvinyl alcohols and modified polyvinyl alcohols, poly(N-methylolacrylamides), polyesters, polyimides, vinyl acetate copolymers, carboxym-ethylcellulose, polycarbonates and the like. A silane coupling agent can be used as a polymer. Water-soluble monomers (for example, poly(N-methylolacrylamides), carboxymethylcel-lulose, gelatin, polyvinyl alcohols and modified polyvinyl alcohols) are preferred, gelatin, polyvinyl alcohols and modified polyvinyl alcohols are more preferred, and polyvinyl alcohols and modified polyvinyl alcohols are most preferred.

The saponification degree of a polyvinyl alcohol is preferably 70 to 100%, and more preferably 80 to 100%. The polymerization degree of a polyvinyl alcohol is preferably 100 to 5000.

In the alignment film of the present invention, it is preferable to bond the side chain having a crosslinkable functional group (for example, a double bond) to the main chain or to introduce a crosslinkable functional group having a function of aligning the liquid crystalline compound to the side chain. For the polymer used in the alignment film, a polymer which is capable of crosslinking by itself or which is crosslinked by use of a crosslinking agent can be used, and a plurality of combinations thereof can be used.

When the side chain having a crosslinkable functional group is bonded to the main chain of the polymer for an alignment film, or when a crosslinkable functional group is introduced to the side chain having a function of aligning the liquid crystalline compound, the polymer for an alignment film can be copolymerized with a multifunctional monomer contained in the optically anisotropic layer. As a result, a strong bond may be formed by copolymerization between not only a multifunctional monomer and a multifunctional monomer, but also between a polymer for the alignment film and a polymer for the alignment film, and also between a multifunctional monomer and a polymer for the alignment film. Therefore, the strength of an optical compensation sheet can be improved significantly by introducing a crosslinkable functional group to the polymer for an alignment film.

It is preferable for the crosslinkable functional group of a polymer for an alignment film to contain a polymerizable group in the same manner as the multifunctional monomer. Specific examples thereof include one as described in the Paragraph Nos. [0080] to [0100] of JP-A-2000-155216, and the like.

The polymer for an alignment film can be crosslinked using a crosslinking agent apart from the crosslinkable functional group. Examples of the crosslinking agent include aldehydes, N-methylol compounds, dioxane derivatives, compounds produced by activating a carboxyl group, an activated vinyl compound, an activated halogen compound, isooxazole and dialdehyde starch. Two or more crosslinking agents may be used in combination. Specific examples thereof include the compounds or the like described in the Paragraph Nos. [0023] to of JP-A-2002-62426. Aldehydes with high reaction activity are preferred, and glutaraldehyde is particularly preferred.

The content of the crosslinking agent with respect to a polymer is preferably 0.1 to 20% by mass, and more preferably 0.5 to 15% by mass. The amount of remaining unreacted crosslinking agent in the alignment film is preferably 1.0% by mass or less, and more preferably 0.5% by mass or less. Once controlled as such, sufficient durability without generating reticulation can be obtained even when the alignment film is used for a long time in the liquid crystal display or when the alignment film is left to stand under a high temperature/high humidity atmosphere for a long time.

An alignment film can be basically formed by coating a solution containing the polymer, which is an alignment film forming material, a crosslinking agent and an additive onto a transparent support, and then heat drying (crosslinking) and subjecting to the rubbing treatment. The crosslinking reaction may be performed at an arbitrary time after coating a solution onto a transparent support as mentioned above. When a water-soluble polymer such as polyvinyl alcohol is used as an alignment film forming material, it is preferable to use a coating liquid in a mixed solvent of water and an organic solvent (for example, methanol) having a defoaming action.

Their proportion in the mass ratio of water:methanol is preferably 0:100 to 99:1, and more preferably 0:100 to 91:9. In this regard, foam generation is inhibited so that defects in the alignment film and the surface of the optically anisotropic layer are significantly reduced.

A coating method used for forming an alignment film is preferably a spin coating method, a dip coating method, a curtain coating method, an extrusion coating method, a rod coating method, or a roll coating method, and particularly preferably a rod coating method. Further, the film thickness after drying is preferably 0.1 to 10 µm. Heat drying can be carried out at 20° C. to 110° C. In order to conduct sufficient crosslinking, the heat drying is carried out preferably at 60° C. to 100° C., and particularly preferably at 80° C. to 100° C. The drying time can be 1 minute to 36 hours, and preferably 1 minute to 30 minutes.

The pH is set preferably at a value which is optimal for the crosslinking agent used, and in the case of using a glutaraldehyde, the pH is set preferably at 4.5 to 5.5.

The alignment film is preferably provided on a transparent support. The alignment film can be obtained by crosslinking the polymer layer as mentioned above, and then subjecting the surface to the rubbing treatment.

For such a rubbing treatment, a treatment method which is widely applied as a process for treating the alignment for liquid crystal of LCD, can be applied. That is, a method of achieving the alignment by rubbing the surface of the alignment film using paper or gauze, felt, rubber, nylon, polyester fibers, or the like, can be used. In general, the method is carried out by performing rubbing a number of times using a cloth which has averagely transplanted fibers having a uniform length and thickness, or the like.

The liquid crystalline composition is coated on the surface of the rubbing-treated alignment film and the molecules of the discotic liquid crystalline compound are aligned. Thereafter, if necessary, the polymer for an alignment film is reacted with a multifunctional monomer contained in an optically anisotropic layer, or the polymer for an alignment film is crosslinked using a crosslinking agent, thereby forming the optically anisotropic layer.

The thickness of the alignment film is preferably in the range of 0.1 to 10 μm.

[Transparent Support (Polymer Film)]

The in-plane retardation (Re) of the transparent support (polymer film) that supports the optically anisotropic layer is preferably 0 to 50 nm, more preferably 0 to 30 nm, and most preferably 0 to 10 nm. Further, the thickness-direction retardation (Rth) of the support is preferably −300 nm to 300 nm, more preferably −100 nm to 200 nm, and most preferably −60 nm to 60 nm. The optical anisotropy of the support is preferably selected by combination with the optically anisotropic layer provided thereon, and the combination allows the Nz value of the λ/4 plate to be controlled.

Examples of the polymer include polyolefins such as a cellulose acylate film (for example, a cellulose triacetate film (refractive index 1.48), a cellulose diacetate film, a cellulose acetate butyrate film, and a cellulose acetate propionate film), polyethylene, polypropylene, and the like, polyester-based resin films such as polyethylene terephthalate, polyethylene naphthalate, and the like, polyacrylic resin films such as a polyethersulfone film, polymethylmethacrylate, and the like, polyurethane-based resin films, polyester films, polycarbonate films, polysulfone films, polyether films, polymethylpentene films, polyether ketone films, (meth)acrylnitrile films, polyolefins, polymers having aliphatic structures (norbornene-based resins (ARTON: trade name, manufactured by JSR Corp., amorphous polyolefins (ZEONEX: trade name, manufactured by Zeon Corp. in Japan)), and the like. Among these, polymers having triacetylcellulose, polyethylene terephthalate, and aliphatic structures are preferred, and triacetylcellulose is particularly preferred.

The polymer film is preferably formed by a solvent casting method. As a solvent casting method, a solution lamination-casting method such as a co-solvent casting method, a successive-casting method, a coating method, and the like may be used. Using a co-casting method or a successive-casting method for preparation, a cellulose acylate solution (dope) for each layer is produced. The co-casting method (simultaneous multilayered casting) is a casting method in which each dope for each layer of each layer (which may be three or more layers) is extruded simultaneously from each slit on a casting-support (a band or a drum) by using a geeser for casting, then peeled off from the support at an appropriate time, and then dried to form a film.

The successive-casting method is a casting method, in which at first, a dope of the first layer is extruded from a delivery valve for casting to be casting on a support; and, after being dried or not being dried, and then a dope for the second layer is extruded from the delivery valve for casting to be casting on the first layer, and if necessary, the dopes of the third layer or higher are successively cast and stacked in this manner, then removed from the support at the appropriate time, and dried to form a film.

The coating method is generally a method in which a film in a core layer is formed into a film according to a solution film-forming method, then a coating liquid to be applied to the surface layer is produced, and the coating liquid is coated onto one side or both sides using an appropriate coating apparatus, and dried to form a layered film.

The thickness of a transparent support to be used is usually about 25 μm to 1000 μm, preferably 25 μm to 250 μm, and more preferably 30 μm to 90 μm. In order to improve the adhesiveness between the transparent support and a layer provided thereon (an adhesive layer, a vertical alignment film or a retardation layer), the surface treatment (for example, a glow discharge treatment, a corona discharge treatment, an ultraviolet (UV) radiation treatment, a flame treatment) may be carried out on the transparent support.

On the transparent support, an adhesive layer (undercoat layer) may be provided. In addition, in order to give slidability in the conveying process or to prevent adhesion of the surface with the reverse surface after rolling, it is preferable to use a transparent support or a long transparent support which is formed by coating one side of the support or co-casting with the support of a polymer layer, in which the inorganic particles having an average particle diameter of 10 to 100 nm are mixed at a mass ratio of the solid content of 5% to 40%.

Further, the λ/4 plate having a layer product structure in which an optically anisotropic layer is formed on a support described above, but the present invention is not limited to this embodiment. As described above, the λ/4 plate may include a stretched polymer film (optically anisotropic support) alone or may include a liquid crystal film formed from a composition containing a liquid crystalline compound alone. Preferred examples of the liquid crystal film are also the same as those of the optically anisotropic layer above.

It is preferable that the λ/4 plate be continuously longitudinal. It is also preferable that the slow axis of the optically anisotropic layer be neither parallel nor perpendicular to the longitudinal direction. That is, the angle formed by the slow axis of at least one layer of the optically anisotropic layer included in the λ/4 plate and the long side of the λ/4 plate is preferably 5 to 85°.

In the case where the optically anisotropic layer is formed from the liquid crystalline compound, the angle of the slow axis of the optically anisotropic layer can be controlled by the angle of rubbing. In the case where the λ/4 plate is formed from a stretch-treated polymer film (optically anisotropic support), the angle of the slow axis can be controlled by the stretch direction. By having an angle of the slow axis of the optically anisotropic layer which is in neither parallel or perpendicular to the longitudinal direction of the long film, it is possible to adhere with a long polarizer by roll-to-roll, which makes it possible to produce an elliptic polarizing plate with high precision of the axis angle and with high productivity.

[Hard Coat Layer and Anti-Reflection Layer]

In the display-side polarizing plate protecting region, as shown in FIG. 3, a singular or a plurality of functional layers may be provided on a surface film according to the purpose. Examples of the preferred embodiment include an embodiment in which a hard coat layer is stacked on an optically anisotropic layer, an embodiment in which an anti-reflection layer is stacked on an optically anisotropic layer, an embodiment in which a hard coat layer is stacked on an optically anisotropic layer, and an anti-reflection layer is stacked thereon, and the like. The anti-reflection layer is a layer including at least one layer, which is designed in consideration of a refractive index, a film thickness, the number of layers, the order of the layers, and the like so as to reduce the reflection rate by optical interference.

The simplest constitution of the anti-reflection layer is a constitution in which a low refractive index layer is provided on the outermost surface of the film. In order to further reduce the reflectivity, a constitution in which a high refractive index layer having a refractive index and a low refractive index layer having a low refractive index are combined to constitute an anti-reflection layer is preferred. Constitution examples include a bilayer constitution with a high refractive index layer/a low refractive index layer, stacked sequentially on the substrate, a constitution with three layers different refractive indices, that is, a constitution in which a medium refractive index layer (a layer having a refractive index that is higher than that of the lower layer and lower than that of the high refractive index layer)/a high refractive index layer/a low refractive index layer are stacked in this order, and the like, and it is also proposed that more anti-reflection layers be stacked. Among these, in view of durability, optical properties, cost, productivity, or the like, a constitution with a medium refractive index layer/a high refractive index layer/a low refractive index layer, stacked in this order, is preferred, and examples thereof include the constitution described in JP-A-8-122504, JP-A-8-110401, JP-A-10-300902, JP-A-2002-243906, JP-A-2000-111706, or the like. Further, an anti-reflection film having a trilayer constitution, which is excellent in terms of a robust property preventing film thickness variance is described in JP-A-2008-262187. For the anti-reflection film having the trilayer constitution, in the case where it is provided on the surface of an image display device, the average value of the reflectivities can be set to 0.5% or less, reflection can be decreased apparently, and an image having apparent stereoscopicity can be obtained. In addition, other functions may be provided for each layer, and examples of such layers include an anti-fouling low refractive index layer, an antistatic high refractive index layer, an antistatic hard coat layer, and an anti-glare coat layer (for example, JP-A-10-206603, JP-A-2002-243906, JP-A-2007-264113, and the like).

In the case of having a hard coat layer or an anti-reflection layer, examples of specific layer constitution are shown below. In the following description, -*/represents a base material on which a functional layer is stacked. Specifically, -*/represents the optically anisotropic support, the optically anisotropic layer, the support, and the like, as described above.
 -*/hard coat layer,
 -*/low refractive index layer,
 -*/anti-glare layer/low refractive index layer
 -*/hard coat layer/low refractive index layer,
 -*/hard coat layer/anti-glare layer/low refractive index layer
 -*/hard coat layer/high refractive index layer/low refractive index layer
 -*/hard coat layer/medium refractive index layer/high refractive index layer/low refractive index layer
 -*/hard coat layer/anti-glare layer/high refractive index layer/low refractive index layer
 -*/hard coat layer/anti-glare layer/medium refractive index layer/high refractive index layer/low refractive index layer
 -*/anti-glare layer/high refractive index layer/low refractive index layer
 -*/anti-glare layer/medium refractive index layer/high refractive index layer/low refractive index layer Among the respective constitutions, it is preferable that functional layers of a hard coat layer, an anti-glare layer, an anti-reflection layer, and the like are formed on an optically anisotropic layer. Further, in addition to an optical film including the optically anisotropic layer, an optical film having layers of a hard coat layer, an anti-glare layer, an anti-reflection layer, and the like provided may be adhered and stacked on a support for preparation.

(Hard Coat Layer)

A hard coat layer may be formed on a surface film which is formed in a display-side polarizing plate protection region of the stereoscopic image recognition apparatus of the present invention in order to provide the film with physical strength. In the present invention, the hard coat layer may not be formed, but it is preferable to form a hard coat layer in terms of enhancement of scratch resistance in a pencil scratch test or the like.

Preferably, a low refractive index layer is provided on the hard coat layer, and more preferably, a medium refractive index layer and a high refractive index layer are provided between the hard coat layer and the low refractive index layer to constitute the anti-reflection film.

The hard coat layer may be constituted with lamination of two or more layers.

In the present invention, the refractive index of the hard coat layer is preferably in the range of 1.48 to 2.00, and more preferably 1.48 to 1.70 in terms of optical design to obtain an anti-reflection surface film.

The film thickness of the hard coat layer is usually about 0.5 µm to 50 µm, preferably 1 µm to 20 µm, and more preferably 5 µm to 20 µm from the viewpoints of providing the surface film with sufficient durability and impact resistance.

The strength of the hard coat layer is preferably H or higher, more preferably 2H or higher, and even more preferably 3H or higher in a pencil hardness test. Little abrasion of a test piece after a taber test in accordance with JIS K5400 is preferred.

The hard coat layer is preferably formed by a crosslinking reaction or a polymerization reaction of an ionizing radiation curable compound. The hard coat layer can be formed, for example, by coating a coating composition including ionizing radiation curable polyfunctional monomers or polyfunctional oligomers onto a transparent support, and subjecting the polyfunctional monomers or the polyfunctional oligomers to a crosslinking reaction or a polymerization reaction. The functional group of the ionizing radiation curable polyfunctional monomer or the polyfunctional oligomers is preferably light, electron beam or radiation polymerizable, and among these, a photopolymerizable functional group is preferred. Examples of the photopolymerizable functional group include the compounds having a polymerizable functional group such as a (meth)acryloyl group, a vinyl group, a styryl group, an allyl, and the like, and among these, a (meth)acryloyl group and $-C(O)OCH=CH_2$ are preferred.

Specific examples of the ionizing radiation curable compound include (meth)acrylic diesters of alkylene glycol, (meth)acrylic diesters of polyoxyalkylene glycol, (meth)acrylic diesters of polyhydric alcohol, (meth)acrylic diesters of ethylene oxide or propylene oxide adducts, epoxy (meth)acrylates, urethane (meth)acrylates, polyester (meth)acrylates, and the like.

As a polyfunctional acrylate-based compound having a (meth)acryloyl group, commercially available ones can be used, and examples thereof include NK ester A-TMMT manufactured by Shin-Nakamura Chemical Co., Ltd., KAYARAD DPHA manufactured by Nippon Kayaku Co., Ltd., and the like. The polyfunctional monomers are described in Paragraph Nos. [0114] to [0122] of JP-A-2009-98658, and shall apply to the present invention.

The ionizing radiation curable compound is a compound having a hydrogen-bonding substituent in view of adhesion with a support and a low curling property. The hydrogen-bonding substituent refers to a substituent in which an atom having high electronegativity such as nitrogen, oxygen, sulfur, halogen, and the like is covalently bonded with a hydrogen bond, and specific examples thereof include OH—, SH—, —NH—, CHO—, CHN—, and the like. Among these, urethane (meth)acrylates and (meth)acrylates having hydroxyl groups are preferred. A commercially available compound can be used, and examples thereof include NK oligo U4HA and NK ester A-TMM-3, both manufactured by Shin-Nakamura Chemical Co., Ltd., KAYARAD PET-30 manufactured by Nippon Kayaku Co., Ltd., and the like.

The hard coat layer may contain matte particles having an average particle diameter of 1.0 to 10.0 μm, and preferably 1.5 to 7.0 μm, for example, particles of inorganic compounds or resin particles, for the purpose of providing an internal scattering property.

Various refractive index monomers or inorganic particles, or both of them may be added to the binder for the hard coat layer for the purpose of controlling the refractive index of the hard coat layer. The inorganic particles have, in addition to an effect of controlling the refractive index, an effect of inhibiting curing shrinkage due to a crosslinking reaction. In the present invention, even after formation of the hard coat layer, a polymer generated by the polymerization of the polyfunctional monomers and/or the high refractive index monomers, and the like as described above, and inorganic particles dispersed therein is referred to as a binder.

(Anti-Glare Layer)

The anti-glare layer is formed for the purpose of providing the film with a hard coating property for improving the anti-glare property due to surface scattering, and preferably the hardness and the scratch resistance of the surface film.

The anti-glare layer is described in Paragraphs No. [0178] to [0189] of JP-A-2009-98658, and this shall apply to the present invention.

[High Refractive Index Layer and Medium Refractive Index Layer]

The refractive index of the high refractive index layer is preferably 1.70 to 1.74, and more preferably 1.71 to 1.73. The refractive index of the medium refractive index layer is adjusted so as to be between the refractive index of the low refractive index layer and the refractive index of the high refractive index layer. The refractive index of the medium refractive index layer is preferably 1.60 to 1.64, and more preferably 1.61 to 1.63.

As for a method for forming the high refractive index layer or the medium refractive index layer, although a transparent thin film of inorganic oxide formed by a chemical vapor deposition (CVD) method or a physical vapor deposition (PVD) method, particularly, a vacuum deposition method or a sputtering method, which is a kind of the physical vapor deposition method, may be used, a method using all-wet coating is preferred.

The medium refractive index layer can be produced in the same manner using the same materials as the high refractive index layer, except that the refractive index is different from that of the high refractive index layer, and therefore, the high refractive index layer is particularly described below.

The high refractive index layer is preferably formed by coating a coating composition containing inorganic fine particles, a curable compound containing a trifunctional or higher functional polymerizable group (hereinafter also referred to as a "binder" sometimes), a solvent, and a polymerization initiator, drying the solvent, and then curing the coating by either one or both means of heating and irradiation of ionizing radiation. In the case of using the curable compound and the initiator, the curable compound is cured upon a polymerization reaction by means of heat and/or ionizing radiation after coating, whereby a medium refractive index layer or high refractive index layer having an excellent scratch resistance and adhesion property can be formed.

(Inorganic Fine Particles)

The inorganic fine particles are preferably fine particles of an oxide of metal, and more preferably inorganic fine particles containing an oxide of at least one metal selected from Ti, Zr, In, Zn, Sn, Al, and Sb.

As the inorganic oxide particles, fine particles of titanium oxide are preferred from the viewpoint of a refractive index. Further, it is preferable to use inorganic fine particles having an oxide of at least one metal of Sb, In, and Sn as a main component from the viewpoint of conductivity. The conductive inorganic fine particles are more preferably an oxide of at least one metal selected from a group consisting of indium oxide doped with tin (ITO), tin oxide doped with antimony (ATO), tin doped with fluorine (FTO), tin oxide doped with phosphorus (PTO), antimony zinc (AZO), indium oxide doped with zinc (IZO), zinc oxide, ruthenium oxide, rhenium oxide, silver oxide, nickel oxide, and copper oxide. By varying the amount of the inorganic fine particles, adjustment to a predetermined refractive index can be conducted.

The average particle diameter of the inorganic fine particles in the layer is, in the case where zirconium oxide is used as a main component, preferably 1 to 120 nm, more preferably 1 to 60 nm, and even more preferably 2 to 40 nm. The range is preferred because the haze is inhibited and dispersion stability and adhesion property to the upper layer due to appropriate irregularities on the surface are improved.

The refractive index of the inorganic fine particles having zirconium oxide as a main component is preferably 1.90 to 2.80, more preferably 2.00 to 2.40, and most preferably 2.00 to 2.20.

The amount of the inorganic fine particles added may vary depending on the layer to which the inorganic fine particles are added, and in the medium refractive index layer, the amount added is preferably 20 to 60% by mass, more preferably 25 to 55% by mass, and even more preferably 30 to 50% by mass, based on the solid content of the entire medium refractive index layer. In the high refractive index layer, the amount added is preferably 40 to 90% by mass, more preferably 50 to 85% by mass, and even more preferably 60 to 80% by mass, based on the solid content of the entire high refractive index layer.

The particle diameter of the inorganic fine particles can be measured by a light-scattering method or an electron micrograph. The specific surface area of the inorganic fine particles is preferably 10 to 400 $m^2/g$, more preferably 20 to 200 $m^2/g$, and most preferably 30 to 150 $m^2/g$.

(Curable Compound)

The curable compound is preferably a polymerizable compound and as the polymerizable compound, an ionizing radiation curable polyfunctional monomer or a polyfunctional oligomer is preferably used. The functional group in the compound is preferably a photo-, electron beam-, or radiation-polymerizable functional group, and among these, a photopolymerizable functional group is preferred. Examples of the photopolymerizable functional group include an unsaturated polymerizable functional group such as a (meth)acryloyl group, a vinyl group, a styryl group, an allyl group, and the like, and among these, a (meth)acryloyl group is preferred.

As specific examples the photopolymerizable polyfunctional monomer having a photopolymerizable functional group, the compounds described regarding the ionizing radiation curable compound used for formation of a hard coat layer as described above can be preferably used.

In the high refractive index layer, a surfactant, an antistatic agent, a coupling agent, a thickener, a coloration inhibitor, a coloring agent (a pigment or a dye), a defoaming agent, a leveling agent, a flame retardant, an ultraviolet absorber, an infrared absorber, an adhesion-imparting agent, a polymerization inhibitor, an antioxidant, a surface modifier, a conductive metal fine particle, and the like may be added, in addition to the above-described component (inorganic fine particles, a curable compound, a polymerization initiator, a photosensitizer, or the like).

As described above, the medium refractive index layer can be obtained using the same manner and in the same manner as for the high refractive index layer.

[Low Refractive Index Layer]

The refractive index of the low refractive index layer in the present invention is preferably 1.30 to 1.47. The refractive index of the low refractive index layer in the case of the anti-reflection film of a multi-layer thin film interference type (medium refractive index layer/high refractive index layer/low refractive index layer) is preferably 1.33 to 1.38, and more preferably 1.35 to 1.37.

The range is preferred because the film strength can be maintained while reducing the reflectivity. As for a method of forming the low refractive index layer, although a transparent thin film of inorganic oxide formed by a chemical vapor deposition (CVD) method or a physical vapor deposition (PVD) method, particularly, a vacuum deposition method or a sputtering method, which is a kind of the physical vapor deposition method, may be used, a method of all-wet coating using a composition for forming a low refractive index layer is preferably used.

The low refractive index layer can be formed of a fluorine-containing curable polymer, a fluorine-containing curable monomer, a non-fluorine-containing curable monomer, a low refractive index particle, and the like, as constituent components. As these compounds, those described in Paragraph Nos. [0018] to [0168] of JP-A-2010-152311 can be used.

The haze of the low refractive index layer is preferably 3% or less, more preferably 2% or less, and most preferably 1% or less.

The strength of the anti-reflection film including the low refractive index layer formed is preferably H or more, more preferably 2H or more, and most preferably 3H or more, in a pencil hardness test under a load of 500 g.

In addition, in order to improve the anti-fouling performance of the anti-reflection film, the contact angle to water on its surface is preferably 95° or more, and more preferably 102° or more. In particular, if the contact angle is 105° or more, the anti-fouling performance against fingerprints is improved, which is thus particularly preferred. Further, the contact angle of water is 102° or more, and the surface free energy is more preferably 25 dynes/cm or less, particularly preferably 23 dynes/cm or less, and even more preferably 20 dynes/cm or less. Most preferably, the contact angle of water is 105° or more and the surface free energy is 20 dynes/cm or less.

(Formation of Low Refractive Index Layer)

The low refractive index layer is preferably formed by coating a coating composition having dissolved or dispersed therein a fluorine-containing anti-fouling agent having a polymerizable unsaturated group, a polyfunctional monomer having a polymerizable unsaturated group, inorganic fine particles, and, if desired, a photopolymerization initiator, and other arbitrary components, and simultaneously with the coating or after the coating and drying, curing the coating upon a crosslinking reaction or polymerization reaction by the irradiation of ionizing radiation (for example, irradiation of light, irradiation of an electron beam, and the like) or heating.

(Curing Conditions)

In particular, when the hard coat layer and/or the anti-reflection layer is formed by the crosslinking reaction or polymerization reaction of an ionizing radiation curable compound, the crosslinking reaction or polymerization reaction is preferably conducted under an atmosphere having an oxygen concentration of 10% by volume or less. When the low refractive index layer is formed under an atmosphere having an oxygen concentration of 1% by volume or less, the outermost layer excellent in terms of physical strength and chemical resistance can be obtained.

The oxygen concentration is preferably 1.0% by volume or less, more preferably 0.1% by volume or less, particularly preferably 0.05% by volume or less, and most preferably 0.02% by volume or less.

As a means of reducing the oxygen concentration to 1% by volume or below, replacement of the air (nitrogen concentration: about 79% by volume, oxygen concentration: about 21% by volume) with other gas is preferred, and replacement with nitrogen (purging by nitrogen) is particularly preferred.

(Ultraviolet Absorber)

The hard coat layer and/or anti-reflection layer of the surface film according to the present invention may contain an ultraviolet absorber. As the ultraviolet absorber, any known one which can exhibit an ultraviolet absorbing property can be used. Among the ultraviolet absorbers, a benzotriazole-based or hydroxyphenyltriazine-based ultraviolet absorber is preferred, in order to obtain a high ultraviolet absorbing property and an ultraviolet absorbing ability (ultraviolet cutting property) that is used in an electronic image display device. Furthermore, two or more kinds of ultraviolet absorbers having different maximum absorption wavelengths can be used in combination in order to widen the ultraviolet absorption band.

Examples of the benzotriazole-based ultraviolet absorbers include 2-[2'-hydroxy-5'-(methacryloyloxymethyl)phenyl]-2H-benzotriazole, 2-[2'-hydroxy-5'-(methacryloyloxyethyl)phenyl]-2H-benzotriazole, 2-[2'-hydroxy-5'-(methacryloyloxypropyl)phenyl]-2H-benzotriazole, 2-[2'-hydroxy-5'-(methacryloyloxyhexyl)phenyl]-2H-benzotriazole, 2-[2'-hydroxy-3'-tert-butyl-5'-(methacryloyloxyethyl)phenyl]-2H-benzotriazole, 2-[2'-hydroxy-5'-tert-butyl-3'-(methacryloyloxyethyl)phenyl]-2H-benzotriazole, 2-[2'-hydroxy-5'-(methacryloyloxyethyl)phenyl]-5-chloro-2H-benzotriazole, 2-[2'-hydroxy-5'-(methacryloyloxyethyl)phenyl]-5-methoxy-2H-benzotriazole, 2-[2'-hydroxy-5'-(methacryloyloxyethyl)phenyl]-5-cyano-2H-benzotriazole, 2-[2'-hydroxy-5'-(methacryloyloxyethyl)phenyl]-5-tert-butyl-2H-benzotriazole, 2-[2'-hydroxy-5'-(methacryloyloxyethyl)phenyl]-5-nitro-2H-benzotriazole, 2-(2-hydroxy-5-tert-butylphenyl)-2H-benzotriazole, benzenepropanoic acid-3-(2H-benzotriazol-2-yl)-5-(1,1-dimethylethyl)-4-hydroxy-, C7- to 9-branched or linear alkyl ester, 2-(2H-benzotriazol-2-yl)-4,6-bis(1-methyl-1-phenylethyl)phenol, 2-(2H-benzotriazol-2-yl)-6-(1-methyl-1-phenylethyl)-4-(1,1,3,3-tetramethylbutyl)phenol, and the like.

Examples of the hydroxyphenyltriazine-based ultraviolet absorber include 2-[4-[(2-hydroxy-3-dodecyloxypropyl)oxy]-2-hydroxyphenyl]-4,6-bis(2,4-dimethylphenyl)-1,3,5-triazine, 2-[4-(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxyphenyl)-1,3,5-triazine, 2-(2-hydroxy-4-[1-octyloxycarbonylethoxy]phenyl)-4,6-bis(4-phenylphenyl)-1,3,5-triazine, 2,2',4,4'-tetrahydroxybenzophenone, 2,2'-dihydroxy-4,4'-dimethoxybenzophenone, 2,2'-dihydroxy-4-methoxybenzophenone, 2,4-dihydroxybenzophenone, 2-hydroxy-4-acetoxyethoxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-n-octoxybenzophenone, a 2,2'-dihydroxy-4,4'-dimethoxy-5,5'-disulfobenzophenone disodium salt, and the like.

The content of the ultraviolet absorber depends on a required ultraviolet transmittance or absorptivity of an ultraviolet absorber, but is usually 20 parts by mass or less, and preferably 1 to 20 parts by mass, based on 100 parts by mass of the ultraviolet curable resin. In the case where the content of the ultraviolet absorber being more than 20 parts by mass, there is a tendency that the curability of the curable composition by ultraviolet rays is reduced, and at the same time, there is a concern that the visible light transmittance of the optical film may be reduced, whereas in the case of the content of the ultraviolet absorber being less than 1 part by mass, the ultraviolet absorptivity of the optical film cannot be sufficiently exhibited.

[Polarizing Plate]

The polarizing plate (the polarizing plate of a liquid crystal display I, the polarizing plate C of a time division image display shutter II, and other polarizing plates) that is used in the present invention includes a protective film and a polarizer. As the polarizer, any one of an iodine-based polarizer, a dye-based polarizer which uses a dichromatic dye, and a polyene-based polarizer may be used. In general, a polyvinyl alcohol-based film is used to produce an iodine-based polarizer and a dye-based polarizer. The absorption axis of the polarizer is equivalent to the stretching direction of the film. Therefore, the polarizer stretched to the vertical direction (conveying direction) has the absorption axis parallel to the longitudinal direction, and the polarizer stretched to the cross direction (conveying direction and perpendicular direction) has the absorption axis perpendicular to the longitudinal direction.

The polarizer generally has a protective film. In the present invention, the λ/4 plate can function as a protective film of the polarizer. In the case where a protective film of the polarizer is stacked, apart from the λ/4 plate, a cellulose ester film having high optical isotropicity as a protective film is preferably used.

A preferable method for the polarizing plate of the present invention includes a step of continuously laminating the λ/4 plate and the polarizer longitudinally. The long polarizing plate is cut to fit the size of a screen in the image device.

A linearly polarizer as the polarizer and the λ/4 plate can be combined to produce a polarizer-integrated optical film which functions as a circular polarizing plate or elliptic polarizing plate, with high productivity.

The polarizing plate that is used on the display side of the liquid crystal device I according to the present invention may be stacked on one side of the polarizer, and an optical compensation film having optical anisotropy may be stacked on the other side of the polarizer. In the order from the viewer, the λ/4 plate, the polarizer, the optical compensation film, and the liquid crystal cell, according to the present invention, can be arranged to allow the optical compensation film to function as a compensation film for contrast or viewing angles of the liquid crystal display, and the λ/4 plate according to the present invention functions as a film used on the outer side of the polarizer.

Figure 4:
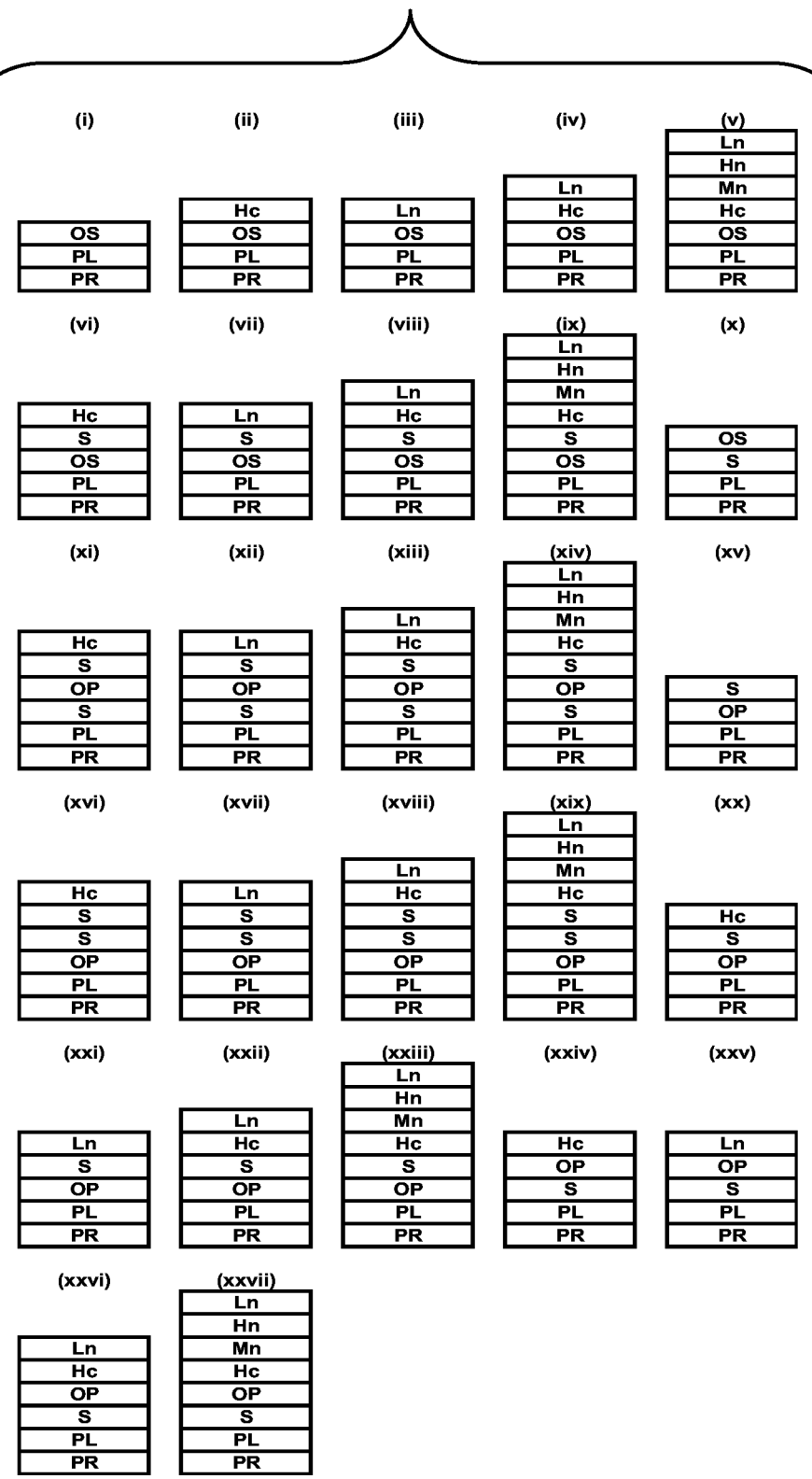
FIG. 4 is a schematic cross-sectional view illustrating examples of a polarizing plate which has a protective layer on one side of a polarizer and a λ/4 plate on the other side thereof.
Figure 5:
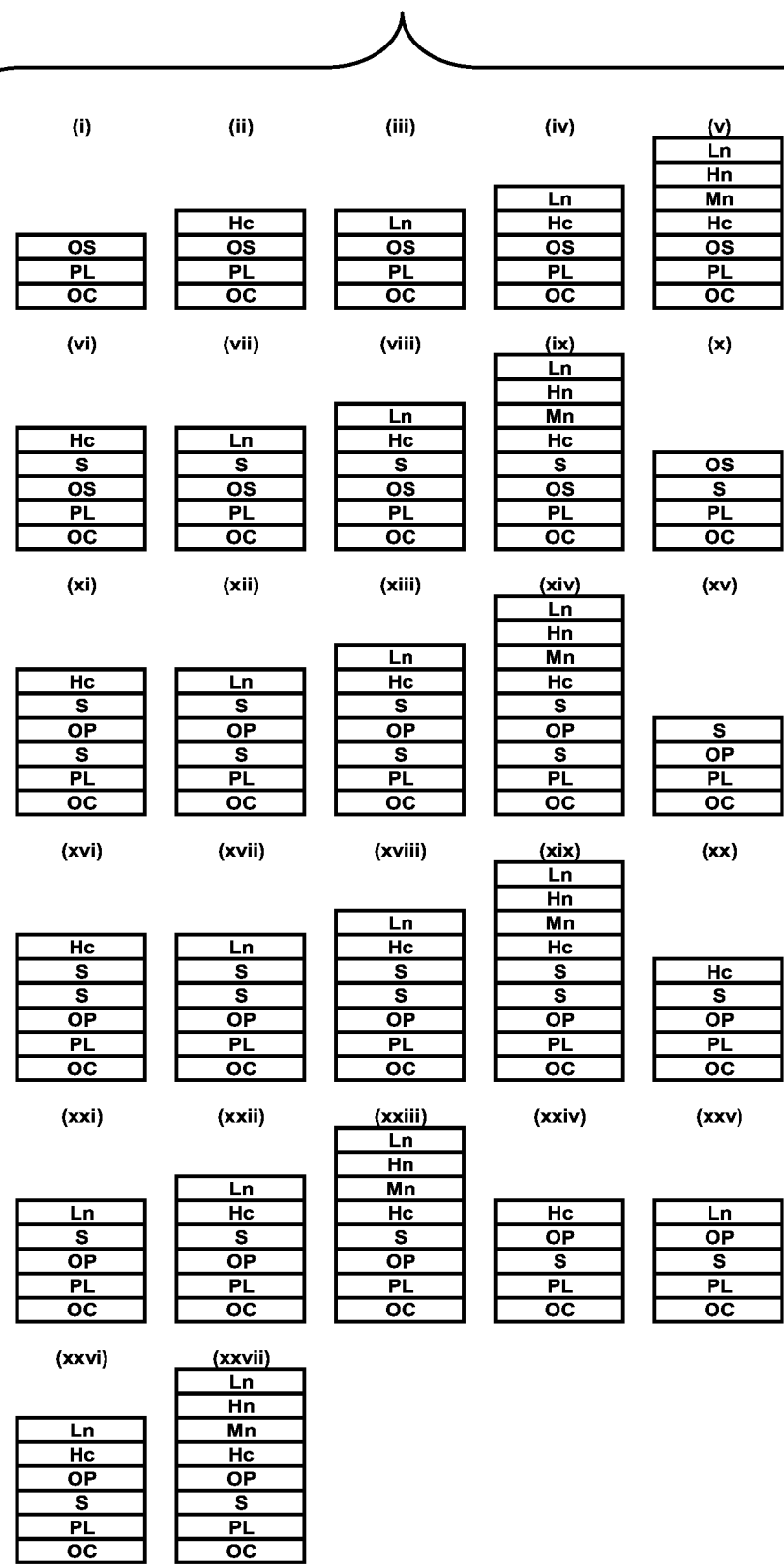
FIG. 5 is a schematic cross-sectional view illustrating examples of a polarizing plate which has a protective layer on one side of a polarizer and a λ/4 plate on the other side thereof.

FIGS. 4 and 5 show examples of the polarizing plate having a λ/4 plate used in the stereoscopic image recognition apparatus according to the present invention. The polarizing plate shown in FIG. 4 has a protective film on one side of the polarizer, and an optically anisotropic support, or a support and an optically anisotropic layer, each functioning as a λ/4 plate, on the other side, and if necessary, a hard coat layer or an anti-reflection layer (a low refractive index layer, a medium refractive index layer, and a high refractive index layer) can be provided thereon. The polarizing plate shown in FIG. 5 has an optical compensation film as a protective film on one side of the polarizer, and an optically anisotropic support, or a support and an optically anisotropic layer, each functioning as a λ/4 plate, on the other side, and if necessary, a hard coat layer or an anti-reflection layer (a low refractive index layer, a medium refractive index layer, and a high refractive index layer) can be provided thereon. Both of FIGS. 4 and 5 show representative constitution examples for part (i) to (xxvii). In FIGS. 4 and 5, "OS", "S", "Hc", "Ln", "Mn", "Hn", "OC", "OL", "PL", and "PR" mean an optically anisotropic layer, a support, a hard coat layer, a low refractive index layer, a medium refractive index layer, and a high refractive index layer, an optically anistropic layer, an optical compensatin film, a polarizer, and a protective layer, respectively.

[Liquid Crystal Display]

As long as the liquid crystal display I of the present invention has the λ/4 plate A in the display-side polarizing plate protective region, its constitution is not particularly limited, and may be any of, for example, reflection-type, semi-transmission-type, and transmission-type liquid crystal displays. The liquid crystal display generally includes a polarizing plate, a liquid crystal cell, and if necessary, other members of a retardation film, a reflection layer, a light-diffusing layer, a backlight, a front light, an optical control film, a light guide, a prism sheet, a color filter, and the like. The location of the polarizing plate except for the polarizing plate having a λ/4 plate is not particularly limited, and one or two or more locations may be available. The liquid crystal cell is not particularly limited, and may be any ordinary liquid crystal cell, for example, having a liquid crystal layer sandwiched between a pair of electrode-having transparent substrates. The transparent substrate that constitutes the liquid crystal cell is not particularly limited as long as it aligns the liquid crystal material to constitute the liquid crystal layer, in a specific alignment direction. Specifically, it may be any of a transparent substrate having the property of aligning liquid crystal by itself; or a transparent substrate not having an aligning capability by itself but coated with an alignment film or the like having the property of aligning liquid crystal. The electrode for the liquid crystal cell may be any ordinary one. In general, the electrode may be provided on the surface of the transparent substrate to be kept in contact with the liquid crystal layer, and in the case where a substrate having an alignment film is used, the electrode may be provided between the substrate and the alignment film. The liquid crystal material which forms the liquid crystal layer is not particularly limited, and examples thereof include various types of ordinary low-molecular liquid crystalline compounds, high-molecular liquid crystalline compounds and their mixtures capable of forming various liquid crystal cells. Further, within a range in which the liquid crystallinity is not affected adversely, a dye, a chiral agent, a non-liquid crystalline compound, or the like may be added to the layer.

The liquid crystal cell may additionally include other various necessary constitutive elements to constitute various types of liquid crystal cells mentioned below, in addition to the above-mentioned electrode substrate and liquid crystal layer. The liquid crystal cell mode includes various different types of modes such as a TN (twisted nematic) mode, an STN (super-twisted nematic) mode, an ECB (electrically controlled birefringence) mode, an IPS (in-plane switching) mode, a VA (vertical alignment) mode, an MVA (multidomain vertical alignment) mode, a PVA (patterned vertical alignment) mode, an OCB (optically compensated birefringence) mode, a HAN (hybrid aligned nematic) mode, an ASM (axially symmetric aligned microcell) mode, a halftone grain scale mode, a multidomain mode, a display mode of using a ferroelectric liquid crystal and an antiferroelectric liquid crystal, and the like. The driving system for the liquid crystal cell is not also particularly limited. The driving system may be any of a passive matrix system for STN-LCD or the like, as well as an active matrix system of using an active electrode such as TFT (thin film transistor) electrode, TFD (thin film diode) electrode, or the like, or a plasma address system. It may also be a field sequential system which does not use a color filter.

The liquid crystal cell is preferably in any of a VA mode, an OCB mode, an IPS mode, or a TN mode, but not limited thereto.

In the VA mode liquid crystal display, rod-shaped liquid crystal molecules are substantially vertically aligned when no voltage is applied. The VA mode liquid crystal cells include (1) VA mode liquid crystal cells in a narrow sense in which rod-shaped liquid crystal molecules are substantially vertically aligned when no voltage is applied while they are substantially horizontally aligned when voltage is applied (described in JP-A-2-176625); (2) liquid crystal cells in a mode (MVA mode) in which VA mode is converted to a multi-domain mode for enlarging the viewing angle (described in SID97, Digest of tech. Papers (pre-prints), 28 (1997), 845); (3) liquid crystal cells in a mode (n-ASM mode) in which rod-shaped liquid crystal molecules are substantially vertically aligned when no voltage is applied while they are aligned being twisted in multi-domains when voltage is applied (described in Preprints of Symposium on Japanese Liquid Crystal Society, 58-59 (1998)); and (4) liquid crystal cells in SURVAIVAL mode (published in LCD International 98). Further, it may be any one of a PVA (Patterned Vertical Alignment) type, an optical alignment type, and a PSA (Polymer-Sustained Alignment) type. The details of these modes are described in JP-A-2006-215326 and JP-T-2008-538819.

In the OCB mode liquid crystal display, the liquid crystal cell is in a bend orientation mode in which rod-shaped liquid crystal molecules in the upper part and in the lower part are substantially reversely (symmetrically) oriented. Liquid crystal displays using such bend orientation mode liquid crystal cell are disclosed in U.S. Pat. Nos. 4,583,825 and 5,410,422. Since the rod-shaped liquid crystal molecules in the upper part and in the lower part of the crystal cell are symmetrically oriented, the liquid crystal cell in the bend orientation mode has a self-optical compensatory function. This mode is thus referred to as an OCB (optically compensatory bend) liquid crystal mode.

Regarding the orientation state of the OCB mode liquid crystal cell displaying black, the rod-shaped liquid crystal molecules are vertically aligned at the central portions of the cell while the molecules are horizontally aligned in the vicinity of the cell substrates as in the TN mode. The liquid crystal cell in the bend orientation mode has an advantage of a high response speed.

In the IPS mode liquid crystal display, rod-shaped liquid crystal molecules are substantially horizontal to the substrate, and the liquid crystal molecules respond in the plane by applying a voltage. The IPS mode becomes a black image when no voltage is applied, and the transmittant axes of a pair of polarizing plates in the upper and lower portions are perpendicular to each other. A method the viewing angle by reducing the drained light with the black image in the inclination direction is described in JP-A-10-54982, JP-A-11-202323, JP-A-9-292522, JP-A-11-133408, JP-A-11-305217, JP-A-10-307291, and the like.

In the TN mode liquid crystal cell, the rod-shaped liquid crystalline molecules are substantially horizontal when no voltage is applied, and are in a twist alignment at 60 to 120°. The TN mode liquid crystal cell is most frequently used as a color-TFT liquid crystal display, and is described in numerous publications.

The liquid crystal cell of the time division image display shutter II is not particularly limited; the same liquid crystal cell as that of the liquid crystal display I can be used.

EXAMPLES

The characteristics of the present invention are described in more detail with reference to Examples and Comparative Examples below. In the following Examples, the amounts of the materials to be used, their ratio, the treatments, their treatment order, and the like may be suitably modified or changed without departing from the sprit and the scope of the present invention. Accordingly, the scope of the present invention shall not be construed to be limited to specific examples shown below.

1. Preparation of Films 1 to 50
(1) Preparation of Film 1
<Production of Transparent Support (Cellulose Acetate Film T1)>

The following composition was put into a mixing tank and stirred while heating to 30° C. to dissolve the respective components, thereby producing a cellulose acetate solution (a dope A for an inner layer and a dope B for an outer layer).

| Composition of cellulose acetate solution (parts by mass) | Inner layer | Outer layer |
| --- | --- | --- |
| Cellulose acetate with acetylation 60.9% | 100 | 100 |
| Triphenyl phosphate (plasticizer) | 7.8 | 7.8 |
| Biphenyl diphenyl phosphate (plasticizer) | 3.9 | 3.9 |
| Methylene chloride (first solvent) | 293 | 314 |
| Methanol (second solvent) | 71 | 76 |
| 1-Butanol (third solvent) | 1.5 | 1.6 |
| Silica fine particle (AEROSIL R972, manufactured by Nippon Aerosil Co., Ltd.) | 0 | 0.8 |
| Retardation enhancer (A) below | 1.7 | 0 |

Retardation enhancer (A)

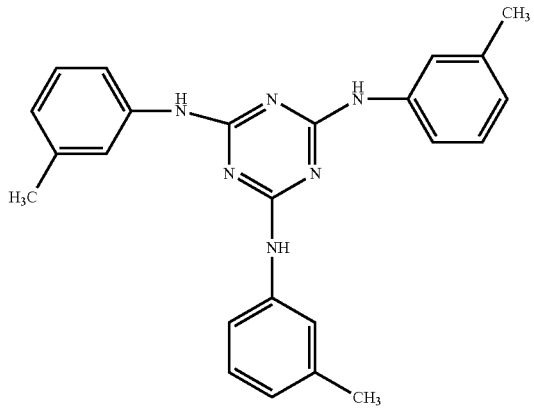 [SMILES: Cc1cccc(Nc2nc(Nc3cccc(C)c3)nc(Nc3cccc(C)c3)n2)c1]

The dope A for an inner layer and the dope B for an outer layer, thus obtained, were cast onto a drum cooled at 0° C., using a three-layer co-casting die. The film having a residual solvent content of 70% by mass was peeled away from the drum. With both edges thereof fixed with a pin tenter, this was conveyed at a draw ratio in the machine direction of 110% and dried at 80° C.; and when the residual solvent content thereof reached 10%, this was dried at 110° C. Next, this was dried at a temperature of 140° C. for 30 minutes, thereby producing a cellulose acetate film having a residual solvent content of 0.3% by mass (thickness: 80 μm (outer layer: 3 μm, inner layer: 74 μm, and outer layer: 3 μm)). The Re (550) and the Rth (550) of the produced cellulose acetate film were 5 nm and 90 nm, respectively.

<Formation of Optically Anisotropic Layer Containing Liquid Crystalline Compound>

(Alkali Saponification Treatment)

A cellulose acetate film T1 was passed through a dielectric heating roll at a temperature of 60° C. to elevate the film surface temperature to 40° C.; and then an alkali solution having the composition shown below was applied onto it in an amount of 14 ml/m², using a bar coater. Then, this was maintained under a steam far-IR heater manufactured by Noritake Company heated at 110° C. for 10 seconds. Subsequently, pure water was applied thereto in an amount of 3 ml/m², also using a bar coater. Next, this was washed with water with a fountain coater and dewatered with an air knife, and this operation was repeated three times; and then this was conveyed in a drying zone at 70° C. for 10 seconds to produce an alkali saponification-treated cellulose acylate film.

(Composition of Alkali Solution)

| Composition of Alkali Solution (parts by mass) | |
| --- | --- |
| Potassium oxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

(Formation of Alignment Film)

An alignment film coating liquid having the composition shown below was continuously applied onto the long, saponification-treated cellulose acetate film above, using a wire bar #14. This was dried with hot air at 60° C. for 60 seconds and then with hot air at 100° C. for 120 seconds.

| Composition of Alignment Film Coating Liquid | |
| --- | --- |
| Modified polyvinyl alcohol below | 10 parts by mass |
| Water | 371 parts by mass |
| Methanol | 119 parts by mass |
| Glutaraldehyde | 0.5 parts by mass |
| Photopolymerization initiator (Irgacure 2959, manufactured by Ciba Specialty Chemicals K. K.) | 0.3 parts by mass |

Modified polyvinyl alcohol

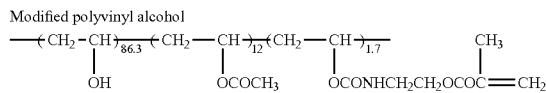

(Formation of Discotic Optically Anisotropic Layer Containing Liquid Crystalline Compound)

The alignment film produced above was continuously subjected to a rubbing treatment. Herein, the longitudinal direction and the conveying direction of the long film were parallel to each other, and with respect to the longitudinal direction of the film, the rotation axis of the rubbing roller was at 45° with counterclockwise rotation.

A discotic liquid crystalline compound-containing coating liquid A having the composition shown below was continuously applied onto the alignment film produced above, using a wire bar. The conveying speed (V) of the film was set to 36 m/min. For the drying of the solvent in the coating liquid and the alignment aging of the discotic liquid crystalline compound, the film was heated with warm air at 120° C. for 90 seconds, and subsequently irradiated with UV light at 80° C. to fix the alignment of the liquid crystalline compound, thereby forming an optically anisotropic layer having a thickness of 1.77 μm. The process thus gave a film 1.

| Composition of Optically Anisotropic Layer Coating Liquid (A) | |
| --- | --- |
| Discotic liquid crystalline compound below | 91 parts by mass |
| Acrylate monomer below | 5 parts by mass |
| Photopolymerization initiator (Irgacure 907, manufactured by Ciba-Geigy AG) | 3 parts by mass |
| Sensitizer (Kayacure-DETX, manufactured by Nippon Kayaku Co., Ltd.) | 1 part by mass |
| Pyridinium salt below | 0.5 parts by mass |
| Fluorine-based polymer (FP1) below | 0.2 parts by mass |
| Fluorine-based polymer (FP3) below | 0.1 parts by mass |
| Methyl ethyl ketone | 189 parts by mass |

Discotic Liquid Crystalline Compound

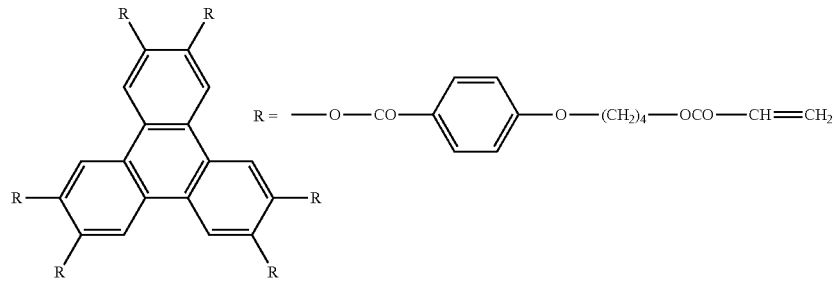

Acrylate monomer:

Ethylene oxide-modified trimethylol propane triacrylate (V #360, manufactured by Osaka Organic Chemical Industry Ltd.)

Composition of Optically Anisotropic Layer Coating Liquid (A)

Pyridinium salt

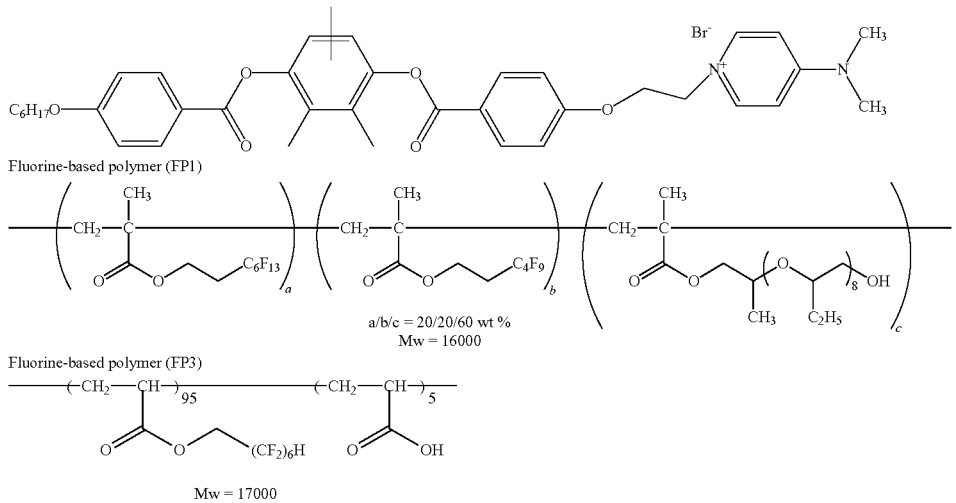

Fluorine-based polymer (FP3)

Mw = 17000

The Re (550) and the Rth (550) at 550 nm of the produced film 1 were 138 nm and 54 nm, respectively. The direction of the slow axis was perpendicular to the rotation axis of the rubbing roller. That is, with respect to the longitudinal direction of the support, the direction of the slow axis was at 45° with clockwise rotation. It was confirmed that the average inclination angle of the disc plane of the discotic liquid crystalline molecule to the film plane was 90°, and the discotic liquid crystal was vertically aligned to the film plane.

(2) Preparation of Film 2

CLEAR LR "CV-LC" (manufactured by Fujifilm Corporation) of a low reflection film having a commercially available cellulose acylate-based film as a support was prepared. Subsequently, the support surface of the "CV-LC" was attached to the optically anisotropic layer side of the film 1 through an adhesive layer, which was then used as a film 2.

(3) Preparation of Film 3

In the same manner as for the production method for the film 2 except that the cellulose acylate film T1 using the optically anisotropic layer of the film 2 as a support was changed to a commercially available cellulose acylate film "TD80UL" (manufactured by Fujifilm Corporation) in the production of the film 2, a film 3 was produced. With the optically anisotropic layer of the film 3, it was confirmed that the average inclination angle of the disc plane of the discotic liquid crystalline molecule to the film plane was 90° and the discotic liquid crystal was vertically aligned to the film plane.

(4) Preparation of Film 4

<Production of Transparent Support (Cellulose Acetate Film T2)>

In the same manner as for the production of the cellulose acetate film T1 except that the flow rate of the dope A was adjusted to change the film thickness of the film, a cellulose acetate film T2 was produced. The thickness of the entire layers, the Re (550), and the Rth (550) of the cellulose acetate film T2 were 110 µm, 7 nm, and 117 nm, respectively.

In the same manner as for the production method of the film 2 except that the cellulose acylate film T1 used as a support of the optically anisotropic layer of the film 2 was adjusted to T2 in the production of the film 2, a film 4 was produced. With the optically anisotropic layer of the film 4, it was confirmed that the average inclination angle of the disc plane of the discotic liquid crystalline molecule to the film plane was 90° and the discotic liquid crystal was vertically aligned to the film plane.

(5) Preparation of Film 5

<Production of Transparent Support (Cellulose Acetate Film T3)>

In the same manner as for the production of the cellulose acetate film T1 except that the flow rate of the dope A was adjusted to change the film thickness of the film, a cellulose acetate film T3 was produced. The thickness of the entire layers, the Re (550), and the Rth (550) of the cellulose acetate film T3 were 87 µm, 5 nm, and 97 nm, respectively.

<Production of Transparent Support (Cellulose Acetate Film T4)>

In the same manner as for the production of the cellulose acetate film T1 except that the flow rate of the dope A was adjusted to change the film thickness of the film, a cellulose acetate film T4 was produced. The thickness of the entire layers, the Re (550), and the Rth (550) of the cellulose acetate film T4 were 55 µm, 3 nm, and 60 nm, respectively.

One side of each of the cellulose acetate films T3 and T4 was subjected to an alkali saponification treatment, and attached to each other using a polyvinyl-based adhesive.

In the same manner as for the production method for film 2 except that the cellulose acylate film T1 using the optically anisotropic layer of the film 2 as a support was changed to a film formed by attaching T3 and T4 to each other in the production of the film 2, a film 5 was produced. With the optically anisotropic layer of the film 5, it was confirmed that the average inclination angle of the disc plane of the discotic liquid crystalline molecule to the film plane was 90° and the discotic liquid crystal was vertically aligned to the film plane.

(6) Preparation of Film 6

Two sheets of the cellulose acetate film T1 were prepared, and one side of each of the sheets was subjected to an alkali saponification treatment, and then attached to each other using a polyvinyl-based adhesive.

In the same manner as for the production method for the film 2 except that the cellulose acylate film T1 using the optically anisotropic layer of the film 2 as a support was changed to a film formed by attaching the two sheets of T1 to each other in the production of the film 2, a film 6 was produced. With the optically anisotropic layer of the film 6, it was confirmed that the average inclination angle of the disc plane of the discotic liquid crystalline molecule to the film plane was 90° and the discotic liquid crystal was vertically aligned to the film plane.

(7) Preparation of Film 7

In the same manner as for the production method for the film 1 except that the type of a wire bar during formation of the optically anisotropic layer and the amount of methyl ethyl ketone as a coating liquid were suitably adjusted in the production of the film 1, a film 7 was produced. The thickness of the optically anisotropic layer was 1.60 µm. The Re (550) and the Rth (550) at 550 nm of the produced film 7 were 125 nm and 61 nm, respectively. The direction of the slow axis was perpendicular to the rotation axis of the rubbing roller. That is, with respect to the longitudinal direction of the support, the direction of the slow axis was at 45° with clockwise rotation. It was confirmed that the average inclination angle of the disc plane of the discotic liquid crystalline molecule to the film plane was 90° and the discotic liquid crystal was vertically aligned to the film plane.

(8) Preparation of Film 8

CLEAR LR "CV-LC" (manufactured by Fujifilm Corporation) of a low reflection film having a commercially available cellulose acylate-based film as a support was prepared. Subsequently, the support surface of the "CV-LC" was attached to the optically anisotropic layer side of the film 7 through an adhesive layer, which was then used as a film 8.

(9) Preparation of Film 9

In the same manner as for the production method for the film 7 except that the rotation axis of the rubbing roller in the step of a rubbing treatment of the alignment film was changed to a direction of 45° clockwise in the production of the film 7, the support surface of the "CV-LC" of the low reflection film was attached to the cellulose acetate film T1 side on the support surface through an adhesive layer, which was then used as a film 9.

Further, the direction of the slow axis of the film 9 was perpendicular to the rotation axis of the rubbing roller. That is, when the coating surface faced downward (the "CV-LC" plane facing downward), with respect to the longitudinal direction of the support, the slow axis was at 45° with counterclockwise rotation. It was confirmed that the average inclination angle of the disc plane of the discotic liquid crystalline molecule to the film plane was 90°, and the discotic liquid crystal was vertically aligned to the film plane.

(10) Preparation of Film 10

One side of each of the cellulose acetate films T1 and T4 was subjected to an alkali saponification treatment, and attached to each other using a polyvinyl-based adhesive.

In the same manner as for the production method for film 8 except that the cellulose acylate film T1 using the optically anisotropic layer of the film 8 as a support was changed to a film formed by attaching T1 and T4 to each other in the production of the film 8, a film 10 was produced. With the optically anisotropic layer of the film 10, it was confirmed that the average inclination angle of the disc plane of the discotic liquid crystalline molecule to the film plane was 90° and the discotic liquid crystal was vertically aligned to the film plane.

(11) Preparation of Film 11

In the same manner as for the production method for the film 2 except that the type of a wire bar during formation of the optically anisotropic layer and the amount of methyl ethyl ketone as a coating liquid were suitably adjusted in the production of the film 2, a film 11 was produced. The thickness of the optically anisotropic layer was 1.50 µm. The produced film 11 included "CV-LC". The Re (550) and the Rth (550) at 550 nm of the produced film 11 were 117 nm and 104 nm, respectively. The direction of the slow axis was perpendicular to the rotation axis of the rubbing roller. That is, with respect to the longitudinal direction of the support, the slow axis was at 45° with clockwise rotation. It was confirmed that the average inclination angle of the disc plane of the discotic liquid crystalline molecule to the film plane was 90° and the discotic liquid crystal was vertically aligned to the film plane.

(12) Preparation of Film 12

<Production of Transparent Support (Cellulose Acetate Film T5)>

In the same manner as for the production of the cellulose acetate film T1 except that the flow rate of the dope A was adjusted to change the film thickness of the film, a cellulose acetate film T5 was produced. The thickness of the entire layers, the Re (550), and the Rth (550) of the cellulose acetate film T5 were 77 µm, 5 nm, and 86 nm, respectively.

One side of each of the cellulose acetate films T4 and T5 was subjected to an alkali saponification treatment, and attached to each other using a polyvinyl-based adhesive.

In the same manner as for the production method for film 11 except that the cellulose acylate film T1 using the optically anisotropic layer of the film 11 as a support was changed to a film formed by attaching T4 and T5 to each other in the production of the film 11, a film 12 was produced. With the optically anisotropic layer of the film 12, it was confirmed that the average inclination angle of the disc plane of the discotic liquid crystalline molecule to the film plane was 90° and the discotic liquid crystal was vertically aligned to the film plane.

(13) Preparation of Film 13

<Formation of Optically Anisotropic Layer Containing a Liquid Crystalline Compound>

(Alkali Saponification and Formation of Alignment Film)

CLEAR LR "CV-LC" (manufactured by Fujifilm Corporation) of a low reflection film having a commercially available cellulose acylate-based film as a support was prepared. In the same manner as for the production method for the film 1, using "CV-LC", the support surface of the "CV-LC" was subjected to an alkali saponification treatment, and subsequently an alignment film was formed.

(Formation of Discotic Optically Anisotropic Layer Containing Liquid Crystalline Compound)

The alignment film produced above was continuously subjected to a rubbing treatment. Herein, the longitudinal direction and the conveying direction of the long film were parallel to each other, and the angle formed by the longitudinal direction of the film and the direction of the rotation axis of the rubbing roller was 45° with counterclockwise rotation.

A discotic liquid crystalline compound-containing coating liquid A having the composition shown below was continuously applied onto the alignment film produced above, using a wire bar. The conveying speed (V) of the film was set to 36 m/min. For the drying of the solvent in the coating liquid and the alignment aging of the discotic liquid crystalline compound, the film was heated with warm air at 120° C. for 90 seconds, and subsequently irradiated with UV light at 80° C. to fix the alignment of the liquid crystalline compound, thereby forming an optically anisotropic layer having a thickness of 1.77 µm. The process thus gave a film 13.

The Re (550) and the Rth (550) at 550 nm of the produced film 13 were 138 nm and 3 nm, respectively. The direction of the slow axis was perpendicular to the rotation axis of the rubbing roller. That is, when the coating surface faced downward (the "CV-LC" plane facing downward), with respect to the longitudinal direction of the support, the slow axis was at 45° with counterclockwise rotation. It was confirmed that the average inclination angle of the disc plane of the discotic liquid crystalline molecule to the film plane was 90°, and the discotic liquid crystal was vertically aligned to the film plane.

(14) Preparation of Film 14

In the same manner as for the production method for the film 13 except that the type of a wire bar during formation of the optically anisotropic layer and the amount of methyl ethyl ketone as a coating liquid were suitably adjusted in the production of the film 13, a film 14 was produced. The thickness of the optically anisotropic layer was 1.60 μm. With the optically anisotropic layer of the film 14, it was confirmed that the average inclination angle of the disc plane of the discotic liquid crystalline molecule to the film plane was 90° and the discotic liquid crystal was vertically aligned to the film plane.

(15) Preparation of Film 15

In the same manner as for the production method for the film 13 except that the type of a wire bar during formation of the optically anisotropic layer and the amount of methyl ethyl ketone as a coating liquid were suitably adjusted in the production of the film 13, a film 15 was produced. The thickness of the optically anisotropic layer was 1.50 μm. With the optically anisotropic layer of the film 15, it was confirmed that the average inclination angle of the disc plane of the discotic liquid crystalline molecule to the film plane was 90° and the discotic liquid crystal was vertically aligned to the film plane.

(16) Preparation of Film 16

In the same manner as for the production of the film 13, the surface of the support of "CV-LC" was subjected to an alkali saponification treatment, thereby further forming an alignment film. The produced alignment film was continuously subjected to a rubbing treatment. Herein, the longitudinal direction and the conveying direction of the long film are parallel to each other, and the angle formed by the longitudinal direction of the film and the direction of the rotation axis of the rubbing roller was 45° with clockwise rotation.

A discotic liquid crystalline compound-containing coating liquid B having the composition shown below was continuously applied onto the alignment film produced above, using a wire bar. The conveying speed (V) of the film was set to 36 m/min. For the drying of the solvent in the coating liquid and the alignment aging of the discotic liquid crystalline compound, the film was heated with warm air at 120° C. for 90 seconds, and subsequently irradiated with UV light at 80° C. to fix the alignment of the liquid crystalline compound, thereby forming an optically anisotropic layer having a thickness of 0.91 μm. The process thus gave a film 16.

| Composition of Optically Anisotropic Layer Coating Liquid (B) | |
|---|---|
| Discotic liquid crystalline compound below | 100 parts by mass |
| Photopolymerization initiator (Irgacure 907, manufactured by Ciba-Geigy AG) | 3 parts by mass |
| Sensitizer (Kayacure-DETX, manufactured by Nippon Kayaku Co., Ltd.) | 1 part by mass |
| Pyridinium salt below | 1 part by mass |
| Fluorine-based polymer (FP2) below | 0.4 parts by mass |
| Methyl ethyl ketone | 252 parts by mass |

Discotic Liquid Crystalline Compound

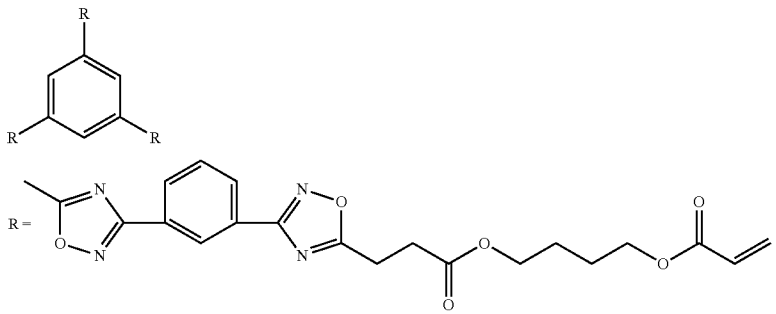

Pyridinium Salt

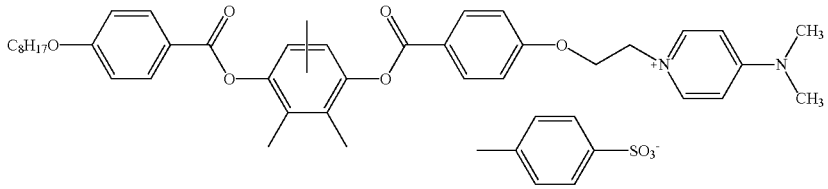

Fluorine-based Polymer (FP2)

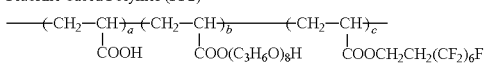

a/b/c = 5/55/40
Mw = 15000

The Re (550) and the Rth (550) of the produced film 16 were 125 nm and 8 nm, respectively. The direction of the slow axis was perpendicular to the rotation axis of the rubbing roller. That is, when the coating surface faced downward (the "CV-LC" plane placed below), the angle formed by the longitudinal direction of the support and the slow axis was 45° with counterclockwise rotation. It was confirmed that the average inclination angle of the disc plane of the discotic liquid crystalline molecule to the film plane was 90°, and the discotic liquid crystal was vertically aligned to the film plane.

(17) Preparation of Film 17

By uniaxially stretching a commercially available norbornene-based polymer film "ZEONOR ZF14" (manufactured by Nippon Zeon Co., Ltd.) at a temperature of 156° C. with a stretching rate of 45%, a film 17 was produced. The Re (550) and the Rth (550) of the film 17 were 138 nm and 81 nm, respectively.

(18) Preparation of Film 18

CLEAR LR "CV-LC" (manufactured by Fujifilm Corporation) of a low reflection film having a commercially available cellulose acylate-based film as a support was produced. Subsequently, the support surface of the "CV-LC" was attached to the optically anisotropic layer side of the film 17 through an adhesive layer, which was then used as a film 18.

(19) Preparation of Film 19

A commercially available polycarbonate-based film "PURE-ACE WR W-142" (manufactured by Teijin Chemicals, Ltd.) was used as a film 19. The Re (550) and the Rth (550) of the film 17 were 138 nm and 72 nm, respectively.

(20) Preparation of Film 20

CLEAR LR "CV-LC" (manufactured by Fujifilm Corporation) of a low reflection film having a commercially available cellulose acylate-based film as a support was produced. The surface of the film 19 was attached subjected to a corona discharge treatment, and then the support surface of the "CV-LC" was attached thereto, which was then used as a film 20.

(21) Preparation of Film 21

A commercially available polycarbonate-based film "PURE-ACE WR W-142" (manufactured by Teijin Chemicals, Ltd.) was used as a film 21. The Re (550) and the Rth (550) of the film 21 were 125 nm and 72 nm, respectively.

(22) Preparation of Film 22

A room temperature, 120 parts by mass of cellulose acetate having an average acetylation of 59.7%, 9.36 parts by mass of triphenyl phosphate, 4.68 parts by mass of biphenyl diphenyl phosphate, 1.00 part by mass of a retardation enhancer (A), 543.14 parts by mass of methylene chloride, 99.35 parts by mass of methanol, and 19.87 parts by mass of n-butanol were mixed to prepare a solution (dope).

The obtained dope was cast on a glass plane at room temperature for 1 minute, and then dried at 45° C. for 5 minutes. The residual amount of the solvent after drying was 30% by mass. The cellulose acetate film was peeled from the glass plate and dried at 120° C. for 10 minutes. The film was cut into a suitable size, and then stretched in the direction parallel to the casting direction at 130° C. The direction perpendicular to the stretching direction was allowed to contract freely. After stretching and then drying as it was at 120° C. for 30 minutes, a stretching film was collected. The residual amount of the solvent after stretching was 0.1% by mass. Thus, a film 22 was obtained. The thickness, the Re (550), and the Rth (550) of the obtained film 22 were 95 μm, 138 nm, and 74 nm, respectively. Further, the stretching ratio was 42%.

(23) Preparation of Film 23

In the same manner as for the production of the film 22 except that the film thickness was adjusted, a film 23 was obtained.

The thickness, the Re (550), and the Rth (550) of the obtained film 23 were 83 μm, 120 nm, and 64 nm, respectively.

(24) Preparation of Film 24

In the same manner as for the production of the film 22 except that the film thickness was adjusted, a film 24 was obtained.

The thickness, the Re (550), and the Rth (550) of the obtained film 24 were 150 μm, 150 nm, and 80 nm, respectively.

(25) Preparation of Film 25

In the same manner as for the production method for the film 1 except that the type of a wire bar during formation of the optically anisotropic layer and the amount of methyl ethyl ketone as a coating liquid were suitably adjusted in the production of the film 1, a film 25 was produced. The thickness of the optically anisotropic layer was 1.54 μm. The Re (550) and the Rth (550) at 550 nm of the produced film 25 were 120 nm and 60 nm, respectively. The direction of the slow axis was perpendicular to the rotation axis of the rubbing roller. That is, with respect to the longitudinal direction of the support, the rotation axis of the rubbing roller was at 45° with counterclockwise rotation. It was confirmed that the average inclination angle of the disc plane of the discotic liquid crystalline molecule to the film plane was 90° and the discotic liquid crystal was vertically aligned to the film plane.

(26) Preparation of Film 26

In the same manner as for the production method for the film 1 except that the cellulose acylate film T1 using the optically anisotropic layer of the film 1 as a support was changed to a commercially available cellulose acylate film "TD80UL" (manufactured by Fujifilm Corporation) in the production of the film 1, a film 26 was produced. With the optically anisotropic layer of the film 26, it was confirmed that the average inclination angle of the disc plane of the discotic liquid crystalline molecule to the film plane was 90° and the discotic liquid crystal was vertically aligned to the film plane.

(27) Preparation of Film 27

In the same manner as for the production method for the film 1 except that the type of a wire bar during formation of the optically anisotropic layer and the amount of methyl ethyl ketone as a coating liquid were suitably adjusted in the production of the film 1, a film 27 was produced. The thickness of the optically anisotropic layer was 1.92 μm. The Re (550) and the Rth (550) at 550 nm of the produced film 27 were 150 nm and 49 nm, respectively. The direction of the slow axis was perpendicular to the rotation axis of the rubbing roller. That is, with respect to the longitudinal direction of the support, the rotation axis of the rubbing roller was at 45° with counterclockwise rotation. It was confirmed that the average inclination angle of the disc plane of the discotic liquid crystalline molecule to the film plane was 90° and the discotic liquid crystal was vertically aligned to the film plane.

(28) Preparation of Film 28

In the same manner as for the production of the film 4 except that "AGA1" (manufactured by Sanritz Automation Co., Ltd.) for a reflection inhibiting film was used instead of the "CV-LC" attached to the optically anisotropic layer side of the film 4 through the adhesive layer, a film 28 was produced.

(29) Preparation of Film 29

In the same manner as for the production of the film 5 except that "AGA1" (manufactured by Sanritz Automation Co., Ltd.) for a reflection inhibiting film was used instead of the "CV-LC" attached to the optically anisotropic layer side of the film 5 through the adhesive layer, a film 29 was produced.

(30) Preparation of Film 30

In the same manner as for the production of the film 10 except that "AGA1" (manufactured by Sanritz Automation Co., Ltd.) for a reflection inhibiting film was used instead of the "CV-LC" attached to the optically anisotropic layer side of the film 10 through the adhesive layer, a film 30 was produced.

(31) Preparation of Film 31

In the same manner as for the production of the film 13 except that "AGA1" (manufactured by Sanritz Automation Co., Ltd.) for a reflection inhibiting film was used instead of the "CV-LC", a film 31 was produced.

(32) Preparation of Film 32

In the same manner as for the production of the film 14 except that "AGA1" (manufactured by Sanritz Automation Co., Ltd.) for a reflection inhibiting film was used instead of the "CV-LC", a film 32 was produced.

(33) Preparation of Film 33

In the same manner as for the production of the film 4 except that "CV-LU" (manufactured by Fujifilm Corporation) for a reflection inhibiting film was used instead of the "CV-LC" attached to the optically anisotropic layer side of the film 4 through the adhesive layer, a film 33 was produced.

(34) Preparation of Film 34

In the same manner as for the production of the film 5 except that "CV-LU" (manufactured by Fujifilm Corporation) for a reflection inhibiting film was used instead of the "CV-LC" attached to the optically anisotropic layer side of the film 5 through the adhesive layer, a film 34 was produced.

(35) Preparation of Film 35

In the same manner as for the production of the film 10 except that "CV-LU" (manufactured by Fujifilm Corporation) for a reflection inhibiting film was used instead of the "CV-LC" attached to the optically anisotropic layer side of the film 10 through the adhesive layer, a film 35 was produced.

(36) Preparation of Film 36

In the same manner as for the production of the film 13 except that "CV-LU" (manufactured by Fujifilm Corporation) for a reflection inhibiting film was used instead of the "CV-LC" a film 36 was produced.

(37) Preparation of Film 37

In the same manner as for the production of the film 14 except that "CV-LU" (manufactured by Fujifilm Corporation) for a reflection inhibiting film was used instead of the "CV-LC" a film 37 was produced.

(38) Preparation of Film 38

In the same manner as for the production of the film 4 except that CLEAR AR (manufactured by SONY Chemical Corp.) for a reflection inhibiting film was used instead of the "CV-LC" attached to the optically anisotropic layer side of the film 4 through the adhesive layer, a film 38 was produced.

(39) Preparation of Film 39

In the same manner as for the production of the film 5 except that CLEAR AR (manufactured by SONY Chemical Corp.) for a reflection inhibiting film was used instead of the "CV-LC" attached to the optically anisotropic layer side of the film 5 through the adhesive layer, a film 39 was produced.

(40) Preparation of Film 40

In the same manner as for the production of the film 10 except that CLEAR AR (manufactured by SONY Chemical Corp.) for a reflection inhibiting film was used instead of the "CV-LC" attached to the optically anisotropic layer side of the film 10 through the adhesive layer, a film 40 was produced.

(41) Preparation of Film 41

In the same manner as for the production of the film 13 except that CLEAR AR (manufactured by SONY Chemical Corp.) for a reflection inhibiting film was used instead of the "CV-LC", a film 41 was produced.

(42) Preparation of Film 42

In the same manner as for the production of the film 14 except that CLEAR AR (manufactured by SONY Chemical Corp.) for a reflection inhibiting film was used instead of the "CV-LC", a film 42 was produced.

(43) Preparation of Film 43

In the same manner as for the production of the film 18 except that "AGA1" (manufactured by Sanritz Automation Co., Ltd.) for a reflection inhibiting film was used instead of the "CV-LC", a film 43 was produced.

(44) Preparation of Film 44

In the same manner as for the production of the film 18 except that "CV-LU" (manufactured by Fujifilm Corporation) for a reflection inhibiting film was used instead of the "CV-LC", a film 44 was produced.

(45) Preparation of Film 45

In the same manner as for the production of the film 18 except that CLEAR AR (manufactured by SONY Chemical Corp.) for a reflection inhibiting film was used instead of the "CV-LC", a film 45 was produced.

(46) Preparation of Film 46

<Production of Transparent Support (Cellulose Acetate Film T6)>

The following composition was put into a mixing tank and stirred while heating to dissolve the respective components, thereby producing a cellulose acetate solution (a dope C) having a solid content concentration of 22% by mass.

(Composition of Cellulose Acetate Solution)

| | |
|---|---|
| Cellulose acetate with acetylation 60.7 to 61.1% | 100 parts by mass |
| Triphenyl phosphate (plasticizer) | 7.8 parts by mass |
| Biphenyl diphenyl phosphate (plasticizer) | 3.9 parts by mass |
| Ultraviolet absorber (Tinuvin 328 manufactured by Ciba Specialty Chemicals K.K.) | 0.9 parts by mass |
| Ultraviolet absorber (Tinuvin 326 manufactured by Ciba Specialty Chemicals K.K.) | 0.2 parts by mass |
| Methylene chloride (first solvent) | 336 parts by mass |
| Methanol (second solvent) | 29 parts by mass |
| 1-Butanol (third solvent) | 11 parts by mass |

A dope D including a matting agent formed by adding 0.02 parts by mass of silica particles (AEROSIL R972, manufactured by Nippon Aerosil Co., Ltd.) having an average particle diameter of 16 nm with respect to 100 parts by mass of cellulose acetate to the dope C was prepared. With the same composition as that of the dope C, the solid content concentration was adjusted to 19% by mass.

Using the dope C mainly, the dope D including the matting agent was set as a lowermost layer and an uppermost layer, and cast using a band stretch device. After the temperature of film surface on the band reached 40° C., the dope D was dried with warm air at 70° C. for 1 minute, and the film was peeled from the band and dried with warm air at 140° C. for 10 minutes, thereby producing a cellulose acetate film T6 having a residual solvent amount of 0.3% by mass. The lowermost layer and the uppermost layer, each including the matting agent were adjusted to have a flow rate to 3 µm, respectively, and to have a main flow rate of 74 µm.

The width and the thickness of the obtained long cellulose acetate film T6 were 2300 mm and 80 µm, respectively. Further, the in-plane retardation Re (550) and the thickness-direction retardation Rth (550) were 2 nm and 41 nm, respectively.

In the same manner as for the production method for the film 14 except that the "CV-LC" used as a support of the optically anisotropic layer was changed to the cellulose acetate film T6 in the production of the film 14, an optically anisotropic support F1 was produced. The thickness of the optically anisotropic layer was 1.60 μm. With the optically anisotropic layer of the optically anisotropic support F1, it was confirmed that the average inclination angle of the disc plane of the discotic liquid crystalline molecule to the film plane was 90° and the discotic liquid crystal was vertically aligned to the film plane.

(Production of Coating Liquid for Hard Coat Layer)

The following composition was put into a mixing tank, stirred, and filtered through a polypropylene-made filter having a hole diameter of 0.4 μm to obtain a coating liquid for a hard coat layer (solid content concentration 58% by mass).

(Composition of Cellulose Acetate Solution)

| Solvent | |
|---|---|
| Methyl acetate | 36.2 parts by mass |
| Methyl ethyl ketone | 36.2 parts by mass |
| (a) Monomer: PETA | 77.0 parts by mass |
| (b) Monomer: Urethane monomer | 20.0 parts by mass |
| Photopolymerization initiator (Irgacure 184, manufactured by Ciba Specialty Chemicals K.K.) | 3.0 parts by mass |
| Leveling agent (SP-13) | 0.02 parts by mass |

The respective compounds are shown below.

PETA: Compound having the following structure, manufactured by Shin-Nakamura Chemical. The mass average molecular weight was 325 and the number of functional groups in one molecule was 3.5 (average value).

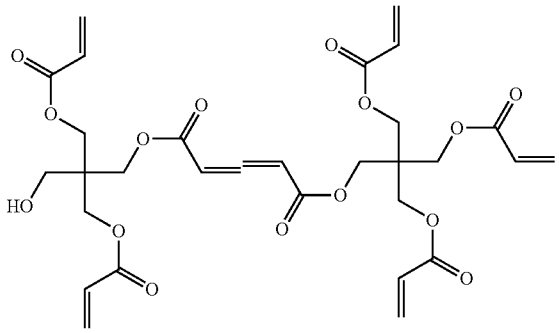

Urethane monomer: Compound having the following structure. The mass average molecular weight was 596 and the number of functional groups in one molecule was 4.

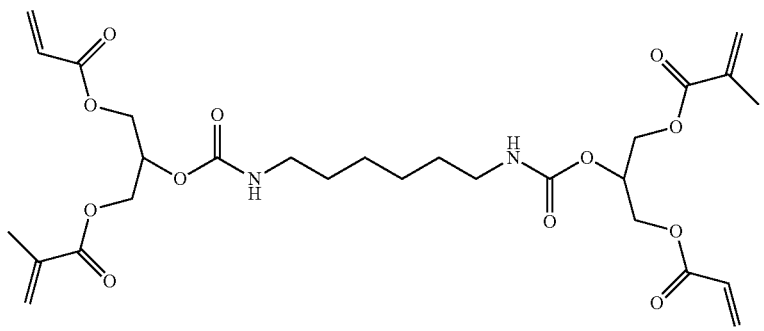 [SMILES: C=CC(=O)OCC(COC(=O)C(=C)C)OC(=O)NCCCCCCNC(=O)OC(COC(=O)C=C)COC(=O)C(=C)C]

Leveling Agent (SP-13)

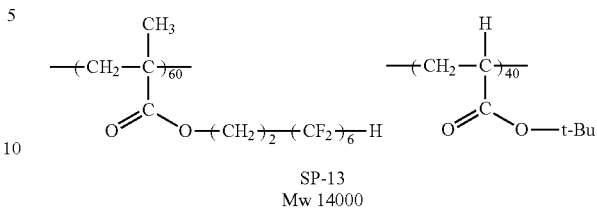

SP-13
Mw 14000

(Production of Coating Liquid for Low Refractive Index Layer)

The respective components were mixed as follows, and dissolved in a 85/15 mixture (mass ratio) of MEK/MMPG-AC to produce a coating liquid for a low refractive index layer having a solid content of 5% by mass.

| Composition of Coating Liquid For Low Refractive Index Layer | |
|---|---|
| Perfluoroolefin copolymer below | 15 parts by mass |
| DPHA | 7 parts by mass |
| Defenser MCF-323 | 5 parts by mass |
| Fluorine-based polymerizable compound below | 20 parts by mass |
| Hollow silica particles in terms of solid content | 50 parts by mass |
| Irgacure 127 | 3 parts by mass |

The compounds used are shown below.

Perfluoroolefin Copolymer

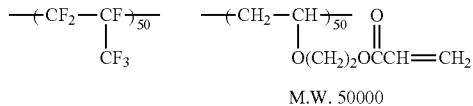

M.W. 50000

In the structural formula, 50:50 denotes a molar ratio.

Fluorine-Based Polymerizable Compound

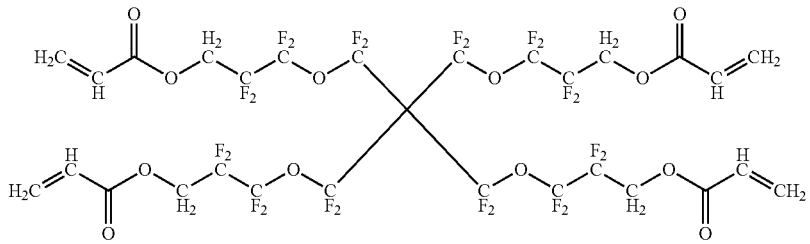 [SMILES: C=CC(=O)OCC(F)(F)C(F)(F)OC(F)(F)C(C(F)(F)OC(F)(F)C(F)(F)COC(=O)C=C)(C(F)(F)OC(F)(F)C(F)(F)COC(=O)C=C)C(F)(F)OC(F)(F)C(F)(F)COC(=O)C=C]

DPHA: Mixture of dipentaerythritol pentaacrylate and dipentaerythritol hexaacrylate (manufactured by Nippon Kayaku Co., Ltd.)

Defenser MCF-323: Fluorine-based surfactant, manufactured by Dainippon Ink K. K.

Irgacure 127: Photopolymerization initiator, manufactured by Ciba Specialty Chemicals K. K.

Hollow silica: Hollow silica particle dispersion (average particle size 45 nm, refractive index 1.25, surface-treated with a silane coupling agent containing an acryloyl group, and MEK dispersion concentration 20%)

MEK: Methyl ethyl ketone

MMPG-Ac: Propylene glycol monomethyl ether acetate (Formation of Hard Coat Layer and Low Refractive Index Layer)

The coating liquid for a hard coat layer was coated onto the support surface on the side on which a layer including the liquid crystalline compound of the optically anisotropic support F1 prepared in Preparation Example above had not been applied (coating amount of solid content: 12 g/m$^2$). After drying at 100° C. for 60 seconds, the coating layer was cured by irradiating ultraviolet rays at an illuminance of 400 mW/cm$^2$ and an irradiation dose of 150 mJ/cm$^2$, using an air-cooled metal halide lamp (produced by Eye Graphics Co., Ltd.) of 160 W/cm while purging with nitrogen so as to give an atmosphere having an oxygen concentration of 0.1% by volume, thereby producing a hard coat layer-attached optical film. On this hard coat layer, the coating liquid for a low refractive index layer was coated. The drying conditions for the low refractive index layer were 70° C. and 60 seconds, and the ultraviolet curing conditions were such that an air-cooled metal halide lamp (produced by Eye Graphics Co., Ltd.) of 240 W/cm was used at an illuminance of 600 mW/cm$^2$ and an irradiation dose of 300 mJ/cm$^2$ while purging with nitrogen so as to give an atmosphere having an oxygen concentration of 1.0% by volume or less. The refractive index and the film thickness of the low refractive index layer were 1.34 and 95 nm, respectively.

As described above, a film 46 having lamination of the hard coat layer and the low refractive index layer in this order was produced. The film 46 was an optical film having excellent anti-reflection performance with a low reflectivity at 380 to 780 nm of about 1.0%. The Re (550) and the Rth (550) of the film 46 were 125 nm and 8 nm, respectively.

(47) Preparation of Film 47

The hard coat layer and the low refractive index layer formed during formation of the film 46 were formed on a glass plate, and then the hard coat layer and the low refractive index layer were peeled from the glass. This layer was attached onto the side on which the layer including the liquid crystalline compound of the optically anisotropic support F1 had been provided, using an adhesive, thereby producing a film 47. The Re (550) and the Rth (550) of the film 47 were 125 nm and 8 nm, respectively.

(48) Preparation of Film 48

<Production of Transparent Support (Cellulose Acetate Film T7)>

In the same manner as for the production of the cellulose acetate film T6 except that the amount of the ultraviolet absorber (Tinuvin 328 manufactured by Ciba Specialty Chemicals K. K.) added was changed to 0.45 parts by mass, and the amount of the ultraviolet absorber (Tinuvin 326 manufactured by Ciba Specialty Chemicals K. K.) added was changed to 0.1 parts by mass, a cellulose acetate film T7 was produced. The thickness of the entire layers, the Re (550), and the Rth (550) of the cellulose acetate film T7 were 82 µm, 2 nm, and 41 nm, respectively.

In the same manner as for the production method of the film 46 except that the cellulose acylate film T6 used as a support of the optically anisotropic layer of the film 46 was adjusted to T7 in the production of the film 46, a film 48 was produced. With the optically anisotropic layer of the film 48, it was confirmed that the average inclination angle of the disc plane of the discotic liquid crystalline molecule to the film plane was 90° and the discotic liquid crystal was vertically aligned to the film plane. The Re (550) and the Rth (550) of the film 48 were 125 nm and 8 nm, respectively.

(49) Preparation of Film 49

In the same manner as for the production method of the film 48 except that the cellulose acylate film T7 used as a support of the optically anisotropic layer of the film 48 was adjusted to T1 in the production of the film 48, a film 49 was produced. With the optically anisotropic layer of the film 49, it was confirmed that the average inclination angle of the disc plane of the discotic liquid crystalline molecule to the film plane was 90° and the discotic liquid crystal was vertically aligned to the film plane. The Re (550) and the Rth (550) of the film 49 were 125 nm and 8 nm, respectively.

(50) Preparation of Film 50

CLEAR LR "CV-LC" (manufactured by Fujifilm Corporation) of a low reflection film having a commercially available cellulose acylate-based film as a support was prepared, and used as a film 50.

2. Characteristics of Films 1 to 50

The characteristics of the produced films 1 to 50 are summarized in Table 1 below. Further, regarding the Re (550) and the Rth (550) of each film, a sample having a dimension of 30 mm×40 mm was humidified at 25° C. and 60% RH for 2 hours, and for KOBRA 21ADH or WR (manufactured by Oji Scientific Instruments, the Re (550) and the Rth (550) were measured at wavelengths of 450 nm, 550 nm, and 630 nm

TABLE 1

| Film | Re (550) (nm) | Rth (550) (nm) | Re (450)/Re (550) | Re (630)/Re (550) |
|---|---|---|---|---|
| Film 1 | 138 | 54 | 1.15 | 0.94 |
| Film 2 | 138 | 93 | 1.15 | 0.94 |
| Film 3 | 138 | 42 | 1.15 | 0.94 |
| Film 4 | 138 | 120 | 1.15 | 0.94 |
| Film 5 | 138 | 160 | 1.15 | 0.94 |
| Film 6 | 138 | 183 | 1.15 | 0.94 |
| Film 7 | 125 | 61 | 1.15 | 0.94 |
| Film 8 | 125 | 100 | 1.15 | 0.94 |
| Film 9 | 125 | 100 | 1.15 | 0.94 |
| Film 10 | 125 | 160 | 1.15 | 0.94 |
| Film 11 | 117 | 104 | 1.15 | 0.94 |
| Film 12 | 117 | 160 | 1.15 | 0.94 |
| Film 13 | 138 | 3 | 1.15 | 0.94 |
| Film 14 | 125 | 8 | 1.15 | 0.94 |
| Film 15 | 117 | 11 | 1.15 | 0.94 |
| Film 16 | 125 | 8 | 1.12 | 0.95 |
| Film 17 | 138 | 81 | 1.00 | 1.00 |
| Film 18 | 138 | 120 | 1.00 | 1.00 |
| Film 19 | 138 | 72 | 0.82 | 1.06 |
| Film 20 | 138 | 111 | 0.82 | 1.06 |
| Film 21 | 125 | 72 | 0.82 | 1.06 |
| Film 22 | 138 | 74 | 0.89 | 1.04 |
| Film 23 | 120 | 64 | 0.89 | 1.04 |
| Film 24 | 150 | 80 | 0.89 | 1.04 |
| Film 25 | 120 | 60 | 1.15 | 0.94 |
| Film 26 | 138 | 3 | 1.15 | 0.94 |
| Film 27 | 150 | 49 | 1.15 | 0.94 |
| Film 28 | 138 | 120 | 1.15 | 0.94 |
| Film 29 | 138 | 160 | 1.15 | 0.94 |
| Film 30 | 125 | 160 | 1.15 | 0.94 |
| Film 31 | 138 | 3 | 1.15 | 0.94 |
| Film 32 | 125 | 8 | 1.15 | 0.94 |
| Film 33 | 138 | 120 | 1.15 | 0.94 |
| Film 34 | 138 | 160 | 1.15 | 0.94 |
| Film 35 | 125 | 160 | 1.15 | 0.94 |
| Film 36 | 138 | 3 | 1.15 | 0.94 |
| Film 37 | 125 | 8 | 1.15 | 0.94 |
| Film 38 | 138 | 120 | 1.15 | 0.94 |
| Film 39 | 138 | 160 | 1.15 | 0.94 |
| Film 40 | 125 | 160 | 1.15 | 0.94 |
| Film 41 | 138 | 3 | 1.15 | 0.94 |
| Film 42 | 125 | 8 | 1.15 | 0.94 |
| Film 43 | 138 | 120 | 1 | 1 |
| Film 44 | 138 | 120 | 1 | 1 |
| Film 45 | 138 | 120 | 1 | 1 |
| Film 46 | 125 | 8 | 1.15 | 0.94 |
| Film 47 | 125 | 8 | 1.15 | 0.94 |
| Film 48 | 125 | 8 | 1.15 | 0.94 |
| Film 49 | 125 | 8 | 1.15 | 0.94 |
| Film 50 | 2 | 39 | −1.21 | 2.32 |

The absorbances at a wavelength of 380 nm of the produced films 46 to 49 are summarized in Table 2 below. Further, the absorbance of each film was measured with an ultraviolet spectrophotometer V-7100 (manufactured by JASCO Corp.).

TABLE 2

| Film | Absorbance at wavelength of 380 nm |
|---|---|
| Film 46 | 1.57 |
| Film 47 | 1.57 |
| Film 48 | 0.77 |
| Film 49 | 0.055 |

3. Manufacturing of polarizing plates 1 to 50

Manufacturing of polarizing plates 6, 8 to 16, 18, 20, AND 28 to 50 for liquid crystal display A polyvinyl alcohol (PVA) film having a thickness of 80 μm was immersed and stained in an iodine solution having an iodine concentration of 0.05% by mass for 60 seconds at 30° C., then was vertically stretched to five times the original length while immersed in a boron solution having a boron concentration of 4% by mass for 60 seconds, and was dried for four minutes at 50° C., thereby obtaining a polarizer having a thickness of 20 μm.

Support surfaces (surfaces opposite to the CV-LC sides) of the films 2 to 6, 8, 10 to 12, 28 to 30, 33 to 35, 38 to 40, 47 and 50 described in the above Table 1 were subjected to an alkali saponification treatment. A VA phase difference film (manufactured by Fujifilm Corporation, Re (550)=50 nm, Rth (550)=125 nm) which was subjected to the same alkali saponification treatment as the respective films subjected to the alkali saponification treatment was prepared, and the VA phase difference film used as one surface and any one of the films 2 to 6, 8 to 16, 18, 20, and 28 to 50 used as the other surface were attached to each other with the polarizer interposed therebetween by using an adhesive, thereby manufacturing the polarizing plates 2 to 6, 8 to 16, 18, 20, and 28 to 50 where the films in the above Table and the VA phase difference films were used as protective layers of the polarizers. In addition, if an attached surface is a cellulose acylate film, a polyvinyl-based adhesive is used, and if others, an acryl-based adhesive is used for the attachment to the polarizer. At this time, for the polarizing plates 2 to 6, 8 to 16, 18, 20, and 28 to 49 formed of the films 2 to 6, 8 to 16, 18, 20, and 28 to 49, the absorption axes of the polarizers and the slow axes of the films 2 to 6, 8 to 16, 18, 20, and 28 to 49 were made to form an angle of 135 degrees. With respect to the polarizing plate 50 formed of the film 50, the absorption axis of the polarizer and the slow axis of the film 50 in the above Table 1 were made to form an angle of 0 degree. In addition, the absorption axis of the polarizer and the slow axis of the VA phase difference film were made to form an angle of 90 degrees.

Manufacturing of polarizing plates 1, 7, 17, 19, and 21 to 27 for LC shutter glasses A polyvinyl alcohol (PVA) film having a thickness of 80 μm was immersed and stained in an iodine solution having an iodine concentration of 0.05% by mass for 60 seconds at 30° C., then was vertically stretched to five times the original length while immersed in a boron solution having a boron concentration of 4% by mass for 60 seconds, and was dried for four minutes at 50° C., thereby obtaining a polarizer having a thickness of 20 μm.

Support surfaces of the films 1, 7 and 22 to 27 described in the above Table 1 were subjected to an alkali saponification treatment. A cellulose acylate film "TD80UL" (manufactured by Fujifilm Corporation,) which was subjected to the same alkali saponification treatment as the respective films subjected to the alkali saponification treatment was prepared, and the TD80UL used as one surface and any one of the films 1, 7, 17, 19 and 21 to 27 used as the other surface were attached to each other with the polarizer interposed therebetween by using an adhesive, thereby manufacturing the polarizing plates 1, 7, 17, 19 and 21 to 27 where the films in the above Table and the TD80UL were used as protective layers of the polarizers. In addition, in the films 1, 7 and 25 to 27 having the coated optically anisotropic layer, a support side was used as an attached surface. If the attached surface was a cellulose acylate film, a polyvinyl-based adhesive was used, and if others, an acryl-based adhesive was used for the attachment to the polarizer. At this time, for the polarizing plates 1, 7, 17, 19 and 21 to 27 formed of the films 1, 7, 17, 19 and 21 to 27, the absorption axes of the polarizers and the slow axes of the films 1, 7, 17, 19 and 21 to 27 were made to form an angle of 135 degrees. In addition, the absorption axis of the polarizer and the slow axis of the TD80UL were made to form an angle of 0 degree.

4. Manufacturing of Liquid crystal display and LC shutter glasses and evaluation of 3D display performance (1) Manufacturing of Liquid Crystal Displays 2 to 6, 8 to 16, 18, 20, and 28 to 50

A liquid crystal TV "LC-46LV3" manufactured by SHARP Corporation was prepared, the polarizing plate on the viewing side was peeled off, the VA phase difference films of the polarizing plates 2 to 6, 8 to 16, 18, 20, and 28 to 50, and the LC cell were attached to each other via an easy-adhesive layer, thereby manufacturing the liquid crystal displays 2 to 6, 8 to 16, 18, 20, and 28 to 50.

In addition, the viewing side polarizing plate of the product and the polarizing plate 50 had the same film configuration, and it was confirmed that display performance did not vary in the liquid crystal display (product) before the viewing side polarizing plate was peeled off, and the liquid crystal display 50.

(2)-(i) Manufacturing of Two-Polarizng Plate Type LC Shutter Glasses A-2, B-2, C-2, D-2, E-2, F-2, G-2, H-2, I-2, J-2, K-2 and W LC shutter glasses "AN-3DG10" manufactured by SHARP Corporation were prepared. The "AN-3DG10" is two-polarizing plate LC shutter glasses having no λ/4 film. The polarizing plate of the "AN-3DG10" on the side opposite to the eye (the side facing the liquid crystal display) was peeled off, and the TD80UL side of the above manufactured LC shutter glasses polarizing plate 1 was attached thereto via an easy-adhesive layer, thereby manufacturing the LC shutter glasses A-2. Here, the attachment was performed such that the absorption axis of the polarizing plate 1 of A-2 was perpendicular to the absorption axis of the eye side polarizing plate (the polarizing plate left without being peeled off) of the "AN-3DG10". When A-2 was installed and faced the liquid crystal display, the absorption axis of the polarizing plate 1 of A-2 was made to be parallel to the absorption axis of the viewing side polarizing plate of the liquid crystal display in a state where the face was not tilted, and the slow axis of A-2 was made to be perpendicular to the slow axis of the λ/4 plate of the viewing side polarizing plate of the liquid crystal display.

In addition, the LC shutter glasses B-2 were manufactured in the same manner except that the polarizing plate 1 was replaced with the polarizing plate 7, the LC shutter glasses C-2 were manufactured in the same manner except that the polarizing plate 1 was replaced with the polarizing plate 17, the LC shutter glasses D-2 were manufactured in the same manner except that the polarizing plate 1 was replaced with the polarizing plate 19, the LC shutter glasses E-2 were manufactured in the same manner except that the polarizing plate 1 was replaced with the polarizing plate 21, the LC shutter glasses F-2 were manufactured in the same manner except that the polarizing plate 1 was replaced with the polarizing plate 22, the LC shutter glasses G-2 were manufactured in the same manner except that the polarizing plate 1 was replaced with the polarizing plate 23, and the LC shutter glasses H-2 were manufactured in the same manner except that the polarizing plate 1 was replaced with the polarizing plate 24. In addition, the LC shutter glasses I-2 were manufactured in the same manner except that the polarizing plate 1 was replaced with the polarizing plate 25, the LC shutter glasses J-2 were manufactured in the same manner except that the polarizing plate 1 was replaced with the polarizing plate 26, and the LC shutter glasses K-2 were manufactured in the same manner except that the polarizing plate 1 was replaced with the polarizing plate 27.

In addition, for test, a product form of the "AN-3DG10" was used as LC shutter glasses W.

(2)-(ii) Manufacturing of One-Polariging Plate Type LC Shutter Glasses A-1, B-1, C-1, D-1, E-1, F-1, G-1, H-1, I-1, J-1, K-1 and S The polarizing plate of the "AN-3DG10", manufactured by SHARP Corporation, on the side opposite to the eye (the side facing the liquid crystal display) was peeled off, and the support side of the above manufactured film 1 was attached thereto via an easy-adhesive layer, thereby manufacturing the LC shutter glasses A-1. When A-1 is installed and faces the liquid crystal display, the slow axis of the film 1 of A-1 was made to be perpendicular to the slow axis of the λ/4 film of the viewing side polarizing plate protection region of the liquid crystal display.

In addition, the LC shutter glasses B-1 (the liquid crystal cell of the glasses and the support surface of the film 7) was manufactured in the same manner except that the film 1 was replaced with the film 7, the LC shutter glasses C-1 were manufactured in the same manner except that the film 1 was replaced with the film 17, the LC shutter glasses D-1 were manufactured in the same manner except that the film 1 was replaced with the film 19, the LC shutter glasses E-1 were manufactured in the same manner except that the film 1 was replaced with the film 21, the LC shutter glasses F-1 were manufactured in the same manner except that the film 1 was replaced with the film 22, the LC shutter glasses G-1 were manufactured in the same manner except that the film 1 was replaced with the film 23, and the LC shutter glasses H-2 were manufactured in the same manner except that the film 1 was replaced with the film 24. In addition, the LC shutter glasses I-1 (the liquid crystal cell of the glasses and the support surface of the film 25) were manufactured in the same manner except that the film 1 was replaced with the film 25, the LC shutter glasses J-1 (the liquid crystal cell of the glasses and the support surface of the film 26) were manufactured in the same manner except that the film 1 was replaced with the film 26, and the LC shutter glasses K-1 (the liquid crystal cell of the glasses and the support surface of the film 27) were manufactured in the same manner except that the film 1 was replaced with the film 27.

In addition, for test, a form where the polarizing plate of the "AN-3DG10" on the opposite side to the eye (the side facing the liquid crystal display) was peeled off was used as LC shutter glasses S. The LC shutter glasses S is a one-polarizing plate type LC shutter glasses having no film.

The liquid crystal displays 2 to 6, 8 to 16, 18, 20 and 28 to 50, and the LC shutter glasses A-1, A-2, B-1, B-2, C-1, C-2, D-1, D-2, E-1, E-2, F-1, F-3, G-1, G-2, H-1, H-2, I-1, I-2, J-1, J-2, K-1, K-2, S and W, which were manufactured in this way, were combined through combinations shown in Tables 3 to 8, thereby manufacturing stereoscopic image recognition apparatuses according to Embodiments 1 to 91 and comparative examples 1 and 2 (using two-polarizing plate type LC shutter glasses), and Embodiments 92 to 182 and comparative examples 3 and 4 (using two-polarizing plate type LC shutter glasses).

(3) Evaluation of 3D Display Performance

The following evaluation was performed for each manufactured stereoscopic image recognition apparatus. In addition, during the evaluation, the liquid crystal display was disposed so as to be perpendicular to the ground (equal to a normal use form).

(3)-1 Measurement of Front White Luminance

The LC shutter glasses were disposed in front of the liquid crystal display, and were disposed such that a line connecting the left and right glasses of the LC shutter glasses was parallel to the ground. As a 3D content item displayed on the liquid crystal display, a 3D content item which displays white for one eye and displays black for the other eye was used, and, in the dark room, a luminance value over the white display side LC shutter glass was measured using a measurement device (BM5A manufactured by TOPCON Corporation).

(3)-2 Measurement of Front White Luminance Change Ratio

In the dark room, a luminance value over the white display side LC shutter glass was measured using a measurement device (BM5A manufactured by TOPCON Corporation) when the LC shutter glasses were rotated in a state where the LC shutter glasses were disposed in front of the liquid crystal display. In addition, as a 3D content item displayed on the liquid crystal display, a 3D content item which displays white for one eye and displays black for the other eye was used.

A white luminance variation was calculated from the following Expression based on the minimal value and the maximal value of the white luminance measurement values.

White luminance variation (%)=(white luminance maximal value−white luminance minimal value)/white luminance maximal value×100

The evaluation was made using the following references based on the calculated white luminance variation.

A: below 3% (variation was not viewed at all)
B: 3% or more and below 10% (variation was slightly viewed and was allowable)
C: 10% or more and below 20% (variation was viewed, but was allowable)
D: 20% or more (variation was clearly viewed, and was not allowable)

(3)-3 Measurement of Viewing Angle White Luminace

The measurement device (BM5A manufactured by TOPCON Corporation) and the LC shutter glasses were disposed at 45 degrees in the azimuth angle direction and 60 degrees in the polar angle direction, and at 135 degrees in the azimuth angle direction and 60 degrees in the polar angle direction from the front of the liquid crystal display, and were disposed such that a line connecting the left and right glasses of the LC shutter glasses was parallel to the ground. As a 3D content item displayed on the liquid crystal display, a 3D content item which displays white for one eye and displays black for the other eye was used, and, in the dark room, a luminance value over the white display side LC shutter glass was measured using a measurement device. The viewing angle white luminance was evaluated based on an average value of the luminance values in two directions of the azimuth angle direction 45 degrees and the azimuth angle direction 135 degrees.

(3)-4 Measurement of Front Crosstalk

The LC shutter glasses were disposed in front of the liquid crystal display, and were disposed such that a line connecting the left and right glasses was parallel to the ground. As a 3D content item displayed on the liquid crystal display, a 3D content item which displays white for one eye and displays black for the other eye was used, and, in the dark room, white luminance over the white display side LC shutter glass and black luminance over the black display side LC shutter glass were measured using a measurement device (BM5A manufactured by TOPCON Corporation), and then the front crosstalk was calculated from the following Equation.

Front crosstalk (%)=2×black luminance/(white luminance+black luminance)×100

In addition, front crosstalk in a product state of the above-described LC-46LV3 manufactured by SHARP Corporation was 10%. In a case of the present product, in a 3D content item which displays a white image for one eye and displays a black image for the other eye, it could be found that the white image was mixed with the black image due to the TV circuit factor.

(3)-5 Measurement of Viewing Angle Crosstalk

The measurement device (BM5A manufactured by TOPCON Corporation) and the LC shutter glasses were disposed at 45 degrees in the azimuth angle direction and 60 degrees in the polar angle direction, and at 135 degrees in the azimuth angle direction and 60 degrees in the polar angle direction from the front of the liquid crystal display, and were disposed such that a line connecting the left and right glasses was parallel to the ground. As a 3D content item displayed on the liquid crystal display, a 3D content item which displays white for one eye and displays black for the other eye was used, and, in the dark room, white luminance over the white display side LC shutter glass and black luminance over the black display side LC shutter glass were measured using a measurement device, and then the viewing angle crosstalk was calculated from the following Equation.

Viewing angle crosstalk (%)=2×black luminance/(white luminance+black luminance)×100

The viewing angle crosstalk was evaluated based on an average value of the calculated luminance values in two directions.

(3)-6 Measurement of Viewing Angle Crosstalk Difference

The measurement device (BM5A manufactured by TOPCON Corporation) and the LC shutter glasses were disposed at 45 degrees in the azimuth angle direction and 60 degrees in the polar angle direction, and at 135 degrees in the azimuth angle direction and 60 degrees in the polar angle direction from the front of the liquid crystal display, and white luminance over the white display side LC shutter glass and black luminance over the black display side LC shutter glass were measured using a measurement device (BM5A manufactured by TOPCON Corporation) when the LC shutter glasses were rotated. In addition, as a 3D content item displayed on the liquid crystal display, a 3D content item which displays white for one eye and displays black for the other eye was used. The viewing angle crosstalk difference in the two directions was calculated from the following Equation based on a minimal value and a maximal value of the viewing angle crosstalk calculated from Equation shown in (3)-5.

Viewing angle crosstalk difference (%)=maximal value of viewing angle crosstalk−minimal value of the viewing angle crosstalk The evaluation was made using the following references based on an average value of the calculated viewing angle crosstalk.

A: below 3% (variation was not viewed at all)
B: 3% or more and below 10% (slight variation was viewed and was allowable)
C: 10% or more and below 20% (variation was viewed, but was allowable)
D: 20% or more (variation was clearly viewed, and was not allowable)
-: Luminance variation was large and color could not be measured (3)-7 Measurement of Front White Shading Δv'

In the dark room, white shading v' over the white display side LC shutter glass was measured using a measurement device (BM5A manufactured by TOPCON Corporation) when the LC shutter glasses were rotated in a state where the LC shutter glasses were maintained to be parallel to the front of the liquid crystal display. In addition, as a 3D content item displayed on the liquid crystal display, a 3D content item which displays white for one eye and displays black for the other eye was used.

The evaluation was made using the following references based on a difference between a minimal value and a maximal value of the color shading v'.

AA: v' variation in white display was below 0.005 (color shading was not viewed and was allowable)

A: v' variation in white display was 0.005 or more and below 0.010 (color shading was not viewed at all and was allowable)

B: v' variation in white display was 0.010 or more and below 0.025 (color shading was slightly viewed and was allowable)

C: v' variation in white display was 0.025 or more and below 0.040 (color shading was viewed, but was allowable)

D: v' variation in white display was 0.040 or more (color shading was clearly viewed, and was not allowable)

-: Luminance variation was large and color could not be measured (3)-8 Measurement of Viewing Angle White Shading Δv'

The measurement device (BM5A manufactured by TOPCON Corporation) and the LC shutter glasses were disposed at 45 degrees in the azimuth angle direction and 60 degrees in the polar angle direction, and at 135 degrees in the azimuth angle direction and 60 degrees in the polar angle direction from the front of the liquid crystal display, and white shading v' over the white display side LC shutter glass was measured using a measurement device (BM5A manufactured by TOPCON Corporation) when the LC shutter glasses were rotated. In addition, as a 3D content item displayed on the liquid crystal display, a 3D content item which displays white for one eye and displays black for the other eye was used.

The evaluation was made using the following references based on a difference between a minimal value and a maximal value of the color shading v'.

AA: v' variation in white display was below 0.005 (color shading was not viewed and was allowable)

A: v' variation in white display was 0.005 or more and below 0.010 (color shading was not viewed at all and was allowable)

B: v' variation in white display was 0.010 or more and below 0.025 (color shading was slightly viewed and was allowable)

C: v' variation in white display was 0.025 or more and below 0.040 (color shading was viewed, but was allowable)

D: v' variation in white display was 0.040 or more (color shading was clearly viewed, and was not allowable)

-: Luminance variation was large and color could not be measured (3)-9 Evaluation of Light Fastness The liquid crystal display was irradiated with light by Super Xenon Weather Meter SX75 (manufactured by Suga Test Instrument Co., Ltd.) at an output of 180 W/m² for 200 hours. In addition, the light irradiation for 200 hours is a light fastness acceleration test corresponding to 20 years when the liquid crystal display is assumed to be exposed to a fluorescent light for 12 hours per day. Thereafter, light fastness of 2D and 3D was measured as follows.

(i) Evaluation of 2D (Evaluation without LC Shutter Glasses)

Front white luminance and front black luminance were measured using a measurement device (BM5A manufactured by TOPCON Corporation), and the evaluation was made using the following references.

A: Variation before and after light irradiation was within 3% (variation was not viewed and was allowable).

B: Variation before and after light irradiation was 3% or more to 5% or less (variation was not viewed and was allowable).

C: Variation before and after light irradiation was 5% or more (variation was viewed, and was not allowable).

(ii) Evaluation of 3D (Evaluation with LC Shutter Glasses)

The LC shutter glasses were disposed in front of the liquid crystal display, and were disposed such that a line connecting the left and right glasses was parallel to the ground. White luminance over the white display side LC shutter glass was measured using a measurement device (BM5A manufactured by TOPCON Corporation), and the light fastness was evaluated using the following references.

A: Variation before and after light irradiation was within 3% (variation was not viewed and was allowable)

B: Variation before and after light irradiation was 3% or more to 5% or less (variation was not viewed and was allowable)

C: Variation before and after light irradiation was 5% or more (variation was viewed, and was not allowable)

In addition, in this evaluation, white luminance was evaluated in the most recommended form when 3D images were viewed in front, and an allowable luminance variation was smaller than a luminance variation when the LC shutter glasses were rotated as in (3)-2.

(3)-10 Evaluation of Screen Luminance Difference

The screen luminance difference was observed when the liquid crystal display displaying white was viewed in front in a state where the LC shutter glasses were worn, and was evaluated using the following references. Here, a viewing distance was set to 1.5 times the height of the liquid crystal display.

A: The entire screen was uniform and luminance difference was not viewed (allowable).

B: The corners were slightly dark, which an unnoticeable luminance difference but was allowable.

C: A luminance difference in the corners of the screen was clearly viewed and thus was not allowable.

The results of evaluating 3D display performance using the two-polarizing plate type LC shutter glasses are shown in the following Tables 3 to 5.

TABLE 3

RESULT WHEN USING TWO-POLARIZING PLATE LC SHUTTER GLASSES

| | DISPLAY SIDE POLARIZING PLATE PROTECTION REGION OF LIQUID CRYSTAL DISPLAY | | | | | λ/4 FILM OF LC SHUTTER GLASSES | | | | |
|---|---|---|---|---|---|---|---|---|---|---|
| | KIND*1 | Re (550) (nm) | Rth (550) (nm) | Re (450)/ Re (550) | Re (630)/ Re (550) | GLASSES KIND*2 (FILM KIND*3) | Re (550) (nm) | Rth (550) (nm) | Re(450)/ Re(550) | Re(630)/ Re(550) |
| Embodiment 1 | 13 | 138 | 3 | 1.15 | 0.94 | A-2(1) | 138 | 54 | 1.15 | 0.94 |
| Embodiment 2 | 3 | 138 | 42 | 1.15 | 0.94 | A-2(1) | 138 | 54 | 1.15 | 0.94 |
| Embodiment 3 | 2 | 138 | 93 | 1.15 | 0.94 | A-2(1) | 138 | 54 | 1.15 | 0.94 |
| Embodiment 4 | 4 | 138 | 120 | 1.15 | 0.94 | A-2(1) | 138 | 54 | 1.15 | 0.94 |

TABLE 3-continued

RESULT WHEN USING TWO-POLARIZING PLATE LC SHUTTER GLASSES

| | | | | | | | | | | |
|---|---|---|---|---|---|---|---|---|---|---|
| Embodiment 5 | 5 | 138 | 160 | 1.15 | 0.94 | A-2(1) | 138 | 54 | 1.15 | 0.94 |
| Embodiment 6 | 14 | 125 | 8 | 1.15 | 0.94 | A-2(1) | 138 | 54 | 1.15 | 0.94 |
| Embodiment 7 | 8 | 125 | 100 | 1.15 | 0.94 | A-2(1) | 138 | 54 | 1.15 | 0.94 |
| Embodiment 8 | 10 | 125 | 160 | 1.15 | 0.94 | A-2(1) | 138 | 54 | 1.15 | 0.94 |
| Embodiment 9 | 15 | 117 | 11 | 1.15 | 0.94 | A-2(1) | 138 | 54 | 1.15 | 0.94 |
| Embodiment 10 | 11 | 117 | 104 | 1.15 | 0.94 | A-2(1) | 138 | 54 | 1.15 | 0.94 |
| Embodiment 11 | 12 | 117 | 160 | 1.15 | 0.94 | A-2(1) | 138 | 54 | 1.15 | 0.94 |
| Embodiment 12 | 18 | 138 | 120 | 1.00 | 1.00 | A-2(1) | 138 | 54 | 1.15 | 0.94 |
| Embodiment 13 | 20 | 138 | 111 | 0.82 | 1.06 | A-2(1) | 138 | 54 | 1.15 | 0.94 |
| Embodiment 14 | 14 | 125 | 8 | 1.15 | 0.94 | B-2(7) | 125 | 61 | 1.15 | 0.94 |
| Embodiment 15 | 16 | 125 | 8 | 1.12 | 0.95 | B-2(7) | 125 | 61 | 1.15 | 0.94 |
| Embodiment 16 | 8 | 125 | 100 | 1.15 | 0.94 | B-2(7) | 125 | 61 | 1.00 | 0.94 |
| Embodiment 17 | 18 | 138 | 120 | 1.00 | 1.00 | C-2(17) | 138 | 81 | 1.00 | 1.00 |
| Embodiment 18 | 18 | 138 | 120 | 1.00 | 1.00 | D-2(19) | 138 | 72 | 0.82 | 1.06 |
| Embodiment 19 | 20 | 138 | 111 | 0.82 | 1.06 | D-2(19) | 138 | 72 | 0.82 | 1.06 |
| Embodiment 20 | 2 | 138 | 93 | 1.15 | 0.94 | C-2(17) | 138 | 81 | 1.00 | 1.00 |
| Embodiment 21 | 14 | 125 | 8 | 1.15 | 0.94 | C-2(17) | 138 | 81 | 1.00 | 1.00 |
| Embodiment 22 | 8 | 125 | 100 | 1.15 | 0.94 | C-2(17) | 138 | 81 | 1.00 | 1.00 |
| Embodiment 23 | 11 | 117 | 104 | 1.15 | 0.94 | C-2(17) | 138 | 81 | 1.00 | 1.00 |
| Embodiment 24 | 2 | 138 | 93 | 1.15 | 0.94 | D-2(19) | 138 | 72 | 0.82 | 1.06 |
| Embodiment 25 | 14 | 125 | 8 | 1.15 | 0.94 | D-2(19) | 138 | 72 | 0.82 | 1.06 |
| Embodiment 26 | 16 | 125 | 8 | 1.12 | 0.95 | D-2(19) | 138 | 72 | 0.82 | 1.06 |
| Embodiment 27 | 9 | 125 | 100 | 1.15 | 0.94 | D-2(19) | 138 | 72 | 0.82 | 1.06 |
| Embodiment 28 | 8 | 125 | 100 | 1.15 | 0.94 | D-2(19) | 138 | 72 | 0.82 | 1.06 |
| Embodiment 29 | 11 | 117 | 104 | 1.15 | 0.94 | D-2(19) | 138 | 72 | 0.82 | 1.06 |
| Embodiment 30 | 2 | 138 | 93 | 1.15 | 0.94 | F-2(22) | 138 | 74 | 0.89 | 1.04 |
| Embodiment 31 | 14 | 125 | 8 | 1.15 | 0.94 | F-2(22) | 138 | 74 | 0.89 | 1.04 |

| | FRONT WHITE LUMINANCE (cd/m$^2$) | FRONT WHITE LUMINANCE VARIATION | VIEWING ANGLE WHITE LUMINANCE (cd/m$^2$) | FRONT CROSSTALK | VIEWING ANGLE CROSSTALK | VIEWING ANGLE CROSSTALK DIFFERENCE |
|---|---|---|---|---|---|---|
| Embodiment 1 | 93 | A | 17.9 | 10% | 49% | A |
| Embodiment 2 | 93 | A | 17.5 | 10% | 49% | A |
| Embodiment 3 | 93 | A | 16.9 | 10% | 49% | A |
| Embodiment 4 | 93 | A | 16.2 | 10% | 49% | A |
| Embodiment 5 | 93 | A | 15.0 | 10% | 49% | A |
| Embodiment 6 | 93 | A | 18.0 | 10% | 49% | A |
| Embodiment 7 | 93 | A | 17.0 | 10% | 49% | A |
| Embodiment 8 | 93 | A | 15.4 | 10% | 49% | A |
| Embodiment 9 | 93 | A | 17.8 | 10% | 49% | A |
| Embodiment 10 | 93 | A | 16.6 | 10% | 49% | A |
| Embodiment 11 | 93 | A | 15.1 | 10% | 49% | A |
| Embodiment 12 | 93 | A | 16.1 | 10% | 49% | A |
| Embodiment 13 | 93 | A | 16.4 | 10% | 49% | A |
| Embodiment 14 | 93 | A | 18.1 | 10% | 49% | A |
| Embodiment 15 | 93 | A | 18.1 | 10% | 49% | A |
| Embodiment 16 | 93 | A | 17.2 | 10% | 49% | A |
| Embodiment 17 | 93 | A | 16.1 | 10% | 49% | A |
| Embodiment 18 | 93 | A | 16.1 | 10% | 49% | A |
| Embodiment 19 | 93 | A | 16.3 | 10% | 49% | A |
| Embodiment 20 | 93 | A | 16.9 | 10% | 49% | A |
| Embodiment 21 | 93 | A | 18.1 | 10% | 49% | A |
| Embodiment 22 | 93 | A | 17.0 | 10% | 49% | A |
| Embodiment 23 | 93 | A | 16.6 | 10% | 49% | A |
| Embodiment 24 | 93 | A | 16.9 | 10% | 49% | A |
| Embodiment 25 | 93 | A | 18.1 | 10% | 49% | A |
| Embodiment 26 | 93 | A | 18.1 | 10% | 49% | A |
| Embodiment 27 | 93 | A | 17.0 | 10% | 49% | A |
| Embodiment 28 | 93 | A | 17.0 | 10% | 49% | A |
| Embodiment 29 | 93 | A | 16.6 | 10% | 49% | A |
| Embodiment 30 | 93 | A | 16.9 | 10% | 49% | A |
| Embodiment 31 | 93 | A | 18.1 | 10% | 49% | A |

| | FRONT WHITE SHADING $\Delta v^2$ | VIEWING ANGLE WHITE SHADING $\Delta v^2$ | LIGHT FASTNESS 2 D | LIGHT FASTNESS 3 D | SCREEN LUMINANCE DIFFERENCE |
|---|---|---|---|---|---|
| Embodiment 1 | C | B | — | — | B |
| Embodiment 2 | C | C | — | — | B |
| Embodiment 3 | C | C | — | — | B |
| Embodiment 4 | C | D | — | — | B |
| Embodiment 5 | C | D | — | — | B |

TABLE 3-continued

RESULT WHEN USING TWO-POLARIZING PLATE LC SHUTTER GLASSES

| | | | | | | |
|---|---|---|---|---|---|---|
| Embodiment 6 | C | B | — | — | B |
| Embodiment 7 | C | C | — | — | B |
| Embodiment 8 | C | D | — | — | B |
| Embodiment 9 | B | B | — | — | B |
| Embodiment 10 | B | C | — | — | B |
| Embodiment 11 | B | D | — | — | B |
| Embodiment 12 | B | C | — | — | B |
| Embodiment 13 | A | C | — | — | B |
| Embodiment 14 | B | B | — | — | B |
| Embodiment 15 | B | B | — | — | B |
| Embodiment 16 | B | C | — | — | B |
| Embodiment 17 | B | C | — | — | B |
| Embodiment 18 | AA | AA | — | — | B |
| Embodiment 19 | AA | AA | — | — | B |
| Embodiment 20 | B | C | — | — | B |
| Embodiment 21 | B | B | — | — | B |
| Embodiment 22 | B | C | — | — | B |
| Embodiment 23 | B | C | — | — | B |
| Embodiment 24 | AA | AA | — | — | B |
| Embodiment 25 | AA | AA | — | — | B |
| Embodiment 26 | AA | AA | — | — | B |
| Embodiment 27 | AA | AA | — | — | B |
| Embodiment 28 | AA | AA | — | — | B |
| Embodiment 29 | AA | AA | — | — | B |
| Embodiment 30 | AA | AA | — | — | B |
| Embodiment 31 | AA | AA | — | — | B |

*1KIND OF LIQUID CRYSTAL DISPLAY,
*2KIND OF LC SHUTTER GLASSES, and
*3KIND OF FILM DISPOSED IN LC SHUTTERS

TABLE 4

RESULT WHEN USING TWO-POLARIZING PLATE LC SHUTTER GLASSES

| | DISPLAY SIDE POLARIZING PLATE PROTECTION REGION OF LIQUID CRYSTAL DISPLAY | | | | | λ/4 FILM OF LC SHUTTER GLASSES | | | | |
|---|---|---|---|---|---|---|---|---|---|---|
| | KIND*1 | Re (550) (nm) | Rth (550) (nm) | Re (450)/ Re (550) | Re (630)/ Re (550) | GLASSES KIND*2 (FILM KIND*3) | Re (550) (nm) | Rth (550) (nm) | Re(450)/ Re(550) | Re(630)/ Re(550) |
| Embodiment 32 | 8 | 125 | 100 | 1.15 | 0.94 | F-2(22) | 138 | 74 | 0.89 | 1.04 |
| Embodiment 33 | 11 | 117 | 104 | 1.15 | 0.94 | F-2(22) | 138 | 74 | 0.89 | 1.04 |
| Embodiment 34 | 2 | 138 | 93 | 1.15 | 0.94 | E-2(21) | 125 | 72 | 0.82 | 1.06 |
| Embodiment 35 | 14 | 125 | 8 | 1.15 | 0.94 | E-2(21) | 125 | 72 | 0.82 | 1.06 |
| Embodiment 36 | 16 | 125 | 8 | 1.12 | 0.95 | E-2(21) | 125 | 72 | 0.82 | 1.06 |
| Embodiment 37 | 9 | 125 | 100 | 1.15 | 0.94 | E-2(21) | 125 | 72 | 0.82 | 1.06 |
| Embodiment 38 | 8 | 125 | 100 | 1.15 | 0.94 | E-2(21) | 125 | 72 | 0.82 | 1.06 |
| Embodiment 39 | 11 | 117 | 104 | 1.15 | 0.94 | E-2(21) | 125 | 72 | 0.82 | 0.94 |
| Embodiment 40 | 13 | 138 | 3 | 1.15 | 0.94 | J-2(26) | 138 | 3 | 1.15 | 0.94 |
| Embodiment 41 | 4 | 138 | 120 | 1.15 | 0.94 | J-2(26) | 138 | 3 | 1.15 | 0.94 |
| Embodiment 42 | 5 | 138 | 160 | 1.15 | 0.94 | J-2(26) | 138 | 3 | 1.15 | 0.94 |
| Embodiment 43 | 14 | 125 | 8 | 1.15 | 0.94 | J-2(26) | 138 | 3 | 1.15 | 0.94 |
| Embodiment 44 | 10 | 125 | 160 | 1.15 | 0.94 | J-2(26) | 138 | 3 | 1.15 | 0.94 |
| Embodiment 45 | 13 | 138 | 3 | 1.15 | 0.94 | I-2(25) | 120 | 60 | 1.15 | 0.94 |
| Embodiment 46 | 4 | 138 | 120 | 1.15 | 0.94 | I-2(25) | 120 | 60 | 1.15 | 0.94 |
| Embodiment 47 | 5 | 138 | 160 | 1.15 | 0.94 | I-2(25) | 120 | 60 | 1.15 | 0.94 |
| Embodiment 48 | 14 | 125 | 8 | 1.15 | 0.94 | I-2(25) | 120 | 60 | 1.15 | 0.94 |
| Embodiment 49 | 10 | 125 | 160 | 1.15 | 0.94 | I-2(25) | 120 | 60 | 1.15 | 0.94 |
| Embodiment 50 | 13 | 138 | 3 | 1.15 | 0.94 | K-2(27) | 150 | 49 | 1.15 | 0.94 |
| Embodiment 51 | 4 | 138 | 120 | 1.15 | 0.94 | K-2(27) | 150 | 49 | 1.15 | 0.94 |
| Embodiment 52 | 5 | 138 | 160 | 1.15 | 0.94 | K-2(27) | 150 | 49 | 1.15 | 0.94 |
| Embodiment 53 | 14 | 125 | 8 | 1.15 | 0.94 | K-2(27) | 150 | 49 | 1.15 | 0.94 |
| Embodiment 54 | 10 | 125 | 160 | 1.15 | 0.94 | K-2(27) | 150 | 49 | 1.15 | 0.94 |
| Embodiment 55 | 13 | 138 | 3 | 1.15 | 0.94 | G-2(23) | 120 | 64 | 0.89 | 1.04 |
| Embodiment 56 | 4 | 138 | 120 | 1.15 | 0.94 | G-2(23) | 120 | 64 | 0.89 | 1.04 |
| Embodiment 57 | 5 | 138 | 160 | 1.15 | 0.94 | G-2(23) | 120 | 64 | 0.89 | 1.04 |
| Embodiment 58 | 14 | 125 | 8 | 1.15 | 0.94 | G-2(23) | 120 | 64 | 0.89 | 1.04 |
| Embodiment 59 | 10 | 125 | 160 | 1.15 | 0.94 | G-2(23) | 120 | 64 | 0.89 | 1.04 |
| Embodiment 60 | 13 | 138 | 3 | 1.15 | 0.94 | H-2(24) | 150 | 80 | 0.89 | 1.04 |
| Embodiment 61 | 4 | 138 | 120 | 1.15 | 0.94 | H-2(24) | 150 | 80 | 0.89 | 1.04 |
| Embodiment 62 | 5 | 138 | 160 | 1.15 | 0.94 | H-2(24) | 150 | 80 | 0.89 | 1.04 |

TABLE 4-continued

RESULT WHEN USING TWO-POLARIZING PLATE LC SHUTTER GLASSES

| | FRONT WHITE LUMINANCE (cd/m$^2$) | FRONT WHITE LUMINANCE VARIATION | VIEWING ANGLE WHITE LUMINANCE (cd/m$^2$) | FRONT CROSSTALK | VIEWING ANGLE CROSSTALK | VIEWING ANGLE CROSSTALK DIFFERENCE |
|---|---|---|---|---|---|---|
| Embodiment 32 | 93 | A | 17.0 | 10% | 49% | A |
| Embodiment 33 | 93 | A | 16.6 | 10% | 49% | A |
| Embodiment 34 | 93 | A | 16.9 | 10% | 49% | A |
| Embodiment 35 | 93 | A | 18.1 | 10% | 49% | A |
| Embodiment 36 | 93 | A | 18.1 | 10% | 49% | A |
| Embodiment 37 | 93 | A | 17.0 | 10% | 49% | A |
| Embodiment 38 | 93 | A | 17.0 | 10% | 49% | A |
| Embodiment 39 | 93 | B | 16.6 | 10% | 49% | A |
| Embodiment 40 | 93 | A | 17.9 | 10% | 49% | A |
| Embodiment 41 | 93 | A | 16.2 | 10% | 49% | A |
| Embodiment 42 | 93 | A | 15.0 | 10% | 49% | A |
| Embodiment 43 | 93 | A | 18.0 | 10% | 49% | A |
| Embodiment 44 | 93 | A | 15.4 | 10% | 49% | A |
| Embodiment 45 | 93 | A | 17.9 | 10% | 49% | A |
| Embodiment 46 | 93 | A | 16.3 | 10% | 49% | A |
| Embodiment 47 | 93 | A | 16.8 | 10% | 49% | A |
| Embodiment 48 | 93 | A | 18.0 | 10% | 49% | A |
| Embodiment 49 | 93 | A | 17.0 | 10% | 49% | A |
| Embodiment 50 | 93 | A | 17.7 | 10% | 49% | A |
| Embodiment 51 | 93 | A | 16.1 | 10% | 49% | A |
| Embodiment 52 | 93 | A | 15.0 | 10% | 49% | A |
| Embodiment 53 | 93 | A | 17.9 | 10% | 49% | A |
| Embodiment 54 | 93 | A | 15.3 | 10% | 49% | A |
| Embodiment 55 | 93 | A | 17.9 | 10% | 49% | A |
| Embodiment 56 | 93 | A | 16.3 | 10% | 49% | A |
| Embodiment 57 | 93 | A | 16.8 | 10% | 49% | A |
| Embodiment 58 | 93 | A | 18.0 | 10% | 49% | A |
| Embodiment 59 | 93 | A | 17.0 | 10% | 49% | A |
| Embodiment 60 | 93 | A | 17.8 | 10% | 49% | A |
| Embodiment 61 | 93 | A | 16.2 | 10% | 49% | A |
| Embodiment 62 | 93 | A | 15.0 | 10% | 49% | A |

| | FRONT WHITE SHADING $\Delta v^2$ | VIEWING ANGLE WHITE SHADING $\Delta v^2$ | LIGHT FASTNESS 2D | LIGHT FASTNESS 3D | SCREEN LUMINANCE DIFFERENCE |
|---|---|---|---|---|---|
| Embodiment 32 | AA | AA | — | — | B |
| Embodiment 33 | AA | AA | — | — | B |
| Embodiment 34 | AA | A | — | — | B |
| Embodiment 35 | AA | A | — | — | B |
| Embodiment 36 | AA | A | — | — | B |
| Embodiment 37 | AA | AA | — | — | B |
| Embodiment 38 | AA | AA | — | — | B |
| Embodiment 39 | AA | A | — | — | B |
| Embodiment 40 | C | B | — | — | A |
| Embodiment 41 | C | D | — | — | A |
| Embodiment 42 | C | D | — | — | A |
| Embodiment 43 | C | B | — | — | A |
| Embodiment 44 | C | D | — | — | A |
| Embodiment 45 | B | B | — | — | B |
| Embodiment 46 | B | C | — | — | B |
| Embodiment 47 | B | D | — | — | B |
| Embodiment 48 | B | B | — | — | B |
| Embodiment 49 | B | D | — | — | B |
| Embodiment 50 | C | A | — | — | B |
| Embodiment 51 | C | A | — | — | B |
| Embodiment 52 | C | A | — | — | B |
| Embodiment 53 | C | A | — | — | B |
| Embodiment 54 | C | A | — | — | B |
| Embodiment 55 | A | A | — | — | B |
| Embodiment 56 | A | A | — | — | B |
| Embodiment 57 | A | A | — | — | B |
| Embodiment 58 | A | A | — | — | B |
| Embodiment 59 | A | A | — | — | B |
| Embodiment 60 | A | A | — | — | B |

TABLE 4-continued

RESULT WHEN USING TWO-POLARIZING PLATE LC SHUTTER GLASSES

| | | | | | |
|---|---|---|---|---|---|
| Embodiment 61 | A | A | — | — | B |
| Embodiment 62 | A | A | — | — | B |

*1KIND OF LIQUID CRYSTAL DISPLAY,
*2KIND OF LC SHUTTER GLASSES, and
*3KIND OF FILM DISPOSED IN LC SHUTTERS

TABLE 5

RESULT WHEN USING TWO-POLARIZING PLATE LC SHUTTER GLASSES

| | DISPLAY SIDE POLARIZING PLATE PROTECTION REGION OF LIQUID CRYSTAL DISPLAY | | | | | λ/4 FILM OF LC SHUTTER GLASSES | | | | |
|---|---|---|---|---|---|---|---|---|---|---|
| | KIND*1 | Re (550) (nm) | Rth (550) (nm) | Re (450)/ Re (550) | Re (630)/ Re (550) | GLASSES KIND*2 (FILM KIND*3) | Re (550) (nm) | Rth (550) (nm) | Re(450)/ Re(550) | Re(630)/ Re(550) |
| Embodiment 63 | 14 | 125 | 8 | 1.15 | 0.94 | H-2(24) | 150 | 80 | 0.89 | 1.04 |
| Embodiment 64 | 10 | 125 | 160 | 1.15 | 0.94 | H-2(24) | 150 | 80 | 0.89 | 1.04 |
| Embodiment 65 | 46 | 125 | 8 | 1.15 | 0.94 | F-2(22) | 138 | 74 | 0.89 | 1.04 |
| Embodiment 66 | 47 | 125 | 8 | 1.15 | 0.94 | F-2(22) | 138 | 74 | 0.89 | 1.04 |
| Embodiment 67 | 48 | 125 | 8 | 1.15 | 0.94 | F-2(22) | 138 | 74 | 0.89 | 1.04 |
| Embodiment 68 | 49 | 125 | 8 | 1.15 | 0.94 | F-2(22) | 138 | 74 | 0.89 | 1.04 |
| Embodiment 69 | 13 | 138 | 3 | 1.15 | 0.94 | F-2(22) | 138 | 74 | 0.89 | 1.04 |
| Embodiment 70 | 4 | 138 | 120 | 1.15 | 0.94 | F-2(22) | 138 | 74 | 0.89 | 1.04 |
| Embodiment 71 | 5 | 138 | 160 | 1.15 | 0.94 | F-2(22) | 138 | 74 | 0.89 | 1.04 |
| Embodiment 72 | 10 | 125 | 160 | 1.15 | 0.94 | F-2(22) | 138 | 74 | 0.89 | 1.04 |
| Embodiment 73 | 31 | 138 | 3 | 1.15 | 0.94 | F-2(22) | 138 | 74 | 0.89 | 1.04 |
| Embodiment 74 | 28 | 138 | 120 | 1.15 | 0.94 | F-2(22) | 138 | 74 | 0.89 | 1.04 |
| Embodiment 75 | 29 | 138 | 160 | 1.15 | 0.94 | F-2(22) | 138 | 74 | 0.89 | 1.04 |
| Embodiment 76 | 32 | 125 | 8 | 1.15 | 0.94 | F-2(22) | 138 | 74 | 0.89 | 1.04 |
| Embodiment 77 | 30 | 125 | 160 | 1.15 | 0.94 | F-2(22) | 138 | 74 | 0.89 | 1.04 |
| Embodiment 78 | 36 | 138 | 3 | 1.15 | 0.94 | F-2(22) | 138 | 74 | 0.89 | 1.04 |
| Embodiment 79 | 33 | 138 | 120 | 1.15 | 0.94 | F-2(22) | 138 | 74 | 0.89 | 1.04 |
| Embodiment 80 | 34 | 138 | 160 | 1.15 | 0.94 | F-2(22) | 138 | 74 | 0.89 | 1.04 |
| Embodiment 81 | 37 | 125 | 8 | 1.15 | 0.94 | F-2(22) | 138 | 74 | 0.89 | 1.04 |
| Embodiment 82 | 35 | 125 | 160 | 1.15 | 0.94 | F-2(22) | 138 | 74 | 0.89 | 1.04 |
| Embodiment 83 | 41 | 138 | 3 | 1.15 | 0.94 | F-2(22) | 138 | 74 | 0.89 | 1.04 |
| Embodiment 84 | 38 | 138 | 120 | 1.15 | 0.94 | F-2(22) | 138 | 74 | 0.89 | 1.04 |
| Embodiment 85 | 39 | 138 | 160 | 1.15 | 0.94 | F-2(22) | 138 | 74 | 0.89 | 1.04 |
| Embodiment 86 | 42 | 125 | 8 | 1.15 | 0.94 | F-2(22) | 138 | 74 | 0.89 | 1.04 |
| Embodiment 87 | 40 | 125 | 160 | 1.15 | 0.94 | F-2(22) | 138 | 74 | 0.89 | 1.04 |
| Embodiment 88 | 18 | 138 | 120 | 1.00 | 1.00 | F-2(22) | 138 | 74 | 0.89 | 1.04 |
| Embodiment 89 | 43 | 138 | 120 | 1.00 | 1.00 | F-2(22) | 138 | 74 | 0.89 | 1.04 |
| Embodiment 90 | 44 | 138 | 120 | 1.00 | 1.00 | F-2(22) | 138 | 74 | 0.89 | 1.04 |
| Embodiment 91 | 45 | 138 | 120 | 1.00 | 1.00 | F-2(22) | 138 | 74 | 0.89 | 1.04 |
| Comparative Embodiment 1 | 50 | (No λ/4 Film) | | | | W | (No λ/4 Film) | | | |
| Comparative Embodiment 2 | 6 | 138 | 183 | 1.15 | 6 | 138 | 183 | 1.15 | 6 | 138 |

| | FRONT WHITE LUMINANCE (cd/m$^2$) | FRONT WHITE LUMINANCE VARIATION | VIEWING ANGLE WHITE LUMINANCE (cd/m$^2$) | FRONT CROSSTALK | VIEWING ANGLE CROSSTALK | VIEWING ANGLE CROSSTALK DIFFERENCE |
|---|---|---|---|---|---|---|
| Embodiment 63 | 93 | A | 17.9 | 10% | 49% | A |
| Embodiment 64 | 93 | A | 15.3 | 10% | 49% | A |
| Embodiment 65 | 93 | A | 18.1 | 10% | 49% | A |
| Embodiment 66 | 93 | A | 18.1 | 10% | 49% | A |
| Embodiment 67 | 93 | A | 18.1 | 10% | 49% | A |
| Embodiment 68 | 93 | A | 18.1 | 10% | 49% | A |
| Embodiment 69 | 93 | A | 17.9 | 10% | 49% | A |
| Embodiment 70 | 93 | B | 16.2 | 10% | 49% | A |
| Embodiment 71 | 93 | A | 15.0 | 10% | 49% | A |
| Embodiment 72 | 93 | A | 15.4 | 10% | 49% | A |
| Embodiment 73 | 93 | A | 17.8 | 11% | 49% | A |
| Embodiment 74 | 93 | A | 16.1 | 11% | 49% | A |
| Embodiment 75 | 93 | A | 15.0 | 11% | 49% | A |
| Embodiment 76 | 93 | A | 17.9 | 11% | 49% | A |
| Embodiment 77 | 93 | A | 15.4 | 11% | 49% | A |
| Embodiment 78 | 93 | A | 17.9 | 10% | 49% | A |
| Embodiment 79 | 93 | A | 16.2 | 10% | 49% | A |
| Embodiment 80 | 93 | A | 15.0 | 10% | 49% | A |

TABLE 5-continued

RESULT WHEN USING TWO-POLARIZING PLATE LC SHUTTER GLASSES

| | | | | | | |
|---|---|---|---|---|---|---|
| Embodiment 81 | 93 | A | 18.0 | 10% | 49% | A |
| Embodiment 82 | 93 | A | 15.4 | 10% | 49% | A |
| Embodiment 83 | 93 | A | 17.9 | 10% | 49% | A |
| Embodiment 84 | 93 | A | 16.2 | 10% | 49% | A |
| Embodiment 85 | 93 | A | 15.0 | 10% | 49% | A |
| Embodiment 86 | 93 | A | 18.0 | 10% | 49% | A |
| Embodiment 87 | 93 | A | 15.4 | 10% | 49% | A |
| Embodiment 88 | 93 | A | 16.1 | 10% | 49% | A |
| Embodiment 89 | 93 | A | 16.1 | 10% | 49% | A |
| Embodiment 90 | 93 | A | 16.1 | 10% | 49% | A |
| Embodiment 91 | 93 | A | 16.1 | 10% | 49% | A |
| Comparative Embodiment 1 | 93 | D | 14.9 | 10% | 49% | — |
| Comparative Embodiment 2 | 93 | B | 14.6 | 10% | 49% | A |

| | FRONT WHITE SHADING $\Delta v^2$ | VIEWING ANGLE WHITE SHADING $\Delta v^2$ | LIGHT FASTNESS 2 D | LIGHT FASTNESS 3 D | SCREEN LUMINANCE DIFFERENCE |
|---|---|---|---|---|---|
| Embodiment 63 | A | A | — | — | B |
| Embodiment 64 | A | A | A | A | B |
| Embodiment 65 | AA | AA | A | D | B |
| Embodiment 66 | AA | AA | B | B | B |
| Embodiment 67 | AA | AA | D | D | B |
| Embodiment 68 | AA | AA | — | — | B |
| Embodiment 69 | AA | AA | — | — | B |
| Embodiment 70 | AA | AA | — | — | B |
| Embodiment 71 | AA | AA | — | — | B |
| Embodiment 72 | AA | AA | — | — | B |
| Embodiment 73 | AA | AA | — | — | B |
| Embodiment 74 | AA | AA | — | — | B |
| Embodiment 75 | AA | AA | — | — | B |
| Embodiment 76 | AA | AA | — | — | B |
| Embodiment 77 | AA | AA | — | — | B |
| Embodiment 78 | AA | AA | — | — | B |
| Embodiment 79 | AA | AA | — | — | B |
| Embodiment 80 | AA | AA | — | — | B |
| Embodiment 81 | AA | AA | — | — | B |
| Embodiment 82 | AA | AA | — | — | B |
| Embodiment 83 | AA | AA | — | — | B |
| Embodiment 84 | AA | AA | — | — | B |
| Embodiment 85 | AA | AA | — | — | B |
| Embodiment 86 | AA | AA | — | — | B |
| Embodiment 87 | AA | AA | — | — | B |
| Embodiment 88 | AA | AA | — | — | B |
| Embodiment 89 | AA | AA | — | — | B |
| Embodiment 90 | AA | AA | — | — | B |
| Embodiment 91 | AA | AA | — | — | B |
| Comparative Embodiment 1 | — | — | — | — | D |
| Comparative Embodiment 2 | C | D | — | — | B |

*1KIND OF LIQUID CRYSTAL DISPLAY,
*2KIND OF LC SHUTTER GLASSES, and
*3KIND OF FILM DISPOSED IN LC SHUTTERS It can be seen from the above-described results that in the stereoscopic image recognition apparatus which includes the liquid crystal display I having the display side polarizing plate protection region satisfying the above Expression (I) and the two-polarizing plate type LC shutter glasses (the time division image display shutter II) having the λ/4 plate, as compared with a current product stereoscopic image recognition apparatus where none of the display side polarizing plate protection region of the liquid crystal display and the LC shutter glasses include the λ/4 plate, and a stereoscopic image recognition apparatus which includes the liquid crystal display having the display side polarizing plate protection region which does not satisfy the above Expression (I), the front white luminance, the front crosstalk, and the viewing angle crosstalk are the same, the front white luminance does not vary, and viewing angle luminance is high.

Upon comparison of four items of the front white luminance, the front crosstalk, the viewing angle crosstalk, and the front white luminance variation of the stereoscopic image recognition apparatuses according to Embodiments 1 to 91 with four items of the front white luminance, the front crosstalk, the viewing angle crosstalk, and the front white luminance variation of the stereoscopic image recognition apparatuses according to the comparative example 1 having no λ/4 plate in the display side polarizing plate protection region and the LC shutter glasses, it can be seen that the stereoscopic image recognition apparatuses of the present invention are notably excellent from the viewpoint of the front white luminance variation while maintaining the equivalent front white luminance, front crosstalk, and viewing angle crosstalk.

In addition, referring to comparative example 2, although the stereoscopic image recognition apparatus is the same as the stereoscopic image recognition apparatuses according to Embodiments 1 to 5 except that Rth of the display side polarizing plate protection region is different, since Rth of the display side polarizing plate protection region does not satisfy the above Expression (I) in the comparative example 2, the viewing angle white luminance is lower than that in the comparative example 1. From this, an effect of the present invention can be initially achieved by employing a λ/4 plate in both of the display side polarizing plate protection region of the liquid crystal display and the LC shutter glasses, and by the display side polarizing plate protection region satisfying the Expression (I).

It can be seen that the stereoscopic image recognition apparatus having the λ/4 plate of the LC shutter glasses which satisfies the above Expressions (XII) and (XIII) is an excellent stereoscopic image recognition apparatus where the front white shading and the viewing angle shading are good, and a color difference is not viewed even if the LC shutter glasses are rotated, along with the characteristics (the front white luminance, the front crosstalk, the viewing angle crosstalk, the front white luminance variation, and the viewing angle white luminance). Specifically, referring to Embodiments 3, 6, 7 and 10 employing the LC shutter glasses A-2, Embodiments 20 to 23 employing the LC shutter glasses C-2, Embodiments 24, 25, 28 and 29 employing the LC shutter glasses D-2, and Embodiments 30 to 33 employing the LC shutter glasses F-2, they are stereoscopic image recognition apparatuses having the same configuration except that λ/4 films used in the LC shutter glasses are different. However, it can be seen that in the stereoscopic image recognition apparatuses according to Embodiments 3, 6, 7 and 10 employing the LC shutter glasses A-2, and Embodiments 20 to 23 employing the LC shutter glasses C-2, since the λ/4 plate of the LC shutter glasses does not satisfy the above Expressions (XII) and (XIII), variations are large as compared with those in the stereoscopic image recognition apparatuses according to Embodiments 24, 25, 28 and 29 employing the LC shutter glasses D-2, and Embodiments 30 to 33 employing the LC shutter glasses F-2.

In addition, it can be seen from the comparison between the above-described Embodiments that a λ/4 plate of the LC shutter glasses and a λ/4 plate of the display side polarizing plate protection region are preferably made of different materials in some cases. That is to say, in the related art, if a λ/4 plate of the LC shutter glasses and a λ/4 plate of the display side polarizing plate protection region are made of the same material, wavelength dispersibility of Re or Rth are the same, which is thus preferable from the viewpoint of circular polarization compensation. However, it can be seen that Re of the λ/4 plate of the LC shutter glasses preferably shows backward dispersibility (shows such wavelength dispersibility that the longer a wavelength is, the larger wavelength dispersion of Re is in the visible ray region).

As a result of comparison with regard to a relationship between Re (550) of a λ/4 plate and the front white shading v' in a stereoscopic image recognition apparatus where Re of a λ/4 plate of the display side polarizing plate protection region shows forward dispersion, as Re (550) of the λ/4 plate of the display side polarizing plate protection region is reduced, the front white shading v' was also reduced. For example, upon comparison of the white shading v' of Embodiments 20 to 23, the lower Re (550) of the λ/4 plate of the display side polarizing plate protection region was, the more reduced was a v' variation in white display when the LC shutter glasses were rotated. The front color shading Δv' of Embodiments 21 to 23 was evaluated as somewhat B, but the color variation was scarcely viewed and was evaluated as being close to A.

It can be seen from the comparison of Embodiments 1, 4 to 6 and 8 and Embodiments 40 to 44 that if Rth of a λ/4 plate used in the LC shutter glasses is low, the screen luminance difference of the liquid crystal display is improved.

It can be seen from the comparison of the viewing angle white shading of Embodiments 1 to 5 that the lower Rth of the display side polarizing plate protection region is, the more reduced a color variation is.

It can be seen from the comparison of the light fastness of Embodiments 65 to 68 that the display side polarizing plate protection region having necessary UV absorption power is necessary from the viewpoint of the light fastness of the optically anisotropic layer included in the display side polarizing plate protection region and the display side polarizer of the liquid crystal display. Specifically, in Embodiment 68 employing the film 49 which does not satisfy necessary UV absorption power from the viewpoint of the light fastness in the display side polarizing plate protection region, reduction in display performance was shown in both of 2D and 3D after the light fastness was tested, and, in Embodiment 66 where a support which satisfies necessary UV absorption power from the viewpoint of the light fastness is disposed between the optically anisotropic layer of the display side polarizing plate protection region and the display side polarizing plate, only 3D display performance was reduced after the light fastness was test. On the other hand, in Embodiments 65 and 67 employing the films 46 and 48 in the display side polarizing plate protection region, a support satisfying necessary UV absorption power was disposed on the outer side of the open loop algorithm of the display side polarizing plate protection region and the display side polarizing plate, and thus performance reduction was not shown in any of 2D and 3D display after the light fastness was tested. From this, it can be seen that it is necessary to provide a support and a function layer having necessary UV absorption power on the outer sides of the optically anisotropic layer included in the display side polarizing plate protection region and the display side polarizing plate from the viewpoint of the light fastness.

Reference Examples

In Embodiment 3, a stereoscopic image recognition apparatus manufactured in the same manner as Embodiment 3 except that the liquid crystal display 50 is used instead of the liquid crystal display 2 was evaluated in the same manner. As a result, the front white luminance and the viewing angle white luminance were reduced, and the front crosstalk and the viewing angle crosstalk were increased (deteriorated). In addition, in Embodiment 3, a stereoscopic image recognition apparatus manufactured in the same manner as Embodiment 3 except that the LC shutter glasses W was used instead of the LC shutter glasses A-2 as LC shutter glasses was also evaluated in the same manner; however, in the same manner as the previous description, the front white luminance and the viewing angle white luminance were reduced, and the front crosstalk and the viewing angle crosstalk were increased (deteriorated). From this, it can be seen that effects of the present invention can be achieved by using a λ/4 plate in both the liquid crystal display and the LC shutter glasses and satisfying the above Expression (I).

In Embodiments 1 to 91 and the comparative examples 1 and 2, the evaluation was made using "LC-46LV3" manufactured by SHARP Corporation as a liquid crystal display and "AN-3DG10" manufactured by SHARP Corporation as LC shutter glasses, and a case of using "UN46C7000" manufactured by SAMSUNG Corporation as a liquid crystal display and "SSG-2200AR" manufactured by SAMSUNG Corporation as LC shutter glasses was also evaluated in the same manner. As a result, in the "UN46C7000" manufactured by SAMSUNG Corporation, the absolute value of obtained crosstalk was decreased; however, a relationship between Rth of the display side polarizing plate protection region, optical characteristics of the LC shutter glasses, and the 3D display characteristics showed the same propensity. It is estimated that the reason why crosstalk was decreased in the "UN46C7000" manufactured by SAMSUNG Corporation was a TV circuit factor. That is to say, as described above, in the "LC-46LV3" manufactured by SHARP Corporation, in a 3D content item which displays a black image for one eye and displays a white image for the other eye, it was confirmed that the white image was mixed with the black image due to the TV circuit factor; however, in the "UN46C7000" manufactured by SAMSUNG Corporation, the white image was slightly mixed with the black image due to the TV circuit factor (3D signal processes), and crosstalk in a product configuration was greatly reduced up to 2%. However, since a relationship between Rth of the display side polarizing plate protection region, optical characteristics of the LC shutter glasses, and the 3D display characteristics showed the same propensity as the above-described result in the "UN46C7000" manufactured by SAMSUNG Corporation as well, it is clear that effects of the present invention are achieved by the λ/4 plates of the display side polarizing plate protection region and the LC shutter glasses satisfying the above Expressions (I) to (XIII) regardless of the crosstalk.

Although in Embodiments 31, 69 to 72, CLEAR LR "CV-LC" (manufactured by Fujifilm Corporation) of a low reflection film is used in the viewing side polarizing plate of the liquid crystal display, since the same effects were also confirmed in the Embodiments 73 to 77 using "AGA1" (manufactured by Sanritz Automation Co., Ltd.) of a reflection inhibiting film, in Embodiments 78 to 82 using CLEAR LR "CV-LC" (manufactured by Fujifilm Corporation) of a reflection inhibiting film, and in Embodiments 83 to 87 using CLEAR AR (manufactured by SONY Chemical Corp.) of a low reflection film, it can be seen that effects of the present invention can be achieved without depending on the kinds of functions layers disposed at the outmost surface of the viewing side polarizing plate of the liquid crystal display. In addition, it is estimated that the same effects can be achieved in a case of using an anti-glare film or an anti-reflection film as well.

In Embodiments 1 to 91, a stereoscopic image recognition apparatus manufactured in the same manner as Embodiments 1 to 91 except that the attached angle 135 degrees of the slow axis of the λ/4 plate forming the polarizing plates 1 to 49 and the absorption axis of the polarizer used in the stereoscopic image recognition apparatus was changed was evaluated in the same manner. As a result, if the slow axis of the λ/4 plate A and the absorption axis of the polarizer is 35 to 55° or 125 to 145°, 3D display characteristic showed the same propensity as in Embodiments 1 to 91. Particularly, if the slow axis of the λ/4 plate and the absorption axis of the polarizer is 40 to 50° or 130 to 140°, 3D display characteristic showed the same result as in Embodiments 1 to 91.

Although, in the above-described Embodiments 1 to 91, as the λ/4 plates of the display side polarizing plate protection region and the LC shutter glasses, a cellulose acylate-based film, an optically anisotropic layer containing a liquid crystalline compound, a norborene-based polymer film, and a polycarbonate-based film, the same effects will be achieved even using, for example, a cellulose acylate-based film, and other films including, as a main component, cellulose acylate (for example, a film of cellulose propionate, cellulose bytyrate, or the like), polyolefin (for example, norborene-based polymer), poly(meth)acrylic ester (for example, polymethylmethacrylate), polycarbonate, polyester, or polysulfone, as the λ/4 plates of the display side polarizing plate protection region and the LC shutter glasses. In addition, it is estimated that the same effects will be achieved even using other commercially available polymer films (in a norborene-based polymer film, ARTON (manufactured by JSR Corp.), ZEONOR (manufactured by Zeon Corp. in Japan), and the like).

Results of evaluating 3D display performance are shown in the following Tables 6 to 8 using the one-polarizing plate type LC shutter glasses.

TABLE 6

RESULT WHEN USING ONE-POLARIZING PLATE TYPE LC SHUTTER GLASSES

| | DISPLAY SIDE POLARIZING PLATE PROTECTION REGION OF LIQUID CRYSTAL DISPLAY | | | | | λ/4 FILM OF LC SHUTTER GLASSES | | | | |
|---|---|---|---|---|---|---|---|---|---|---|
| | KIND*1 | Re (550) (nm) | Rth (550) (nm) | Re (450)/ Re (550) | Re (630)/ Re (550) | GLASSES KIND*2 (FILM KIND*3) | Re (550) (nm) | Rth (550) (nm) | Re(450)/ Re(550) | Re(630)/ Re(550) |
| Embodiment 92 | 13 | 138 | 3 | 1.15 | 0.94 | A-1(1) | 138 | 54 | 1.15 | 0.94 |
| Embodiment 93 | 3 | 138 | 42 | 1.15 | 0.94 | A-1(1) | 138 | 54 | 1.15 | 0.94 |
| Embodiment 94 | 2 | 138 | 93 | 1.15 | 0.94 | A-1(1) | 138 | 54 | 1.15 | 0.94 |
| Embodiment 95 | 4 | 138 | 120 | 1.15 | 0.94 | A-1(1) | 138 | 54 | 1.15 | 0.94 |
| Embodiment 96 | 5 | 138 | 160 | 1.15 | 0.94 | A-1(1) | 138 | 54 | 1.15 | 0.94 |
| Embodiment 97 | 14 | 125 | 8 | 1.15 | 0.94 | A-1(1) | 138 | 54 | 1.15 | 0.94 |
| Embodiment 98 | 8 | 125 | 100 | 1.15 | 0.94 | A-1(1) | 138 | 54 | 1.15 | 0.94 |
| Embodiment 99 | 10 | 125 | 160 | 1.15 | 0.94 | A-1(1) | 138 | 54 | 1.15 | 0.94 |
| Embodiment 100 | 15 | 117 | 11 | 1.15 | 0.94 | A-1(1) | 138 | 54 | 1.15 | 0.94 |
| Embodiment 101 | 11 | 117 | 104 | 1.15 | 0.94 | A-1(1) | 138 | 54 | 1.15 | 0.94 |
| Embodiment 102 | 12 | 117 | 160 | 1.15 | 0.94 | A-1(1) | 138 | 54 | 1.15 | 0.94 |
| Embodiment 103 | 18 | 138 | 120 | 1.00 | 1.00 | A-1(1) | 138 | 54 | 1.15 | 0.94 |
| Embodiment 104 | 20 | 138 | 111 | 0.82 | 1.06 | A-1(1) | 138 | 54 | 1.15 | 0.94 |
| Embodiment 105 | 14 | 125 | 8 | 1.15 | 0.94 | B-1(7) | 125 | 61 | 1.15 | 0.94 |
| Embodiment 106 | 16 | 125 | 8 | 1.12 | 0.95 | B-1(7) | 125 | 61 | 1.15 | 0.94 |
| Embodiment 107 | 8 | 125 | 100 | 1.15 | 0.94 | B-1(7) | 125 | 61 | 1.15 | 0.94 |
| Embodiment 108 | 18 | 138 | 120 | 1.00 | 1.00 | C-1(17) | 138 | 81 | 1.00 | 1.00 |

TABLE 6-continued

RESULT WHEN USING ONE-POLARIZING PLATE TYPE LC SHUTTER GLASSES

| | | | | | | | | | | |
|---|---|---|---|---|---|---|---|---|---|---|
| Embodiment 109 | 18 | 138 | 120 | 1.00 | 1.00 | D-1(19) | 138 | 72 | 0.82 | 1.06 |
| Embodiment 110 | 20 | 138 | 111 | 0.82 | 1.06 | D-1(19) | 138 | 72 | 0.82 | 1.06 |
| Embodiment 111 | 2 | 138 | 93 | 1.15 | 0.94 | C-1(17) | 138 | 81 | 1.00 | 1.00 |
| Embodiment 112 | 14 | 125 | 8 | 1.15 | 0.94 | C-1(17) | 138 | 81 | 1.00 | 1.00 |
| Embodiment 113 | 8 | 125 | 100 | 1.15 | 0.94 | C-1(17) | 138 | 81 | 1.00 | 1.00 |
| Embodiment 114 | 11 | 117 | 104 | 1.15 | 0.94 | C-1(17) | 138 | 81 | 1.00 | 1.00 |
| Embodiment 115 | 2 | 138 | 93 | 1.15 | 0.94 | D-1(19) | 138 | 72 | 0.82 | 1.06 |
| Embodiment 116 | 14 | 125 | 8 | 1.15 | 0.94 | D-1(19) | 138 | 72 | 1.82 | 1.06 |
| Embodiment 117 | 16 | 125 | 8 | 1.15 | 0.95 | D-1(19) | 138 | 72 | 1.82 | 1.06 |
| Embodiment 118 | 9 | 125 | 100 | 1.15 | 0.94 | D-1(19) | 138 | 72 | 1.82 | 1.06 |
| Embodiment 119 | 8 | 125 | 100 | 1.15 | 0.94 | D-1(19) | 138 | 72 | 1.82 | 1.06 |
| Embodiment 120 | 11 | 117 | 104 | 1.15 | 0.94 | D-1(19) | 138 | 72 | 1.82 | 1.06 |
| Embodiment 121 | 2 | 138 | 93 | 1.15 | 0.94 | F-1(22) | 138 | 74 | 1.89 | 1.04 |
| Embodiment 122 | 14 | 125 | 8 | 1.15 | 0.94 | F-1(22) | 138 | 74 | 1.89 | 1.04 |

| | FRONT WHITE LUMINANCE (cd/m$^2$) | FRONT WHITE LUMINANCE VARIATION | VIEWING ANGLE WHITE LUMINANCE (cd/m$^2$) | FRONT CROSSTALK | VIEWING ANGLE CROSSTALK | VIEWING ANGLE CROSSTALK DIFFERENCE |
|---|---|---|---|---|---|---|
| Embodiment 92 | 104 | B | 19.1 | 10% | 56% | B |
| Embodiment 93 | 104 | B | 18.5 | 10% | 58% | B |
| Embodiment 94 | 104 | B | 17.7 | 10% | 67% | B |
| Embodiment 95 | 104 | B | 16.6 | 10% | 69% | B |
| Embodiment 96 | 104 | B | 15.5 | 10% | 83% | B |
| Embodiment 97 | 104 | B | 19.2 | 11% | 57% | B |
| Embodiment 98 | 104 | B | 17.8 | 11% | 62% | B |
| Embodiment 99 | 104 | B | 15.6 | 11% | 75% | B |
| Embodiment 100 | 104 | B | 18.9 | 14% | 57% | B |
| Embodiment 101 | 104 | B | 17.3 | 14% | 60% | B |
| Embodiment 102 | 104 | B | 15.5 | 14% | 69% | B |
| Embodiment 103 | 104 | B | 16.6 | 11% | 69% | B |
| Embodiment 104 | 104 | A | 17.0 | 11% | 68% | B |
| Embodiment 105 | 104 | B | 19.4 | 10% | 57% | C |
| Embodiment 106 | 104 | B | 19.4 | 10% | 57% | C |
| Embodiment 107 | 104 | B | 17.8 | 10% | 62% | C |
| Embodiment 108 | 104 | B | 16.6 | 10% | 69% | B |
| Embodiment 109 | 104 | A | 16.6 | 11% | 68% | B |
| Embodiment 110 | 104 | A | 16.9 | 10% | 68% | B |
| Embodiment 111 | 104 | B | 17.7 | 11% | 67% | B |
| Embodiment 112 | 104 | B | 19.4 | 11% | 56% | B |
| Embodiment 113 | 104 | B | 17.8 | 11% | 61% | B |
| Embodiment 114 | 104 | B | 17.3 | 14% | 60% | B |
| Embodiment 115 | 104 | A | 17.7 | 11% | 69% | B |
| Embodiment 116 | 104 | A | 19.4 | 11% | 55% | B |
| Embodiment 117 | 104 | A | 19.4 | 11% | 55% | B |
| Embodiment 118 | 104 | A | 17.8 | 11% | 61% | B |
| Embodiment 119 | 104 | A | 17.8 | 11% | 61% | B |
| Embodiment 120 | 104 | A | 17.3 | 14% | 60% | B |
| Embodiment 121 | 104 | A | 17.7 | 11% | 68% | B |
| Embodiment 122 | 104 | A | 19.4 | 11% | 56% | B |

| | FRONT WHITE SHADING $\Delta v^2$ | VIEWING ANGLE WHITE SHADING $\Delta v^2$ | LIGHT FASTNESS 2D | LIGHT FASTNESS 3D | SCREEN LUMINANCE DIFFERENCE |
|---|---|---|---|---|---|
| Embodiment 92 | C | C | — | — | B |
| Embodiment 93 | C | C | — | — | B |
| Embodiment 94 | C | C | — | — | B |
| Embodiment 95 | C | C | — | — | B |
| Embodiment 96 | C | C | — | — | B |
| Embodiment 97 | C | C | — | — | B |
| Embodiment 98 | C | C | — | — | B |
| Embodiment 99 | C | C | — | — | B |
| Embodiment 100 | C | B | — | — | B |
| Embodiment 101 | C | B | — | — | B |
| Embodiment 102 | C | B | — | — | B |
| Embodiment 103 | C | C | — | — | B |
| Embodiment 104 | B | B | — | — | B |
| Embodiment 105 | B | B | — | — | B |
| Embodiment 106 | B | B | — | — | B |
| Embodiment 107 | B | B | — | — | B |
| Embodiment 108 | B | C | — | — | B |
| Embodiment 109 | A | B | — | — | B |

TABLE 6-continued

RESULT WHEN USING ONE-POLARIZING PLATE TYPE LC SHUTTER GLASSES

| | | | | | |
|---|---|---|---|---|---|
| Embodiment 110 | A | A | — | — | B |
| Embodiment 111 | C | C | — | — | B |
| Embodiment 112 | B | C | — | — | B |
| Embodiment 113 | B | C | — | — | B |
| Embodiment 114 | B | B | — | — | B |
| Embodiment 115 | B | B | — | — | B |
| Embodiment 116 | A | A | — | — | B |
| Embodiment 117 | A | A | — | — | B |
| Embodiment 118 | A | B | — | — | B |
| Embodiment 119 | A | B | — | — | B |
| Embodiment 120 | A | B | — | — | B |
| Embodiment 121 | B | B | — | — | B |
| Embodiment 122 | A | A | — | — | B |

*1KIND OF LIQUID CRYSTAL DISPLAY,
*2KIND OF LC SHUTTER GLASSES, and
*3KIND OF FILM DISPOSED IN LC SHUTTERS

TABLE 7

RESULT WHEN USING ONE-POLARIZING PLATE TYPE LC SHUTTER GLASSES

| | DISPLAY SIDE POLARIZING PLATE PROTECTION REGION OF LIQUID CRYSTAL DISPLAY | | | | | λ/4 FILM OF LC SHUTTER GLASSES | | | | |
|---|---|---|---|---|---|---|---|---|---|---|
| | KIND*1 | Re (550) (nm) | Rth (550) (nm) | Re (450)/ Re (550) | Re (630)/ Re (550) | GLASSES KIND*2 (FILM KIND*3) | Re (550) (nm) | Rth (550) (nm) | Re(450)/ Re(550) | Re(630)/ Re(550) |
| Embodiment 123 | 8 | 125 | 100 | 1.15 | 0.94 | F-1(22) | 138 | 74 | 0.89 | 1.04 |
| Embodiment 124 | 11 | 117 | 104 | 1.15 | 0.94 | F-1(22) | 138 | 74 | 0.89 | 1.04 |
| Embodiment 125 | 2 | 138 | 93 | 1.15 | 0.94 | E-1(21) | 125 | 72 | 0.82 | 1.06 |
| Embodiment 126 | 14 | 125 | 8 | 1.15 | 0.94 | E-1(21) | 125 | 72 | 0.82 | 1.06 |
| Embodiment 127 | 16 | 125 | 8 | 1.12 | 0.94 | E-1(21) | 125 | 72 | 0.82 | 1.06 |
| Embodiment 128 | 9 | 125 | 100 | 1.15 | 0.94 | E-1(21) | 125 | 72 | 0.82 | 1.06 |
| Embodiment 129 | 8 | 125 | 100 | 1.15 | 0.94 | E-1(21) | 125 | 72 | 0.82 | 1.06 |
| Embodiment 130 | 11 | 117 | 104 | 1.15 | 0.94 | E-1(21) | 125 | 72 | 0.82 | 1.06 |
| Embodiment 131 | 13 | 138 | 3 | 1.15 | 0.94 | J-1(26) | 138 | 3 | 1.15 | 0.94 |
| Embodiment 132 | 4 | 138 | 120 | 1.15 | 0.94 | J-1(26) | 138 | 3 | 1.15 | 0.94 |
| Embodiment 133 | 5 | 138 | 160 | 1.15 | 0.94 | J-1(26) | 138 | 3 | 1.15 | 0.94 |
| Embodiment 134 | 14 | 125 | 8 | 1.15 | 0.94 | J-1(26) | 138 | 3 | 1.15 | 0.94 |
| Embodiment 135 | 10 | 125 | 160 | 1.15 | 0.94 | J-1(26) | 138 | 3 | 1.15 | 0.94 |
| Embodiment 136 | 13 | 138 | 3 | 1.15 | 0.94 | I-1(25) | 120 | 60 | 1.15 | 0.94 |
| Embodiment 137 | 4 | 138 | 120 | 1.15 | 0.94 | I-1(25) | 120 | 60 | 1.15 | 0.94 |
| Embodiment 138 | 5 | 138 | 160 | 1.15 | 0.94 | I-1(25) | 120 | 60 | 1.15 | 0.94 |
| Embodiment 139 | 14 | 125 | 8 | 1.15 | 0.94 | I-1(25) | 120 | 60 | 1.15 | 0.94 |
| Embodiment 140 | 10 | 125 | 160 | 1.15 | 0.94 | I-1(25) | 120 | 60 | 1.15 | 0.94 |
| Embodiment 141 | 13 | 138 | 3 | 1.15 | 0.94 | K-1(27) | 150 | 49 | 1.15 | 0.94 |
| Embodiment 142 | 4 | 138 | 120 | 1.15 | 0.94 | K-1(27) | 150 | 49 | 1.15 | 0.94 |
| Embodiment 143 | 5 | 138 | 160 | 1.15 | 0.94 | K-1(27) | 150 | 49 | 1.15 | 0.94 |
| Embodiment 144 | 14 | 125 | 8 | 1.15 | 0.94 | K-1(27) | 150 | 49 | 1.15 | 0.94 |
| Embodiment 145 | 10 | 125 | 160 | 1.15 | 0.94 | K-1(27) | 150 | 49 | 1.15 | 0.94 |
| Embodiment 146 | 13 | 138 | 3 | 1.15 | 0.94 | G-1(23) | 120 | 64 | 0.89 | 1.04 |
| Embodiment 147 | 4 | 138 | 120 | 1.15 | 0.94 | G-1(23) | 120 | 64 | 0.89 | 1.04 |
| Embodiment 148 | 5 | 138 | 160 | 1.15 | 0.94 | G-1(23) | 120 | 64 | 0.89 | 1.04 |
| Embodiment 149 | 14 | 125 | 8 | 1.15 | 0.94 | G-1(23) | 120 | 64 | 0.89 | 1.04 |
| Embodiment 150 | 10 | 125 | 160 | 1.15 | 0.94 | G-1(23) | 120 | 64 | 0.89 | 1.04 |
| Embodiment 151 | 13 | 138 | 3 | 1.15 | 0.94 | H-1(24) | 150 | 80 | 0.89 | 1.04 |
| Embodiment 152 | 4 | 138 | 120 | 1.15 | 0.94 | H-1(24) | 150 | 80 | 0.89 | 1.04 |
| Embodiment 153 | 5 | 138 | 160 | 1.15 | 0.94 | H-1(24) | 150 | 80 | 0.89 | 1.04 |

| | FRONT WHITE LUMINANCE (cd/m$^2$) | FRONT WHITE LUMINANCE VARIATION | VIEWING ANGLE WHITE LUMINANCE (cd/m$^2$) | FRONT CROSSTALK | VIEWING ANGLE CROSSTALK | VIEWING ANGLE CROSSTALK DIFFERENCE |
|---|---|---|---|---|---|---|
| Embodiment 123 | 104 | A | 17.8 | 11% | 61% | B |
| Embodiment 124 | 104 | A | 17.3 | 14% | 60% | B |
| Embodiment 125 | 104 | A | 17.7 | 12% | 67% | C |
| Embodiment 126 | 104 | A | 19.4 | 11% | 57% | C |
| Embodiment 127 | 104 | A | 19.4 | 11% | 57% | C |
| Embodiment 128 | 104 | A | 17.8 | 11% | 62% | C |
| Embodiment 129 | 104 | A | 17.8 | 11% | 62% | C |
| Embodiment 130 | 104 | B | 17.3 | 11% | 60% | C |
| Embodiment 131 | 104 | B | 19.1 | 10% | 56% | B |

TABLE 7-continued

RESULT WHEN USING ONE-POLARIZING PLATE TYPE LC SHUTTER GLASSES

| | | | | | | |
|---|---|---|---|---|---|---|
| Embodiment 132 | 104 | B | 16.6 | 10% | 69% | B |
| Embodiment 133 | 104 | B | 15.5 | 10% | 83% | B |
| Embodiment 134 | 104 | B | 19.2 | 11% | 57% | B |
| Embodiment 135 | 104 | B | 15.6 | 11% | 75% | B |
| Embodiment 136 | 104 | B | 19.0 | 13% | 56% | C |
| Embodiment 137 | 104 | B | 16.6 | 13% | 69% | C |
| Embodiment 138 | 104 | B | 15.5 | 13% | 84% | C |
| Embodiment 139 | 104 | B | 19.1 | 10% | 57% | C |
| Embodiment 140 | 104 | B | 15.6 | 10% | 75% | C |
| Embodiment 141 | 104 | B | 19.1 | 14% | 57% | C |
| Embodiment 142 | 104 | B | 16.5 | 14% | 70% | C |
| Embodiment 143 | 104 | B | 15.5 | 14% | 84% | C |
| Embodiment 144 | 104 | B | 19.0 | 14% | 57% | C |
| Embodiment 145 | 104 | B | 15.5 | 14% | 76% | C |
| Embodiment 146 | 104 | A | 19.0 | 12% | 56% | C |
| Embodiment 147 | 104 | A | 16.6 | 12% | 69% | C |
| Embodiment 148 | 104 | A | 15.5 | 12% | 84% | C |
| Embodiment 149 | 104 | A | 19.1 | 13% | 57% | C |
| Embodiment 150 | 104 | A | 15.6 | 13% | 75% | C |
| Embodiment 151 | 104 | A | 19.1 | 12% | 57% | C |
| Embodiment 152 | 104 | A | 16.5 | 12% | 70% | C |
| Embodiment 153 | 104 | A | 15.5 | 12% | 84% | C |

| | FRONT WHITE SHADING $\Delta v^2$ | VIEWING ANGLE WHITE SHADING $\Delta v^2$ | LIGHT FASTNESS 2 D | LIGHT FASTNESS 3 D | SCREEN LUMINANCE DIFFERENCE |
|---|---|---|---|---|---|
| Embodiment 123 | A | B | — | — | B |
| Embodiment 124 | A | B | — | — | B |
| Embodiment 125 | B | B | — | — | B |
| Embodiment 126 | A | A | — | — | B |
| Embodiment 127 | A | A | — | — | B |
| Embodiment 128 | A | B | — | — | B |
| Embodiment 129 | A | B | — | — | B |
| Embodiment 130 | A | B | — | — | B |
| Embodiment 131 | C | C | — | — | A |
| Embodiment 132 | C | C | — | — | A |
| Embodiment 133 | C | C | — | — | A |
| Embodiment 134 | C | C | — | — | A |
| Embodiment 135 | C | C | — | — | A |
| Embodiment 136 | B | C | — | — | B |
| Embodiment 137 | B | C | — | — | B |
| Embodiment 138 | B | C | — | — | B |
| Embodiment 139 | B | B | — | — | B |
| Embodiment 140 | B | B | — | — | B |
| Embodiment 141 | C | C | — | — | B |
| Embodiment 142 | C | C | — | — | B |
| Embodiment 143 | C | C | — | — | B |
| Embodiment 144 | C | C | — | — | B |
| Embodiment 145 | C | C | — | — | B |
| Embodiment 146 | B | A | — | — | B |
| Embodiment 147 | B | B | — | — | B |
| Embodiment 148 | B | B | — | — | B |
| Embodiment 149 | A | A | — | — | B |
| Embodiment 150 | A | B | — | — | B |
| Embodiment 151 | B | A | — | — | B |
| Embodiment 152 | B | B | — | — | B |
| Embodiment 153 | B | B | — | — | B |

*1 KIND OF LIQUID CRYSTAL DISPLAY,
*2 KIND OF LC SHUTTER GLASSES, and
*3 KIND OF FILM DISPOSED IN LC SHUTTERS

TABLE 8

RESULT WHEN USING ONE-POLARIZING PLATE TYPE LC SHUTTER GLASSES

| | DISPLAY SIDE POLARIZING PLATE PROTECTION REGION OF LIQUID CRYSTAL DISPLAY | | | | | λ/4 FILM OF LC SHUTTER GLASSES | | | | |
|---|---|---|---|---|---|---|---|---|---|---|
| | KIND*1 | Re (550) (nm) | Rth (550) (nm) | Re (450)/ Re (550) | Re (630)/ Re (550) | GLASSES KIND*2 (FILM KIND*3) | Re (550) (nm) | Rth (550) (nm) | Re(450)/ Re(550) | Re(630)/ Re(550) |
| Embodiment 154 | 14 | 125 | 8 | 1.15 | 0.94 | H-1(24) | 150 | 80 | 0.89 | 1.04 |
| Embodiment 155 | 10 | 125 | 160 | 1.15 | 0.94 | H-1(24) | 150 | 80 | 0.89 | 1.04 |
| Embodiment 156 | 46 | 125 | 8 | 1.15 | 0.94 | F-1(22) | 138 | 74 | 0.89 | 1.06 |
| Embodiment 157 | 47 | 125 | 8 | 1.15 | 0.94 | F-1(22) | 138 | 74 | 0.89 | 1.06 |
| Embodiment 158 | 48 | 125 | 8 | 1.15 | 0.95 | F-1(22) | 138 | 74 | 0.89 | 1.06 |
| Embodiment 159 | 49 | 125 | 8 | 1.15 | 0.94 | F-1(22) | 138 | 74 | 0.89 | 1.06 |
| Embodiment 160 | 13 | 138 | 3 | 1.15 | 0.94 | F-1(22) | 138 | 74 | 0.89 | 1.06 |
| Embodiment 161 | 4 | 138 | 120 | 1.15 | 0.94 | F-1(22) | 138 | 74 | 0.89 | 1.06 |
| Embodiment 162 | 5 | 138 | 160 | 1.15 | 0.94 | F-1(22) | 138 | 74 | 0.89 | 0.94 |
| Embodiment 163 | 10 | 125 | 160 | 1.15 | 0.94 | F-1(22) | 138 | 74 | 0.89 | 0.94 |
| Embodiment 164 | 31 | 138 | 3 | 1.15 | 0.94 | F-1(22) | 138 | 74 | 0.89 | 0.94 |
| Embodiment 165 | 28 | 138 | 120 | 1.15 | 0.94 | F-1(22) | 138 | 74 | 0.89 | 0.94 |
| Embodiment 166 | 29 | 138 | 160 | 1.15 | 0.94 | F-1(22) | 138 | 74 | 0.89 | 0.94 |
| Embodiment 167 | 32 | 125 | 8 | 1.15 | 0.94 | F-1(22) | 138 | 74 | 0.89 | 0.94 |
| Embodiment 168 | 30 | 125 | 160 | 1.15 | 0.94 | F-1(22) | 138 | 74 | 0.89 | 0.94 |
| Embodiment 169 | 36 | 138 | 3 | 1.15 | 0.94 | F-1(22) | 138 | 74 | 0.89 | 0.94 |
| Embodiment 170 | 33 | 138 | 120 | 1.15 | 0.94 | F-1(22) | 138 | 74 | 0.89 | 0.94 |
| Embodiment 171 | 34 | 138 | 160 | 1.15 | 0.94 | F-1(22) | 138 | 74 | 0.89 | 0.94 |
| Embodiment 172 | 37 | 125 | 8 | 1.15 | 0.94 | F-1(22) | 138 | 74 | 0.89 | 0.94 |
| Embodiment 173 | 35 | 125 | 160 | 1.15 | 0.94 | F-1(22) | 138 | 74 | 0.89 | 0.94 |
| Embodiment 174 | 41 | 138 | 3 | 1.15 | 0.94 | F-1(22) | 138 | 74 | 0.89 | 0.94 |
| Embodiment 175 | 38 | 138 | 120 | 1.15 | 0.94 | F-1(22) | 138 | 74 | 0.89 | 0.94 |
| Embodiment 176 | 39 | 138 | 160 | 1.15 | 0.94 | F-1(22) | 138 | 74 | 0.89 | 0.94 |
| Embodiment 177 | 42 | 125 | 8 | 1.15 | 0.94 | F-1(22) | 138 | 74 | 0.89 | 1.04 |
| Embodiment 178 | 40 | 125 | 160 | 1.15 | 0.94 | F-1(22) | 138 | 74 | 0.89 | 1.04 |
| Embodiment 179 | 18 | 138 | 120 | 1.00 | 1.00 | F-1(22) | 138 | 74 | 0.89 | 1.04 |
| Embodiment 180 | 43 | 138 | 120 | 1.00 | 1.00 | F-1(22) | 138 | 74 | 0.89 | 1.04 |
| Embodiment 181 | 44 | 138 | 120 | 1.00 | 1.00 | F-1(22) | 138 | 74 | 0.89 | 1.04 |
| Embodiment 182 | 45 | 138 | 120 | 1.00 | 1.00 | F-1(22) | 138 | 74 | 0.89 | 1.04 |
| Comparative Example 3 | 50 | (No λ/4 Film) | | | | S | (No λ/4 Film) | | | |
| Comparative Example 4 | 6 | 138 | 183 | 1.15 | 0.94 | A-1(1) | 138 | 54 | 1.15 | 0.94 |

| | FRONT WHITE LUMINANCE (cd/m²) | FRONT WHITE LUMINANCE VARIATION | VIEWING ANGLE WHITE LUMINANCE (cd/m²) | FRONT CROSSTALK | VIEWING ANGLE CROSSTALK | VIEWING ANGLE CROSSTALK DIFFERENCE |
|---|---|---|---|---|---|---|
| Embodiment 154 | 104 | A | 19.0 | 13% | 57% | C |
| Embodiment 155 | 104 | A | 15.5 | 13% | 76% | C |
| Embodiment 156 | 104 | A | 19.4 | 11% | 56% | B |
| Embodiment 157 | 104 | A | 19.4 | 11% | 56% | B |
| Embodiment 158 | 104 | A | 19.4 | 11% | 56% | B |
| Embodiment 159 | 104 | A | 19.4 | 11% | 56% | B |
| Embodiment 160 | 104 | A | 19.1 | 11% | 56% | B |
| Embodiment 161 | 104 | A | 16.6 | 11% | 69% | B |
| Embodiment 162 | 104 | A | 15.5 | 11% | 83% | B |
| Embodiment 163 | 104 | A | 15.6 | 11% | 75% | B |
| Embodiment 164 | 104 | A | 19.0 | 11% | 57% | B |
| Embodiment 165 | 104 | A | 16.5 | 11% | 70% | B |
| Embodiment 166 | 104 | A | 15.4 | 11% | 84% | B |
| Embodiment 167 | 104 | A | 19.2 | 11% | 56% | B |
| Embodiment 168 | 104 | A | 15.6 | 11% | 75% | B |
| Embodiment 169 | 104 | A | 19.1 | 11% | 56% | B |
| Embodiment 170 | 104 | A | 16.6 | 11% | 69% | B |
| Embodiment 171 | 104 | A | 15.5 | 11% | 83% | B |
| Embodiment 172 | 104 | A | 19.4 | 11% | 56% | B |
| Embodiment 173 | 104 | A | 15.6 | 11% | 75% | B |
| Embodiment 174 | 104 | A | 19.1 | 11% | 56% | B |
| Embodiment 175 | 104 | A | 16.6 | 11% | 69% | B |
| Embodiment 176 | 104 | A | 15.5 | 11% | 83% | B |
| Embodiment 177 | 104 | A | 19.4 | 11% | 56% | B |
| Embodiment 178 | 104 | A | 15.6 | 11% | 75% | B |
| Embodiment 179 | 104 | A | 16.6 | 11% | 68% | B |
| Embodiment 180 | 104 | A | 16.6 | 11% | 68% | B |
| Embodiment 181 | 104 | A | 16.6 | 11% | 68% | B |
| Embodiment 182 | 104 | A | 16.6 | 11% | 68% | B |
| Comparative Example 3 | 104 | D | 15.4 | 11% | 70% | F |

TABLE 8-continued

RESULT WHEN USING ONE-POLARIZING PLATE TYPE LC SHUTTER GLASSES

| | | | | | | |
|---|---|---|---|---|---|---|
| Comparative Example 4 | 104 | D | 15.2 | 10% | 90% | B |

| | FRONT WHITE SHADING | VIEWING ANGLE WHITE SHADING | LIGHT FASTNESS | | SCREEN LUMINANCE |
|---|---|---|---|---|---|
| | $\Delta v^2$ | $\Delta v^2$ | 2 D | 3 D | DIFFERENCE |
| Embodiment 154 | B | A | — | — | B |
| Embodiment 155 | B | B | — | — | B |
| Embodiment 156 | A | A | A | A | B |
| Embodiment 157 | A | A | A | D | B |
| Embodiment 158 | A | A | B | B | B |
| Embodiment 159 | A | A | D | D | B |
| Embodiment 160 | B | A | — | — | B |
| Embodiment 161 | B | B | — | — | B |
| Embodiment 162 | B | B | — | — | B |
| Embodiment 163 | A | B | — | — | B |
| Embodiment 164 | B | A | — | — | B |
| Embodiment 165 | B | B | — | — | B |
| Embodiment 166 | B | B | — | — | B |
| Embodiment 167 | A | A | — | — | B |
| Embodiment 168 | A | B | — | — | B |
| Embodiment 169 | B | A | — | — | B |
| Embodiment 170 | B | B | — | — | B |
| Embodiment 171 | B | B | — | — | B |
| Embodiment 172 | A | A | — | — | B |
| Embodiment 173 | A | B | — | — | B |
| Embodiment 174 | B | A | — | — | B |
| Embodiment 175 | B | B | — | — | B |
| Embodiment 176 | B | B | — | — | B |
| Embodiment 177 | A | A | — | — | B |
| Embodiment 178 | A | B | — | — | B |
| Embodiment 179 | A | B | — | — | B |
| Embodiment 180 | A | B | — | — | B |
| Embodiment 181 | A | B | — | — | B |
| Embodiment 182 | A | B | — | — | B |
| Comparative Example 3 | D | D | — | — | D |
| Comparative Example 4 | C | D | — | — | B |

*1KIND OF LIQUID CRYSTAL DISPLAY,
*2KIND OF LC SHUTTER GLASSES, and
*3KIND OF FILM DISPOSED IN LC SHUTTERS It can be seen from the above-described results that in the stereoscopic image recognition apparatus which includes the liquid crystal display I having the display side polarizing plate protection region satisfying the above Expression (I) and the one-polarizing plate type LC shutter glasses (the time division image display shutter II) having the λ/4 plate, as compared with a current product stereoscopic image recognition apparatus where none of the display side polarizing plate protection region of the liquid crystal display and the LC shutter glasses include the λ/4 plate, and a stereoscopic image recognition apparatus which includes the liquid crystal display having the display side polarizing plate protection region which does not satisfy the above Expression (I), the front white luminance, the front crosstalk, and the viewing angle crosstalk are the same, the front white luminance is not varied, and viewing angle luminance is high.

Upon comparison of four items of the front white luminance, the front crosstalk, the viewing angle crosstalk, and the front white luminance variation of the stereoscopic image recognition apparatuses according to Embodiments 92 to 182 with four items of the front white luminance, the front crosstalk, the viewing angle crosstalk, and the front white luminance variation of the stereoscopic image recognition apparatuses according to the comparative example 3 having no λ/4 plate in the display side polarizing plate protection region and the LC shutter glasses, it can be seen that the stereoscopic image recognition apparatuses of the present invention are notably excellent from the viewpoint of the front white luminance variation while maintaining the equivalent front white luminance, front crosstalk, and viewing angle crosstalk.

In addition, referring to the comparative example 4, although the stereoscopic image recognition apparatus is the same as the stereoscopic image recognition apparatuses according to Embodiments 92 to 96 except that Rth of the display side polarizing plate protection region is different, since Rth of the display side polarizing plate protection region does not satisfy the above Expression (I) in the comparative example 4, the viewing angle white luminance is lower than that in the comparative example 3. From this, it is clear that bright 3D display where the viewing angle white luminance is improved can be initially achieved by employing a λ/4 plate in both of the display side polarizing plate protection region of the liquid crystal display and the LC shutter glasses, and by the display side polarizing plate protection region satisfying the Expression (I), as compared with an stereoscopic image recognition apparatus in the related art which does not include.

In addition, since Rth of the display side polarizing plate protection region does not satisfy the above Expression (II) in the Embodiment 96, the viewing angle crosstalk is lower than that in the comparative example 3. From this, it can be seen that a stereoscopic image recognition apparatus where the front white luminance is the same, and the front crosstalk, the front white luminance variation, the viewing angle crosstalk difference, the front white luminance, and viewing angle luminance are excellent as compared with a stereoscopic image recognition apparatus which does not include a λ/4 plate in the related, can be obtained by Rth of the display side polarizing plate protection region satisfying the above Expression (II).

It can be seen that the stereoscopic image recognition apparatus having the λ/4 plate of the one-polarizing plate type LC shutter glasses which satisfies the above Expressions (XII) and (XIII) is an excellent stereoscopic image recognition apparatus where the front white shading and the viewing angle shading are good, and a color difference is not viewed even if the LC shutter glasses are rotated, along with the characteristics (the front white luminance, the front crosstalk, the viewing angle crosstalk, the front white luminance variation, and the viewing angle white luminance). Specifically, referring to Embodiments 94, 97, 98 and 101 employing the LC shutter glasses A-1, Embodiments 111 to 114 employing the LC shutter glasses C-1, Embodiments 115, 116, 119 and 120 employing the LC shutter glasses D-1, and Embodiments 121 to 124 employing the LC shutter glasses F-1, they are stereoscopic image recognition apparatuses having the same configuration except that λ/4 plates used in the LC shutter glasses are different. However, it can be seen that in the stereoscopic image recognition apparatuses according to Embodiments 91, 97, 98 and 101 employing the LC shutter glasses A-1, and Embodiments 111 to 114 employing the LC shutter glasses C-1, since the λ/4 plate of the LC shutter glasses does not satisfy the above Expressions (XII) and (XIII), variations are large as compared with those in the stereoscopic image recognition apparatuses according to Embodiments 115, 116, 119 and 120 employing the LC shutter glasses D-1, and Embodiments 121 to 124 employing the LC shutter glasses F-1.

In addition, it can be seen from the comparison between the above-described Embodiments that a λ/4 plate of the LC shutter glasses and a λ/4 plate of the display side polarizing plate protection region are preferably made of different materials in some cases. That is to say, in the related art, if a λ/4 plate of the LC shutter glasses and a λ/4 plate of the display side polarizing plate protection region are made of the same material, wavelength dispersibility of Re or Rth are the same, which is thus preferable from the viewpoint of circular polarization compensation. However, it can be seen that Re of the λ/4 plate of the LC shutter glasses preferably shows backward dispersibility (shows such wavelength dispersibility that the longer a wavelength is, the larger wavelength dispersion of Re is in the visible ray region).

As a result of comparison with regard to a relationship between Re (550) of a λ/4 plate and the front white shading v' in a stereoscopic image recognition apparatus where Re of a λ/4 plate of the display side polarizing plate protection region shows forward dispersion, as Re (550) of the λ/4 plate of the display side polarizing plate protection region was reduced, the front white shading v' was also reduced. For example, upon comparison of the white shading v' of Embodiments 111 to 114, the lower Re (550) of the λ/4 plate of the display side polarizing plate protection region was, the more reduced was a v' variation in white display when the LC shutter glasses were rotated. Particularly, if Re (550) of the λ/4 plate of the display side polarizing plate protection region was decreased from 138 nm to 125 nm, the v' variation in white display when the LC shutter glasses was dramatically improved.

It can be seen from the comparison of Embodiments 92, 95 to 97 and 99 and Embodiments 131 to 135 that if Rth of a λ/4 plate used in the LC shutter glasses is low, the screen luminance difference of the liquid crystal display is improved.

Upon the comparison of the viewing angle white shading of Embodiments 92 to 96, all the evaluations in the above Tables were given C, but the lower Rth of the display side polarizing plate protection region was, the more reduced a color variation was. From this, it can be seen that the lower Rth of the display side polarizing plate protection region is, the more reduced a viewing angle color variation is.

It can be seen from the comparison of the light fastness of Embodiments 156 to 159 that the display side polarizing plate protection region having necessary UV absorption power is necessary from the viewpoint of the light fastness of the optically anisotropic layer included in the display side polarizing plate protection region and the display side polarizer of the liquid crystal display. Specifically, in Embodiment 159 employing the film 49 which does not satisfy necessary UV absorption power from the viewpoint of the light fastness in the display side polarizing plate protection region, reduction in display performance was shown in both of 2D and 3D after the light fastness was tested, and, in Embodiment 157 where a support which satisfies necessary UV absorption power from the viewpoint of the light fastness is disposed between the optically anisotropic layer of the display side polarizing plate protection region and the display side polarizing plate, only 3D display performance was reduced after the light fastness was test. On the other hand, in Embodiments 156 and 158 employing the films 46 and 48 in the display side polarizing plate protection region, a support satisfying necessary UV absorption power was disposed on the outer side of the open loop algorithm of the display side polarizing plate protection region and the display side polarizing plate, and thus performance reduction was not shown in any of 2D and 3D display after the light fastness was tested. From this, it can be seen that it is necessary to provide a support and a function layer having necessary UV absorption power on the outer sides of the optically anisotropic layer included in the display side polarizing plate protection region and the display side polarizing plate from the viewpoint of the light fastness.

Reference Examples

In Embodiment 94, a stereoscopic image recognition apparatus manufactured in the same manner as Embodiment 94 except that the liquid crystal display 50 is used instead of the liquid crystal display 2 was evaluated in the same manner. As a result, the front white luminance and the viewing angle white luminance were reduced, and the front crosstalk and the viewing angle crosstalk were increased (deteriorated). In addition, in Embodiment 94, a stereoscopic image recognition apparatus manufactured in the same manner as Embodiment 94 except that the LC shutter glasses S was used instead of the LC shutter glasses A-1 as LC shutter glasses was also evaluated in the same manner; however, in the same manner as the previous description, the front white luminance and the viewing angle white luminance were reduced, and the front crosstalk and the viewing angle crosstalk were increased (deteriorated). From this, it can be seen that effects of the present invention can be achieved by using a λ/4 film in both the liquid crystal display and the LC shutter glasses and satisfying the above Expression (I).

In Embodiments 92 to 182 and the comparative examples 3 and 4, the evaluation was made using "LC-46LV3" manufactured by SHARP Corporation as a liquid crystal display and "AN-3DG10" manufactured by SHARP Corporation as LC shutter glasses, and a case of using "UN46C7000" manufactured by SAMSUNG Corporation as a liquid crystal display and "SSG-2200AR" manufactured by SAMSUNG Corporation as LC shutter glasses was also evaluated in the same manner. As a result, in the "UN46C7000" manufactured by SAMSUNG Corporation, the absolute value of crosstalk obtained by a TV circuit factor was decreased as described above; however, a relationship between Rth of the display side polarizing plate protection region, optical characteristics of the LC shutter glasses, and the 3D display characteristics showed the same propensity. In contrast, crosstalk due to the TV circuit factor was reduced, and, accordingly, a crosstalk difference due to Rth of the display side polarizing plate protection region was enlarged. However, since a relationship between Rth of the display side polarizing plate protection region, optical characteristics of the LC shutter glasses, and the 3D display characteristics showed the same propensity as the above-described result in the "UN46C7000" manufactured by SAMSUNG Corporation as well, it is clear that effects of the present invention are achieved by the λ/4 films of the display side polarizing plate protection region and the LC shutter glasses satisfying the above Expressions (I) to (XIII) regardless of the crosstalk due to a TV circuit factor.

Although in Embodiments 122, 160 to 163, CLEAR LR "CV-LC" (manufactured by Fujifilm Corporation) of a low reflection film is used in the viewing side polarizing plate of the liquid crystal display, since the same effects were also confirmed in the Embodiments 164 to 168 using "AGA1" (manufactured by Sanritz Automation Co., Ltd.) of a reflection inhibiting film, in Embodiments 169 to 173 using CLEAR LR "CV-LC" (manufactured by Fujifilm Corporation) of a reflection inhibiting film, and in Embodiments 174 to 178 using CLEAR AR (manufactured by SONY Chemical Corp.) of a low reflection film, it can be seen that effects of the present invention can be achieved without depending on the kinds of functions layers disposed at the outmost surface of the viewing side polarizing plate of the liquid crystal display. In addition, it is estimated that the same effects can be achieved in a case of using an anti-glare film or an anti-reflection film as well.

In Embodiments 92 to 182, a stereoscopic image recognition apparatus manufactured in the same manner as Embodiments 92 to 182 except that the attached angle 135 degrees of the slow axis of the λ/4 plate forming the polarizing plates 2 to 6, 8 to 16, 18, 20, and 28 to 49 and the absorption axis of the polarizer used in the liquid crystal display, and a slow axis angle of a film attached to the LC shutter glasses were changed was evaluated in the same manner. As a result, if the slow axis of the λ/4 plate A and the absorption axis of the polarizer is 35 to 55° or 125 to 145°, 3D display characteristic showed the same propensity as in Embodiments 92 to 182. Particularly, if the slow axis of the λ/4 plate A and the absorption axis of the polarizer is 40 to 50° or 130 to 140°, 3D display characteristic showed the same result as in Embodiments 92 to 182.

Although, in the above-described Embodiments 92 to 182, as the λ/4 plates of the display side polarizing plate protection region and the LC shutter glasses, a cellulose acylate-based film, an optically anisotropic layer containing a liquid crystalline compound, a norborene-based polymer film, and a polycarbonate-based film, the same effects will be achieved even using, for example, a cellulose acylate-based film, and other films including, as a main component, cellulose acylate (for example, a film of cellulose propionate, cellulose bytyrate, or the like), polyolefin (for example, norborene-based polymer), poly(meth)acrylic ester (for example, polymethylmethacrylate), polycarbonate, polyester, or polysulfone, as the λ/4 plates of the display side polarizing plate protection region and the LC shutter glasses. In addition, it is estimated that the same effects will be achieved even using other commercially available polymer films (in a norborene-based polymer film, ARTON (manufactured by JSR Corp.), ZEONOR (manufactured by Zeon Corp. in Japan), and the like).

What is claimed is:

1. A stereoscopic image recognition apparatus comprising:
a liquid crystal display I that comprises: a backlight unit, a first liquid crystal cell and a pair of polarizing plates interposing the first liquid crystal cell therebetween, one of the polarizing plates being a display side polarizing plate on a display side of the first liquid crystal cell and the other of the polarizing plates being on a backlight unit side of the first liquid crystal cell; and
a time division image display shutter II that comprises a second liquid crystal cell and that is disposed between a display surface of the liquid crystal display I and a viewer, wherein the liquid crystal display I includes a λ/4 plate A in a protection region for the display side polarizing plate, the protection region being a region on the display side of a polarizer of the one of the polarizing plates, wherein an angle formed by an absorption axis of the display side polarizing plate and a slow axis of the λ/4 plate A is 35 to 55° or 125 to 145°, and the protection region satisfies the following Expression (III),
wherein the time division image display shutter II includes a polarizing plate C between the second liquid crystal cell and the viewer and includes a λ/4 plate B between the polarizing plate C and the liquid crystal display I,
wherein when the absorption axis of the display side polarizing plate and the absorption axis of the polarizing plate C are disposed so as to be perpendicular or parallel to each other, the slow axes of the λ/4 plate A and the λ/4 plate B are perpendicular or parallel to each other:

$$|Rth\,(550)| \leq 80\ nm \qquad (III)$$

wherein Rth (λ) is a retardation (nm) in a thickness direction at a wavelength λ nm, and wherein the protection region for the display side polarizing plate has an Re(550) of 100 to 175 nm, wherein the protection region satisfies the following Expressions (IV) and (V):

$$1.00 \leq Re(450)/Re(550) \leq 1.18 \qquad (IV)$$

$$0.92 \leq Re(630)/Re(550) \leq 1.00 \qquad (V)$$

where Re (λ) is an in-plane retardation (nm) at a wavelength λ nm, and wherein the λ/4 plate B satisfies the following Expressions (XII) and (XIII):

$$Re(450)/Re(550) \leq 0.89 \qquad (XII)$$

$$Re(630)/Re(550) \geq 1.04 \qquad (XIII)$$

where Re (λ) is an in-plane retardation (nm) at a wavelength λ nm.

2. The stereoscopic image recognition apparatus according to claim 1, wherein at least one of the λ/4 plate A and the λ/4 plate B includes a transparent support, an alignment film, and an optically anisotropic layer containing a liquid crystalline compound.

3. The stereoscopic image recognition apparatus according to claim 2, wherein the liquid crystalline compound is a discotic liquid crystalline compound, and the discotic liquid crystalline compound is substantially vertically aligned in the optically anisotropic layer.

4. The stereoscopic image recognition apparatus according to claim 1, wherein the protection region has an anti-reflection layer on an outmost surface thereof.

5. The stereoscopic image recognition apparatus according to claim 1, wherein the protection region has an absorptivity of 0.06 or more at 380 nm.

6. The stereoscopic image recognition apparatus according to claim 1, wherein the time division image display shutter II includes at least the λ/4 plate B, the second liquid crystal cell, and the polarizing plate C in this order from a side facing the liquid crystal display I.

7. The stereoscopic image recognition apparatus according to claim 1, wherein the time division image display shutter II includes at least the λ/4 plate B, a polarizing plate, the second liquid crystal cell, and the polarizing plate C in this order from a side facing the liquid crystal display I.

* * * * *